US011156201B2

(12) United States Patent
Sheldon-Coulson et al.

(10) Patent No.: US 11,156,201 B2
(45) Date of Patent: Oct. 26, 2021

(54) INERTIAL PNEUMATIC WAVE ENERGY DEVICE

(71) Applicant: LONE GULL HOLDINGS, LTD., Portland, OR (US)

(72) Inventors: Garth Alexander Sheldon-Coulson, Moorpark, CA (US); Brian Lee Moffat, Simi Valley, CA (US); Daniel William Place, Los Angeles, CA (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 16/412,225

(22) Filed: May 14, 2019

(65) Prior Publication Data

US 2019/0353139 A1 Nov. 21, 2019

Related U.S. Application Data

(60) Provisional application No. 62/672,579, filed on May 17, 2018, provisional application No. 62/693,373, filed on Jul. 2, 2018.

(51) Int. Cl.
*F03B 13/10* (2006.01)
*F03B 13/12* (2006.01)
*F03B 13/24* (2006.01)
*H02K 7/18* (2006.01)

(52) U.S. Cl.
CPC ........... *F03B 13/24* (2013.01); *H02K 7/1823* (2013.01); *F05B 2220/706* (2013.01)

(58) Field of Classification Search
CPC .. F03B 13/24; H02K 7/1823; F05B 2220/706
See application file for complete search history.

(56) References Cited

U.S. PATENT DOCUMENTS

| | | | | |
|---|---|---|---|---|
| 3,064,137 A | * | 11/1962 | Corbett, Jr. .......... | H02K 7/1853 290/53 |
| 3,200,255 A | * | 8/1965 | Masuda ............... | H02K 7/1853 290/42 |
| 3,922,739 A | * | 12/1975 | Babintsev ............ | H01M 10/44 441/16 |
| 4,152,895 A | * | 5/1979 | Wirt ..................... | F03B 13/141 60/398 |
| 4,258,269 A | * | 3/1981 | Tsubota ................ | F03B 13/22 290/53 |
| 4,271,668 A | * | 6/1981 | McCormick .......... | F03B 13/142 60/398 |
| 4,286,347 A | * | 9/1981 | Modisette ............ | F03B 13/142 60/398 |

(Continued)

*Primary Examiner* — Tulsidas C Patel
*Assistant Examiner* — Thomas K Quigley
(74) *Attorney, Agent, or Firm* — Fulwider Patton LL0

(57) ABSTRACT

A buoyant wave energy device is disclosed that incorporates an open-bottomed tube of substantial length in which is partially enclosed a first body of water that oscillates in response to wave action. The device incorporates a buoy to which an upper end of the tube is connected and inside of which is trapped a second body of water of substantial mass. A differential phase in the oscillations of the water trapped in the tube, and the oscillations of the buoy of augmented mass, result in the periodic compression of a pocket of air trapped at the top of the tube, and in the subsequent expulsion of pressurized air through a turbine, thereby generating electrical power.

10 Claims, 80 Drawing Sheets

(56) References Cited

U.S. PATENT DOCUMENTS

| | | | | |
|---|---|---|---|---|
| 4,312,288 A * | 1/1982 | Finsterwalder | F03G 7/05 | 114/264 |
| 4,341,959 A * | 7/1982 | Ambli | F03B 13/147 | 290/53 |
| 4,383,413 A * | 5/1983 | Wells | F03B 13/142 | 60/497 |
| 4,441,316 A * | 4/1984 | Moody | F03B 13/142 | 60/398 |
| 4,719,754 A * | 1/1988 | Nishikawa | F03B 13/142 | 60/501 |
| 4,864,958 A * | 9/1989 | Belinsky | B63B 1/107 | 114/265 |
| 5,191,225 A * | 3/1993 | Wells | F03B 13/142 | 290/53 |
| 5,375,550 A * | 12/1994 | Innis | B63B 3/08 | 114/266 |
| 5,701,740 A * | 12/1997 | Tveter | F03B 13/1875 | 60/505 |
| 5,770,893 A * | 6/1998 | Youlton | F03B 13/24 | 290/53 |
| 5,842,838 A * | 12/1998 | Berg | B01D 61/10 | 417/331 |
| 5,975,865 A * | 11/1999 | Manabe | F04B 17/00 | 417/331 |
| 6,574,957 B2 * | 6/2003 | Brumfield | F03B 13/266 | 60/398 |
| 6,812,588 B1 * | 11/2004 | Zadig | F04B 17/00 | 290/53 |
| 6,849,963 B2 * | 2/2005 | Grinsted | F03B 17/06 | 290/42 |
| 7,554,216 B2 * | 6/2009 | Winsloe | F03B 13/142 | 290/53 |
| 7,823,525 B2 * | 11/2010 | Brown | B63B 35/44 | 114/264 |
| 7,980,832 B2 * | 7/2011 | Ahdoot | F03B 13/20 | 417/333 |
| 8,030,789 B2 * | 10/2011 | Ortiz | F03B 13/142 | 290/43 |
| 8,129,854 B2 * | 3/2012 | Patten | F03B 13/20 | 290/53 |
| 8,424,300 B1 * | 4/2013 | Navarro | F03B 13/14 | 60/398 |
| 8,446,030 B2 * | 5/2013 | Brown | F03B 13/24 | 290/53 |
| 8,668,472 B2 * | 3/2014 | Tillotson | F03B 13/189 | 417/332 |
| 8,745,981 B1 * | 6/2014 | Hanna | F03B 13/1855 | 60/398 |
| 8,841,792 B2 * | 9/2014 | Teichman | F03B 13/24 | 290/53 |
| 8,974,184 B2 * | 3/2015 | Becker | F03B 13/142 | 416/136 |
| 9,518,556 B2 * | 12/2016 | Song | F03B 13/24 | |
| 2006/0225634 A1 * | 10/2006 | Cho | B63B 39/03 | 114/264 |
| 2009/0121486 A1 * | 5/2009 | Ganley | F03B 13/262 | 290/53 |
| 2010/0038913 A1 * | 2/2010 | Svelund | F03B 13/20 | 290/53 |
| 2010/0237623 A1 * | 9/2010 | Brown | E02B 9/08 | 290/53 |
| 2010/0308590 A1 * | 12/2010 | Rohrer | F03B 13/188 | 290/53 |
| 2011/0012357 A1 * | 1/2011 | Lai | F03B 13/26 | 290/53 |
| 2011/0101696 A1 * | 5/2011 | Holle | F01D 5/225 | 290/53 |
| 2013/0145753 A1 * | 6/2013 | Becker | F03B 15/00 | 60/327 |
| 2017/0314526 A1 * | 11/2017 | Farley | F03B 13/188 | |

* cited by examiner

INERTIAL PNEUMATIC WAVE ENERGY DEVICE

CROSS-REFERENCES TO RELATED APPLICATIONS

This application claims priority from U.S. Ser. No. 62/693,373, filed Jul. 2, 2018. and U.S. Ser. No. 62/672,579, filed May 17, 2018, the contents of which are incorporated herein by reference in their entirety.

BACKGROUND

Large-scale computing currently has at least two significant limitations and/or drawbacks, each of which is solved by the present invention. First, computers require electrical power in order to operate and perform their calculations. Electrical power is required to energize CPUs. Electrical power is required to energize random-access memory. Electrical power is required to energize shared and/or more persistent memory (e.g. hard disks). Electrical power is required to energize switches, routers, and other equipment supporting network connections between computers.

As society's reliance on computers and computing increases, the portion of the world's energy budget that is consumed by computers and computing also increases. By some estimates, computers and computing currently account for approximately 4% of the world's total electricity budget and the percentage is growing exponentially, especially with respect to computationally intensive tasks such as simulations, artificial intelligence, and mining of cryptocurrencies such as Bitcoin.

Secondly, computers generate heat. Most (if not all) of the electrical power used to energize computers is converted to, and/or lost as, heat from the circuits and components that execute the respective computational tasks. The heat generated by computers can raise the temperatures of computers to levels that can cause those computers to fail, especially when the computers are located in close proximity to one another. Because of this, computers, and/or the environments in which they operate, must be cooled. And, cooling, e.g. through air conditioners and/or air conditioning, requires and/or consumes significant amounts of electrical energy. Favorable historical trends in the miniaturization of computer components (e.g. "Moore's Law") are currently slowing, suggesting that future increases in computational power may require greater investments in cooling than was common in the past.

SUMMARY OF THE INVENTION

The present invention relates to a novel wave energy converter containing two substantial masses which, as a result of wave action, are driven away from and toward one another, thereby compressing and causing the expulsion through turbines of air trapped and cyclically compressed within a chamber. Some embodiments of the wave energy device disclosed herein comprise a buoy, a water tube, an air turbine, a power take off, and one or more one-way valves. The disclosed apparatus floats adjacent to an upper surface of a body of water, e.g. the sea, and is low-cost, robust, and captures the energy of ocean waves and converts it into electrical power in an efficient manner.

The wave energy device of the present invention differs from oscillating water columns, and other wave energy devices, of the prior art through its inclusion of attributes that significantly increase its efficiency, including, but not limited to:

1) A substantial ballast positioned within the buoy causing the device to manifest a large downward momentum following the passage of a wave crest.

2) The positioning of the device's ballast within an upper portion of the device (e.g., within the buoy), as opposed to a lower portion (e.g., near the bottom of a submerged tube). By placing the device's downward-pushing ballast adjacent to the buoy surfaces against which the upward-pushing buoyant forces of the displaced waters are imparted, the structural requirements of the device are significantly lessened, and the ability of the device to withstand violent storm wave action is increased.

3) The use of water (e.g., seawater) to provide a significant portion of the device's ballast, which provides the device an ability to alter the mass of its ballast in response to changes in wave conditions, e.g., in order to adapt the motion, orientation, and/or position of the device to wave conditions of varying energies, and which reduces structural costs.

4) A buoy displacing a relatively significant waterplane area, for example, a waterplane area of at least three times the cross-sectional area of its water tube channel, as opposed to a "spar buoy" type of relatively meager waterplane area, so as to maximize the amount of wave energy transmitted or imparted to the device.

5) The storage of high-pressure air, low-pressure air, or both, within pneumatic "accumulators" or buffers, which effectively decouple the air pressures used to generate electrical power from the oscillating and impulsive changes in air pressure generated by the device's tube, and thereby permitting a relatively steady generation of electrical power from smaller, and less costly, turbines and generators, instead of an impulsive generation of power from significantly larger and more expensive turbines and generators (e.g., turbines and generators with the capacity to handle more powerful and volumetric surges of air). The steadier generation of electrical power minimizes the need for batteries, flywheels, or other energy storage and/or buffering components, resulting in a further reduction of device costs.

6) The provision of self-propulsion capabilities permitting the positioning and operation of devices at locations far from shore where wave energies are greater than at near-shore locations, and thereby permitting greater power-generation efficiencies and higher capacity factors.

7) The consumption of generated electrical power onboard the devices so as to profitably monetize the output of each device without the benefit of a power cable through which electrical power might be transmitted back to shore.

8) The consumption of generated electrical power onboard the devices by computing devices and/or circuits so as to process arbitrary computing tasks transmitted to the device via encoded electromagnetic signals.

9) The incorporation of phased array antennas (and/or other types of antennas) across and/or over the broad area(s) of the device's upper surface(s) and/or deck(s).

A preferred embodiment of the device disclosed herein locates and/or compartmentalizes computers within or adjacent to a buoy, or buoyant portion, floating adjacent to the surface of a body of water. And, a substantial portion of the electrical power generated by the embodiment in response to wave action is used to energize the buoy's cluster(s) of computers, at least some of the time. The resulting heat generated by the computers can be transmitted (e.g. passively, convectively, conductively, and/or via the boiling of a phase-change coolant) to the water on which the buoy floats, or to the air surrounding the buoy, e.g. strong ocean winds.

Another aspect of the present invention is a novel type of computing apparatus which is integrated within a buoy that obtains the energy required to power its computing operations from waves that travel across the surface of the body of water on which the buoy floats. Additionally, these self-powered computing buoys employ novel designs to utilize their close proximity to a body of water and/or to strong ocean winds to significantly lower the cost and complexity of cooling their computing circuits. \

These and other features of the invention will best be understood with reference to the accompanying figures in conjunction with the detailed description of the preferred embodiments below.

DETAILED DESCRIPTION OF THE PREFERRED EMBODIMENTS

Figure 1:
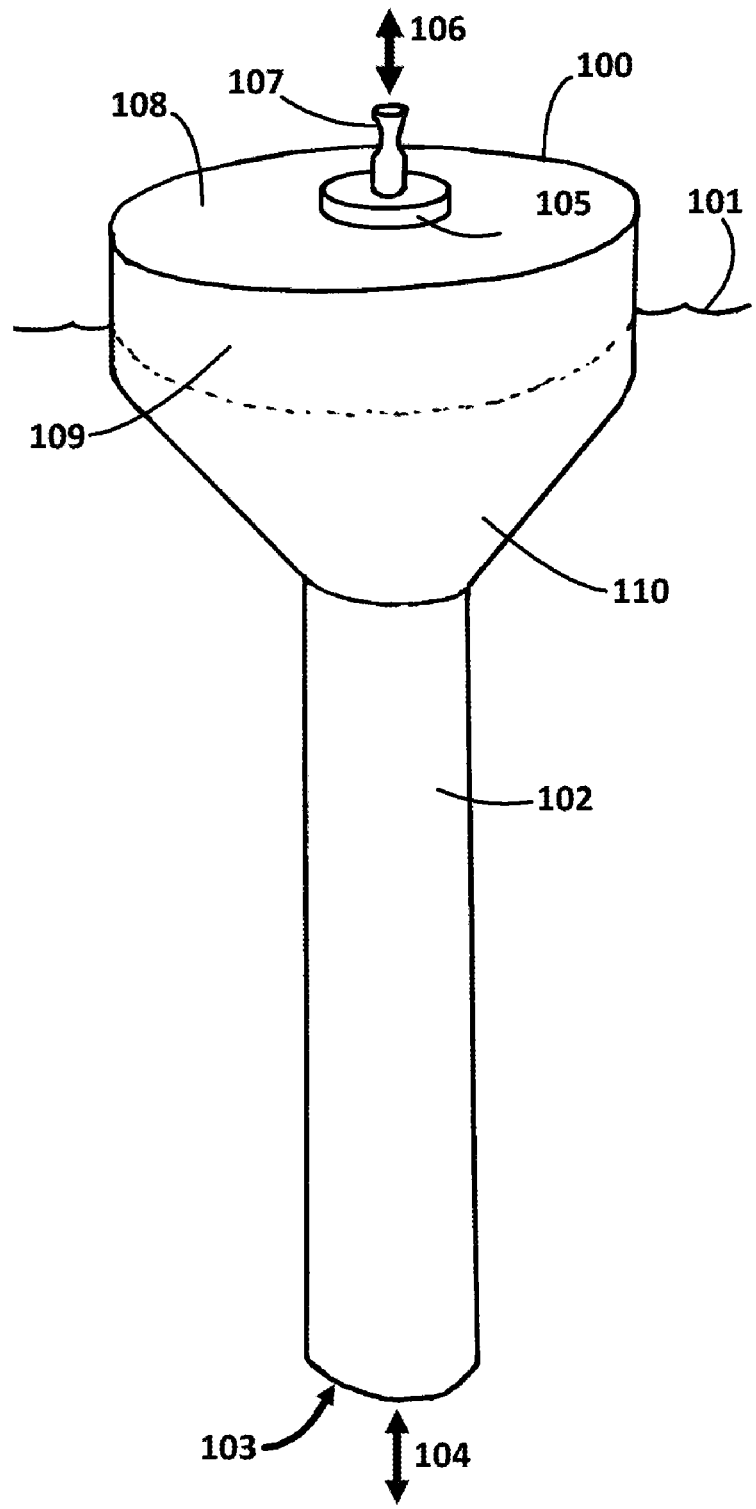
FIG. 1 is an elevated, perspective schematic view of a first embodiment of the present invention.

The device disclosed herein is a wave energy converter that floats adjacent to an upper surface of a body of water, e.g. the sea, and which incorporates a large number of computing circuits or "chips" that are powered, at least in part, by the electrical power generated by the device in response to the passage of waves beneath it, and which are used to process arbitrary and/or specific computing tasks that can be (but are not necessarily) transmitted to the device via encoded electromagnetic signals.

Also disclosed is a buoyant device containing a buoyant portion, sometimes referred to as a "buoy," causing the device to float adjacent to an upper surface of a body of water. The device also contains at least one approximately vertical tubular structure, typically with an open bottom end, and/or one or more openings and/or apertures near its bottom end, sometimes referred to as a "water column." The water column tends to contain air in an upper portion, typically referred to as an "air pocket." Out-of-phase vertical oscillations of water inside the water column in response to waves buffeting the device cause cyclical compressions and expansions of the air pocket.

A portion of the air pressurized by the cyclical compressions of a device's air pocket may be vented directly to the atmosphere. It may be directed through a turbine that turns a generator to generate electrical power. And it may be directed into a chamber where pressurized air is stored and/or buffered and therefrom released at a relatively steady rate into the atmosphere, causing the rotation of a turbine, and the energizing of a generator, and the generation of electrical power.

Air may be drawn into the air pocket during periods of its expansion, said air passing directly into the air pocket. Alternately, the air may be drawn through a turbine that turns a generator to generate electrical power. And, alternately, the air may be drawn from a chamber where depressurized air (i.e. air at less than atmospheric pressure) is stored and/or buffered and into which air from the atmosphere outside the device is admitted at a relatively steady rate, causing a relatively steady rotation of a turbine, and the energizing of a generator, and the generation of electrical power.

A device will typically have a buoy with a substantial waterplane area so as to capture wave energy from a broad, large, and/or expansive portion of the surface area of the water on which the device floats.

A device will typically include substantial ballast within the buoy in order to provide the device with substantial inertia allowing it to store and/or manifest substantial downward momentum when falling off wave crest. A device will typically store a significant volume and/or mass of water within a chamber inside its buoy in order to achieve a desirable ballast mass, and/or weight.

A device will typically have a water column and/or water tube characterized by a significant diameter, e.g., 2-11 meters, and a significant length, e.g., 30-150 meters, causing the water column to partially enclose ("partially" because an aperture is incorporated within the wall of the water column near its bottom) a volume of water of substantial mass and inertia, allowing the water within the water tube to manifest substantial upward momentum when rising within the water column.

Disparate phases of the buoy's downward motion and the contemporaneous upward motion of the water in water column cyclically compresses and decompresses the air within the device's air pocket.

A device may possess the means, mechanisms, components, equipment, systems, modules, and/or structures, to generate propulsion allowing the device the ability to reposition itself and/or change its geospatial location, e.g., thereby allowing it to seek out, follow, and/or position itself at a location characterized by favorable wave conditions, climates, and/or weather.

A device may incorporate the means, mechanisms, components, equipment, systems, modules, and/or structures, required to allow it to consume at least a portion of the electrical power that it generates in order to perform onboard computing of computational tasks that it receives from remote sources (e.g., by radio or satellite communications), to generate chemical fuels, to desalinate water and/or isolate useful minerals from seawater, etc. Such energy-consuming capabilities permit a device (and its owners) to monetize a device and/or a portion of the electrical power that a device generates, without need for a subsea power cable.

1) Buoyant Portion

An embodiment of the present invention incorporates, includes, and/or utilizes a buoy in order to keep at least a portion of the device adjacent to the surface of a body of water. Buoys of the present invention are positively buoyant objects that may be free-floating, drifting, self-propelled, tethered (e.g., by anchor) to a seafloor or tethered (e.g., by mooring cables) to one or more other buoys.

Buoys of the present invention include, but are not limited to, those which are composed and/or fabricated of, and/or may incorporate, include, and/or contain: air-filled voids, foam, wood, bamboo, steel, aluminum, cement, fiberglass, and/or plastic.

Buoys of the present invention include, but are not limited to, those which are fabricated as a substantially monolithic body, as well as those comprised of an interconnected assemblage of parts, e.g., of which individual parts may not be positively buoyant. They may also be fabricated as assemblies of positively buoyant sub-assemblies, e.g., of buoyant canisters or modules.

Buoys of the present invention include, but are not limited to, those which displace water across and/or over areas of the surface of body of water as small as 2 square meters, and as great as 4,000 square meters.

Buoys of the present invention include, but are not limited to, those which have a horizontal cross-sectional shape (i.e., a shape with respect to a cross-section parallel to the resting surface of a body of water) and/or a waterplane shape that is approximately: circular, elliptical, rectangular, triangular, and hexagonal.

Buoys of the present invention include, but are not limited to, those which have a vertical cross-sectional shape (i.e., a shape with respect to a cross-section normal to the resting surface of a body of water) that is approximately: rectangular, frusto-triangular, semi-circular, and semi-elliptical.

2) Water Tube

An embodiment of the present invention incorporates, includes, and/or utilizes a tube, cylinder, channel, conduit, container, canister, object, and/or structure, i.e., a "water tube," an upper end of which is nominally positioned above the mean water line of the device, and a lower end of which is nominally positioned at a depth near, adjacent to, and/or below, a wave base of the body of water on which the embodiment floats.

Water tubes of the present invention include, but are not limited to, those which have a horizontal cross-section, i.e., a cross-section through a plane normal to a longitudinal axis of the tube, that is approximately circular, elliptical, rectangular, hexagonal, and/or octagonal, as well as those which have a horizontal cross-section that is irregular or of some or any other shape.

Water tubes of the present invention include, but are not limited to, those which have an internal channel, e.g., through which water and/or air may flow, which have horizontal cross-sections, i.e., a cross-sections through a plane normal to a longitudinal axis of the tube, that is approximately circular, elliptical, rectangular, hexagonal, and/or octagonal, as well as those which have a horizontal cross-section that is irregular or of some or any other shape.

Water tubes of the present invention include, but are not limited to, those which have an internal channel, e.g., through which water and/or air may flow, with variable, inconsistent, and/or changing, horizontal cross-sectional areas, i.e., a variable, inconsistent, and/or unequal, area with respect to at least two cross-sections through a plane normal to a longitudinal axis of the tube.

Water tubes of the present invention include, but are not limited to, those which are fabricated, at least in part, of: steel, and/or other metals; one or more types of plastic; one or more types of fiber or composite materials (e.g., carbon fiber or fiberglass); one or more types of resin; and/or one or more types of cementitious material.

Water tubes of the present invention include, but are not limited to, those which are, at least in part, and/or at least to a degree, flexible with respect to at least one axis, as well as those that are, at least in part, rigid and/or not substantially flexible with respect to at least one axis.

Water tubes of the present invention include, but are not limited to, those which are comprised of tube walls of approximately constant thickness and/or strength; as well as those which are comprised of tube walls of variable, inconsistent, and/or changing, thicknesses and/or strengths (e.g., tubes having thicker walls nearer the buoy and thinner walls near the bottom of the water tube).

Embodiments of the present invention incorporate, include, and/or utilize one or more water tubes, and the scope of the present disclosure includes embodiments that incorporate, include, and/or utilize different numbers, and/or any number, of water tubes.

3) Air Turbine

An embodiment of the present invention incorporates, includes, and/or utilizes "air turbines," e.g., devices and/or mechanisms that cause a shaft to rotate in response to the passage of air through a channel.

Embodiments of the present invention include, but are not limited to, those that incorporate, include, and/or utilize "uni-directional air turbines" that cause a shaft to rotate with a torque having a first rotational direction in response to the passage of air through a channel in a first direction of flow, but cause that shaft to rotate with a torque having a second rotational direction (or no torque) in response to the passage of air through the channel in a second, e.g., opposite, direction of flow.

Embodiments of the present invention include, but are not limited to, those that incorporate, include, and/or utilize "bi-directional air turbines" that cause a shaft to rotate with a torque having a first rotational direction in response to the passage of air through a channel in a first direction of flow, and cause that shaft to rotate with torque having that same first rotational direction in response to the passage of air through the channel in a second, e.g., opposite, direction of flow.

Embodiments of the present invention include, but are not limited to, those that incorporate, include, and/or utilize "air turbines" that are of known types, including, but not limited to, air turbines of the following types:

Wells turbines
Wells turbines with guide vanes
biplane Wells turbine with guide vanes
contrarotating Wells turbine
Impulse turbines
Impulse turbines with guide vanes
Biradial turbines
McCormick counterrotating turbine
Cross-flow turbines
Savonius turbines Embodiments of the present invention include, but are not limited to, those that incorporate, include, and/or utilize "boundary layer effect turbines" including, but not limited to, those of the "Tesla turbine" design.

Embodiments of the present invention include, but are not limited to, those that incorporate, include, and/or utilize "air turbines" that are of unknown, undocumented, and/or unpublished types, designs, and configurations.

Embodiments of the present invention incorporate, include, and/or utilize one or more turbines, and the scope of the present disclosure includes embodiments that incorporate, include, and/or utilize different numbers, and/or any number, of turbines.

4) Ducted Air Turbine

Embodiments of the present invention include, but are not limited to, those that incorporate, include, and/or utilize "air turbines" positioned within constricted portions of a water tubes, or extensions of a water tube. By positioning air turbines in constricted portions of tubes through which air will flow, the speed of the air is increased by a Venturi effect thereby facilitating the efficient extraction of power from the flow.

Embodiments of the present invention include, but are not limited to, those that incorporate, include, and/or utilize "air turbines" positioned within cowlings, tubes, and/or shrouds, that are of known types, including, but not limited to, the following types:

| | |
|---|---|
| ducted turbines | uni-directional ducted turbines |
| shrouded turbines | bi-directional ducted turbines |
| venturi shaped ducted turbines | |
| diffuser-augmented wind turbines | |

Embodiments of the present invention include, but are not limited to, those that incorporate, include, and/or utilize "air turbines" positioned within tubes, and/or portions of tubes, that comprise constrictions of known types, including, but not limited to, the following types:

| | |
|---|---|
| venturi tubes | nozzles |
| flow nozzles | orifice plates |
| Dall tubes | venturi nozzles |

Embodiments of the present invention include, but are not limited to, those that incorporate, include, and/or utilize constricted tubes that are of unknown, undocumented, and/or unpublished types, designs, and configurations.

Embodiments of the present invention include, but are not limited to, those that incorporate, include, and/or utilize one or more constricted tubes, ducts, and/or ducted turbines, and the scope of the present disclosure includes embodiments that incorporate, include, and/or utilize different numbers, and/or any number, of constricted tubes, ducts, and/or ducted turbines.

5) Power Take Off (PTO)

The scope of the present invention includes embodiments that include, incorporate, and/or utilize, air turbines that are directly and/or indirectly connected to PTOs including, but not limited to, those comprising:

an electrical generator a pump (e.g., of air or water)

a gearbox and rotatably connected electrical generator and/or pump (e.g., of air or water)

a hydraulic ram and/or piston, and, a cam shaft that is rotatably connected to an hydraulic ram and/or piston;

The scope of the present invention includes embodiments that include, incorporate, and/or utilize, air turbines that are directly and/or indirectly connected to linearly extensible components, and/or elements, of extensible PTOs such as hydraulic pistons, rack-and-pinon assemblies, sliding rods/shafts of linear generators, etc.

6) Pressurization of Air Within the Water Tube

Air flows into, and out of, embodiments of the present invention. Inhibiting that flow at different points, stages, and/or in different manners, can affect and/or alter the average height of the water within the respective water tubes.

6a) Overview of Hyper-Pressurized Embodiment

Embodiment of this type can generate power by:

1) letting air freely enter the water tube when the mass and/or inertia-driven latency of the water inside the water tube causes it to rise more slowly than the tube surrounding it as the water level rises in response to an approaching wave crest;

2) when the water level falls in response to an approaching wave trough, pressurizing the air inside the water tube by compressing it between a falling tube (i.e. the falling "ceiling" of the tube) and a rising level of water inside the tube; and, 3) constraining the pressurized air to leave the water tube through a turbine that extracts power from its out-flow, including but not limited to its out-flow into an accumulator, thereby directly or indirectly energizing a PTO.

Embodiments of this type can use a differential and/or unequal flow of air in to, and out of, the water tube to drive the air, and its associated water level, below the ambient water, and/or the outer water level, thereby increasing the average pressure of the air to an air pressure above that of the ambient atmospheric air.

The level of the water inside the tube is allowed to rise passively as the embodiment rises. However, it is actively pushed down through the pressurization of the air above it, when the embodiment falls. As a result of this dynamic, the average level of the water inside the tube can be lower and/or below that of the average level of the water outside the tube (i.e., the mean water level of the body of water on which the embodiment floats, and/or the level that would characterize the body of water in the absence of waves).

6b) Overview of Hypo-Pressurized Embodiment

Embodiment of this type can generate power by:

1) when the mass and/or inertia-driven latency of the water inside the water tube causes it to rise more slowly than the tube surrounding it as the water level rises in response to an approaching wave crest, and the pressure of the air inside the water tube falls;

2) constraining air to enter the relatively under-pressurized air pocket at the top of the water tube through a turbine that extracts power from its inflow, thereby energizing a PTO; and, 3) when the water level falls in response to an approaching wave trough, allowing air inside the water tube pressurized by its compression between a falling tube and a rising level of water inside the tube to exit the tube freely.

Embodiments of this type can use a differential and/or unequal flow of air in to, and out of, the water tube to hold the air, and its associated water level, above the ambient water, and/or the outer water level, thereby decreasing the average pressure on the air below that of the ambient air.

The level of the water inside the tube is allowed to fall passively as the embodiment falls. However, it is actively pulled up through the depressurization of the air above it, when the embodiment rises. As a result the average level of the water inside the tube can be higher and/or above that of the average level of the water outside the tube (i.e., the mean water level of the body of water on which the embodiment floats, and/or the level that would characterized the body of water in the absence of waves).

6c) Neutrally-Pressurized Air Pocket

An embodiment of the present invention compels air to enter and exit the water tube through a turbine that extracts power from both its inflow and outflow, thereby energizing a PTO. Unlike the "hyper-" and "hypo-" pressurized embodiments discussed above, the water tube of this "neutrally-" pressurized embodiment has an average level of water inside its tube that is approximately equal to the average level of the water outside the tube.

Instantiations of these embodiments may utilize separate "uni-directional" turbines for the extraction of power from inflowing and outflowing air, and/or "bi-directional" turbines to extract power from flows of both directions.

7) One-Way Valve

An embodiment of the present invention incorporates, includes, and/or utilizes "one-way vents," and/or "one-way valves," i.e., devices and/or mechanisms positioned within, and/or in the path of, a channel that respond to higher pressure within the channel on a first side of the vent by allowing air to flow in a first flow direction, at a first rate of flow, from the first higher-pressure side to a lower pressure side; and, conversely, that respond to higher pressure within the channel on a second, i.e., opposite, side of the valve by allowing air to flow in a second, i.e., opposite, direction, at a second rate of flow which is less than the first rate of flow (or zero). Typically, and nominally, a one-way valve will only allow air to flow through the respective channel when the pressure is relatively higher on one side of the valve, but will not allow air to flow when the pressure is relatively higher on the other side of the valve.

Embodiments of the present invention include, but are not limited to, those that incorporate, include, and/or utilize "one-way valves" that are of known types, including, but not limited to, the following types:

| | | |
|---|---|---|
| ball check valves | diaphragm check valves | reflux valves |
| Belleville valves | duckbill valves | retention valves |
| check valves | in-line check valves | stop-check valves |
| clack valves | lift-check valves | swing check valves |
| clapper valves | non-return valves | umbrella valves |
| cross-slit valves | pneumatic non-return valves | wafer check valves |

The scope of the present invention includes embodiments that incorporate, include, and/or utilize "solid-state check valves" including, but not limited to, those of the "Tesla valve" design.

The scope of the present invention includes embodiments that incorporate, include, and/or utilize one-way valves that are active, actuated, and/or controlled, including, but not limited to, valves that are opened and/or closed in response to signals (e.g., electrical, and/or hydraulic signals, as well as those manifested with and/or through the movements of cables, struts, and/or rods) generated by a corresponding controller or control circuit. Such a circuit might open or close a connected valve in response to data, readings, and/or signals, generated by, and/or received from, one or more types of sensors, including, but not limited to, those related to, and/or sensitive to: pressure, acceleration, capacitance, and/or stress.

The scope of the present invention includes embodiments that incorporate, include, and/or utilize "one-way valves" that are of unknown, undocumented, and/or unpublished types, designs, and configurations.

Embodiments of the present invention incorporate, include, and/or utilize one or more one-way valves, and the scope of the present disclosure includes embodiments that incorporate, include, and/or utilize different numbers, and/or any number, of one-way valves.

8) Variable and/or Adjustable Device Mass

The present invention includes an embodiment in which various "water ballast chambers," compartments, voids, spaces, and/or containers, within the embodiment may be filled with, and/or emptied of, water to any desired degree, thereby altering the average density of the embodiment, and its average depth (i.e., waterline) in the water on which it floats.

By emptying water from one or more of these water ballast chambers, an embodiment can reduce its average density and rise up to a shallower average depth, and/or lower its waterline, thereby projecting its upper portions out of the water and above potentially damaging storm waves and/or surges.

By adding water to one or more of these water ballast chambers, an embodiment can increase its average density and sink down to a greater average depth, and/or raise its waterline, for example, a depth in which it can become more responsive to the waves passing beneath and/or around it, thereby increasing the amount of power it is able to extract from those waves.

9) Augmented Mass

The scope of the present invention includes embodiments in which the inherent mass of the embodiments are augmented and/or adjusted, at least in part, through the addition and/or removal of water from within one or more chambers or voids within the embodiments, e.g. by a pump or by some other means or mechanism. Such "water ballast" is at least partially trapped within the embodiment and its relative position and/or orientation (as a mass) within the embodiment does not tend to change significantly even as the embodiment rises, falls, and/or otherwise moves in response to the action of waves moving across the surface of the water on which the embodiment floats.

An embodiment holds water within the embodiment's buoy or buoyant structure. An embodiment holds water within the hollow wall of its water tube, e.g., within the gap between the water tube's inner wall and its outer wall wherein the inner wall is a tubular structure approximately coaxial with the tubular outer wall. An embodiment holds water within a chamber, container, and/or void, adjacent to, and/or embedded within, an upper surface of the buoy, the water tube, and/or another part or portion of the embodiment.

The present invention includes embodiments in which the inherent mass of the embodiments are augmented, at least in part, through the addition of sand, gravel, and/or some other granular or powdered hard materials. This material also includes, but is not limited to, dirt, rocks, crushed cement, bricks, automobiles, and/or other heavy and/or scrap material, e.g., such as discarded or waste materials that are available for recycling.

The present invention includes embodiments in which the inherent mass of the embodiments are augmented, at least in part, through the addition of cement and/or cementitious materials.

The present invention includes embodiments in which the inherent mass of the embodiments are augmented, at least in part, through the addition of a material that is "loose" and/or able to be shoveled, poured, and/or imported to the embodiment. This can include, but is not limited to, aggregate materials.

10) High-Pressure and Low-Pressure Air Accumulators

The present invention includes embodiments in which the upper portion of a water tube is separated from the turbine through which high-pressure air is expelled from the embodiment by an "accumulator" in which high-pressure air is trapped, cached, and/or buffered, and from which high-pressure air steadily flows out through an associated turbine. The flow out of an accumulator will tend to be more constant, and at a steadier rate, than would be possible with a direct, and/or unbuffered, high-pressure flow directly from the air cyclically compressed in the water tube.

The present invention includes embodiments in which the upper portion of a water tube is separated from the turbine through which ambient air outside the embodiment (at atmospheric pressure) is drawn in to the embodiment's water tube through and/or from an "accumulator" in which air at or below atmospheric pressure is trapped, cached, and/or buffered, and from which high-pressure air steadily flows out through an associated turbine. The flow in to such a low-pressure accumulator will tend to be more constant, and at a steadier rate, than would be manifested by a direct, and/or unbuffered, flow of outside air directly into the tube as the air in the tube is cyclically decompressed.

One or more high- and/or low-pressure accumulators may be used by an embodiment to buffer the flow of air into and/or out from the water tube as the air in that tube is cyclically compressed and decompressed in response to the effect of wave action on the embodiment and the water inside the tube.

An embodiment of the present disclosure has an accumulator that is positioned within its buoy or buoyant structure. An embodiment has an accumulator that shares, and/or is in part comprised of, a portion of the outer-most wall of its buoy or buoyant structure, e.g., a wall that is in contact with the air and/or water outside the buoy. An embodiment has an accumulator that shares a portion of the inner-most wall of its water tube, e.g., a wall that is in contact with the water inside the air and/or water tube. An embodiment of the present disclosure has an accumulator that is positioned upon or embedded within an upper wall of its buoy or buoyant structure.

The scope of the present disclosure includes embodiments that have one or more high- and/or low-pressure accumulators attached to, positioned or embedded within, and/or in any way connected to, the embodiment.

11) Cement Reinforced Tube Walls

The present invention includes an embodiment in which a water tube is comprised of an internal wall, e.g., made of steel, and an outside wall, e.g., also made of steel, and a gap that is filled, at least in part, with concrete and/or another cementitious material.

12) Truss Reinforced Tubes

The present invention includes an embodiment in which a water tube is structurally reinforced and/or strengthened by an exterior truss. Another embodiment includes a water tube is structurally reinforced and/or strengthened by an interior truss, e.g., a truss within a concrete-filled gap between interior and exterior tube walls, and/or a truss within the lumen, conduit, aperture, and/or channel, through which water and/or air flow.

13) Flexible Water Tubes

The present invention includes an embodiment in which a water tube is, at least in part, not entirely rigid.

An embodiment has a water tube comprised, at least in part, of:
a flexible tube;
two or more rigid tube segments that are conjoined, interconnected, and/or linked, by means of flexible joints, and/or connectors;
a flexible material utilizing rigid circumferential bands to prevent the collapse of the tube while permitting it to bend with respect to its longitudinal axis and a limiting maximal bend radius;
an accordion-like extensible material that both allows the tube to flex along its longitudinal axis and allows its length to increase and decrease through flexes of the accordion-like pleats that define its walls.

14) Buoyant Tubes

The present invention includes an embodiment in which a water tube incorporates, includes, and/or contains, buoyant material, i.e., material that has a density less than the water on which the embodiment floats, and that tends to reduce the average density of the embodiment.

15) On-Board Computing

The present invention includes an embodiment in which a plurality of computers perform computational tasks that are not directly related to the operation, navigation, inspection, monitoring, and/or diagnosis, of the embodiment, its power take-off, and/or any other component, feature, attribute, and/or characteristic of its structure, systems, subsystems, and/or physical embodiment. Such an embodiment may contain computers, computing systems, computational systems, servers, computing networks, data processing systems, and/or information processing systems, that are comprised of, but not limited to, the following modules, components, sub-systems, hardware, circuits, electronics, and/or modules:

graphics processing units (GPUs)
computer processing units (CPUs)
tensor processing units (TPUs)
hard drives
flash drives
solid-state drives (SSDs)
random access memory (RAM)
field programmable gate arrays (FPGAs)
application-specific integrated circuits (ASICs)
network switches, and
network routers.

Such an embodiment may contain computers, computing systems, computational systems, servers, computing networks, data processing systems, and/or information processing systems, that are powered, at least in part, from electrical energy extracted by the embodiment from the energy of ocean waves.

Some embodiments of the present disclosure incorporate, utilize, energize, and/or operate, computers incorporating CPUs, CPU-cores, inter-connected logic gates, ASICs, ASICs dedicated to the mining of cryptocurrencies, RAM, flash drives, SSDs, hard disks, GPUs, quantum chips, optoelectronic circuits, analog computing circuits, encryption circuits, and/or decryption circuits.

Some embodiments of the present disclosure incorporate, utilize, energize, and/or operate, computers specialized and/or optimized with respect to the computation, and/or types of computation, characteristic of, but not limited to: machine learning, neural networks, cryptocurrency mining, graphics processing, graphics rendering, image object recognition and/or classification, image rendering, quantum computing, quantum computing simulation, physics simulation, financial analysis and/or prediction, and/or artificial intelligence.

Some embodiments of the present disclosure incorporate, utilize, energize, and/or operate, computers that may at least approximately conform to the characteristics typically ascribed to, but not limited to: "blade servers," "rack-mounted computers and/or servers," and/or supercomputers.

Some embodiments of the present disclosure incorporate, utilize, energize, and/or operate, at least 100 computing circuits and/or CPUs. Some incorporate, utilize, energize, and/or operate, at least 1,000 computing circuits and/or CPUs. Some incorporate, utilize, energize, and/or operate, at least 2,000 computing circuits and/or CPUs. Some incorporate, utilize, energize, and/or operate, at least 5,000 computing circuits and/or CPUs. Some incorporate, utilize, energize, and/or operate, at least 10,000 computing circuits and/or CPUs.

Some embodiments of the present disclosure utilize computing chips and/or circuits that contain two or more CPUs and/or computing "cores" per chip and/or per circuit.

Some embodiments of the present disclosure utilize computing chips and/or circuits that contain a graphics processing unit (GPU) within the chips and/or within a computing circuit.

16) Low-Power and/or Passive Cooling of Computers

Much, if not all, of the energy imparted to computational devices within an embodiment of the present disclosure will become heat. And, excessive levels of heat might damage or impair those computational devices. Therefore, it is prudent for an embodiment to remove heat from its "active" computational devices as quickly and/or efficiently as possible, and/or quickly enough to avoid excessive heating of the computational devices.

Some embodiments of the present disclosure facilitate the passive convective cooling of at least some of their computational devices, and/or of the ambient environments of those computation devices. Some embodiments of the present disclosure actively remove heat from their computational devices, and/or from the ambient environments of those computational devices.

Some embodiments of the present disclosure passively cool their computing devices by facilitating the convective and/or conductive transmission of heat from the computing devices and/or their environment to the water on which the device floats, e.g. through a thermally conductive wall, and/or fins or heat baffles, separating the devices from the water.

Some embodiments of the present disclosure passively cool their computing devices by facilitating the convective and/or conductive transmission of heat from the computing devices and/or their environment to the air above the water on which the device floats, e.g. through a thermally conductive wall, and/or fins or heat baffles, separating the devices from the air.

Some embodiments of the present disclosure actively cool their computing devices by means of a heat exchanger that absorbs heat from the computing devices and/or their environment, and carries it to a heat exchanger in thermal contact with the water on which the device floats and/or the air above that water. Such thermal contact may be the result of direct exposure of the exchanger with the air and/or water, or it may be the result of indirect exposure of the exchanger with the air and/or water by means of the exchanger's direct contact with a wall or other surface in direct or indirect contact with the air and/or water.

Some embodiments of the present disclosure passively cool their computing devices, and/or of the ambient environments of their computing devices, by providing a thermally conductive connection between the computing devices and the water on which the embodiments float and/or the air outside the embodiments. Some embodiments promote this conduction of heat from the computing devices to the ambient water and/or air by using "fins" and/or other means of increasing and/or maximizing the surface area of the conductive surface in contact with the water and/or air. Some embodiments promote this conduction of heat from the computing devices to the ambient water by using copper and/or copper/nickel heatsink poles and/or plates extending into the water and/or air outside the embodiments, and/or into the chamber(s) in which at least a portion of the embodiment's computing devices are located.

Some embodiments of the present disclosure are positioned within sealed chambers containing air, nitrogen, and/or another gas or gases. Some embodiments of the present disclosure are positioned within chambers into which air, nitrogen, and/or another gas or gases, are pumped.

Because a computing device operating in an air environment (e.g. inside a compartment or module on and/or within an embodiment of the present disclosure) may not transmit heat with sufficient efficiency to prevent and/or preclude an overheating of the computing device, the use, by some embodiments, of a thermally conductive fluid and/or gas to facilitate the passage of heat from the various components (e.g. the CPUs) within the computing devices to the ambient air or water proximate to the embodiment may reduce the risk of overheating, damaging, and/or destroying some, if not all, of the computing devices therein.

Some embodiments of the present disclosure promote the conduction of heat from their computing devices to the ambient air and/or water by immersing, surrounding, bathing, and/or spraying, the computing devices with and/or in a thermally conductive fluid and/or gas. The thermally conductive fluid and/or gas is ideally not electrically conductive, as this might tend to short-circuit, damage, and/or destroy, the computing devices. The thermally conductive fluid and/or gas ideally has a high heat capacity that allows it to absorb substantial heat without experiencing a substantial increase in its own temperature. The thermally conductive fluid and/or gas carries at least a portion of the heat generated and/or produced by at least some of the computing devices to one or more other thermally conductive interfaces and/or conduits through which at least a portion of the heat may pass from the fluid and/or gas to the ambient air or water proximate to the embodiment.

Some embodiments of the present disclosure provide improved "buffering" of the heat that they absorb from their respective computing devices, while that heat is being transmitted to the surrounding air and/or water through their use of, and/or surrounding of at least some of their respective computing devices with, a fluid that boils from a fluid into a gas within the operational temperature range between that of the external water/air and that of the high-temperature surfaces of the computing circuits around which the fluid is disposed.

An embodiment of the present disclosure may cool its computing systems, and/or other heat-generating components and/or systems, by means, systems, modules, components, and/or devices, the include, but are not limited to, the following:

closed-circuit heat exchangers that transfer heat from the source to a heat sink (e.g., the air or water around an embodiment), wherein at least one end of the closed-circuit heat exchanger is:
  in contact with an interior water-facing wall
  in contact with an interior air-facing wall
  incorporates ribs to increase the surface area in contact with water
  and/or in contact with air
  positioned inside a duct, tube, and/or channel, of an OWC
  in contact with a duct, tube, and/or channel, of an OWC
mounting of computing modules:
  in air and/or in water
  against interior walls facing air and/or water
  wherein the mounting chamber or location incorporates ribs within spires projecting up from deck within spires projecting down into water A significant advantage of embodiments of the present disclosure is that a large number of computing devices can be deployed in such a way (i.e. within a large number of embodiments) that a relatively large number of computing devices are partitioned into relatively small groups, which, in addition to being powered, at least in part, by the energy available in the environment proximate to each embodiment, are also immediately adjacent, and/or proximate, to a heat sink characterized by a relatively cool temperature and a relatively large heat capacity, i.e. the sea, and the wind that flows above it. By deploying relatively small numbers of computing devices in self-powered and passively cooled autonomous units, environmental energy is used with maximal efficiency (e.g. without suffering the losses and costs associated with transmitting the power to shore), and requisite cooling is accomplished with minimal, if any, expenditure of energy. Embodiments of current disclosure permit a graceful and efficient scaling of computing and/or computing networks through the iterative fabrication and deployment of relatively simple and cost-effective self-powered, self-cooling, computing modules.

By contrast, the concentration of larger numbers of computing devices, e.g. the number of computing devices that might be associated with hundreds or thousands of embodiments of the present disclosure, requires that power be generated remotely and transmitted to the concentrated collection(s) of computing devices, thereby increasing costs and incidental losses of energy, and requires that a relatively large and concentrated amount of heat be actively and energetically removed from the "mass(es)" of computing devices, concentrated in a relatively small space, and/or volume, by means typically requiring significant expenditure of capital and additional energy.

The present invention includes embodiments in which pluralities of computers, computing systems, computational systems, servers, computing networks, data processing systems, and/or information processing systems, incorporated therein, are cooled by methods, mechanisms, processes, systems, modules, and/or devices, that include, but are not limited to, the following:

direct conduction of at least a portion of the heat generated by at least some of the computers, generators, rectifiers, and/or other electronic components comprising the embodiment, to air and/or water surrounding the embodiment;

indirect conduction of at least a portion of the heat generated by at least some of the computers, generators, rectifiers, and/or other electronic components comprising the embodiment, to the air surrounding the embodiment by means of one or more heat exchangers, at least one element of which is in contact with air and/or water surrounding the embodiment;

indirect conduction of at least a portion of the heat generated by at least some of the computers, generators, rectifiers, and/or other electronic components comprising the embodiment, to the air and/or water surrounding the embodiment by means of phase-changing material, e.g., a liquid that changes phases to a gas when it has absorbed heat from at least some of the computers, generators, rectifiers, and/or other electronic components comprising the embodiment, and changes phases back to a liquid, e.g., condenses, when it has transferred at least a portion of that heat energy to a surface through which the heat energy will directly or indirectly be conducted to the air and/or water surrounding the embodiment.

17) Applicable Types of Computing Tasks

Computing tasks of an arbitrary nature are supported, as is the incorporation and/or utilization of computing circuits specialized for the execution of specific types of computing tasks, such as the "mining" of cryptocurrencies. And, each buoy's receipt of a computational task, and its return of a computational result, may be accomplished through the transmission of data across satellite links, fiber optic cables, LAN cables, radio, modulated light, microwaves, and/or any other channel, link, connection, and/or network. Systems and methods are disclosed for parallelizing computationally intensive tasks across multiple buoys.

Some embodiments of the present disclosure incorporate, utilize, energize, and/or operate, computers organized, interconnected, controlled, and/or configured, so as to optimize the loading, execution, and reporting of results, related to arbitrary computational tasks.

These types of arbitrary computational tasks might be typical of services that execute programs for others, and/or provide computational resources with which others may execute their own programs, often in exchange for a fee based on attributes of the tasks and/or resources used, that might include, but would not be limited to: size (e.g. in bytes) of program and/or data executed, size (e.g. in bytes) of data created during program execution and/or returned to the owner of the program, number of computing cycles (number of computational operations) consumed during program execution, amounts of RAM, and/or hard disk space, utilized during program execution, other computing resources, such as GPUs, required for program execution, and the amount of electrical power consumed during and/or by a program's execution.

Embodiments optimized to perform arbitrary computational tasks might utilize "disk-free computing devices" in conjunction with "storage area networks" so as to utilize memory and/or data storage components and/or devices more efficiently.

Some embodiments of the present disclosure incorporate, utilize, energize, and/or operate, computers organized, interconnected, controlled, and/or configured, so as to optimize the loading, execution, and reporting of results, related to "cryptocurrency (e.g. Bitcoin) mining," i.e. to the calculation of cryptocurrency ledgers, and the identification of suitable ledger-specific "nonce" values (e.g. the search for a "golden nonce"), and/or related to the loading, execution, and reporting of results, related to other "proof of work" programs. The computers, and/or computing resources, of some embodiments are optimized to perform hash functions so as to calculate "proof of work" values for blockchain-related algorithms.

Some embodiments of the present disclosure incorporate, utilize, energize, and/or operate, computers organized, interconnected, controlled, and/or configured, so as to optimize the loading, execution, and reporting of results, related to neural networks and/or artificially intelligent programs. Some embodiments will facilitate the cooperative execution of programs related to neural networks and/or artificially intelligent programs through the direct, physical, and/or virtual, interconnection of their internal networks and/or computing devices.

Some embodiments of the present disclosure incorporate, utilize, energize, and/or operate, computers organized, interconnected, controlled, and/or configured, so as to optimize the loading, execution, and reporting of results, related to the serving of web pages and/or search results.

Some embodiments of the present disclosure incorporate, utilize, energize, and/or operate, computers organized, interconnected, controlled, and/or configured, so as to optimize the loading, execution, and reporting of results, related to the solving of "n-body problems," the simulation of brains, gene matching, and solving "radar cross-section problems."

Some embodiments of the present disclosure incorporate, utilize, energize, and/or operate, computers organized, interconnected, controlled, and/or configured, so as to optimize the loading, execution, and reporting of results, consistent with the functionality provided by "terminal servers," colocation servers and/or services, and/or to provide offsite backups for enterprises.

18) Types of Computing Task Management

An embodiment of the present disclosure receives a task from a remote source and/or server. An embodiment receives a task from a radio and/or electromagnetically-encoded transmission broadcast by a satellite (e.g. which a plurality of other devices also receive and/or are able to receive) or other remote antenna. An embodiment receives a task across and/or via a transmission across a fiber-optic cable. An embodiment receives a task across and/or via a transmission across a LAN and/or Ethernet cable.

An embodiment adds a task received via an electromagnetically-encoded signal to a task queue of pending tasks if:

it possesses, incorporates, and/or operates, all of the hardware required to complete and/or execute the task efficiently;

there is sufficient room in its task queue;

there is a sufficient likelihood that it will be able to complete the task no later than any deadline associated with the task; and, the estimated duration of the task's execution is no more than the likely operational time available to the device (e.g. given current energy reserves, current power generation levels, etc.).

An embodiment begins execution of a task, it marks the task as "in-progress" and sets a "timeout" value, after which the task will be restarted if not yet complete.

In an embodiment, when the embodiment determines that the level of its power generation has decreased, and the continued and/or continuous operation of its currently "active" computing devices and/or circuits can no longer be sustained, then it stops execution of a sufficient number of its most-recently started computational tasks, and/or those tasks with the greatest estimated remaining execution times, and powers down the corresponding computing devices and/or circuits, so that, for instance, there will remain sufficient power to complete the computation of the remaining tasks using the still-active computing devices and/or circuits.

An embodiment transmits the results of a completed task to a remote source and/or server (e.g. the remote source and/or server from which the task originated). After receipt and/or validation of the completed-task results, the remote source and/or server broadcasts to all of the devices which (would have been expected to have) received the now-completed task, a message and/or signal to indicate that the task has been completed. Each of the devices receiving the "task-completed" message and/or signal then removes that task from its task queue, and terminates execution of the task if the execution of the task is in progress.

An embodiment facilitates the receipt of the same task by a plurality of devices, each of which may elect to place the task in its respective task queue, and/or to execute the task when sufficient computing resources and/or energy are available.

In addition to the results of a task, an embodiment also returns to a remote source and/or server, information that is sufficient to allow the benefactor of the task's execution to be charged and/or billed an amount of money consistent with a payment contract. Such "billing-relevant information" might include, but is not limited to, the following:

size (e.g. in bytes) of the program executed;

size (e.g. in bytes) of the results generated;

amount (e.g. in bytes) of RAM required to complete the program's execution;

number of instruction cycles required to complete the program's execution;

number of CPUs required to complete the program's execution;

number and/or cycles required of GPUs to complete the program's execution;

amount of energy (e.g. kWh) expended to complete the execution of the program;

degree of requested task priority that influenced priority of task execution;

degree and/or percentage of available computing resources busy with other tasks at time of task execution (e.g. level of demand at time of task execution);

amount of task-results data (e.g. in bytes) returned to the remote source and/or server;

cost for satellite bandwidth consumed (e.g. bytes) and/or required in order to transmit task and associated data to device; and/or cost for satellite bandwidth consumed (e.g. bytes) and/or required in order to transmit task results to remote source and/or server.

An embodiment of the present disclosure sends task-execution-specific data, messages, and/or signals, to a remote source and/or server which indicate, among other things:

which tasks are waiting in a task queue;

which tasks are being executed;

estimated time remaining to complete execution of tasks being executed;

an estimate of the amount of energy required to complete tasks being executed;

an estimate of the rate of electrical power generation;

an estimate of the amount of shared memory required to complete tasks being executed;

and an estimate of the amount of shared memory currently available.

A global task controlling and/or coordinating computer and/or server may use such task-execution-specific data in order to forecast which tasks are likely to be successfully completed by a future time. And, if the likelihood of a particular task's completion by a future time is sufficiently great then other devices notified at an earlier time of the task, and potentially storing the task in their respective task queues, may be notified of that task's likely completion by a device. Those other devices may then elect to reduce the priority of the task, or to remove it from their task queues.

19) Types of Computing Task Processing

Some embodiments of the present disclosure execute encrypted programs and/or data for which a decryption key, algorithm, and/or parameter, is not available, nor accessible, to other tasks, programs, and/or computing circuits and/or devices, on the respective embodiments. Some embodiments of the present disclosure execute encrypted programs and/or data for which a decryption key, algorithm, and/or parameter, is not available, nor accessible, to an embodiment device, nor to the remote source(s) and/or server(s) which transmitted the encrypted program and/or data to the device.

Some embodiments of the present disclosure simultaneously execute two or more encrypted programs that are encrypted with different encryption keys, algorithms, and/or parameters, and must be decrypted with different decryption keys, algorithms, and/or parameters.

Some embodiments of the present disclosure utilize a plurality of CPUs and/or computing circuits to independently, and/or in parallel, execute (copies of) the same program, operating on (copies of) the same data set, wherein each execution will nominally and/or typically produce identical task results.

Some embodiments of the present disclosure comprise multiple buoys each containing a plurality of CPUs and/or computing circuits, wherein a plurality of CPUs and/or computing circuits on a first buoy, and a plurality of CPUs and/or computing circuits on a second buoy, all simultaneously: execute in parallel (copies of) the same program; operate on (copies of) the same data set; search for a "golden nonce" value for the same cryptocurrency block and/or blockchain block; perform in parallel the same computational task; or perform in parallel a divide-and-conquer algorithm pertaining to the same computational task.

Some embodiments of the present disclosure utilize a plurality of CPUs and/or computing circuits to execute the same program, operating on the same data set, in a parallelized fashion wherein each individual CPU and/or computing circuit will execute the program with respect to a portion of the full data set, thereby contributing piecemeal to the complete execution of the task.

20) Types of Data Transmission

Some embodiments of the present disclosure communicate data to and from a remote and/or terrestrial digital data network and/or internet, and/or exchange data with other computers and/or networks remote from the embodiment, and/or not physically attached to, nor incorporated within, the embodiment, by means of "indirect network communication links" which include, but are not limited to:

satellite, Wi-Fi, radio, microwave, modulated light (e.g. laser, LED), "quantum-data-sharing network" (e.g., in which quantum entangled atoms, photons, atomic particles, quantum particles, etc., are systematically altered so as to transmit data from one point [e.g., the location of one particle] to another point [e.g., the location of another particle]), as well as:

fiber-optic cable(s), LAN cable(s), Ethernet cable(s), and/or other electrical and/or optical cables.

Some free-floating embodiments of the present disclosure, as well as some anchored and/or moored embodiments that are not directly connected to land by means of a cable, utilize one or more indirect network communication links, including, but not limited to: satellite, Wi-Fi, radio, microwave, modulated light (e.g. laser, LED).

Some embodiments of the present disclosure which communicate with other devices and/or terrestrial data transmission and/or exchange networks transmit data to a remote receiver by means of modulated light (e.g. laser or LED) which is limited to one or more specific wavelengths and/or ranges of wavelengths. The sensitivity of the remote receiver is then improved through the receiver's use of complementary filter(s) to exclude wavelengths of light outside the one or more specific wavelengths and/or ranges of wavelengths used by the transmitting embodiment. A remote receiver might utilize multiple such wavelength-specific filters, e.g. utilize one at a time, so as to limit and/or discriminate its receipt of data to that transmitted from one or more specific remote sources at a time and/or from among many such remote sources, each of which, and/or each subset of which, utilizes a specific wavelength(s) and/or range(s) of wavelengths.

Some embodiments of the present disclosure exchange data with neighboring and/or proximate other and/or complementary devices through the use of one or more types and/or channels of data communication and/or transmission, e.g. Wi-Fi, modulated light, radio, and/or microwave, while exchanging data with remote computer(s) and/or network(s) (e.g. the internet) through the use of one or more other and/or different types and/or channels of data communication and/or transmission, e.g. satellite.

Some embodiments of the present disclosure exchange data with neighboring and/or proximate other and/or complementary devices, and/or remote and/or terrestrial computers and/or networks, through data passed to, from, through, and/or between, aerial drones, surface water drones, underwater drones, balloon-suspended transmitter/receiver modules, devices, or systems, manned planes, boats, and/or submarines.

Some embodiments of the present disclosure exchange data with neighboring and/or proximate other and/or complementary devices, and/or remote and/or terrestrial computers and/or networks, through data passed to, from, through, and/or between, underwater transmitter/receiver modules, devices, or systems drifting on, and/or in, the body of water, and/or modules, devices, or systems resting on, and/or attached to, the seafloor, by means including, but not limited to, the generation, detection, encoding, and/or decoding, of acoustic signals, sounds, and/or data.

Some embodiments of the present disclosure receive "global" transmissions of data from a remote and/or terrestrial computer and/or network via one channel, frequency, wavelength, and/or amplitude modulation, broadcast by a satellite, radio, microwave, modulated light, and/or other means of electro-magnetic data transmission. Some of these embodiments transmit device-specific, and/or device-group-specific (e.g. two or more "cooperating" devices, two or more devices whose device-specific computer(s) and/or computer network(s) are linked, e.g. by Wi-Fi), on other and/or different channels, frequencies, wavelengths, and/or amplitude modulations, to a compatible and/or complementary receiver on a satellite, and/or other receiver of radio, microwave, modulated light, and/or other means of electro-magnetic data transmissions.

In some deployments of some embodiments of the present disclosure, a satellite will broadcast to a plurality of the deployed devices, on a channel and/or frequency shared by many, if not all, of the devices in a deployment, information including, but not limited to: data, tasks, requests for information (e.g. status of tasks, geolocation of a device or group of devices, amount(s) of energy available for computational tasks and/or for locomotion, amount of electrical power being generated in response to the current wave conditions of a device and/or group of devices, status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, etc.).

In some deployments of some embodiments of the present disclosure, a satellite will broadcast to a specific deployed device, and/or subset or group of deployed devices, on a channel and/or frequency specific to the device, and/or subset or group of deployed devices, information including, but not limited to: device- or group-specific data (e.g. which range of cryptocurrency nonce values to evaluate), deviceor group-specific tasks (such as which types of observation to prioritize, e.g. submarines), requests for information (e.g. wave conditions at location of device), etc.

In some deployments of some embodiments of the present disclosure, each device, or subset of devices, will broadcast to a satellite on a channel and/or frequency specific to the device, or subset of devices, (i.e. and not shared by other devices in a deployment) information including, but not limited to: data, task results (e.g. cryptocurrency ledgers and corresponding nonce values), requests for information (e.g. new tasks, weather and/or wave forecasts for a given geolocation, results of self-diagnostics on hardware, software, memory integrity, etc., status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, observations (e.g. visual, audio, radar) of aircraft, observations of other floating vessels, observations of submarines, observations of marine life, observations of weather and/or wave conditions, environmental sensor readings, etc.).

21) Antennas

Some embodiments of the present disclosure use one or more antennas, and/or one or more arrays of antennas, to facilitate communication, coordination, and/or the transfer of data, with a land-based receiver, one or more other embodiments and/or instances of the same embodiment, boats, submarines, buoys, airborne drones, surface water drones, submerged drones, satellites, and/or other receivers and/or transmitters utilizing one or more antennas.

There are embodiments of the present disclosure that utilize types of antennas including, but not limited to, the following:
    parasitic antennas including, but not limited to:
    Yagi-Uda antennas
    Quad antennas
    wire antennas
    loop antennas
    dipole antennas
    half-wave dipole antennas
    odd multiple half-wave dipole antennas
    short dipole antennas
    monopole antennas
    electrically small loop antennas
    electrically large loop antennas
    log periodic antennas
    bow-tie antennas
    travelling wave antennas including, but not limited to:
    helical antennas
    Yagi-Uda antennas
    microwave antennas including, but not limited to:
    rectangular micro-strip antennas
    planar inverted-F antennas
    reflector antennas including, but not limited to:
    corner reflector antennas
    parabolic reflector antennas
    multi-band antennas
    separate transmission and receiving antennas There are embodiments of the present disclosure that utilize types of antenna arrays including, but not limited to, the following:
    driven arrays including, but not limited to:
    arrays of helical antennas
    broadside arrays including, but not limited to:
        collinear arrays
    planar arrays including, but not limited to:
    those composed of unidirectional antennas
    reflective arrays including, but not limited to:
        half-wave dipole antennas in front of a reflecting screen
        curtain arrays
        microstrip antennas
        (e.g., comprised of arrays of patch antennas)
    phased arrays including, but not limited to:
    those with analog and/or digital beamforming
    those with crossed dipoles
    passive electronically scanned arrays
    active electronically scanned arrays
    low-profile and/or conformal arrays
    smart antennas, reconfigurable antennas, and/or adaptive arrays in which:
    a receiving array that estimates the direction of arrival of the radio waves and electronically optimizes the radiation pattern adaptively to receive it, synthesizing a main lobe in
    that direction
    endfire arrays including, but not limited to:
    log periodic dipole arrays
    parasitic arrays including, but not limited to:
    endfire arrays consisting of multiple antenna elements in a line
        of which only one is a driven element
        (i.e., connected to a transmitter or receiver)
    log periodic dipole arrays
    Yagi-Uda antennas
    Quad antennas A preferred embodiment of the present disclosure incorporates on an upper deck and/or surface of its buoy a phased array utilizing digital beamforming, and also optionally utilizing gyroscopes and/or accelerometers to track changes in the orientation of the embodiment's buoy in order to reduce the latency between such changes and corresponding corrections to the gain and/or directionality of the phased array's beam, e.g., to preserve an optimal beam orientation with respect to a satellite.

Another embodiment of the present disclosure incorporates on an upper deck of its buoy a phased array transmitting and receiving electromagnetic radiation of at least two frequencies, wherein the beamwidth of a first frequency is significantly greater, than the beamwidth of a second frequency. Such an embodiment uses the beam of the first frequency to localize and track a target receiver and/or transmitter, e.g., a satellite, and to adjust the angular orientation and/or beamwidth of the beam of the second frequency so as to optimize the second beam's gain with respect to the target receiver and/or transmitter.

Another embodiment of the present disclosure incorporates dipole antennas attached to the periphery of the buoy and oriented approximately radially about the periphery of the embodiment's deck (with respect to a vertical longitudinal axis of the embodiment and/or its buoy). The dipoles benefit from the proximate ground plane created by the sea and its surface, wherein the sea and/or its surface reflect upward any beam lobe that might have otherwise been directed downward, thus increasing the gain of the upward beam.

22) Phased Arrays

A preferred embodiment utilizes a phased array of antennas, e.g., dipole antennas, arrayed across an upper surface of the embodiment, e.g., the deck of the embodiment's buoy. A phased array deployed across such a broad and/or expansive array provides the embodiment with the opportunity to achieve a highly resolved directionality and a significant and/or optimized degree of signal gain.

A phased array deployed across a broad, nominally horizontal upper surface of an embodiment permits optimized signal strength, signal-to-noise ratio, and data exchange, with respect to electromagnetically-mediated communications and/or exchanges of signals and/or data with a satellite. Such a capability is useful to a self-propelled embodiment that executes computing tasks received from a remote computer or computing network by satellite, and that returns computing results to a remote computer or computing network by satellite.

A phased array deployed across a broad, nominally vertical lateral surface of an embodiment, e.g., such as one or more sides of an embodiment's buoy portion, can facilitate an embodiment's communications and/or to exchanges of data with remote antennas, e.g., those of other devices and/or terrestrial antennas, and with any associated and/or linked computers or computing networks. Such remote antennas might be associated with, and/or integrated within, a variety of systems, stations, and/or locations, including, but not limited to: terrestrial stations, airborne drones, ocean-going surface drone vessels, ocean-going submerged drone vessels, piloted aircraft, and satellites.

Embodiments of the present invention include, but are not limited to, those that incorporate, include, and/or utilize, phased arrays in which the individual antennas of which they are comprised have any orientation relative to a respective embodiment, and have any orientation with respect to one another (e.g., parallel, normal, radial, random, etc.). Embodiments of the present invention include, but are not limited to, those that incorporate, include, and/or utilize, phased arrays comprised of any number of individual and/or constituent antennas, and/or of antennas of any size. Embodiments of the present invention include, but are not limited to, those that incorporate, include, and/or utilize, phased arrays characterized by, and/or capable of, any transmission power, signal strength, and/or gain, and/or any degree of signal amplification with respect to received signals.

23) Power Management

An embodiment of the present disclosure stores at least a portion of the electrical energy (and/or another form of energy) that it extracts from ambient waves in an energy storage device, component, and/or system. Embodiments of the present disclosure include, incorporate, and/or utilize, energy storage devices, components, and/or systems, including, but not limited to:

batteries, capacitors, and fuel cells, e.g., that generate and consume hydrogen as an energy store.

An embodiment of the present disclosure utilizes at least a portion of the energy that it stores in order to provide approximately steady and/or continuous electrical power to at least a portion of the computers and/or computer networks contained therein. An embodiment of the present disclosure responds to a diminution and/or reduction in the rate at which it produces and/or generates electrical power (e.g., in response to suboptimal wave conditions) by incrementally shutting down computers and/or computer networks therein, preferably only after saving the intermediate data and state of each computer and/or memory module. An embodiment of the present disclosure responds to a resumption and/or return of the rate at which it produces and/or generates electrical power (e.g., in response to a resumption of optimal wave conditions) by incrementally turning on computers and/or computer networks therein.

Some embodiments of the present disclosure activate and deactivate subsets of their computers, thereby changing and/or adjusting the number and/or percentage of their computers that are active at any given time, in response to changes in wave conditions, and/or changes in the amount of electrical power generated by the power takeoffs of their respective devices, so as to match the amount of power being consumed by the computers to the amount being generated.

Some embodiments of the present disclosure incorporate, and/or utilize components and/or mechanism, including, but not limited to: batteries, capacitors, springs, components, features, circuits, devices, processes, and/or chemical fuel (e.g. hydrogen) generators and storage mechanisms. These energy storage mechanisms permit the embodiments to store, at least for a short time (e.g. 10-20 seconds), at least a portion of the electrical and/or mechanical energy generated by the embodiment in response to wave motion. Such energy storage may have the beneficial effect of integrating and/or smoothing the generated electrical power.

Some embodiments, when tethered to other devices, may further stabilize their own energy supplies, as well as helping to stabilize the energy supplies of other tethered devices, by sharing electrical energy, batteries, capacitors, and/or other energy storage means, components, and/or systems, and/or by sharing and/or distributing generated power, across a shared, common, and/or networked power bus and/or grid. This capability and deployment scenario will facilitate the ability of some tethered collections and/or farms of devices to potentially utilize a smaller total number of batteries, capacitors, and/or other energy storage means, components, and/or systems, since the sharing of such components, systems, and/or reserves will tend to reduce the amount of energy that any one device will need to store in order to achieve a certain level of stability with respect to local variations in generated power and/or computing requirements.

Such energy storage, especially if a sufficiently great amount of energy may be thus stored, may allow a device to continue powering a total number of computers than could be directly powered by any instantaneous level of generated electrical power. For example, an embodiment able to store enough power to energize all of its computers for a day in the absence of waves, may be able to avoid reducing its number of active computers during a "lull" in the waves, and continue energizing them until the waves resume.

Some embodiments of the present disclosure apply, consume, utilize, and/or apply, at least 50% of the electrical power that they generate to energize, power, and/or operate, their respective computing devices and/or circuitry. Some embodiments of the present disclosure apply, consume, utilize, and/or apply, at least 90% of the electrical power that they generate to energize, power, and/or operate, their respective computing devices and/or circuitry. Some embodiments of the present disclosure apply, consume, utilize, and/or apply, at least 99% of the electrical power that they generate to energize, power, and/or operate, their respective computing devices and/or circuitry.

Some embodiments of the present disclosure incorporate, utilize, energize, and/or operate, with a "power usage effectiveness" (PUE) of no more than 1.1. Some embodiments of the present disclosure incorporate, utilize, energize, and/or operate, with a "power usage effectiveness" (PUE) of no more than 1.01. Some embodiments of the present disclosure incorporate, utilize, energize, and/or operate, with a "power usage effectiveness" (PUE) of no more than 1.001.

Some embodiments of the present disclosure turn at least a portion of their respective computing devices on and off so as to at least approximately match the amount of electrical power being generated by the embodiments, and/or the rate at which the embodiments are extracting energy from the waves that buffet them.

The power profile of certain embodiments of a wave energy converter can be irregular, i.e. it can generate large amounts of power for a few seconds, followed by a pause of a few seconds when no power is generated. ASIC chips designed to computing hash values for the "mining" of cryptocurrencies can typically compute many millions of hash values per second. In some embodiments, energy control circuits turn on and energize ASICs and/or CPUs when the wave energy converter is generating power, and de-energize ASICs when the wave energy converter is not generating power. In some embodiments, energy control circuits energize a quantity of ASICs that corresponds and/or is proportional to the amount of power the wave energy converter is presently generating. In this manner, the amount of required power storage and/or buffering equipment can be reduced. In some embodiments, computing circuitry is energized and de-energized on a second-by-second basis. In some embodiments, it is energized and de-energized on a millisecond by millisecond basis.

Some embodiments of the present disclosure turn at least a portion of their respective computing devices on and off so as to at least approximately match the amount of electrical power that their own computers forecast and/or estimate that they will generate at a future time. Some embodiments of the present disclosure turn at least a portion of their respective computing devices on and off so as to at least approximately match the amount of electrical power that has been forecast and/or estimated by a computer on another device, and/or on a computer at another remote location, that they will generate at a future time.

Some embodiments of the present disclosure select those tasks that they will attempt to compute and/or execute so as to at least approximately match the amount of future computing power and/or computing capacity, and/or the amount of time, required to complete those tasks will at least approximately match a forecast and/or estimated of computing power, and/or operational time, that will be available to the embodiment at a future time.

Some embodiments of the present disclosure, when deployed within a farm configuration in which the devices are collectively electrically connected to one or more terrestrial and/or other sources of electrical power, may, e.g. when their power generation exceeds their computing power requirements, send excess generated electrical power to shore. Conversely, devices deployed in such a farm configuration, in which the devices are collectively electrically connected to one or more terrestrial and/or other sources of electrical power, may, when their computing demands require more electrical energy than can be provided through the conversion of wave energy (e.g. when waves are small), draw energy from those one or more terrestrial sources of power so as to continue computing and/or recharge their energy reserves.

24) Types of Inter-Device Data Sharing

Some embodiments of the present disclosure facilitate communication, coordination, and/or the transfer of data, between two or more of their respective computing devices and/or circuits by means of a common distributed network, e.g. Ethernet, TCP/IP.

Some embodiments of the present disclosure facilitate communication, coordination, and/or the transfer of data, between the computers, circuits, and/or internal and/or physical networks on, and/or incorporated within, two or more devices by means of virtual and/or electromagnetic network connections and/or links, e.g. WAN, Wi-Fi, satellite-mediated, radio, microwave, and/or modulated light. The devices of such embodiments share data, programs, and/or otherwise cooperate, without the benefit of a physical network connection.

Some embodiments of the present disclosure transmit, receive, transfer, share, and/or exchange, data by means of acoustic and/or electrical signals transmitted through the seawater on which they float. By inducing localized sounds, acoustic signals, electrical currents, and/or electrical charges, within the seawater that surrounds it, an embodiment can create acoustic and/or electrical signals in the seawater that travel through the seawater, and/or radiate away from the device within the seawater, and can be detected and/or received by one or more other similar devices. In this way, a two-way exchange of data, as well as broadcasts of data from one device to many others, can be completed, executed, and/or realized.

Some embodiments of the present disclosure may facilitate the sharing, and/or exchange, of data between widely separated devices, e.g. devices which are so distant from one another that line-of-sight communication options, e.g. modulated light, are not available, by daisy-chaining inter-device communications, signals, transmissions, and/or data transfers. Data may be exchanged between two widely separated devices through the receipt and re-transmission of that data by devices located at intermediate positions.

Some embodiments of the present disclosure transmit, receive, transfer, share, and/or exchange, data by means of light and/or "flashes" shined on, and/or reflected or refracted by, atmospheric features, elements, particulates, droplets, etc. An embodiment will encode data (and preferably first encrypt the data to be transmitted) into a series of modulated light pulses and/or flashes that are projected into the atmosphere in at least an approximate direction toward another such device. The receiving device, e.g. through the use of wavelength-specific filters, and/or temporally-specific frequency filters, will then detect at least a portion of the transmitted light pulses and decode the encoded data. The return of data by the receiving device is accomplished in a similar manner.

Such a "reflected and/or refracted and light-modulated" data stream can be made specific to at least a particular wavelength, range of wavelengths, pulse frequency, and/or range of pulse frequencies. By such a data communication scheme and/or process, an individual device can be configured to transmit data to one or more individual other devices (e.g. on separate wavelength-specific channels), and/or to a plurality of other devices. It can be configured to receive data from one or more individual other devices (e.g. on separate wavelength-specific channels), and/or to a plurality of other devices.

25) Local Exchange of Data and/or Power

The present invention includes an embodiment in which one end of a cable is suspended adjacent to the surface of the body of water on which the embodiment floats. The other end of the cable is directly and/or indirectly connected to a computer or other electronic device, component, and/or system, directly and/or indirectly connected at least one other computing device on the embodiment.

A vessel, e.g., an unmanned autonomous vessel, can approach the embodiment, secure the free end of the cable, and by communicating through that cable with the associated computer or other electronic device, component, and/or system, on board the embodiment, exchange copious amounts of data with the computer or other electronic device, component, and/or system, on the embodiment, e.g., in order to download the results of a calculation and/or simulation performed on the embodiment, and/or to upload a body of data and/or applications with which to perform a calculation.

Embodiments of the present disclosure achieve this remote data exchange capability by means of cables including, but not limited to, the following types:
  fiber optic cables
  LAN cables
  RS-232 cables, and
  Ethernet cables.

Embodiments of the present disclosure may also exchange data with other computers, vessels, networks, data-relay stations, and/or data repositories, by means of communication technologies including, but not limited to, the following types:
  Wi-Fi
  radio
  pulse-modulated underwater sounds, e.g., sonars
  pulse-modulated lasers
  pulse-modulated LEDs, and,
  physical semaphores (e.g., 2D arrays of MEMs).

Embodiments of the present disclosure may also exchange data with other computers, vessels, networks, data-relay stations, and/or data repositories, by means of communication channels mediated by, and/or including, but not limited to, the following types:
  boats and/or other manned surface vessels
  autonomous surface vessels
  submarines
  autonomous underwater vessels
  planes
  autonomous unmanned aerial vehicles (AUVs)
  satellites
  balloons
  ground stations, e.g., transmission stations positioned on shore, and,
  other embodiments of the present invention.

26) Types of Data Transmission Networks

Some embodiments of the present disclosure interconnect at least some of their computing devices with, and/or within, a network in which each of a plurality of the computing devices are assigned, and/or associated with, a unique internet, and/or "IP" address. Some embodiments of the present disclosure interconnect at least some of their computing devices with, and/or within, a network in which a plurality of the computing devices are assigned, and/or associated with, a unique local subnet IP address.

Some embodiments of the present disclosure interconnect at least some of their computing devices with, and/or within, a network that incorporates, includes, and/or utilizes, a router.

Some embodiments of the present disclosure interconnect at least some of their computing devices with, and/or within, a network that incorporates, includes, and/or utilizes, a modem.

Some embodiments of the present disclosure interconnect at least some of their computing devices with, and/or within, a network that incorporates, includes, and/or utilizes, a "storage area network."

27) Advantages

The present invention offers many advantages, including, but not limited to:

27a) Harvesting of Optimal Wave Energy Resources

If the electrical power generated by a wave-energy converting buoy is to be transmitted to land, e.g. where it might be added to an electrical grid, then that power must have a channel, method, and/or means, with which to do so. Many developers of wave energy devices anticipate using subsea electrical power cables to transmit power generated by anchored farms of their devices to shore. However, these cables are expensive. Their deployment (e.g. their burial in the seafloor) is also expensive. And, the anchoring and/or mooring of a farm of buoys (i.e. wave energy devices) close to shore can be difficult.

The present invention allows wave energy devices to make good use of the electrical power that they generate without transmitting it to land. And, because the disclosed device is free to operate far from land, it is also free to be deployed where waves are most consistent, and of optimal energies.

While the present invention does not preclude the anchoring of the disclosed devices, it nevertheless allows wave energy devices to make good use of the electrical power that they generate without being anchored and/or moored to the seafloor, and without an electrical cable to shore.

27b) Efficient Utilization of Wave Energy

The present invention optimizes the harvesting of energy from ocean waves with a technology that has the potential to be highly reliable, long-lived, and cost effective.

27c) Efficient Scaling of Computing

By sequestering clusters of computers within independent buoys, the numbers of computers (i.e. the numbers of clusters) can be scaled with relative ease, e.g. there are no obvious barriers, costs, and/or consequences, associated with an increase in the numbers of such sequestered clusters of computers made available for the processing of computing tasks.

The energy efficiency of interconnected sets of collocated computers can be discussed in terms of "power usage effectiveness" or "PUE."

PUE=(Total Computing Facility Power)/(Total Computing Equipment Power)

Because large terrestrial clusters of computers require the expenditure of energy not just for the computers themselves, but also for requirements such as: cooling, lighting, environmental considerations for staff, etc., their PUEs are typically estimated to be about 1.2. An ideal PUE would be 1.0, which would mean that all electrical power consumed, was consumed by the computers executing their respective computing tasks, and, by extension, no electrical power was "wasted" doing anything else.

Many embodiments of the disclosed device utilize passive conductive cooling of their computers, which, because it is passive, consumes no electrical power. And, because the disclosed devices are typically autonomous and/or unmanned, many embodiments utilize close to 100% of the electrical power that they generate energizing their respective computers, and providing them with the energy that they need to complete their respective computing tasks. Thus, many embodiments of the disclosed device will have a PUE approaching 1.0, i.e. a "perfect" power usage effectiveness, at least net of any losses due to temporary buffering or storage of power.

Also, because the computers stored and operated within the devices of the present disclosure are located on buoys that are floating on a body of water (e.g. on the sea far from shore), they provide significant computing power without requiring a concomitant dedication of a significant area of land. This potentially frees land that might otherwise have been used to house such computing clusters, so that it might instead be used for farming, homes, parks, etc.

27d) Decoupling Large-Scale Computing from Large-Scale Support Costs

Some might regard the history of computing as having taught that progress, especially with respect to the scaling of computing, is often a consequence of an underlying progress in the discovery and/or invention of new ways to "decouple" the components, and the constituent tasks, on which large-scale computing relies, from the overhead and/or support requirements needed to support large "monolithic" collections of computers.

27e) Synergies in Multi-use Buoys

Some embodiments of the present disclosure, when deployed in anchored farms of devices, will send electricity back to an onshore electrical power grid via a subsea electrical power cable. However, when the electrical demands of that terrestrial grid are not high, and/or the price of electrical power sold into that grid is too low, then some or all of the devices in the farm may perform computations, such as Bitcoin mining and/or arbitrary or custom computational tasks for third parties, in order to generate revenue and/or profits.

Multi-purpose buoys, and methods for employing the same, are disclosed, wherein the electrical energy produced by a buoy is normally directed to the buoy's computing circuits to carry out computationally intensive tasks, but can be redirected to serve purposes such as the electrical charging of nearby ocean-going and airborne drones.

Some embodiments of the present disclosure, when deployed in anchored farms of devices, or when free-floating, especially as individual devices, will primarily generate and store electrical energy that may then be transmitted conductively and/or inductively to autonomous vessels and/or aircraft (i.e. "drones") via charging connections and/or pads. However, when any connected drones are fully charged and/or a device's energy stores are full, then the device may consume any surplus generated electrical power performing computations, such as Bitcoin mining and/or arbitrary or custom computational tasks for third parties, in order to generate revenue and/or profits. Such a dual purpose may also facilitate the role of device in charging drones, and/or may facilitate the hiding of drones when the ratio of devices to drones is high.

Some embodiments of the present disclosure, when deployed in anchored farms of devices, or when free-floating, especially as individual devices, will primarily energize, operate, and monitor various sensors, such as, but not limited to: sonar, radar, cameras, microphones, hydrophones, antennae, gravimeters, magnetometers, and Geiger counters, in order to monitor their environments (air and water) in order to detect, monitor, characterize, identify, and/or track other vessels and/or aircraft, or to survey the ocean floor for minerals and other characteristics. However, when there are no proximate vessels and/or aircraft to track, then a device might utilize some of its underutilized electrical energy (and computational power) in order to perform computations, such as Bitcoin mining and/or arbitrary or custom computational tasks for third parties, in order to generate revenue and/or profits.

There are many uses for electrical power far out at sea. Ocean charging stations for autonomous and/or remotely-operated, ocean-going or airborne, "drones," especially military drones, can consume large amounts of power. Surveying of the ocean floor and the detection of submarines can consume large amounts of power. Communications relays (e.g. for submarines) and radar stations can consume large amounts of power. Ocean-floor mining operations can consume large amounts of power.

Many of the aforementioned applications, however, consume power only sporadically, and are therefore unlikely to be economical. It is unlikely to be economical, for instance, to deploy a dedicated wave energy converter for the charging of drones. However, such a deployment can become economical if there is a use to which electrical power can be put during normal operation, between such sporadic uses. The performance of computationally intensive tasks using computational circuits is one of the simplest, most low-capital-cost and low-maintenance ways of using electrical power.

270 Military/Rescue/Research

Some embodiments of the present disclosure may present tethers, mooring lines, cables, arms, sockets, berths, chutes, hubs, indentations, and/or connectors, to which another vessel may attach, and/or moor, itself.

Some embodiments of the present disclosure may present connectors, protocols, APIs, and/or other devices or components or interfaces, by and/or through which energy may be transferred and/or directed to be transferred from the embodiments to another vessel. The vessels that might receive such energy include, but are not limited to:

autonomous underwater vehicles, autonomous surface vessels, autonomous aircraft; and/or manned underwater vehicles (e.g. submarines), manned surface vessels (e.g. cargo and/or container ships), and manned aircraft (e.g. helicopters).

Some of the vessels to which energy may be transferred and/or transmitted may possess weapons.

Some embodiments of the present disclosure may detect, monitor, log, track, identify, and/or inspect (e.g. visually, audibly, and/or electromagnetically), other vessels passing within a sufficiently short to distance of a device such that at least some of the device's sensors are able to detect, analyze, monitor, identify, characterize, and/or inspect, such other vessels.

Aircraft operating near some embodiments are detected and/or characterized by means and/or methods that include, but are not limited to:

visually (e.g. with one or more cameras, detecting one or more wavelengths of light, including, but not limited to visible light and infrared light), the detection of specific, e.g. engine-related, noises, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, and/or the detection of noise and/or other vibrations induced in the water on which the device floats.

Surface vessels operating near some embodiments are detected and/or characterized by means and/or methods that include, but are not limited to:

visually (e.g. with one or more cameras, detecting one or more wavelengths of light, including, but not limited to visible light and infrared light), the detection of specific, e.g. engine-related, noises and/or vibrations, especially those that might be transmitted through and/or in the water on which the device floats, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, and/or the detection of observed changes in the behavior of local marine organisms (e.g. the direction in which a plurality of fish swim).

Sub-surface vessels operating near some embodiments are detected and/or characterized by means and/or methods that include, but are not limited to:

the detection of specific, e.g. engine-related, noises and/or vibrations, transmitted through and/or in the water on which the device floats, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, the detection of changes in the behavior of local marine organisms (e.g. the direction in which a plurality of fish swim), and/or the detection of changes in the volume and/or clarity of ambient noises nominally and/or typically generated by marine organisms, geological phenomena (e.g. volcanic and/or seismic events), current-induced noises (e.g. water movements around geological formations), and/or reflected noises (e.g. the noise of overpassing planes reflecting in specific patterns off the seafloor).

A plurality of devices able to exchange data, message, and/or signals, and/or otherwise interconnected, may obtain high-resolution information about the nature, structure, behavior, direction, altitude and/or depth, speed, condition (e.g. damaged or fully functional), incorporation of weapons, etc., through the sharing and synthesis of the relevant data gathered from the unique perspectives of each device.

Some embodiments of the present disclosure may transmit, e.g. via satellite, to a remote computer and/or server, the detection, nature, character, direction of travel, speed, and/or other attributes, of detected, monitored, tracked, and/or observed, other vessels. Some embodiments may be able to receive, e.g. via satellite, and respond to commands and/or requests for additional types of observations, sensor readings, and/or responses, including, but not limited to: the firing of missiles, the firing of lasers, the emission of electromagnetic signals intended to jam certain radio communications, the firing of torpedoes, the vigilant tracking of specific vessels (e.g. a prioritization of the tracking and/or monitoring of specific vessels over other nearby vessels), the release of tracking devices, the emission of misleading electromagnetic transmissions (e.g. to mislead GPS readings, to mimic radio beacons and/or radars, etc.) . . . even the self-destruction of the device itself.

Some embodiments of the present disclosure may present connectors, linkages, interfaces, APIs, and/or other devices or components, by and/or through which data may be exchanged between the embodiment and another vessel. Such other vessels might utilize such a data connection in order to obtain cached data, messages, signals, commands, and/or instructions, preferably encrypted, transmitted to the device from a remote source and/or server, and stored within the device, and/or within a plurality of devices, any one of which may be accessed by another vessel for the purpose of obtaining command and control information.

Such embodiments may facilitate the transmission of data, messages, status reports, and/or signals, preferably encrypted, from the other vessels to the remote source and/or server, especially by masking the source of any such transmission within equivalent, but potentially meaningless, transmissions from a plurality, if not from all, other devices. If all of the devices of such an embodiment regularly transmit blocks of encrypted and/or fictitious data to a particular remote source and/or server, then the replacement of one device's block of data with actual data (the nature and/or relevance of which might only be discernable to a receiver with one or more appropriate decryption keys, algorithms, and/or parameters) will effectively hide the location of any and/or all such other vessels with respect to the detection of such data transmissions. This mechanism of hiding the location of a device to which another vessel is connected is particularly useful when the other vessel is a submersible and/or submarine, since it would presumably also be hidden from visual and (while at rest, connected to a device) audio detection.

27g) Decoupling Computing from Terrestrial Data Centers

The present invention offers many potential benefits, including, but not limited to a decoupling of computing power (e.g. available CPUs and/or instructions per second) from the typically correlated supporting and/or enabling requirements, e.g., such as those associated with the construction, operation, and/or maintenance, of data centers and/or server farms.

These requirements include the need that sufficient electrical power be provided to energize a large number of computers. In order to transmit large amounts of electrical power into concentrated collections of computers, it is typically necessary to bring the power to the collections of computers at a high voltage and/or a high current. However, since individual computers, computing devices, and/or computing circuits, require electrical power that is typically of a lower voltage and/or current, it is often necessary and/or preferred to partition the high-energy electrical power into multiple circuits of lower-energy power. These changes in voltage and/or current can result in some loss of energy and/or efficiency.

These requirements include the need to remove heat, and/or introduce cooling, fast enough to compensate for the significant amounts of heat that are generated by highly concentrated and extensive collections of electrically-powered computing devices. Such cooling is relatively energy intensive, e.g. significant electrically-powered refrigeration, fans, pumped liquid heat exchangers, etc.

Embodiments of the present disclosure obtain relatively small amounts of electrical power from water, and/or ocean, waves and utilize that electrical power to energize a relatively small number of computing devices. By contrast with large, highly-concentrated, collections of computers, the computers within embodiments of the present invention are able to be energized with electrical power that, at least approximately, matches electrical requirements of the computers, i.e. there is no need to transmit highly-energetic electrical power from distant sources before reducing that power down to voltages and/or currents that are compatible with the computers to be energized.

Some embodiments of the present disclosure achieve and/or satisfy all of their cooling requirements through purely passive and convective and/or conductive cooling. Thermally-conductive walls and/or pathways facilitate the natural transmission of heat from the computing devices to the air and/or water outside the device. A relatively smaller number of devices means relatively less heat is generated. And, the proximity of a heat sink of significant capacity (i.e. the water on which the device floats) means that the removal of these relatively small amounts of heat conductively and/or convectively is achieved with great efficiency and in the absence of any additional expenditures of energy.

The present invention increases the modularity of clusters of computing devices by not only isolating them physically, but also by powering them independently and autonomously, and by cooling them passively. Through the creation and deployment of additional self-powered computing buoys, a computing capability can be scaled in an approximately linear fashion, typically, if not always, without the non-linear and/or exponential support requirements and/or consequences, e.g. cooling, that might otherwise limit an ability to grow a less modular architecture and/or embodiment of computing resources.

The present invention provides a useful application for wave-energy conversion devices that requires significantly less capital expenditures and/or infrastructure. For instance, a free-floating and/or drifting device of the present invention can continuously complete computational tasks, such as calculating blockchain block values, while floating freely in very deep water (e.g. 3 miles deep) in the middle of an ocean, hundreds or thousands of miles from shore. Such an application does not depend upon, nor require, a subsea power cable to send electrical power to shore. It does not require extensive mooring and/or the deployment of numerous anchors in order to fix the position of a device, e.g. so that it can be linked to a subsea power cable.

By providing alternate computational resources, that draw their power directly from the environment, and by completing computational tasks currently executed in terrestrial clusters of computers, the amount of electrical power required on land can be reduced. And, thereby, the amount of electrical power generated through the consumption of fossil fuels, and the concomitant generation of greenhouse gases, can be reduced.

All potential variations in sizes, shapes, thicknesses, materials, orientations, methods, mechanisms, procedures, processes, electrical characteristics and/or requirements, and/or other embodiment-specific variations of the general inventive designs, structures, systems, and/or methods disclosed herein are included within the scope of the present disclosure.

28) Self-Propulsion

The present invention includes an embodiment in which the embodiment possesses devices, mechanisms, structures, features, systems, and/or modules, that actively and purposely move the embodiment, primarily laterally, to new geospatial locations and/or positions. Such self-propulsion capabilities allow embodiments to achieve useful objectives, including, but not limited to, the following:

to seek out optimal wave conditions to avoid adverse wave and/or weather conditions to avoid other ships, vessels, and/or potential hazards to avoid shallow waters, rocks, land masses, islands, and/or other geological hazards to maintain proximity to other embodiments, e.g., so as to exchange data with one another, and/or cooperate in the execution of relatively large computing tasks to provide energy to other vessels, and/or disaster areas in time of emergency, and, to return to port in order to receive inspection, maintenance, repair, upgrades, and/or in order to be decommissioned.

Embodiments of the present invention may achieve self-propulsion by devices, mechanisms, structures, features, systems, and/or modules, that include, but are not limited to, the following:

rigid sails flexible sails

Flettner rotors keel-shaped tube chambers rudders ducted fans propellers propeller-driven underwater thrusters directed out flows of air from water tubes utilized as thrust water jets submerged, wave-heave-driven flaps submerged, tethered airplane-like kite and/or drone inflatable water-filled (or emptied) sack, and sea anchors and/or drogues 29) Airfoil-Shaped Tubes and/or Tube Shrouds and/or Cowlings The present invention includes an embodiment in which a water tube has an airfoil-shaped cross-sectional shape (i.e., with respect to a horizontal cross-section in a plane normal to a longitudinal axis of the water tube). Another embodiment has a water tube is embedded within an airfoil-shaped casing, shroud, and/or cowling.

The scope of the present invention includes embodiments that minimize their drag, and facilitate their motion, e.g., by means of self-propulsion, through the use of airfoil-shaped water tubes and/or outer tube casings, shrouds, cowlings, and/or enclosures The scope of the present invention includes embodiments that incorporate and/or include airfoil-shaped water tubes and/or casings as well as rudders and/or ailerons that allow the airfoil-shaped water tubes to be steered after the manner of a keel, or an airplane wing.

30) Utilization of Turbine Exhaust as Thrust

The present invention includes an embodiment in which compressed, relatively high-pressure air flowing out of a water tube, either through a turbine or through a one-way valve, is directed laterally in a desirable direction so as to propel the embodiment.

31) Pitch-Inhibiting Weight

The present invention includes an embodiment in which a weight is suspended beneath one or more water tubes by flexible cables and/or rigid struts or structures such that when the orientation of the embodiment deviates from vertical, and/or from normal with the resting, nominal surface of the body of water on which the embodiment floats, then the downward gravitational force of the weight is imparted to the bottom of the water tube, and/or the bottom of the embodiment's buoy, thereby creating a restoring torque, or is imparted to the most raised of two or more water tubes, again thereby creating a restoring torque.

32) Aerosolization of Water

The present invention includes an embodiment that directly or indirectly uses a portion of the energy that it extracts from waves to spray seawater aerosols into the air (e.g., thereby increasing the abundance of cloud nucleation sites and promoting the development of clouds with greater albedo that might tend to reflect incident sunlight back into space thereby potentially reducing the temperature of the Earth).

The present invention includes an embodiment in which an expulsion and/or exhaust of high-pressure air is used to entrain and aerosolize water. An embodiment utilizes a high-pressure jet of air to draw up, aerosolize, and blow into the atmosphere, seawater drawn up from the sea surrounding the embodiment. An embodiment utilizes the exhaust from its high-pressure turbine (i.e., a turbine through which high-pressure air is vented from the embodiment, e.g., from its water tube and/or from its high-pressure accumulator) to entrain, aerosolize, and blow into the atmosphere, seawater.

The present invention includes an embodiment in which an electrically-powered pump and/or blower is used to aerosolize seawater and project, propel, and/or spray, it into the atmosphere.

33) Combinations and Derivative Variations

The present invention includes many novel devices, devices that are hybrid combinations of those novel devices, and variations, modifications, and/or alterations, of those novel devices, all of which are included within the scope of the present invention. All derivative devices, combinations of devices, and variations thereof, are also included within the scope of the present invention.

The scope of the present disclosure includes embodiments that include, incorporate, and/or utilize, air turbines, valves, and other means of regulating and/or controlling the flow of air and water, in any combination, and incorporating and/or characterized by any and all embellishments, modifications, variations, and/or changes, that would preserve their essential function and/or functionality.

The present invention, as well as the discussion regarding same, is made in reference to wave energy converters on, at, or below, the surface of an ocean. However, the scope of the present invention applies with equal force and equal benefit to wave energy converters and/or other devices on, at, or below, the surface of an inland sea, a lake, and/or any other body of water or fluid.

All potential variations in sizes, shapes, thicknesses, materials, orientations, and/or other embodiment-specific variations of the general inventive designs, structures, systems, and/or methods disclosed herein are included within the scope of the present disclosure, and will be obvious to those skilled in the art.

34) Applicable Types of Wave Energy Devices

While the variety of wave energy devices provided in the illustrations and examples in the present invention are limited, the scope of those portions of the disclosure that are not limited or constrained to a particular wave energy technology, and/or those portions which may be applied to other types of wave energy technologies and/or designs, shall apply and/or extend to all wave energy devices and/or technologies. Those elements of the presently disclosed wave energy technology which may be incorporated within, added to, and/or utilized in conjunction with, other wave energy technologies and/or devices, including, but not limited to, those of a future disclosure, are included within the scope of the present disclosure, as are those wave energy devices and/or technologies which include and/or benefit from them. It is to be understood that many objects of the disclosure apply to any type of wave energy converter consistent with the present invention.

35) Applicable Types of Device Deployments

Some embodiments of the present disclosure float freely, and/or "drift," adjacent to a surface of water in a passive manner which results in their movement in response to wind, waves, currents, tides, etc. Some embodiments are anchored and/or moored so as to retain an approximately constant position relative to a position on the underlying seafloor. And, some embodiments are self-propelled, and/or capable of exploiting natural movements of air and/or water to move in a chosen direction, at least approximately.

Some embodiments of the present disclosure are self-propelled and/or capable of exploiting natural movements of air and/or water so as to change their positions in at least a somewhat controlled manner. Self-propelled embodiments may achieve their directed motions by means including, but not limited to: rigid sails, ducted fans, propellers, sea anchors, Flettner rotors, sea anchors, and/or drogue anchors.

Some embodiments of the present disclosure are deployed so as to be free-floating and so as to drift with the ambient winds, currents, and/or other environmental influences that will affect and/or alter its geolocation. Some embodiments of the present disclosure are deployed such that individual devices are anchored and/or moored (e.g. to the seafloor) so as to remain approximately stationary.

Some embodiments of the present disclosure which are anchored and/or moored are so anchored and/or moored proximate to other such devices, and may even be moored to one another. These embodiments may be deployed in "farms" and their computers may be directly and/or indirectly interconnected such that they may interact, e.g. when cooperating to complete various computing tasks. The devices deployed in farms may communicate with computers and/or networks on land by means of one or more subsea data transmission cables, including, but not limited to: fiber optic cables, LAN cables, Ethernet cables, and/or other electrical cables. The devices deployed in farms may communicate with computers and/or networks on land by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some embodiments of the present disclosure which drift and/or are self-propelled, may directly and/or indirectly interconnect their computers so they may interact, e.g. when cooperating to complete various computing tasks. For example, drifting devices may act as clusters within a larger virtual cluster so as to cooperatively complete computing tasks that are larger than individual devices could complete individually. And, for example, self-propelled devices may travel the seas together in relatively close proximity to one another, though not directly connected.

Drifting, and/or self-propelled, devices may communicate with computers and/or networks on land, and/or with each other, by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some embodiments of the present disclosure are deployed so as to be "virtually" interconnected to one or more other devices (e.g. by Wi-Fi, radio, microwave, modulated light, satellite links, etc.), and together to drift with the ambient winds, currents, and/or other environmental influences that will affect and/or alter its geolocation. Some embodiments of the present disclosure are deployed so as to be "virtually" interconnected to one or more other devices (e.g. by Wi-Fi, radio, microwave, modulated light, satellite links, etc.), and, because they are "self-propelled" and/or able to actively influence their geolocation, and/or changes in same, through their manipulation of ambient winds, currents, and/or other environmental influences.

Some embodiments of the present disclosure are deployed so as to be tethered, and to be directly inter-connected, to one or more other devices, wherein one or more of the tethered devices are anchored and/or moored (e.g. to the seafloor) so as to remain approximately stationary, thereby limiting the range of motion and/or position of the entire tethered assembly.

Some embodiments, when directly and/or indirectly interconnected with one or more other devices, whether drifting or anchored, will link their computers and/or computing networks, e.g. by means of satellite-mediated inter-device communications of data, so as to act, behave, cooperate, and/or compute, as subsets of a larger, integrated, and/or inter-connected set of computers. Such inter-connected and/or cooperating devices may utilize, and/or assign to, a single device (or subset of the inter-connected group of devices) to be responsible for a specific portion, part, and/or subset, of the system-level calculations, estimates, scheduling, data transmissions, etc., on which the group of devices depends.

36) Sizes of Devices

The scope of the present disclosure includes embodiments of different dimensions, areas, volumes, masses, and capacities, including, but not limited to, those possessing:

waterplane areas of between 10 and 5,000 square meters drafts of between 30 and 250 meters tubular channels having cross-sectional areas (with respect to sectional planes normal to longitudinal axes of the respective tubular channels) that are between 3 and 140 square meters tubular channels having lengths (along axes parallel to longitudinal axes of the respective tubular channels) that are between 30 and 150 meters water ballasts having masses that are between 50 thousand and 300 million kilograms water ballasts having relative masses equal to between 25% and 100,000% of the masses of the respective "dry" portions of the respective embodiments (i.e., those parts of the respective embodiments that are rigid and/or not comprised of water, such as structural components)

the ability to generate between 1 kW and 5 MW when buffeted by ocean waves having significant wave heights of 3 or more meters, and dominant or significant wave periods of 9 or more seconds.

Scope of the Disclosure

While much of the present invention is discussed in terms of wave energy converters, including both floating and submerged components and/or modules, it will be obvious to those skilled in the art that most, if not all, of the disclosure is applicable to, and of benefit with regard to, other types of buoyant devices and/or partially or fully submerged devices, and all such applications, uses, and embodiments, are included within the scope of the present disclosure.

The embodiments illustrated and discussed in relation to the figures included herein are provided for the purpose of explaining some of the basic principles of the disclosure. However, the scope of the present invention covers all embodiments, even those differing from the idealized examples presented. The present invention covers all embodiments even those using modern components, devices, systems, etc., as replacements for the components, devices, systems, etc., used in the embodiments illustrated and/or discussed for the purpose of explanation and example.

Any one-way valve illustrated or discussed in the present invention may be replaced or augmented with an actively controlled valve, and the scope of the present invention includes any and all such substitutions.

The scope of the present invention includes "pressure-actuated" one-way valves that may be comprised of a flap or ball that opens in one direction when the pressure of the air on the side to which the flap or ball moves or rotates is less than the pressure of the air on the other side. The scope of the present invention includes "pressure-actuated" one-way valve may be a flap or ball that opens in one direction when the net effective pressure of the air pushing against it in the direction in which it moves when it opens is sufficient to create an "opening" force that is greater than a threshold or "closing" force tending or acting to hold the valve closed, e.g., the valve will open when the net pressure of the air tending to push it in an opening direction is sufficient, when applied against the surface of the flap or ball to generate an "opening" force sufficient to overcome the force of a pair of magnets (e.g., one in the ball or flap, and one in the frame to which, or within which, the ball or flap is constrained) tending to hold the valve closed. The scope of the present invention includes embodiments utilizing and/or incorporating all other varieties, styles, designs, and/or types, of one-way valves.

The scope of the present invention includes the incorporation of a control system within any embodiment discussed wherein the control system controls (opens and closes) valves, adjusts and/or alters the torque imparted by generators on turbines, adjusts and/or alters the volume of water ballast, and thereby alters and/or adjusts an embodiment's draft, waterplane area, and/or waterline, etc.

Any "generator" mentioned, discussed, and/or specified, in the present invention may create electrical power, pressurized hydraulic fluid, compressed air, and/or perform some other useful work or produce some other useful product. Any "generator" mentioned, discussed, and/or specified, in the present invention may be a generator, and alternator, or any other mechanism, device, and/or component, that converts energy from one form to another, especially any other mechanism, device, and/or component, that converts the rotary motion of a turbine's shaft into electrical power.

The scope of the present invention includes ducts, and/or vents of any and all shapes and/or sizes, and possessing and/or incorporating constrictions of any all absolute and/or relative cross-sectional areas.

The scope of the present invention includes turbines of any and all types, any and all diameters, any and all efficiencies, and made of any and all materials.

The scope of the present invention includes multiple turbines in series, e.g., multiple turbines extracting energy from a same flow of air.

The scope of the present invention includes generators, alternators, etc., in which the amount, degree, and/or magnitude, of the resistive torque imparted by to the turbines to those generators, alternators, etc., to which they are connected, may be actively controlled so as to optimize the extraction of energy from the positively and/or negatively pressurized air within the respective water columns and/or accumulators from or to which air flows before or after flowing through the turbines.

The scope of the present invention includes the use of adjustable guide vanes, dampers, and/or other flow-control surfaces, and/or other obstructions to flow, that may be used to adjust the rate and/or pressure of air flowing through the turbines, especially so as to optimize the extraction of energy from the air flowing through the turbines.

For a fuller understanding of the nature and objects of the disclosure, reference should be made to the following detailed descriptions, taken in connection with the accompanying drawings. The following figures offer explanatory illustrations, which, like most, if not all, explanations and illustrations, are potentially useful, but inherently incomplete. The following figures, and the illustrations offered therein, in no way constitute limitations, neither explicit nor implicit, on the scope of the present invention.

Note that some figures incorporate bold arrows to suggest the flow of air and/or water.

FIG. 1 shows a side perspective view of an embodiment of the present invention. The embodiment 100 floats adjacent to an upper surface 101 of a body of water. The embodiment incorporates a tubular water column 102, a lower end 103 of which is open to the water 101. As the embodiment moves up and down in response to passing waves, water moves 104 in and out of the open bottom 103 of the water column 102. Water moves 104 in and out of the open bottom 103 of the water column at least in part due to wave-induced changes in the draft of that portion of the water column and at least in part due to vertical movements of the embodiment in response to wave heave.

As the level of the water within the water column 102 oscillates, a pocket of air trapped in an upper portion 105 of the water column is alternately compressed and expanded. As the pocket of air expands and contracts in response to variations in the level of the water enclosed within the water column 102, air is alternately 106 drawn in to (inhaled) and expelled from (exhaled) that air pocket through a tubular duct 107 containing an air-driven turbine (not visible) that is operatively connected to a generator (not visible).

The embodiment 100 incorporates a buoy 108-110 with an approximately flat upper surface (or deck) 108, an approximately cylindrical side 109, and an approximately frusto-conical bottom 110.

Figure 2:
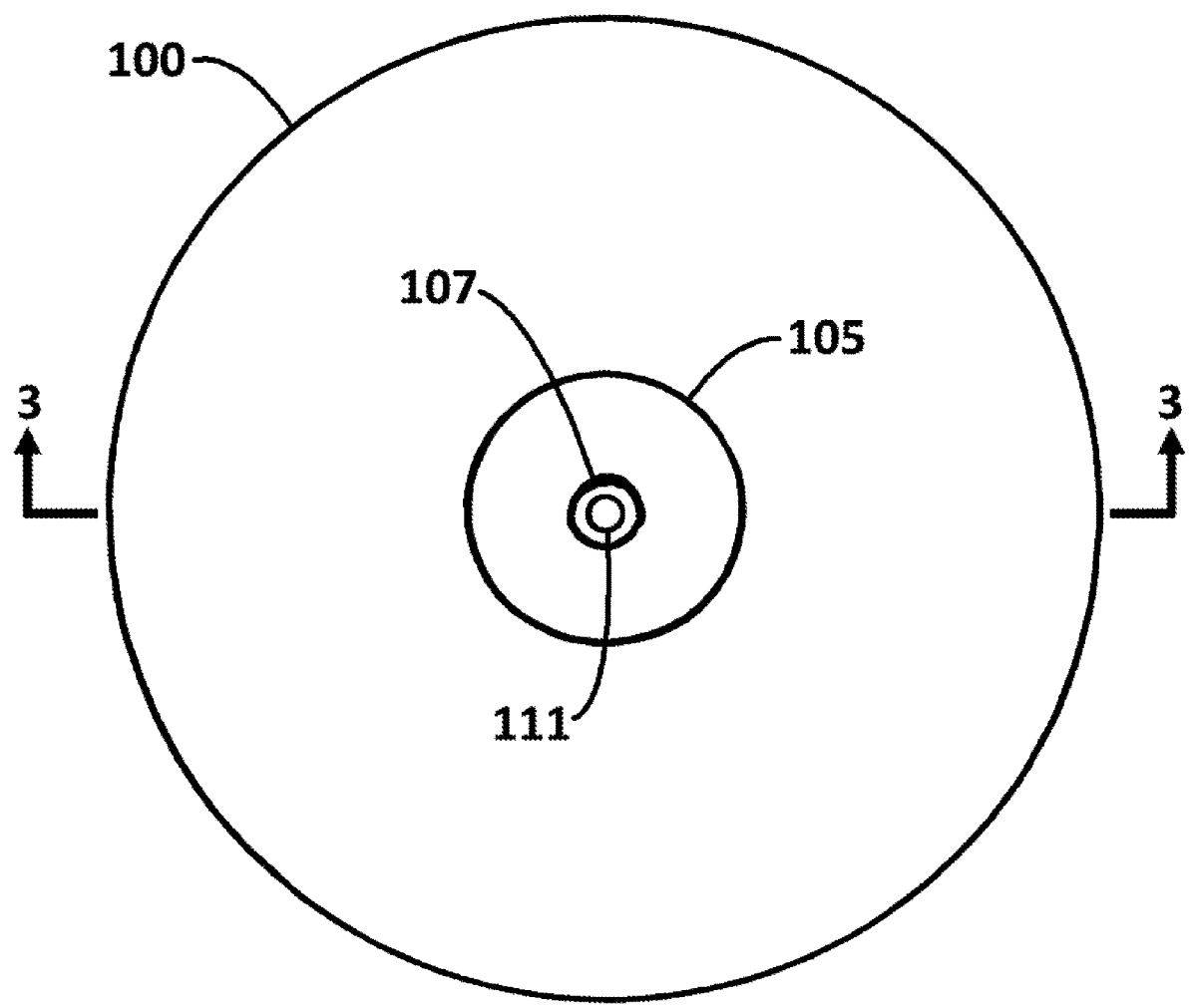
FIG. 2 is a top view of the embodiment of FIG. 1.

FIG. 2 shows a top-down view of the same embodiment illustrated in FIG. 1. Incorporated within the approximate horizontal center of the buoy 100, and/or approximately coaxial with a vertical longitudinal axis of radial symmetry of the embodiment, is the upper end of the water column 105 within which a duct 107 allows air to flow into, and out of, the air pocket in the upper portion of the water column 105. A turbine 111 in a constricted portion of the duct is spun by the air that flows in and out of the water column 105 and generates rotational kinetic energy that energizes an operatively connected generator (not visible).

Figure 3:
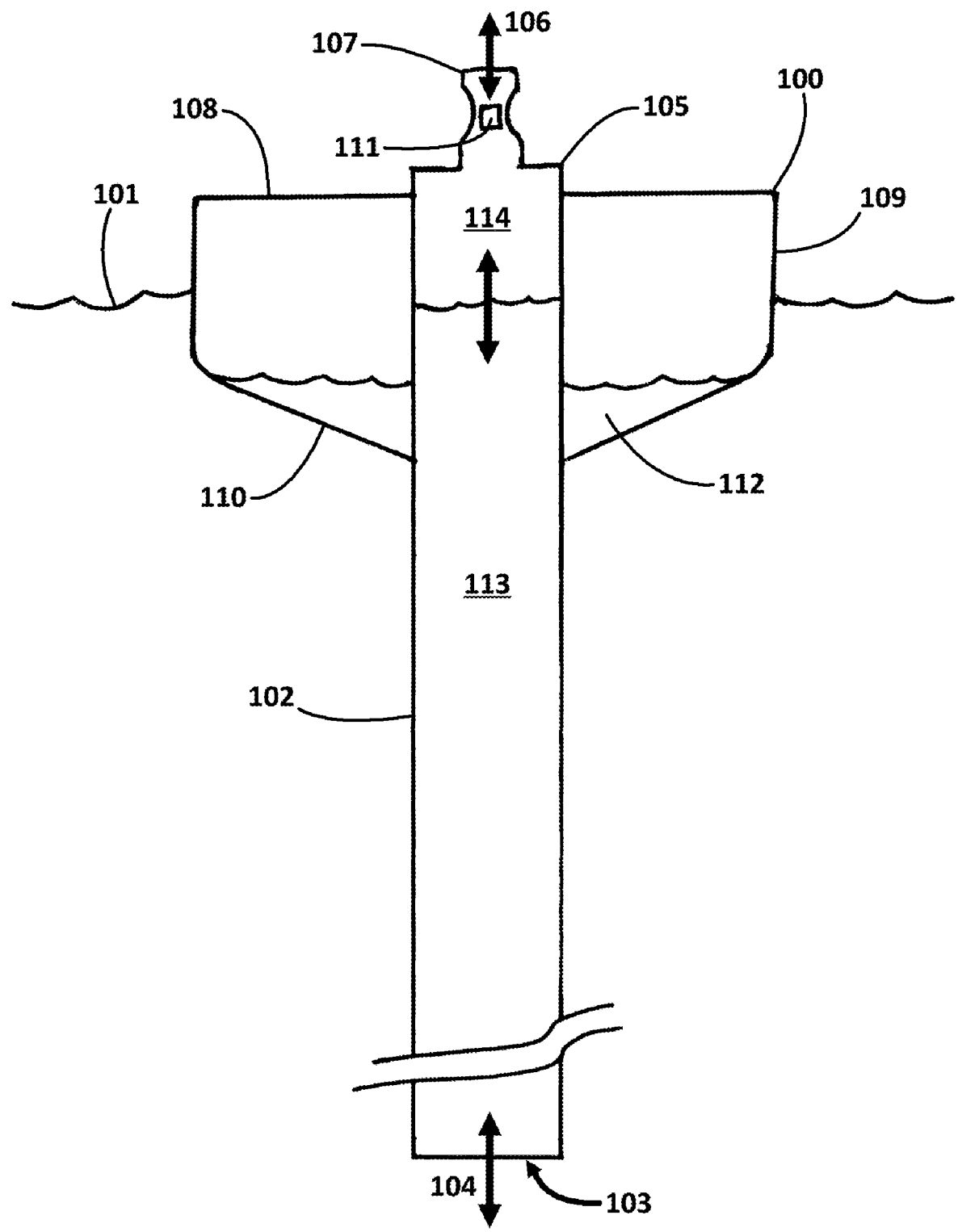
FIG. 3 is a cross sectional view of the embodiment of FIG. 1.

FIG. 3 shows a vertical cross-sectional view of the same embodiment illustrated in FIGS. 1 and 2, wherein the vertical section is taken along section line 3-3 as specified in FIG. 2. A buoyant, and at least partially hollow, buoy 108-110, contains water ballast 112 positioned in a lower interior portion of the buoy and therein adjacent to an interior surface of the bottom wall 110 of the buoy. Thus, the weight of the ballast 112 tends to push down against one of the buoy surfaces against which the water 101 pushes up.

Water column 102/105 has an open bottom 103 through which water may flow 104 in and out of the water column. Due to changes in the draft and pressure of the water at the lower mouth 103 of the water column, and to vertical, e.g., heave-induced, movements of the embodiment and its water column, the body of water enclosed by the water column tends to move up and down within the tube 102, and typically out of phase with the wave-induced rising and falling of the embodiment and the surface 101 of the body of water.

When the water 113 enclosed by the water column moves up within the water column 102/105, at the same time that the buoy 100 moves down, e.g., on the retreating face of a passing wave, air trapped in a pocket 114 adjacent to the top of the water column 105 is compressed, forcing at least a portion of that air to flow 106 through duct 107, and through turbine 111 therein, resulting in the generation of electrical power by a generator (not shown) operatively connected to turbine 111.

Conversely, when the water 113 enclosed by the water column moves down within the water column 102/105, at the same time that the buoy 100 moves up, e.g., on the rising face of an approaching wave crest, air trapped in a pocket 114 at the top of the water column 105 is expanded, and its pressure is reduced, forcing air to flow 106 into the air pocket through duct 107, and through turbine 111 therein, resulting in the generation of electrical power by a generator (not shown) operatively connected to turbine 111.

Figure 4:
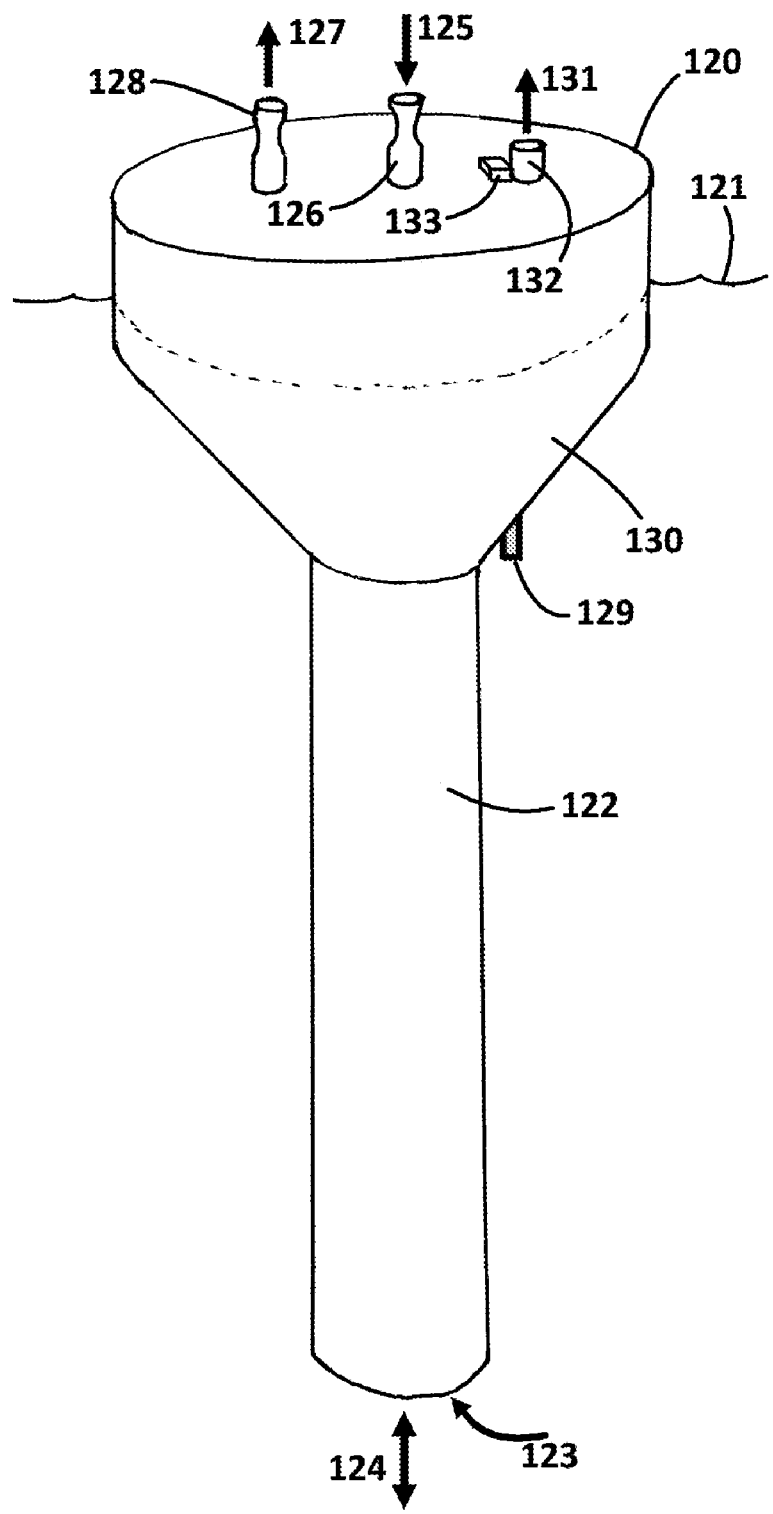
FIG. 4 is an elevated, perspective schematic view of a second embodiment of the present invention.

FIG. 4 shows a side perspective view of an embodiment of the present invention. The embodiment 120 floats adjacent to an upper surface 121 of a body of water. The embodiment incorporates a tubular water column 122 a lower end 123 of which is open to the water. As the embodiment moves up and down in response to passing waves, water moves 124 in and out of the open bottom 123 of the water column 122. Water moves 124 in and out of the open bottom 123 of the water column 122 at least in part due to wave-induced changes in the draft of that portion of the water column and at least in part due to vertical movements of the embodiment in response to wave heave.

As the level of the water within the water column 122 oscillates, a pocket of air trapped in an upper portion of the water column 122 (within a portion of the water column positioned inside the buoy 130) is alternately compressed and expanded. As the pocket of air expands in response to downward movements of the upper surface of the water enclosed within the water column 122, air is drawn 125 in to (inhaled) that air pocket through a tubular duct 126 containing an air-driven turbine (not visible) that is operatively connected to a generator (not visible).

As the pocket of air trapped in an upper portion of the water column 122 is compressed in response to upward movements of the upper surface of the water enclosed within the water column 122, air is expelled from the air pocket and directed into a high-pressure "accumulator" (not visible and within the buoy 130). Compressed, high-pressure air within the accumulator flows 127 out through a tubular duct 128 containing an air-driven turbine (not visible) that is operatively connected to a generator (not visible). Because the high-pressure accumulator stores, and slowly releases through duct 128, the air impulsively and/or cyclically compressed within the water column 122, air from the accumulator flows 127 outward at a relatively steady rate and pressure. This allows the turbine within duct 128 to be smaller, lighter, and less costly than the type and capacity of generator that would be required if the outward flow of pressurized air originated directly from the air pocket in the water column 122, and were therefore more impulsive and characterized by significantly varying rates and pressures that spanned a greater range.

The embodiment 120 also has an actuated (e.g., electrically actuated) one-way valve that when opened allows high-pressure air from the water column's air pocket to be directed into the cavity of the hollow buoy 130 (i.e. the hollow cavity of the buoy being separate from the high-pressure accumulator positioned therein), which results in the displacement of at least a portion of the water ballast within the buoy 130 through an aperture 129 in a lower wall 130 of the buoy. The expulsion of a portion of the water ballast within the buoy 120 decreases the mass, weight, and inertia of the buoy and reduces the volume of water that the embodiment displaces, i.e., it results in the buoy rising out of the water 121. Such a reduction in the mass of the embodiment, and in the consequent raising of the embodiment out of the water, allows the embodiment to adapt to an increase in the energy of the waves buffeting it by decreasing its water plane area (e.g., by lowering its mean water plane to a lower position transiting the frusto-conical bottom of the buoy where the horizontal cross-sectional area is lessened) and thereby decreasing the amount of wave energy that the embodiment absorbs from the water 121 on which it floats.

By contrast, when wave conditions are suboptimal, and/or insufficiently energetic, air can be released 131 from the cavity within the hollow buoy 130 through a valve 132, controlled or actuated by a controller 133. When air is released from the inside of the buoy, water flows in through aperture 129, thereby increasing the mass, weight, and inertia of the embodiment, thereby increasing its draft (i.e., the depth of the bottom of its water column), and increasing (potentially up to its maximal amount) the cross-sectional area of its water plane area at the surface 121 of the body of water on which it floats, and thereby increasing the amount of wave energy that the embodiment absorbs from the water 121 on which it floats.

Figure 5:
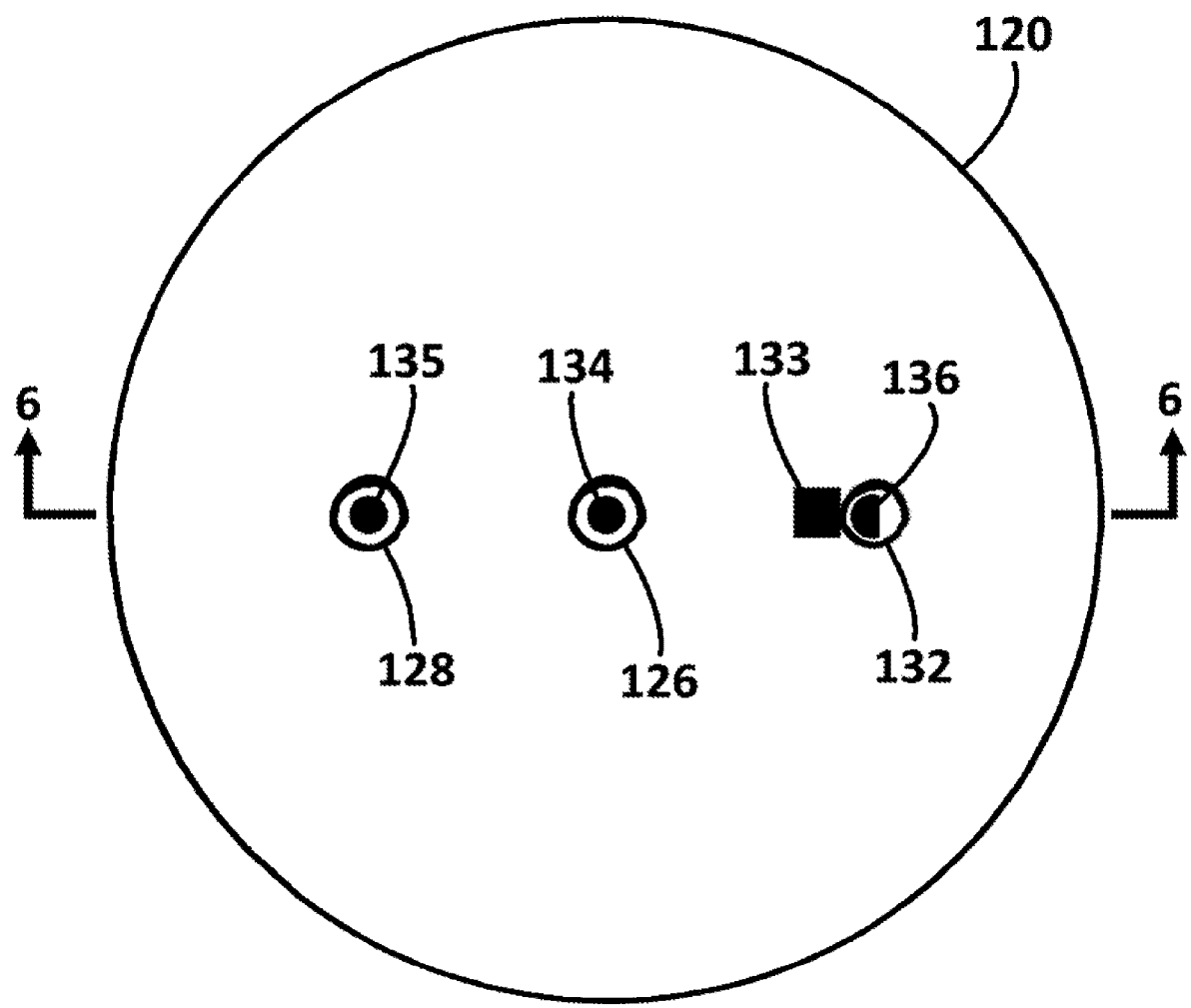
FIG. 5 is a top view of the embodiment of FIG. 4.

FIG. 5 shows a top-down view of the same embodiment illustrated in FIG. 4. Incorporated within the approximate center of the buoy 120 is a duct 126 containing a turbine 134 that is positioned in a constricted portion of the duct. One end of the duct is connected to an upper end of the embodiment's water column (122 in FIG. 4) and allows air to flow into an air pocket in an upper portion of that water column, especially when the pressure of the air within that air pocket is reduced relative to the pressure of the atmosphere outside the embodiment. The turbine 134 positioned within the duct 126 tends to be spun by air that flows from the atmosphere outside the embodiment and into the water column's air pocket. The inhalation turbine's spinning generates rotational kinetic energy that energizes a generator to which the turbine is operatively connected.

Positioned to one side of the "inhalation duct" 126 is an "exhalation duct" 128 through which pressurized air stored in an accumulator within buoy 120 flows out of the buoy and through a turbine 135 located within a constricted portion of the exhalation duct 128. The exhalation turbine's spinning generates rotational kinetic energy that energizes a generator to which the turbine is operatively connected.

A valve 132 contains a "flap" 136 (a movable obstruction capable of shutting the valve) whose position is controlled by a controller 133. The controller permits the valve to be opened or closed. When opened, air within the buoy is allowed to escape which allows water to flow into, and be entrained within, the hollow interior of the buoy, thereby increasing the mass, weight, and inertia of the embodiment and causing the embodiment's draft to increase.

Figure 6:
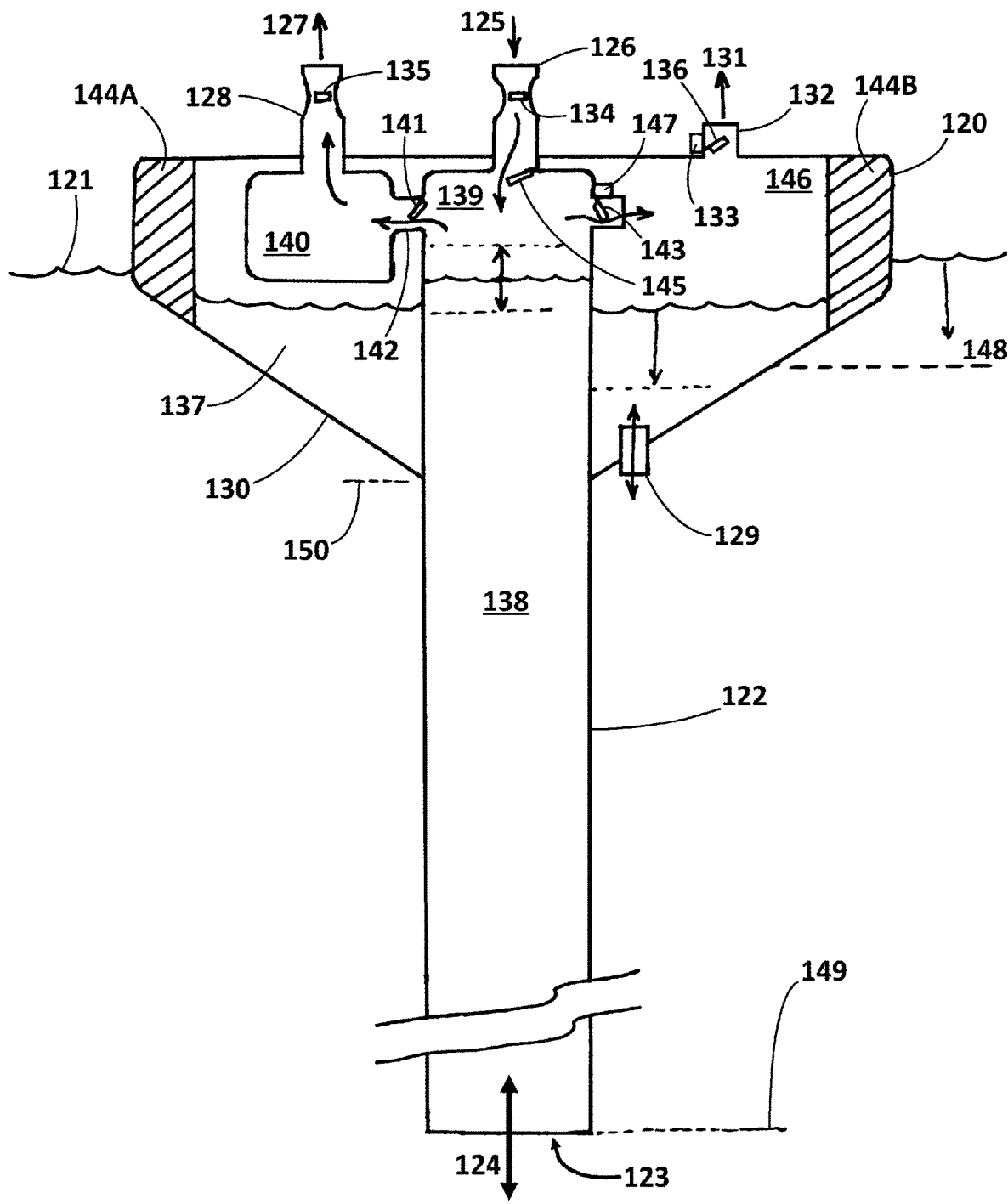
FIG. 6 is a cross sectional view of the embodiment of FIG. 4.

FIG. 6 shows a vertical cross-sectional view of the same embodiment illustrated in FIGS. 4 and 5, wherein the vertical section is taken along section line 6-6 as specified in FIG. 5. A buoyant, and at least partially hollow, buoy 120/130, contains a water ballast 137 in a lower interior portion adjacent to a bottom buoy surface and/or wall 130. Thus, the weight of the ballast 137 pushes down against one of the buoy surfaces against which the water 121 on which the embodiment floats pushes up.

Water column 122 has an open bottom 123 and/or mouth or aperture through which water may flow 124 in and out. Due to changes in the depth and pressure of the water at the lower mouth 123 of the water column, and due to vertical, e.g., heave-induced, movements of the water column 122, the body of water 138 enclosed within the water column 122 tends to move up and down, and typically moving out of phase, with the wave-induced rising and falling of the embodiment and the surface 121 of the body of water on which the embodiment floats.

When the water 138 enclosed by the water column 122 moves down within the water column at the same time that the buoy 120 moves up, e.g., on the rising face of an approaching wave crest, the volume of the air pocket 139 at the top of the water column 122 is increased, causing the air trapped in that air pocket to expand, and causing its pressure to be reduced. When the pressure of the air in the air pocket 139 falls below the outside atmospheric pressure (e.g., 1 ATM) then a pressure-actuated one-way valve 145 opens and allows outside air to flow 125 into the air pocket 139 through duct 126, and through turbine 134 therein, resulting in the generation of electrical power by a generator (not shown) operatively connected to turbine 134.

When the water 138 enclosed by the water column 122 moves up within the water column at the same time that the buoy 120 moves down, e.g., on the retreating face of a passing wave, air trapped in a pocket 139 at the top of the water column 122 is compressed, causing its pressure to exceed the pressure of the air within a high-pressure accumulator 140. At that point, and until the pressure within the air pocket 139 falls to, or below, the pressure in the accumulator 140, pressurized air will force open the passive (pressure actuated) one-way valve 141 positioned within a tube or aperture 142 that connects the air pocket 139 to the accumulator 140. After forcing open the one-way valve 141, air will flow from the pressurized air pocket 139 into the accumulator 140.

Pressurized air within accumulator 140 flows out 127 to the atmosphere through duct 128 and turbine 135 therein. The rate at which the air flows is related to the diameter of duct 128, the diameter of that portion of the duct wherein the turbine 135 is position, i.e., the degree of duct constriction, the number of blades on turbine 135, and flow rate of the air may be adjusted and/or controlled through the adjustment and/or control of the resistive torque imparted to the turbine 135 by its operatively connected generator or alternator (not shown). When appropriately designed and controlled, the duct and turbine therein can release 127 pressurized air from accumulator 140 at a relatively steady rate and pressure, thereby permitting the use of a smaller turbine and a smaller generator (or alternator) than would be required if the turbine and generator were required to capture energy from the impulsive bursts of pressurized air generated by the air pocket in the absence of a buffering accumulator. The passage of air through turbine 135 at a relatively steady rate and pressure will also tend to prolong the life of, and reduce the need to maintain, the turbine, the bearings (if any) facilitating the rotation of the turbine, and the generator (not shown) to which the turbine is operatively connected.

Moreover, a turbine directly capturing energy from the impulsive bursts of pressurized air generated by the air pocket would be required to capture energy over a greater range of flow rates and pressures than the turbine capturing energy from the relatively steady flow rates and pressures emanating from the accumulator. It would be more difficult, if not impossible, for a turbine energized directly from the output of the air pocket to achieve the same efficiency of energy capture as a turbine energized by the relatively constant flow rates and pressures that would characterize the buffered accumulator output.

Embodiment 120 includes permanently buoyant structures 144 and/or components (e.g., closed-cell foam) within the hollow interior of the buoy 120/130 so that embodiment 120 cannot sink even if the water 137 within the hollow space within the buoy is increased to its maximum possible extent and/or volume, e.g. by a defective and/or failed pressure relief valve 136 and/or controller 133.

Embodiment 120 includes two actively controlled or actuated valves 136 and 143. When the embodiment's control module (not shown) opens valve 136 (e.g., by sending an appropriate signal to the valve's control module 133) then air trapped within the hollow interior 146 of the buoy is allowed to escape to the atmosphere outside the embodiment. This allows water 121 on which the embodiment floats to flow into the hollow interior 146 through vent or aperture 129. When the embodiment's control module (not shown) opens one-way valve 143 (e.g., by sending an appropriate signal to the valve's control module 147) then at those times when the air within air pocket 139 is pressurized (e.g., as a result of the air pocket's compression) then pressurized air will flow from the air pocket 139 into the hollow interior 146 of the buoy. The inflow of pressurized air will cause water within the hollow interior 146 of the buoy to flow through vent or aperture 129 into the body of water 121 on which the embodiment floats.

Through the opening of either of valves 136 or 143, and the concomitant closing of the other of those two valves, the volume of water (i.e., ballast) within the hollow interior 146 of the buoy can be either increased or decreased.

An increase in the volume of the water ballast within the buoy 120 will cause the buoy's draft 149 to increase (i.e., will cause the top of the buoy 120 to get closer to the surface 121 of the water). This might be useful when the energy of the waves buffeting the embodiment is relatively low and the embodiment can capture more of that energy by increasing its water plane area.

A decrease in the volume of the water ballast within the buoy 120 will cause the buoy's draft 149 to decrease (i.e., will cause the top of the buoy to move higher and further from the surface 121 of the water). This might be useful when the energy of the waves buffeting the embodiment is relatively high and it is useful for the embodiment to capture a smaller fraction of that energy by decreasing its water plane area, e.g., the water plane area of the buoy 120 when its mean waterline is at 148 is less than it is when its mean waterline is at 121 (i.e. when its waterline is at the same position suggested within the embodiment configuration illustrated in FIG. 6) since the cross-sectional area of the embodiment, in a plane parallel to the surface 121 of the body of water on which the embodiment floats, is less when the waterline of the embodiment is at a position 148 than when it is at 121. Also, by decreasing the volume of the water ballast within the buoy and thereby raising the embodiment out of the water to a degree, the vulnerability of the embodiment to damage by extreme waves can be reduced.

The mass of the embodiment 120 and therefore the draft of the embodiment is not significantly affected by the water enclosed within water column 122 since that water is unbounded at its lower end and is (aside from any suction within the air pocket 139) able to flow down and out of the water column with relative freedom.

Note that because of the significant mass of the water 137 entrained within the buoy 120, and the relative insignificance of the water partially enclosed within, and relatively free to move in and out of, the water column 122, the embodiment's center of mass is located approximately along the embodiment's vertical longitudinal axis (i.e., its radial axis of approximate symmetry) at a point within the upper and lower bounds of the buoy. In other words, the embodiment's center of mass is found within the buoy, above line 150, and not below line 150.

Figure 7:
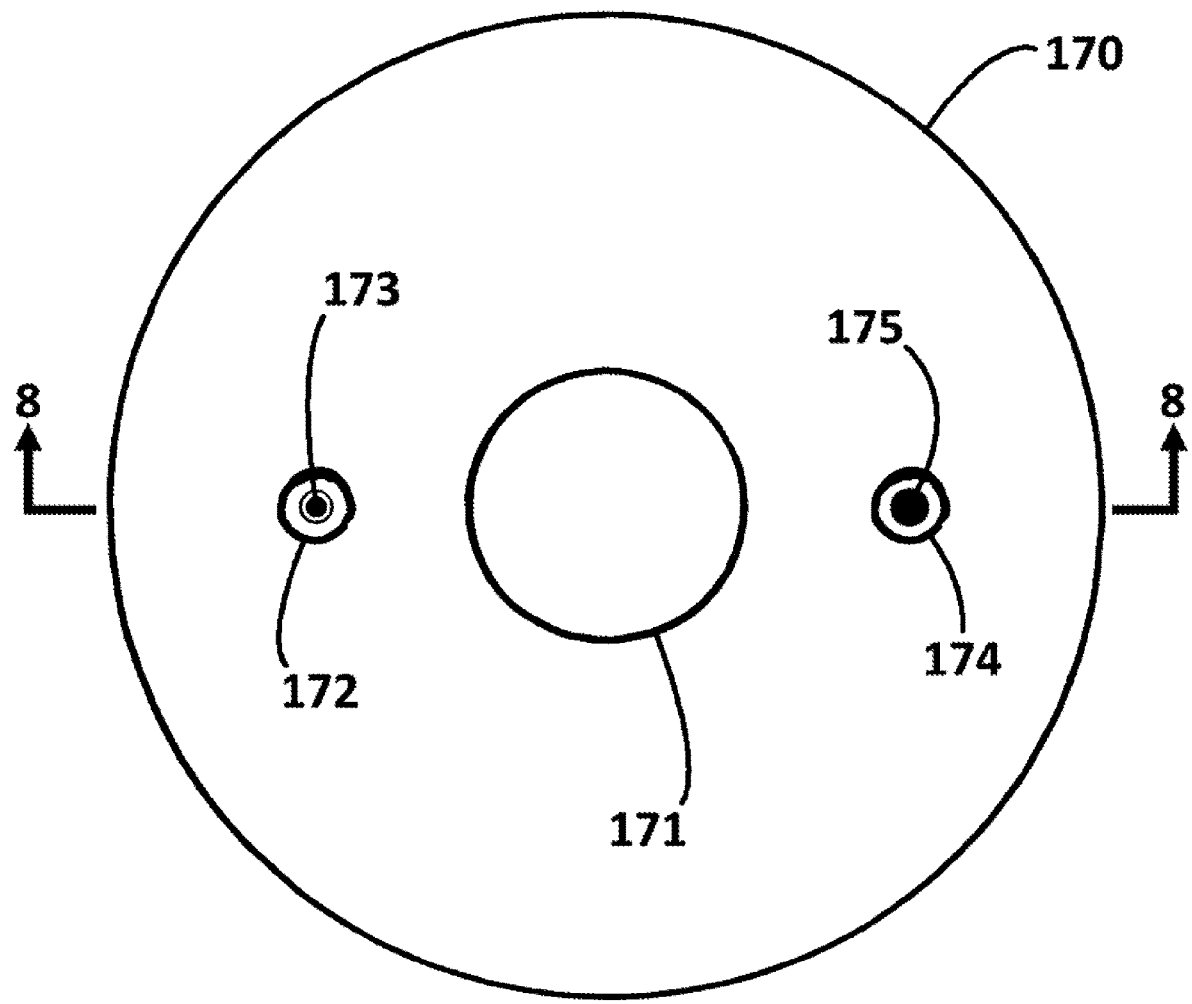
FIG. 7 is a top view of another embodiment of the present invention.

FIG. 7 shows a top-down view of an embodiment of the present invention. A buoy 170 floats adjacent to an upper surface of a body of water (not shown). An open-bottomed water column 171 integrated into the center of the buoy contains an air pocket above the body of water enclosed within the water column 171.

Figure 8:
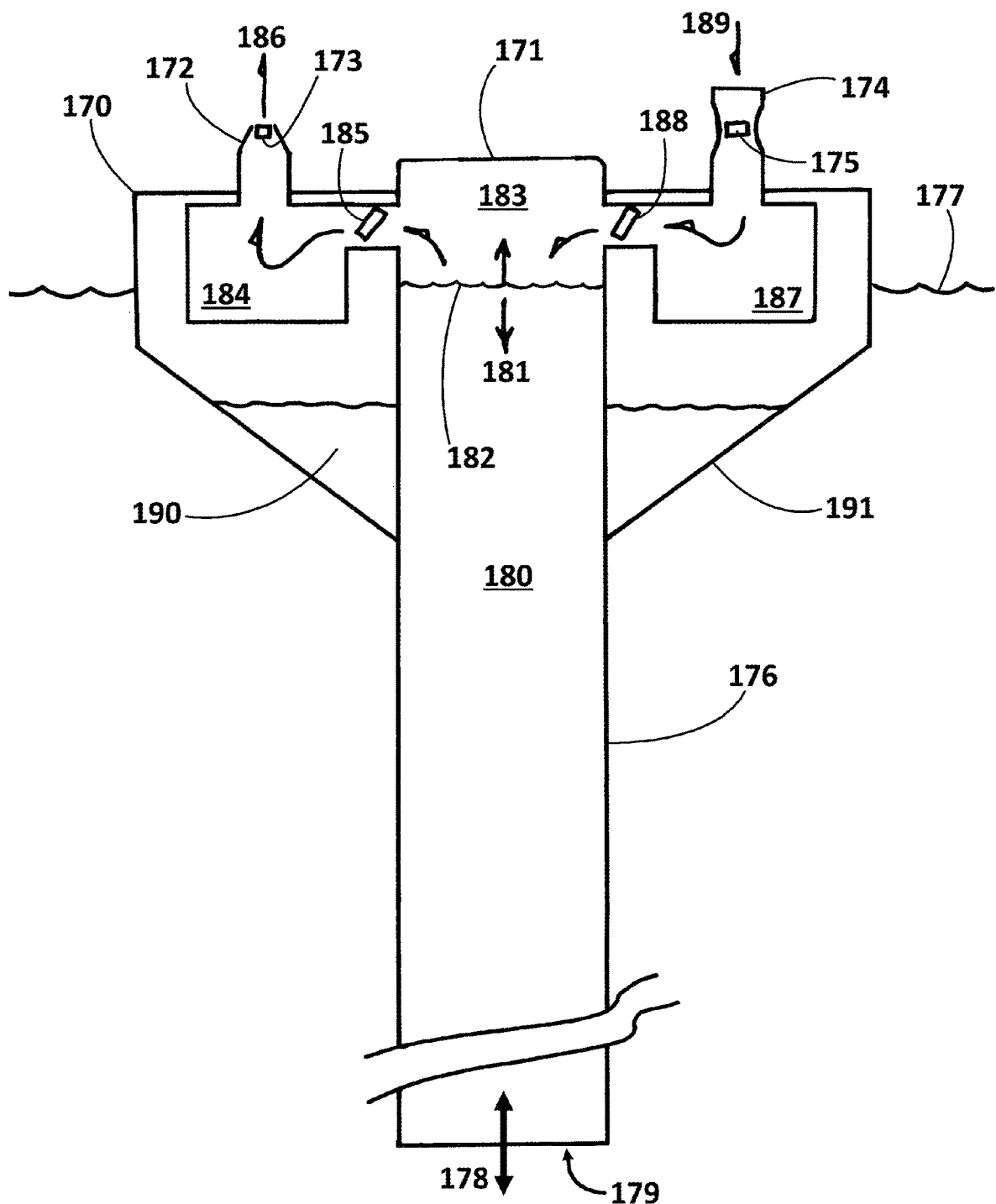
FIG. 8 is a cross sectional view of the embodiment of FIG. 7.

The embodiment illustrated in FIGS. 7 and 8 has a similar gross structure to that of the embodiments illustrated in FIGS. 1 and 4, namely, the embodiment illustrated in FIGS. 7 and 8 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry. While top-down and sectional views are provided of the embodiment illustrated in FIGS. 7 and 8, because of the similarity in the large structural features of the embodiments illustrated in FIGS. 1, 4, and 7-8, perspective and side views of the embodiment illustrated in FIGS. 7 and 8 are omitted.

As the buoy 170 and the body of water within the water column 171 move toward one another (e.g., as the water moves upward while the buoy is moving downward) the air trapped at the top of the water column is compressed and its pressure is increased. When the pressure of the air within the water column's air pocket is sufficiently high, a first pressure-actuated one-way valve (not visible) allows a portion of the pressurized air in the air pocket to travel through a tubular connector into a high-pressure accumulator (not visible).

Pressurized air from the high-pressure accumulator flows out of the accumulator and into the ambient atmosphere through a duct 172 and through a turbine 173 therein. As the pressurized air flows through the turbine 173 it spins which causes the rotor of a generator operatively connected to the turbine to spin as well, thereby generating electrical energy.

In similar embodiments, the spinning of the turbine is rotatably connected to a hydraulic generator or pump, thereby generating pressurized hydraulic fluid. And, in another similar embodiment, the spinning of the turbine creates rotational kinetic energy that is used to perform useful work.

As the buoy 170 and the body of water within the water column 171 move away from one another (e.g., as the water moves downward while the buoy is moving upward) the volume of the pocket in which air is trapped at the top of the water column 171 is increased, i.e., the air is expanded and its pressure is reduced. When the pressure of the air within the water column's air pocket is sufficiently low, a second pressure-actuated one-way valve (not visible) allows a portion of the relatively higher pressure air in a low-pressure accumulator (not visible) to travel through a tubular connector into the air pocket.

Air from outside the embodiment (i.e., air at a pressure of approximately 1 atmosphere) flows into the low-pressure accumulator through a duct 174 and through a turbine 175 therein. As the outside air flows through the turbine 175 the turbine spins which causes the rotor of a generator operatively connected to the turbine to spin as well, thereby generating electrical energy.

In similar embodiments, the spinning of the turbine is operatively connected to a hydraulic generator or pump, thereby generating pressurized hydraulic fluid. And, in another similar embodiment, the spinning of the turbine creates rotational kinetic energy that is used to perform useful work.

FIG. 8 shows a vertical cross-sectional view of the same embodiment illustrated in FIG. 7, wherein the vertical section plane is taken along section line 8-8 as specified in FIG. 7. The embodiment incorporates a buoyant portion 170 including, but not limited to: a buoy, flotation module, boat, barge, or buoyant platform, and an open-bottomed water column 171/176 portion, including, but not limited to: a tube, pipe, channel, or chamber.

As the buoy 170 rises and falls in response to waves traveling across the surface 177 of the body of water on which the buoy floats, the water partially enclosed within the water column 171/176 rises and falls, as water flows 178 into, and out of, the water column's mouth 179. The water 180 within the water column 171/176 rises and falls 181, at least in part, due to the changes in the pressure of the water adjacent to the bottom mouth 179 of the water column that result from changes in the depth of the bottom mouth of the water column. The depth of, and water pressure around, the bottom mouth of the water column change, at least in part, because as waves lift and let fall the buoy, the buoy's vertical movements are imperfectly synchronized with the surfaces of those waves and with the movements of the embodiment, thereby effectively changing the depth of the water column's mouth 179. The water 180 within the water column 171/176 also rises and falls 181, at least in part, due to the inertia of the water 180 inhibiting that water's ability to accelerate up and down in unison or synchrony with the embodiment 170 and the structural tube defining and/or establishing its water column 171/176.

When the distance between the top 171 of the water column and the top 182 of the water 180 within the water column 176, changes so as to decrease the volume available to the air pocket 183, the air 183 trapped at the top of the water column is compressed. When the pressure of that air exceeds the pressure of the air in a high-pressure accumulator 184, then a first pressure-actuated one-way valve 185 opens and relatively high-pressure air flows from the air pocket 183 into the high-pressure accumulator 184.

High-pressure air within the high-pressure accumulator 184 flows at a relatively steady rate and pressure through a duct 172 and a turbine 173 therein and therethrough flows 186 into the atmosphere. The rotational kinetic energy imparted to the turbine 173 by the air flowing through it is communicated to an operatively connected generator, and thereby energizes the electrical generator resulting in its generation of electrical power. In a similar embodiment, that rotational kinetic energy of the turbine is used to energize a hydraulic pump or generator and pressurize hydraulic fluid. And, in another similar embodiment, the rotational kinetic energy of the turbine is used to perform useful work (such as energizing a pump that sprays seawater into the air in order to create aerosols that increase cloud cover and reflect heat from the Sun back into space).

When the distance between the top 171 of the water column and the top 182 of the water 180 within the water column 176, increases, the volume of the air pocket 183 is increased, and the air 183 trapped at the top of the water column is decompressed, and its pressure is reduced. When the pressure of that air falls below the pressure of the air in a low-pressure accumulator 187, a second pressure-actuated one-way valve 188 opens and relatively high-pressure air flows from the low-pressure accumulator 187 into the relatively low-pressure air pocket 183.

The relatively higher-pressure atmospheric air outside the embodiment flows 189 at a relatively steady rate and pressure through a duct 174 and through a turbine 175 therein and into the low-pressure accumulator 187. The rotational kinetic energy imparted to the turbine 175 by the air flowing through it is used to energize an electrical generator and thereby generate electrical power. In a similar embodiment, that rotational kinetic energy of the turbine 175 is used to energize a hydraulic pump or generator and pressurize hydraulic fluid. And, in another similar embodiment, that rotational kinetic energy of the turbine 175 is used to perform useful work (such as energizing a pump that sprays seawater into the air in order to create aerosols that increase cloud cover and reflect heat from the Sun back into space).

Water 190 entrained within the buoy 170 increases the mass, weight, and inertia of the buoy (i.e., thereby serving as ballast) affecting the embodiment's draft, and the vertical position of its waterline. A pump and associated pipes (not shown) allow the embodiment's control system (not shown) to increase or decrease the amount, volume, or level, of water 190 stored within the buoy, thereby raising or lowering, respectively, the embodiment's waterline, and thereby respectively increasing or decreasing the embodiment's draft. This ability of the embodiment's control system to adjust the embodiment's draft allows the control system to optimize the draft, and the associated water plane area, of the embodiment with respect to the significant wave height, period, wind speed, wind direction, current speed, current direction, and/or any other relevant environmental and/or operational factor(s). By reducing the embodiment's draft during storms, the control system can minimize the risk of structural damage to the embodiment that might otherwise result from more energetic wave conditions of those storms.

Figure 9:
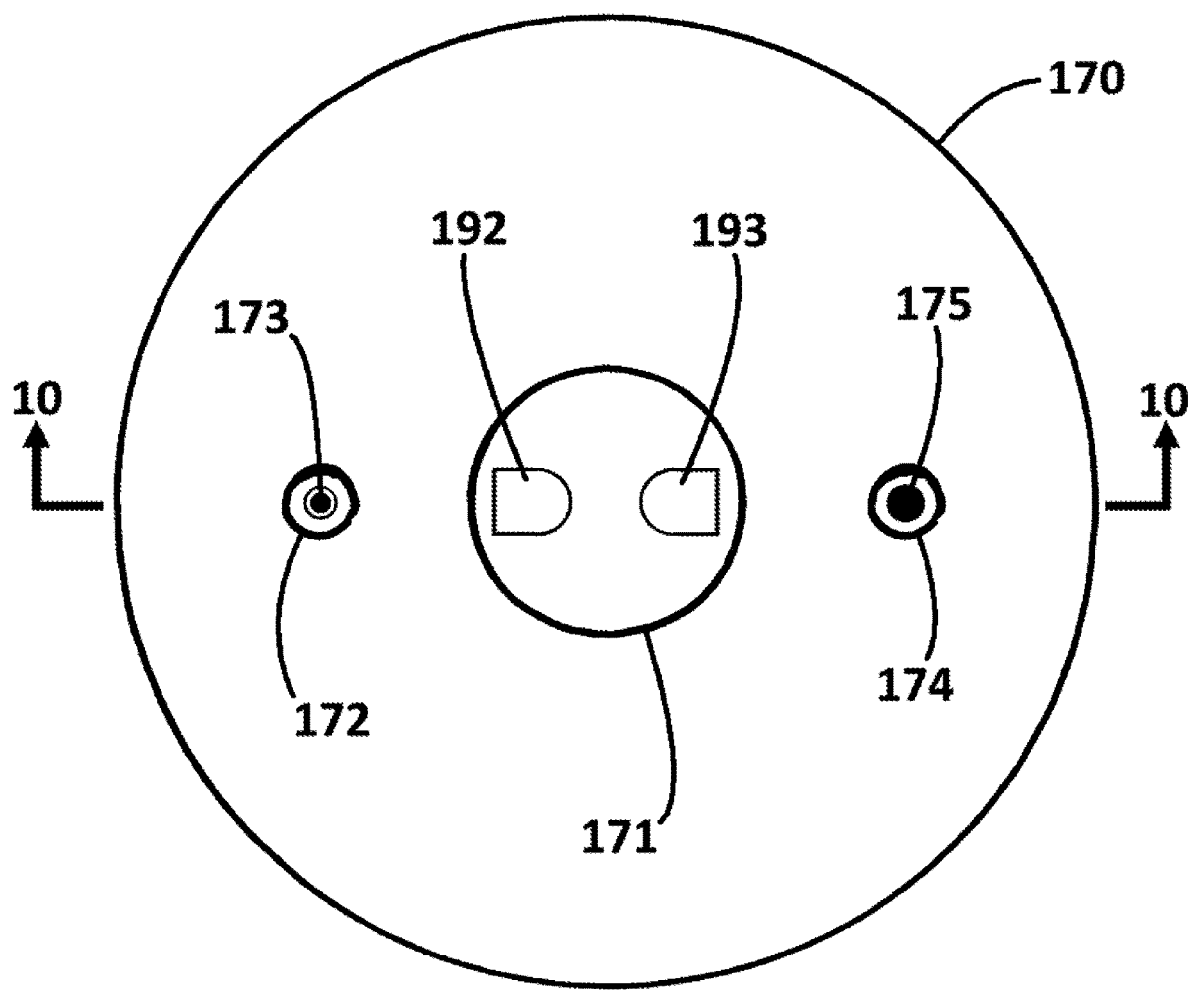
FIG. 9 is a top view of another embodiment of the present invention.

FIG. 9 shows a top-down view of an embodiment of the present invention that is similar to the embodiment illustrated and discussed in FIGS. 7 and 8, and the components shared by the embodiments of FIGS. 7-8 and FIGS. 9-10 share the same identifying numbers in order to facilitate understanding of the present invention. The components and behaviors common to both embodiments will not be repeated in relation to FIGS. 9 and 10. However, unlike the embodiment illustrated and discussed in FIGS. 7 and 8, the embodiment illustrated and discussed in FIGS. 9 and 10 includes two additional ducts 192 and 193, and respective one-way valves that are explained in the description of FIG. 10.

Figure 10:
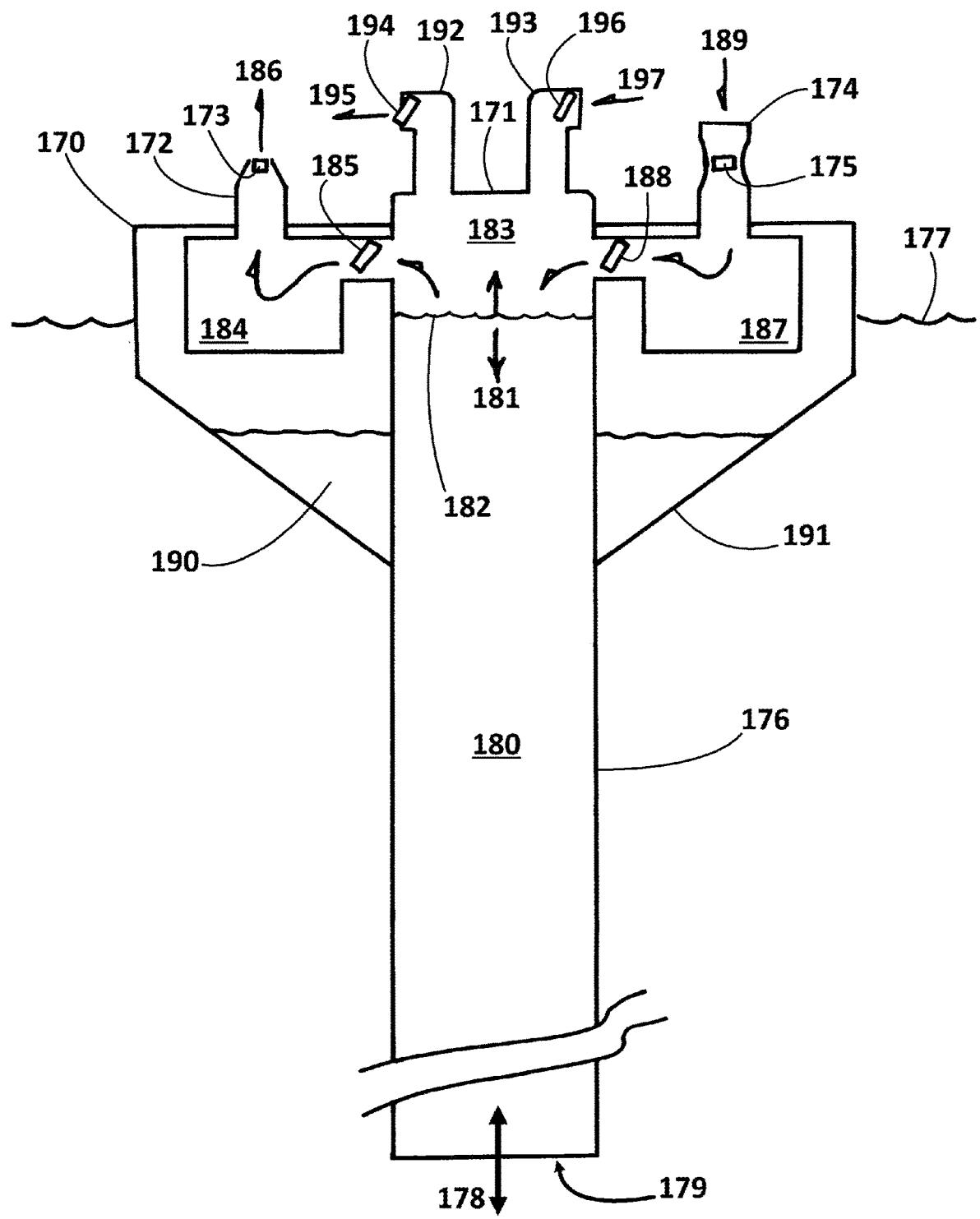
FIG. 10 is a cross sectional view of the embodiment of FIG. 9.

The embodiment illustrated in FIGS. 9 and 10 has a similar gross structure to that of the embodiments illustrated in FIGS. 1 and 4, namely, the embodiment illustrated in FIGS. 9 and 10 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry. While top-down and sectional views are provided of the embodiment illustrated in FIGS. 9 and 10, because of the similarity in the large structural features of the embodiments illustrated in FIGS. 1, 4, and 9-10, perspective and side views of the embodiment illustrated in FIGS. 9 and 10 are omitted.

FIG. 10 shows a vertical cross-sectional view of the same embodiment illustrated in FIG. 9, wherein the vertical section plane is along section line 10-10 as specified in FIG. 9. The embodiment incorporates a buoyant portion 170, and an open-bottomed 179 water column 171/176.

As the buoy 170 rises and falls in response to waves traveling across the surface 177 of the body of water on which the buoy floats, the water partially enclosed within the water column 171/176 rises and falls 181, and water flows 178 into, and out of, the water column's mouth 179. The water 180 within the water column 171/176 rises and falls 181, at least in part, due to the changes in the pressure of the water adjacent to the bottom mouth 179 of the water column 171/176 that result from changes in the depth of the bottom mouth of the water column. The depth of, and water pressure around, the bottom mouth of the water column change, at least in part, because as waves lift and let fall the buoy, the buoy's vertical movements are imperfectly synchronized with the surfaces of those waves, thereby effectively changing the depth of the water column's mouth 179. The water 180 within the water column 171/176 also rises and falls 181, at least in part, due to the inertia of that water 180 inhibiting that water's ability to accelerate upward and downward in unison or synchrony with the embodiment 170 and structural tube defining and/or establishing its water column 171/176 and partially entraining the water 180 therein.

When the distance between the top 171 of the water column and the top 182 of the water 180 within the water column 176, decreases, the air 183 trapped at the top of the water column is compressed. With respect to this embodiment, and unlike the embodiment illustrated in FIGS. 7 and 8, as the air within air pocket 183 begins to be compressed, and before the pressure of the air within the air pocket 183 has increased enough to open pressure-actuated one-way valve 185 connecting the air pocket 183 with the high-pressure accumulator 184, a high-pressure bypass valve 194 opens to allow at least a portion of the "modestly pressurized" air within air pocket 183 to escape 195 into the atmosphere outside the embodiment through duct 192.

In the illustrated embodiment, when the pressure of the air within the air pocket 183 has risen to, or above, a threshold pressure level, the high-pressure bypass valve 194 closes, and at a similar but preferably greater threshold pressure, the high-pressure accumulator valve 185 opens and allows at least a portion of the highly-pressurized air within the air pocket 183 to flow into the high-pressure accumulator 184 from where it will flow 186 into the atmosphere outside the embodiment, through duct 172 and through turbine 173 therein, at an approximately constant rate of flow and pressure, while also generating rotational kinetic energy within turbine 173 (which in the illustrated embodiment is converted into electrical power through the energizing of a generator, not shown) at an approximately constant rate and/or level.

In a similar embodiment, the high-pressure bypass valve 194 closes at approximately the same pressure at which the high-pressure accumulator valve 185 opens. In another similar embodiment, there is no high-pressure bypass valve 194 and the high-pressure bypass duct 192 is continuously open (e.g., but because of its relatively narrow channel doesn't cause a significant loss of pressure or potential energy within the compressed air inside the air pocket 183). In another similar embodiment, the high-pressure bypass valve 194 only opens when the air within the air pocket 183 reaches or exceeds a pressure that is greater than the pressure at which the high-pressure accumulator valve 185 opens. In this embodiment, the high-pressure bypass valve 194 functions as a "relief valve" reducing the risk that pressure within the water column 171 will rise so high that the water column or some other component of the embodiment will suffer structural or other damage.

High-pressure air within the high-pressure accumulator 184 flows at a relatively steady rate and pressure through a duct 172 and a turbine 173 therein and into 186 the atmosphere. The rotational kinetic energy imparted to the turbine 173 by the air flowing through it is used to energize an electrical generator (not shown) and causing the generator to generate electrical power. Turbine 173 is positioned within a constricted portion of duct 172 where air speed is approximately maximal. In a similar embodiment, the rotational kinetic energy of turbine 194 is used to energize an hydraulic pump or generator and pressurize hydraulic fluid. And, in another similar embodiment, that rotational kinetic energy is used to perform useful work (such as energizing a pump that sprays seawater into the air in order to create aerosols that increase cloud cover and reflect heat from the Sun back into space).

When the distance between the top 171 of the water column and the top 182 of the water 180 within the water column 176 increases, the air 183 trapped at the top of the water column is decompressed, and its pressure is reduced. With respect to this embodiment, and unlike the embodiment illustrated in FIGS. 7 and 8, as the air within air pocket 183 begins to be decompressed, and before the pressure of the air within the air pocket 183 has decreased enough to open pressure-actuated one-way valve 188 connecting the air pocket 183 with the low-pressure accumulator 187, a low-pressure bypass valve 196 opens to allow atmospheric air outside the embodiment to enter 197 the air pocket 183 within the water column 176.

In the illustrated embodiment, when the pressure of the air within the air pocket 183 has fallen below a threshold level, the low-pressure bypass valve 196 closes, and at a similar but preferably lesser threshold pressure, the low-pressure accumulator valve 188 opens and allows at least a portion of the air within the low-pressure accumulator 187 to flow into the air pocket 183 thereby reducing the pressure within the low-pressure accumulator 187 and causing atmospheric air outside the embodiment to continue flowing into the low-pressure accumulator 187 through duct 174, and through turbine 175 positioned therein, at an approximately constant rate of flow and pressure, while also generating rotational kinetic energy within turbine 175 (which in the illustrated embodiment is converted into electrical power through the energizing of a generator, not shown) at an approximately constant level.

In a similar embodiment, the low-pressure bypass valve 196 closes at approximately the same pressure at which the low-pressure accumulator valve 188 opens. In another similar embodiment, there is no low-pressure bypass valve 196 and the low-pressure bypass duct 193 is continuously open (e.g., but because of its relatively narrow channel doesn't cause a significant increase in pressure or reduction in the low-pressure potential energy within the air inside the air pocket 183). In another similar embodiment, the low-pressure bypass valve 196 only opens when the air within the air pocket 183 reaches or falls below a pressure that is lesser than the pressure at which the low-pressure accumulator valve 185 opens. In this embodiment, the low-pressure bypass valve 196 functions as a "relief valve" reducing the risk that pressure will fall to a level so low that the water column or some other component of the embodiment may suffer structural or other damage.

Low-pressure air within the low-pressure accumulator 187 draws atmospheric air into the low-pressure accumulator 187 at a relatively steady rate and pressure through a duct 174 and a turbine 175 therein. The rotational kinetic energy imparted to the turbine 175 by the air flowing through it is communicated to a generator (not shown) causing an electrical generator operatively connected to the turbine 175 to generate electrical power. In a similar embodiment, that rotational kinetic energy of the turbine 175 is used to energize a hydraulic pump or generator and pressurize hydraulic fluid. And, in another similar embodiment, that rotational kinetic energy is used to perform useful work (such as energizing a pump that sprays seawater into the air in order to create aerosols that increase cloud cover and reflect heat from the Sun back into space).

Water 190 entrained within the buoy 170 increases the mass, weight, and inertia of the buoy 170 (i.e., and serves as ballast) thereby affecting the embodiment's draft, and the vertical position of its waterline. A pump and associated pipes (not shown) allow the embodiment's control system (not shown) to increase or decrease the amount, volume, or level, of water 190 stored, captured, and/or entrained within the buoy, thereby raising or lowering, respectively, the embodiment's waterline, and respectively increasing or decreasing the embodiment's draft. This ability of the embodiment's control system to adjust the embodiment's draft allows the control system to optimize the draft, and associated water plane area, of the embodiment with respect to the significant wave height, period, wind speed, wind direction, current speed, current direction, and/or any other relevant environmental and/or operational factor. By reducing the embodiment's draft during storms, the control system can minimize the risk of structural damage to the embodiment that might otherwise result from more energetic wave conditions of those storms.

In the illustrated embodiment, duct 192 contains a one-way "high-pressure bypass" valve 194 that allows a portion of the air inside the air pocket 183 trapped at the top of the water column 171 to flow 195 out of the air pocket when its pressure is greater than the pressure of the air outside the embodiment (i.e., greater than atmospheric pressure), but is less than the pressure required to open the pressure-actuated one-way valve that allows that pressurized air to flow into the embodiment's high-pressure accumulator. The duct 192, and its associated valve 194, do not allow air to flow out at a rate that would prevent the pressure of the air inside the water column 171 from eventually reaching a pressure sufficient to open the pressure-actuated one-way valve 185 connecting the air pocket 183 within the water column 171 to the high-pressure accumulator 184. At approximately the same moment that the valve 185 connecting the air pocket to the high-pressure accumulator opens, the valve allowing high pressure air to escape the air pocket into the atmosphere closes.

Likewise, in the illustrated embodiment, duct 193 contains a one-way "low-pressure bypass" valve 196 that allows air outside the embodiment (i.e., air at atmospheric pressure) to flow 197 into the air pocket 183 trapped at the top of the water column 171 when the pressure of the air within the air pocket 183 is lower than the pressure of the air outside the embodiment, but is greater than the pressure required to open the pressure-actuated one-way valve 188 that allows depressurized air to flow out of the embodiment's low-pressure accumulator 187. The duct 193, and its associated valve 196, do not allow air to flow into the air pocket 183 at a rate that would prevent the pressure of the air inside the water column 171 from eventually falling to a pressure sufficient to open the pressure-actuated one-way valve 188 connecting the air pocket 183 within the water column 171 to the low-pressure accumulator 187. At approximately the same moment that the valve 188 connecting the air pocket 183 to the low-pressure accumulator 187 opens, the valve 196 allowing atmospheric air to flow 197 directly into the air pocket 183 closes.

A listing of the many mechanisms, assemblies, components, and systems, some passive and some active, by which the high-pressure bypass valve 194 can be closed at pressures less than that of the atmosphere outside the embodiment, and closed at pressures above the threshold opening pressure of the one-way valve 185 connecting the air pocket 183 to the high-pressure accumulator 184, is not practical as there at too many. However, all such mechanisms, assemblies, components, and/or systems, are included within the scope of the present invention.

As an example of a suitable high-pressure bypass valve 194, a flap when pushed by a relatively slight pressure differential (i.e., when the pressure of the air 183 inside the water column 171 is only slightly greater than that of the atmosphere outside the device) can be displaced from a first orifice, creating a gap between that first orifice and a second orifice on the opposite side of the flap through which the slightly pressurized air may flow. However, when the flap is pushed by a pressure differential greater than or equal to the threshold pressure at which the valve 185 connecting the water column 171 to the high-pressure accumulator 184 opens, then the flap of the high-pressure bypass valve 194 can be sufficiently displaced that it is pushed up against the second orifice effectively closing it and halting the flow of air through the valve.

Similarly, duct 193 contains a one-way "low-pressure bypass" valve 196 that allows atmospheric air from outside the embodiment to flow into the water column's air pocket 183 when, and only when, the pressure of the air therein is less than the pressure of the air outside the embodiment (i.e., less than atmospheric pressure), but is greater than the pressure required to open the pressure-actuated one-way valve 188 that allows that air to flow into the air pocket 183 from the embodiment's low-pressure accumulator 187. The example high-pressure bypass valve 194 described in the prior paragraph, when utilized in a reversed orientation would constitute a suitable low-pressure bypass valve 196.

There are many variations to the structure and operation of the embodiment described in relation to FIGS. 7-10, all of which are included within the scope of the present disclosure. Embodiments similar to those described in FIGS. 7-10 include and/or utilize active valves (e.g., activated and/or controlled electrically or hydraulically) instead of passive and/or pressure-actuated valves. Such active valves are actively controlled by the embodiment's operating system, providing the potential to adjust and optimize the behavior of the pressure, and power generation, cycles through a dynamic (e.g., algorithmically calculated) pattern of control.

Embodiments similar to those described in FIGS. 7-10 include and/or utilize ducts and/or valves that are capable (e.g., especially when actively controlled by a control system) of allowing sufficient pressurized air to escape, and/or sufficient atmospheric air to enter, the water column 171 so as to limit, reduce, and/or prevent variations in the pressure of the air in the air pocket 183. Embodiments similar to those described in FIGS. 7-10 include and/or utilize bypass valves that are constantly open, but are characterized and/or permit a rate of flow low enough to only reduce the range of pressures developed within the air pocket of the water column by a small, if not trivial, amount.

Figure 11:
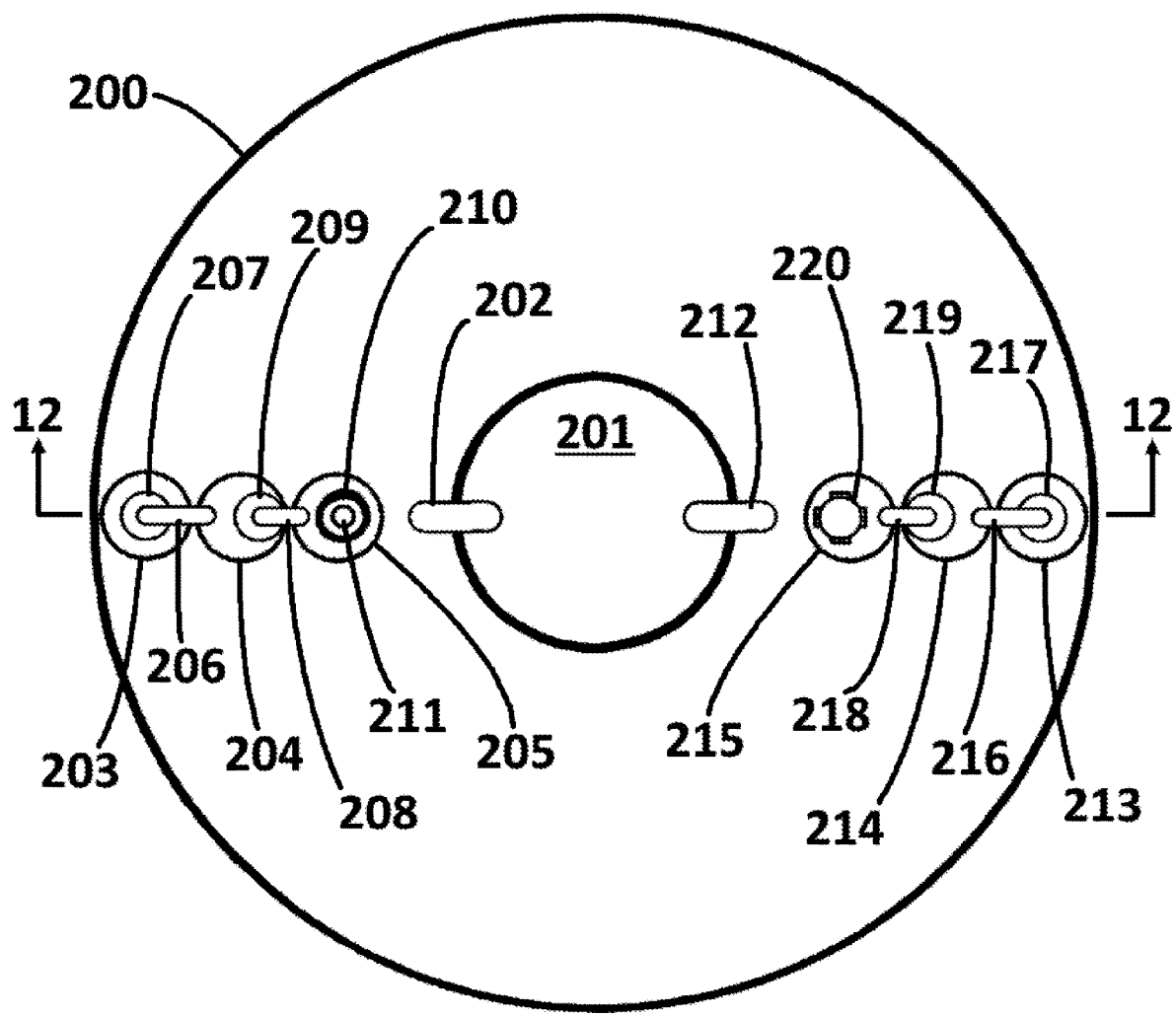
FIG. 11 is a top view of another embodiment of the present invention.

FIG. 11 shows a top-down view of an embodiment of the present invention. A buoy 200 floats adjacent to an upper surface of a body of water (not shown). An open-bottomed water column 201 is incorporated at the center of buoy 200 and the column is approximately coaxial with a vertical longitudinal axis of approximately radial symmetry of the embodiment.

Figure 12:
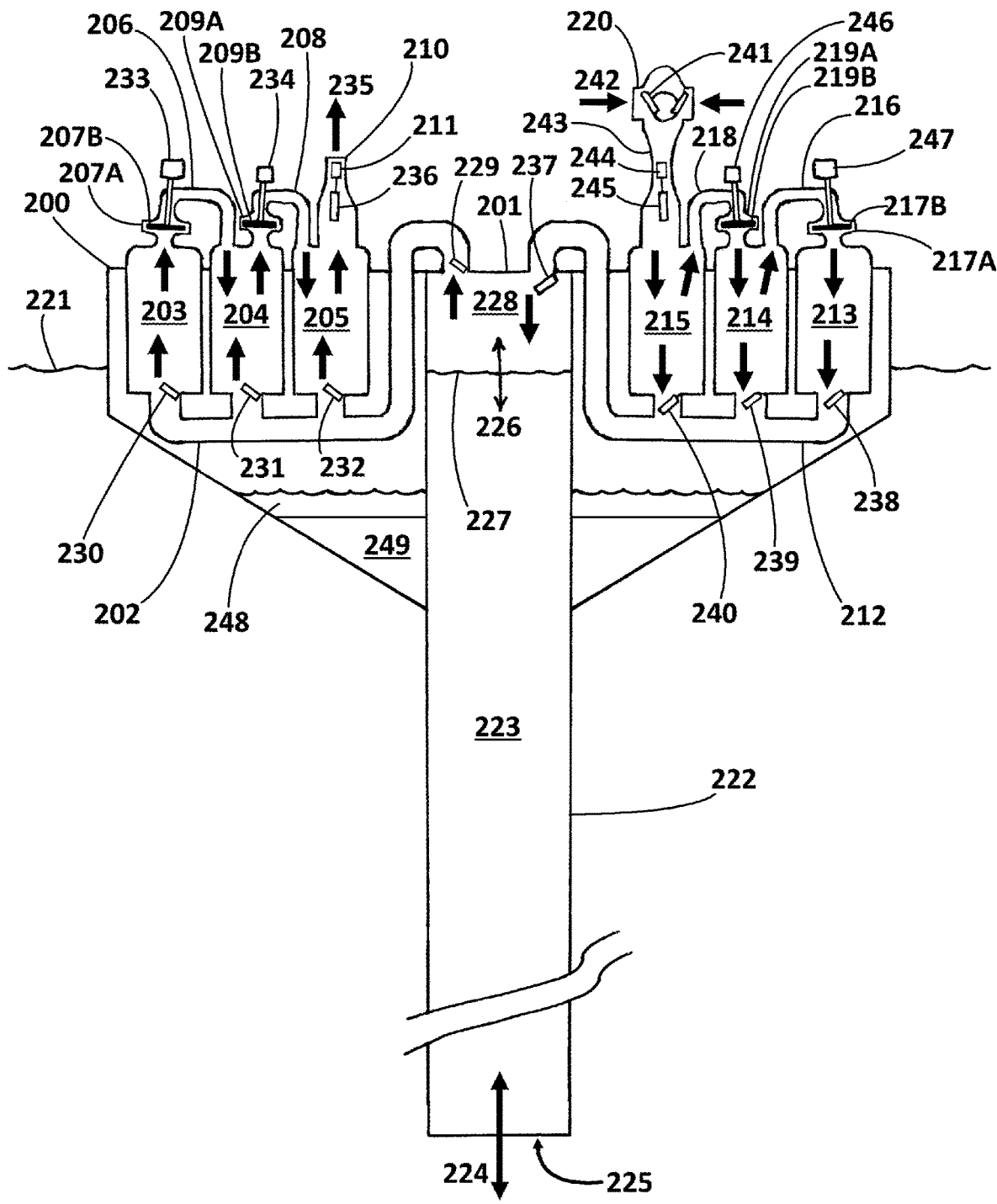
FIG. 12 is a cross sectional view of the embodiment of FIG. 11.

The embodiment illustrated in FIGS. 11 and 12 has a similar gross structure to that of the embodiments illustrated in FIGS. 1 and 4, namely, the embodiment illustrated in FIGS. 11 and 12 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry. While top-down and sectional views are provided of the embodiment illustrated in FIGS. 11 and 12, because of the similarity in the large structural features of the embodiments illustrated in FIGS. 1, 4, and 11-12, perspective and side views of the embodiment illustrated in FIGS. 11 and 12 are omitted.

A high-pressure pipe 202 or conduit connects an air pocket positioned within an upper portion of the water column 201 to three high-pressure accumulators 203-205. A first high-pressure accumulator 203 is connected to a second high-pressure accumulator 204 by a first inter-high-pressure accumulator pipe 206 that contains a first inter-high-pressure turbine (not visible) positioned within turbine enclosure 207. The second high-pressure accumulator 204 is connected to a third high-pressure accumulator 205 by a second inter-high-pressure accumulator pipe 208 that contains a second inter-high-pressure turbine (not visible) positioned within turbine enclosure 209. And the third high-pressure accumulator 205 vents to the atmosphere outside the embodiment by way of a high-pressure duct 210 containing a high-pressure turbine 211 positioned within a constricted portion of the duct 210.

A low-pressure pipe 212 or conduit connects an air pocket positioned within an upper portion of the water column 201 to three low-pressure accumulators 213-215. A first low-pressure accumulator 213 is connected to a second low-pressure accumulator 214 by a first inter-low-pressure accumulator pipe 216 that contains a first inter-low-pressure turbine (not visible) positioned within turbine enclosure 217. The second low-pressure accumulator 214 is connected to a third low-pressure accumulator 215 by a second inter-low-pressure accumulator pipe 218 that contains a second inter-low-pressure turbine (not visible) positioned within turbine enclosure 219. And the third low-pressure accumulator 215 receives air from the atmosphere outside the embodiment by way of a low-pressure duct 220 containing a low-pressure turbine (not visible) positioned within a constricted portion of the duct 220.

FIG. 12 shows a vertical cross-sectional view of the same embodiment illustrated in FIG. 11, wherein the vertical section plane is taken along section line 12-12 as specified in FIG. 11. The embodiment incorporates a buoyant portion 200 including, but not limited to: a buoy, flotation module, boat, barge, or buoyant platform, that tends to float adjacent to an upper surface 221 of a body of water, and an open-bottomed water column 201/222 portion, including, but not limited to: a tube, pipe, channel, or chamber.

The illustration in FIG. 12 includes arrows indicating the direction in which air typically flows through the embodiment. For example, a downward-pointing arrow adjacent to valve 237 indicates air flowing into air pocket 228 from pipe 212; and, an upward-pointing arrow adjacent to valve 229 indicates air flowing from air pocket 228 into pipe 202.

As the buoy 200 rises and falls in response to waves traveling across the surface 221 of the body of water on which the buoy floats, the water 223 partially enclosed within the water column 201/222 rises and falls, causing water to flow 224 into, and out of, the water column's mouth 225. The water 223 within the water column 201/222 rises and falls 226, at least in part, due to the changes in the pressure of the water adjacent to the bottom mouth 225 of the water column that result from changes in the depth of the bottom mouth of the water column. The depth of, and water pressure around, the bottom mouth of the water column change, at least in part, because as waves lift and let fall the buoy, the buoy's vertical movements are imperfectly synchronized with the surfaces of those waves, thereby effectively changing the depth of the water column's mouth 225. The water 223 within the water column 201/222 also rises and falls 226, at least in part, due to the inertia of that water 223 inhibiting that water's ability to accelerate up and down in unison or synchrony with the embodiment 200 and its tubular water column 201/222.

When the distance between the top 201 of the water column and the top 227 of the water 223 within the water column 222, decreases, the air 228 trapped at the top of the water column 201 is compressed. When the pressure of that air exceeds the pressure of the air in high-pressure pipe 202 and reaches or exceeds the threshold opening pressure of the one-way high-pressure-pipe valve 229, pressurized air from air pocket 228 flows into the high-pressure pipe 202.

When the pressure of the air within the high-pressure pipe 202 exceeds the pressure within a first 203, second 204, and/or third 205, high-pressure accumulator, the respective one-way high-pressure-accumulator valves 230-232 open and pressurized air flows from the high-pressure pipe 202 into those respective first, second, and/or third, high-pressure accumulators.

When the pressure of the air within the first high-pressure accumulator 203 exceeds the pressure of the air within the second high-pressure accumulator 204, air flows through a first inter-high-pressure accumulator pipe 206 from the first 203 to the second 204 high-pressure accumulator. The air flowing through that first inter-high-pressure accumulator pipe 206 flows through, and energizes and causes to rotate, a first inter-high-pressure turbine 207B, positioned within a first inter-high-pressure turbine enclosure 207A, which is operatively connected by a shaft to a first inter-high-pressure generator 233, thereby generating electrical power.

When the pressure of the air within the second high-pressure accumulator 204 exceeds the pressure of the air within the third high-pressure accumulator 205, air flows through a second inter-high-pressure accumulator pipe 208 from the second 204 to the third 205 high-pressure accumulator. The air flowing through that second inter-high-pressure accumulator pipe 208 flows through, and energizes and causes to rotate, a second inter-high-pressure turbine 209B, positioned within a second inter-high-pressure turbine enclosure 209A, which is operatively connected by a shaft to a second inter-high-pressure generator 234, thereby generating electrical power.

When the pressure of the air within the third high-pressure accumulator 205 exceeds the pressure of the air outside the embodiment (e.g., exceeds atmospheric pressure), air flows 235 through a high-pressure duct 210 from the third 205 high-pressure accumulator and into the atmosphere. The air flowing through the high-pressure duct 210 flows through a constricted portion of the duct, and energizes and causes to rotate, a turbine 211, positioned within a constricted portion of the duct 210, which is operatively connected by a shaft to a generator 236, thereby generating electrical power.

After the air pocket 228 has been maximally compressed (i.e., reached a maximal pressure during the wave-driven cycle of pressure variations within the air pocket 228, the pressures of the air within each of the three high-pressure accumulators 203-205 will tend to be approximately equal. As the third high-pressure accumulator 205 vents pressurized air to the atmosphere through duct 210 and turbine 211, the pressure of the air therein will fall. As the pressure of the air within the third high-pressure accumulator 205 falls below the pressure of the air within the second high-pressure accumulator 204, air will flow through pipe 208 and turbine 209B, causing its pressure to fall. And, as the pressure of the air within the second high-pressure accumulator 204 falls below the pressure of the air within the first high-pressure accumulator 203, air will flow through pipe 206 and turbine 207B, causing its pressure to fall.

When next the air within the air pocket 228 begins to be compressed, the relatively modestly pressurized air first will be able to flow through pipe 202 into high-pressure accumulator 205 since the pressure of the air therein will tend be lower than the pressures of the air in the other two high-pressure accumulators 203 and 204. As the air within the air pocket 228 becomes progressively more compressed, and more highly pressurized, air will begin flowing into high-pressure accumulator 204 while continuing to flow into high-pressure accumulator 205. And, eventually, as the air within the air pocket 228 becomes even more compressed, and even more pressurized, air will begin flowing into high-pressure accumulator 203 while continuing to flow into high-pressure accumulators 204 and 205.

By providing receiving accumulators for air pressurized to different degrees. levels, and/or magnitudes, a combination of useful behaviors may be achieved. The air in one accumulator 205 oscillates between a relatively large range of pressures. This provides the potential benefit that at the low end of its relatively greater range of pressures, it is able to begin receiving pressurized air at relatively lower pressures, potentially capturing pressure potential energy that might otherwise be lost. However, this also provides the potential drawback that this accumulator's turbine is driven by flow rates and pressures that vary relatively greatly during the embodiment's operation, and because of this it is possible that this accumulator's turbine will capture energy with less efficiency.

On the other hand, and at the other extreme, the air in another accumulator 203 oscillates between a relatively narrow range of pressures (i.e., tending to have and maintain a consistently higher pressure than the pressures of the other accumulators). This provides the potential benefit that air will flow through its respective turbine 207B at a relatively constant rate and pressure permitting it to capture energy at a higher efficiency.

When the distance between the top 201 of the water column and the top 227 of the water 223 within the water column 222, increases, the air 228 trapped at the top of the water column 201 is decompressed, and its pressure is reduced. When the pressure of that air falls below the pressure of the air in low-pressure pipe 212 and reaches or falls below the threshold opening pressure of the one-way low-pressure-pipe valve 237, relatively higher-pressure air from the pipe 212 flows into air pocket 228.

When the pressure of the air within the low-pressure pipe 212 falls below the pressure within a first 213, second 214, and/or third 215, low-pressure accumulator, the respective one-way low-pressure-accumulator valves 238-240 open and relatively pressurized air flows out from those respective first, second, and/or third, low-pressure accumulators and into the pipe 212.

When the pressure of the air within the third low-pressure accumulator 215 falls below the pressure of the air outside the embodiment (e.g., falls below atmospheric pressure), one-way valves, e.g., 241, within a low-pressure duct 220, open to connect the third low-pressure accumulator 215 to the atmosphere, and air flows 242 from the atmosphere through the open one-way valves, e.g., 241, through a constricted portion 243 of the low-pressure duct 220, and through a turbine 244 therein, which is operatively connected by a shaft to a generator 245. The air flowing from the atmosphere into the third low-pressure accumulator 215, imparts rotational kinetic energy to the turbine 244 within duct 243, thereby causing electrical power to be generated by generator 245.

When the pressure of the air within the third low-pressure accumulator 215 rises above the pressure of the air within the second low-pressure accumulator 214, air flows through a second inter-low-pressure-accumulator pipe 218 from the third 215 to the second 214 low-pressure accumulator. The air flowing through that pipe flows through, and energizes and causes to rotate, a second inter-low-pressure turbine 219B, which is operatively connected by a shaft to a second inter-low-pressure generator 246, thereby generating electrical power.

When the pressure of the air within the second low-pressure accumulator 214 rises above the pressure of the air within the first low-pressure accumulator 213, air flows through a first inter-low-pressure-accumulator pipe 216 from the second 214 to the first 213 low-pressure accumulator. The air flowing through that pipe flows through, and energizes, a first inter-low-pressure turbine 217B, which is operatively connected by a shaft to a first inter-low-pressure generator 247, thereby generating electrical power.

After the pressure of the air within air pocket 228 has been reduced to a maximal extent, the pressures of the air within each of the three low-pressure accumulators 213-215 will tend to be approximately equal. As the third low-pressure accumulator 215 receives relatively highly pressurized air (e.g., receives air at atmospheric pressure) from the atmosphere through duct 220/243 and turbine 244, the pressure of the air therein will rise. As the pressure of the air within the third low-pressure accumulator 215 rises (and approaches atmospheric pressure) and becomes greater than the pressure of the air within the second low-pressure accumulator 214, air will flow through pipe 218 and turbine 219B, causing the air pressure within the second low-pressure accumulator 214 to rise as well. And, as the pressure of the air within the second low-pressure accumulator 214 rises above the pressure of the air within the first low-pressure accumulator 213, air will flow through pipe 216 and turbine 217B, causing its pressure to rise.

When next the air within the air pocket 228 begins to be reduced, the air in low-pressure accumulator 215 should have a pressure greater than the air in the other two low-pressure accumulators 213 and 214. And, the air in low-pressure accumulator 213 should have the lowest pressure of all. This range of pressures between or among the low-pressure accumulators means that air will flow from them, through low-pressure pipe 212, and into the depressurized and/or depressurizing air pocket 228 at different times and/or at differing rates.

The relatively higher pressure air in low-pressure accumulator 215 will tend to be the first to flow into the air pocket 228 when its pressure is dropping. The air in low-pressure accumulator 214 will tend to be the next to flow into the air pocket 228, as air continues to flow from low-pressure accumulator 215. And, finally, when the air in air pocket 228 has fallen to or below that in low-pressure accumulator 213, air will flow from all three low-pressure accumulators into the air pocket 228.

By providing low-pressure accumulators for air depressurized to different degrees, a combination of useful behaviors may be achieved. The air in one accumulator 215 oscillates between a relatively large range of pressures. This provides the potential benefit that at the high end of its relatively greater range of pressures, it is able to begin providing air to the air pocket 228 at relatively higher pressures, potentially facilitating the ability of the water 223 within water column 222 to oscillate to a maximal extent and/or over a maximal range of heights 227 within the water column. However, this also provides the potential drawback that this accumulator's turbine will be driven by flow rates and pressures that vary relatively greatly during the embodiment's operation, and because of this it is possible that this accumulator's turbine 244 will capture energy with relatively low efficiency.

On the other hand, and at the other extreme, the air in another low-pressure accumulator 213 oscillates between a relatively narrow range of pressures (i.e., tending to have and maintain a consistently lower pressure than the other accumulators). This provides the potential benefit that air will flow through its respective turbine 217B at a relatively constant rate and pressure permitting it to capture energy more and/or most efficiently.

Each turbine in this embodiment is operatively connected to a respective generator that tends to generate electrical power in response to air flowing through its respective turbine. However, in similar embodiments, the turbines are connected to hydraulic pumps and/or generators and generate pressurized hydraulic fluid in response to air flowing through the turbines. In other embodiments, the turbines, and their respective generators, generate pressurized air (e.g., more highly pressurized than that produced by the air pocket). And, in other embodiment, the rotational kinetic energy of the turbines is used for other useful purposes and/or work.

The embodiment illustrated in FIGS. 11 and 12 incorporates three high-pressure accumulators 203-205 three high-pressure turbines 207B, 209B, and 211, and three turbine-driven generators 233, 234, and 236. Other embodiments have different numbers of high-pressure accumulators, including, but not limited to: one, two, four, five, six, and seven. Some do not have even a single high-pressure accumulator. Other embodiments have different numbers of high-pressure turbines, including, but not limited to: one, two, four, five, six, and seven. Some do not have even a single high-pressure turbine. And, other embodiments energize different numbers of generators with one, some and/or all of their high-pressure turbines. All variations of the illustrated embodiment are included within the scope of the present disclosure.

The embodiment illustrated in FIGS. 11 and 12 incorporates three low-pressure accumulators 213-215 three low-pressure turbines 217B, 219B, and 244, and three turbine-driven generators 245-247. Other embodiments have different numbers of low-pressure accumulators, including, but not limited to: one, two, four, five, six, and seven. Some do not have even a single low-pressure accumulator. Other embodiments have different numbers of low-pressure turbines, including, but not limited to: one, two, four, five, six, and seven. Some do not have even a single low-pressure turbine. And, other embodiments energize different numbers of generators with one, some or all of their low-pressure turbines. All variations of the illustrated embodiment are included within the scope of the present disclosure.

Water 248 and a solid, porous and/or aggregate material (e.g., which might include, but is not limited to: gravel, rocks, pieces of iron, etc.) having a dry density greater than water, and saturated with water (e.g., sharing the water 248), are entrained within the buoy 200 and increase its mass, weight, and inertia, serving as ballast. A pump and associated pipes (not shown) allow the embodiment's control system (not shown) to increase or decrease the amount, volume, or level, of water 248 stored within the buoy, thereby raising or lowering, respectively, the embodiment's waterline, and increasing or decreasing the embodiment's draft. This ability of the embodiment's control system to adjust the embodiment's draft allows the control system to optimize the draft, and associated water plane area, of the embodiment with respect to the significant wave height, period, wind speed, wind direction, current speed, current direction, and/or any other relevant environmental and/or operational factor. By reducing the embodiment's draft during storms, the control system can minimize the risk of structural damage to the embodiment that might otherwise result from more energetic wave conditions of those storms.

The use of a solid, porous and/or aggregate material 249 helps to stabilize the water 248 and reduce the "sloshing" of the water from one side of the buoy's interior to the other as the embodiment tilts (i.e., as its longitudinal and/or radial axis of symmetry deviates from a normal orientation with respect to a surface of the mean and/or resting water level 221).

Figure 13:
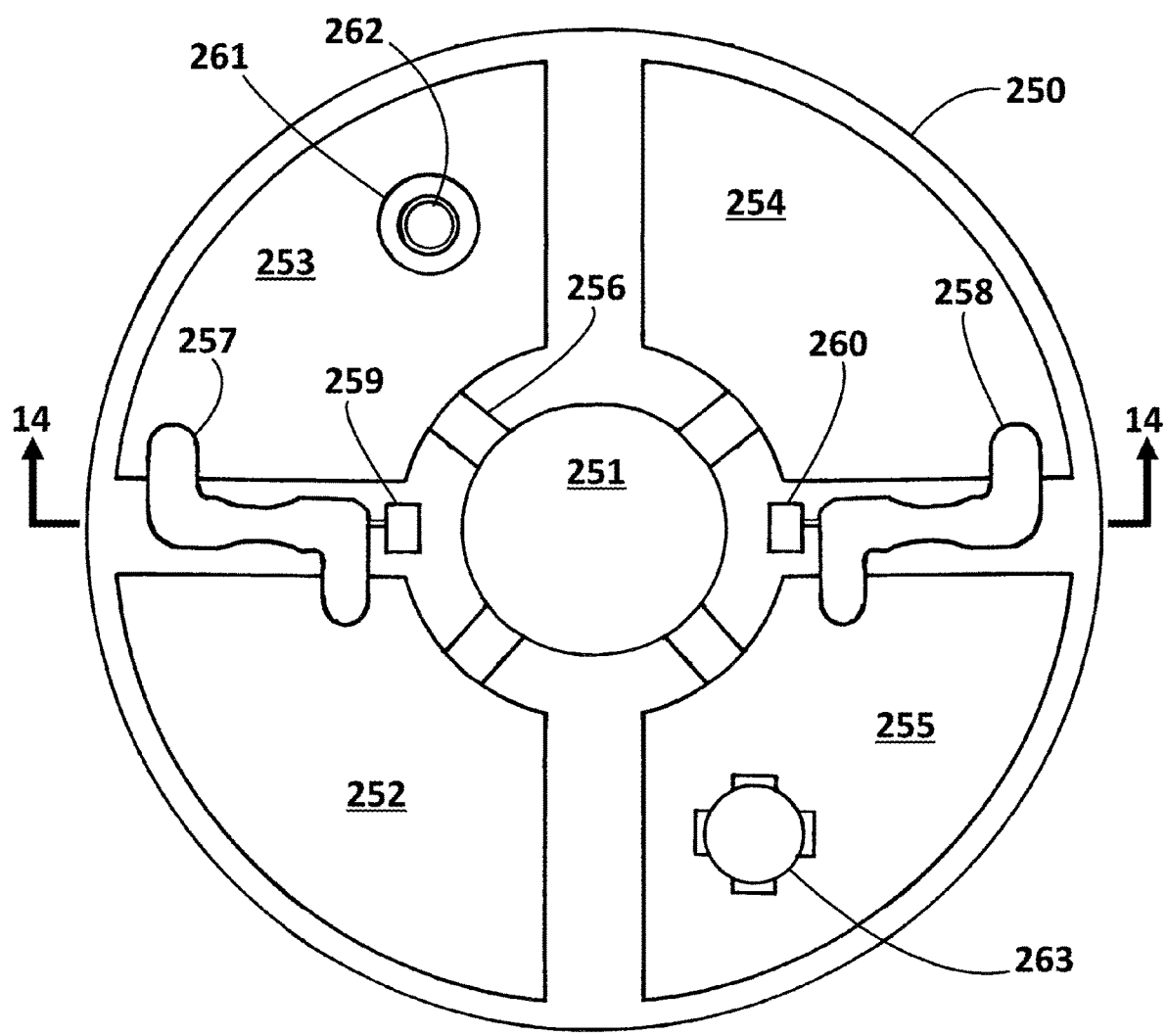
FIG. 13 is a top view of another embodiment of the present invention.

FIG. 13 shows a top-down view of an embodiment of the present invention. A buoy 250 floats adjacent to an upper surface of a body of water (not shown). An open-bottomed water column 251 is incorporated at the center of buoy 250, and/or positioned such that it is approximately coaxial with a vertical longitudinal axis of radial symmetry of the embodiment.

Figure 14:
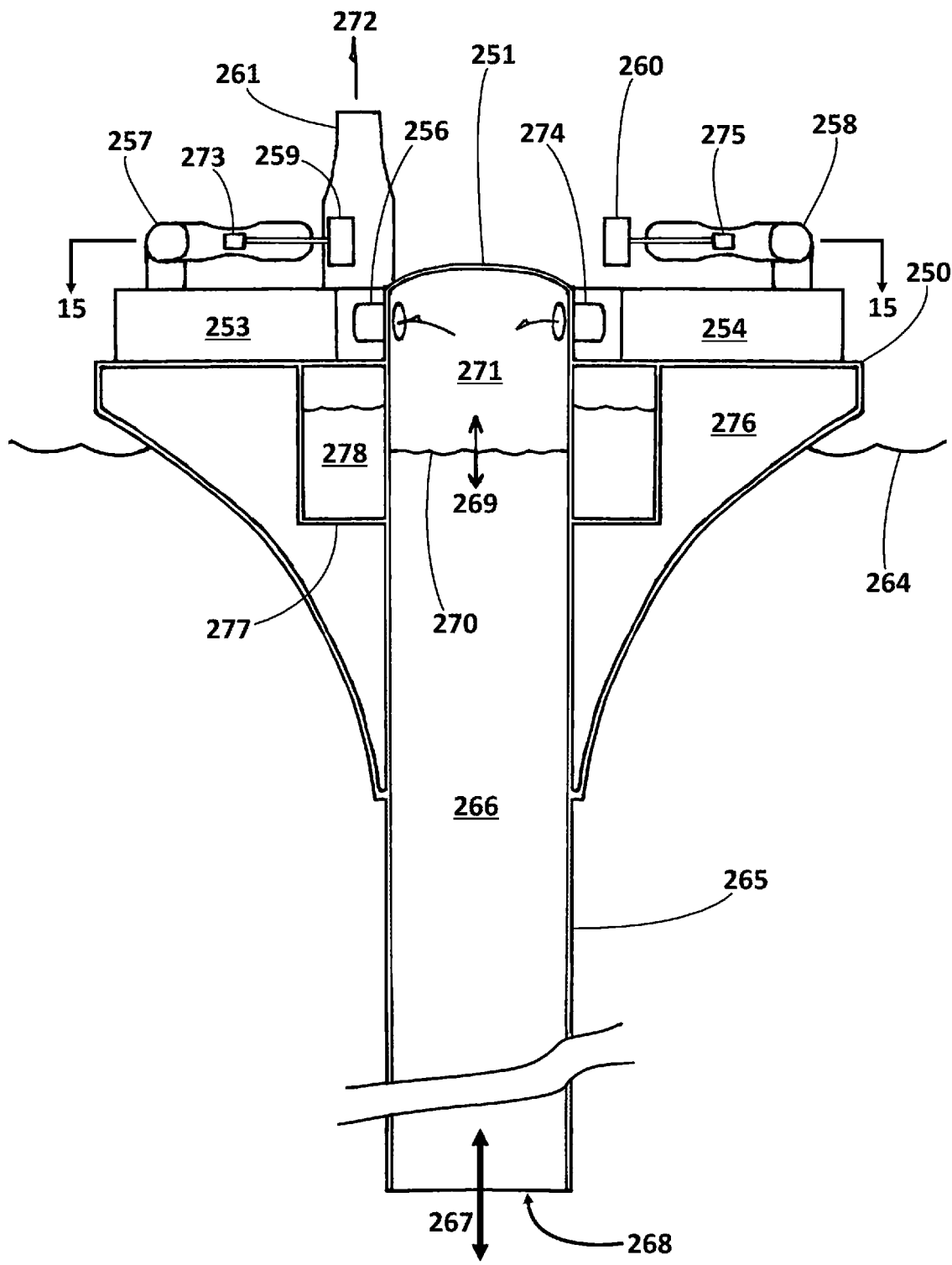
FIG. 14 is a cross sectional view of the embodiment of FIG. 13.
Figure 15:
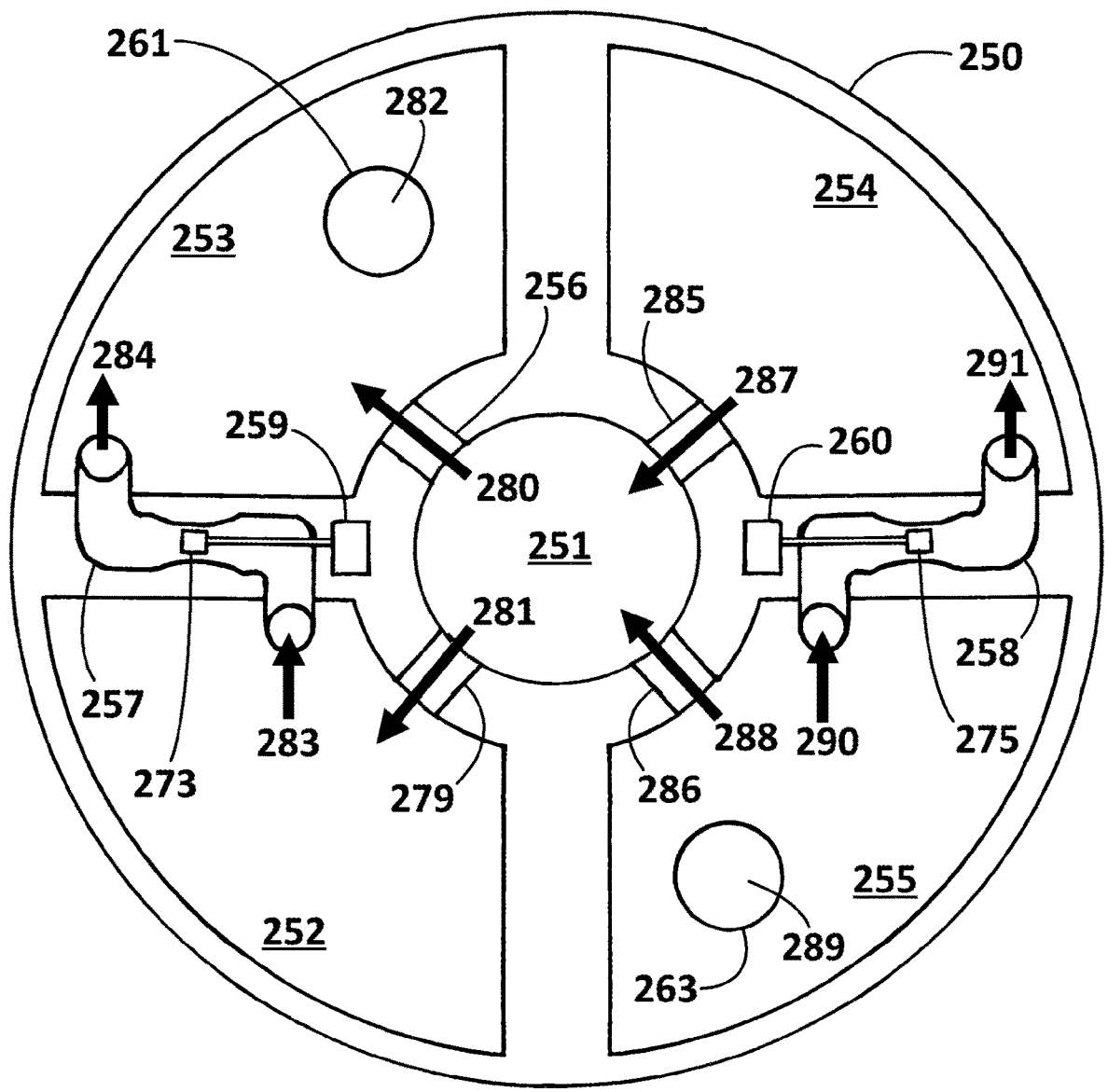
FIG. 15 is a top view of another embodiment of the present invention.

The embodiment illustrated in FIGS. 13-15 has a similar gross structure to that of the embodiments illustrated in FIGS. 1 and 4, namely, the embodiment illustrated in FIGS. 13-15 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry. While top-down and sectional views are provided of the embodiment illustrated in FIGS. 13-15, because of the similarity in the large structural features of the embodiments illustrated in FIGS. 1, 4, and 13-15, perspective and side views of the embodiment illustrated in FIGS. 13-15 are omitted.

Two high-pressure accumulators 252-253, and two low-pressure accumulators 254-255, are attached to an upper surface of the buoy 250. Each accumulator is connected to the central water column 251 by a pipe, e.g. 256. The pair of high-pressure accumulators 252 and 253 are connected to each other by a high-pressure-accumulator pipe 257. And, the pair of low-pressure accumulators 254 and 255 are connected to each other by a low-pressure-accumulator pipe 258.

Positioned inside a constricted portion of the high-pressure-accumulator pipe 257 is a turbine (not visible) that is operatively connected to a generator 259. And, positioned inside a constricted portion of the low-pressure-accumulator pipe 258 is a turbine (not visible) that is operatively connected to a generator 260.

Pressurized air flows from one 253 of the high-pressure accumulators to the atmosphere through a duct 261 and through a turbine 262 therein. And, air flows from the atmosphere into one 255 of the low-pressure accumulators through a duct 263 and through a turbine (not visible) therein.

FIG. 14 shows a vertical cross-sectional view of the same embodiment illustrated in FIG. 13, wherein the vertical section plane is taken along section line 14-14 as specified in FIG. 13. The embodiment incorporates a buoyant portion 250 including, but not limited to: a buoy, flotation module, boat, barge, or buoyant platform, that tends to float adjacent to an upper surface 264 of a body of water, and an open-bottomed water column 251/265 portion, including, but not limited to: a tube, pipe, channel, or chamber.

As the buoy 250 rises and falls in response to waves traveling across the surface 264 of the body of water on which the buoy floats, the water 266 partially enclosed within the water column 251/265 rises and falls, and, as it does so, water flows 267 into, and out of, the water column's mouth 268. The water 266 within the water column 251/265 rises and falls 269, at least in part, due to the changes in the pressure of the water adjacent to the bottom mouth 268 of the water column that result from changes in the depth of the bottom mouth of the water column. The depth of, and water pressure around, the bottom mouth of the water column change, at least in part, because as waves lift and let fall the buoy, the buoy's vertical movements are imperfectly synchronized with the surfaces of those waves, thereby effectively changing the depth of the water column's mouth 268. The water 266 within the water column 251/265 also rises and falls 269, at least in part, due to the inertia of that water 266 inhibiting that water's ability to accelerate up and down in unison or synchrony with the embodiment 250 and its water column 251/265.

When the distance between the top 251 of the water column 265 and the upper surface 270 of the water 266 within the water column 265 decreases, the air 271 trapped at the top of the water column 251 is compressed. When the pressure of that compressed air exceeds the pressure of the air in either of the high-pressure accumulators 253 and 252 (in FIG. 13), and reaches or exceeds the threshold opening pressure of each high-pressure accumulator's respective one-way high-pressure-accumulator valve (e.g., inside pipe 256), then pressurized air from air pocket 271 flows through each high-pressure-accumulator's pipe, e.g., 256, and into each respective high-pressure accumulator. At the moment of maximal compression of the air pocket 271, the pressure of the air in each of the two high-pressure accumulators 253 and 252 (in FIG. 13) tends to be approximately equal.

Pressurized air within one 253 of the embodiment's two high-pressure accumulators flows out 272 through a high-pressure duct 261, energizing a turbine (not visible) therein, and its operatively connected generator (not visible). As pressurized air flows out 272 of the high-pressure accumulator 253, the pressure of the air within that accumulator is reduced. As the pressure of the air within high-pressure accumulator 253 falls, air from the other high-pressure accumulator (252 in FIG. 13) flows through pipe 257 into high-pressure accumulator 253. As air flows from accumulator 252 to 253, it imparts rotational kinetic energy to, and causes to rotate, turbine 273, positioned within a constricted portion of pipe 257, which in turn energizes operatively connected generator 259, resulting in the production of electrical power.

When the distance between the top 251 of the water column and the upper surface 270 of the water 266 within the water column 265, increases, the air 271 trapped at the top of the water column 251 is decompressed, and its pressure is reduced. When the pressure of that decompressed air falls below the pressure of the air in either of the low-pressure accumulators 254 and 255 (in FIG. 13), and reaches or falls below the threshold opening pressure of each low-pressure accumulator's respective one-way low-pressure-accumulator valves (e.g., inside pipe 274), then air from the respective low-pressure-accumulators flows through each low-pressure-accumulator's pipe, e.g., 274, and into the air pocket 271. At the moment of minimal pressurization of the air pocket 271, the pressure of the air in each of the two low-pressure accumulators 254 and 255 (in FIG. 13) tends to be approximately equal.

Low-pressure air within one (255 in FIG. 13) of the two low-pressure accumulators draws in a flow of atmospheric air from outside the embodiment through a low-pressure duct (263 in FIG. 13, and similar to the low-pressure duct 220 of the embodiment illustrated in FIGS. 11 and 12), energizing, and causing to rotate, a turbine (not visible) therein, and its operatively connected generator (not visible). As more highly-pressurized air flows into the low-pressure accumulator (255 in FIG. 13) from outside the embodiment, the pressure of the air within that accumulator is increased. As the pressure of the air within that low-pressure accumulator (255 in FIG. 13) increases, that more highly-pressurized air flows from that low-pressure accumulator (255 in FIG. 13) into the other low-pressure accumulator 254 through pipe 258. As air flows from accumulator 255 to 254, it imparts rotational kinetic energy to, and causes to rotate, turbine 275, positioned within a constricted portion of pipe 258, which in turn energizes operatively connected generator 260, resulting in the production of electrical power.

Much of the interior of buoy 250 is filled with a material 276 possessing a density lower than that of water. However, a chamber 277, having the shape of an annular ring positioned about the embodiment's water column 265, contains water 278, the volume and/or mass of which may be varied through the activation of a bi-directional pump (not shown), and a subsequent drawing in of additional water from the body of water 264 on which the embodiment floats into ballast chamber 277, or a subsequent discharge from water ballast chamber 277 to the body of water 264 on which the embodiment floats. By adjusting the amount and/or mass of the water ballast within the embodiment, the embodiment's waterline and/or its draft may be adjusted.

FIG. 15 shows a horizontal cross-sectional view of the same embodiment illustrated in FIGS. 13 and 14, wherein the horizontal section is taken along section line 15-15 as specified in FIG. 14. The embodiment incorporates a buoyant portion 250 that tends to float adjacent to an upper surface of a body of water, and an open-bottomed water column 251.

When the relative motions of the embodiment 250 and the water enclosed within the water column 251 cause a pocket of air located within an upper portion of the water column 251 to be compressed, then, when the pressure of that air is great enough, the pressurized air forces open two one-way valves (not shown), one each in a pair of pipes 256 and 279, each of the pipes of which connects to a respective high-pressure accumulator 253 and 252, and the pressurized air flows 280 and 281 from the air pocket within water column 251 into the respective high-pressure accumulators 253 and 252. Arrows 280 and 281 show the flow of pressurized air from water column 251 into high-pressure accumulators 252 and 253, through pipes 256 and 279 and past the respective one-way valves (not shown) therein.

High-pressure air within high-pressure accumulator 253 flows up and out of high-pressure accumulator 253 through the channel 282 within high-pressure duct 261 and the turbine (not shown) therein, causing a generator (not shown) operatively connected to that turbine to generate electrical power.

As the pressure of the air within high-pressure accumulator 253 falls, high-pressure air from high-pressure accumulator 252 flows 283/284 through pipe 257, and through turbine 273, positioned within a constricted portion of pipe 257, therein, into the relatively lower-pressure accumulator 253, causing generator 259 operatively connected to turbine 273 to generate electrical power.

When the relative motions of the embodiment 250 and the water enclosed within the water column 251 cause a pocket of air located with an upper portion of the water column 251 to be expanded and decompressed, thereby reducing its pressure, then, when the pressure of that air is low enough, that partial vacuum draws open two one-way valves, one each in a pair of pipes 285 and 286, each pipe of which connects to a respective low-pressure accumulator 254 and 255, and air flows 287 and 288 from the respective low-pressure accumulators 254 and 255 into the air pocket within water column 251. Arrows 287 and 288 show the flow of air from low-pressure accumulators 254 and 255 into water column 251, through pipes 285 and 286, and past the one-way valves (not shown) therein.

Low-pressure air within low-pressure accumulator 255 draws air down (from the atmosphere above the embodiment) and into low-pressure accumulator 255 through the channel 289 within low-pressure duct 263 and the turbine (not shown) therein, causing a generator (not shown) operatively connected to that turbine to generate electrical power.

As the air pressure within low-pressure accumulator 255 increases (due to the influx of air from outside the embodiment), the relatively lower pressure air in low-pressure accumulator 254 draws 290/291 the relatively higher pressure air in low-pressure accumulator 255 through pipe 258, and through turbine 275, positioned within a constricted portion of pipe 258, therein, into the lower-pressure accumulator 254, causing generator 260 operatively connected to turbine 275 to generate electrical power.

Figure 16:
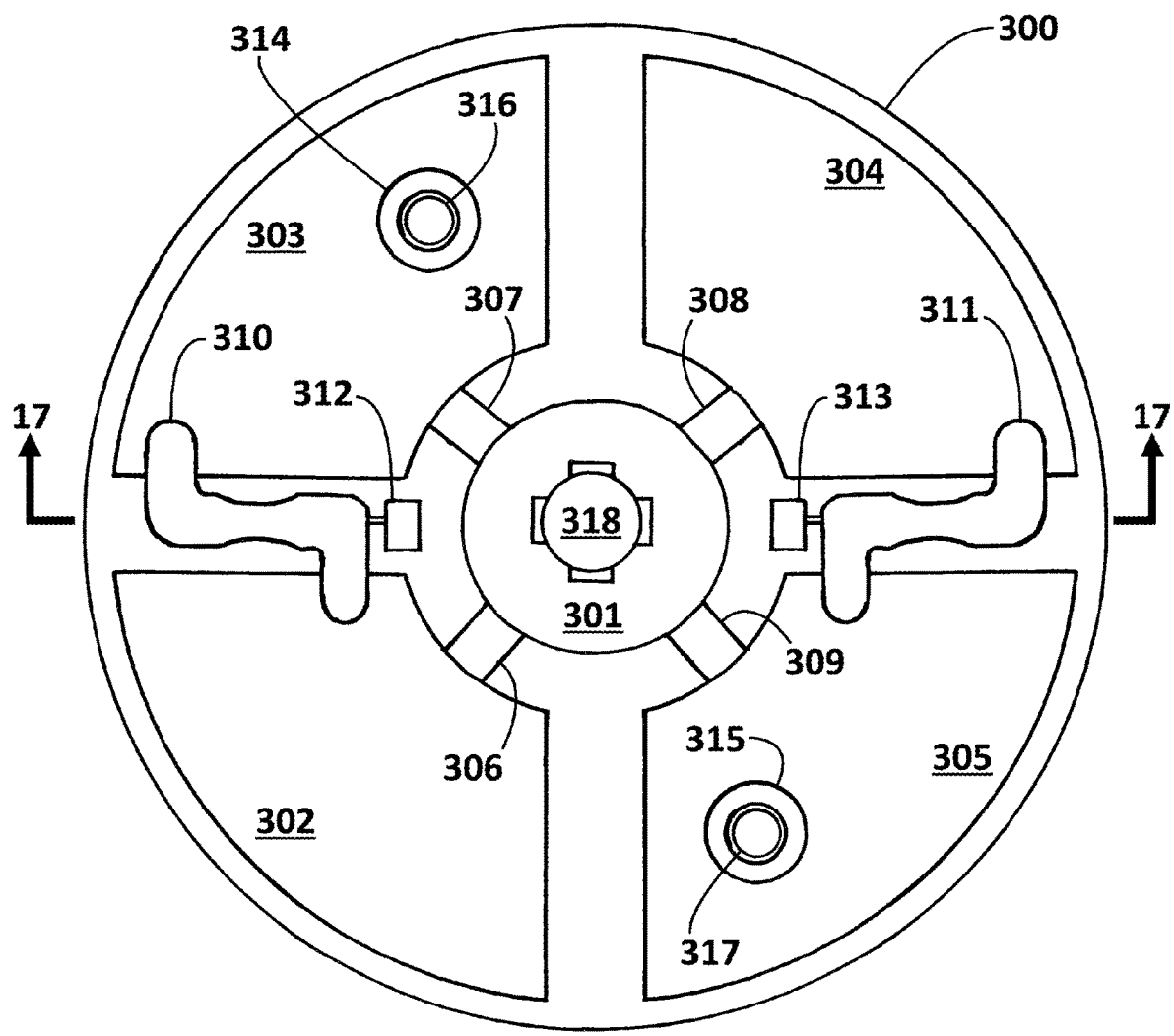
FIG. 16 is a top view of another embodiment of the present invention.

FIG. 16 shows a top-down view of an embodiment of the present invention. A buoy 300 floats adjacent to an upper surface of a body of water (not shown). An open-bottomed water column 301 is incorporated at the center of buoy 300, and/or is approximately coaxial with a vertical longitudinal axis of radial symmetry of the embodiment.

Figure 17:
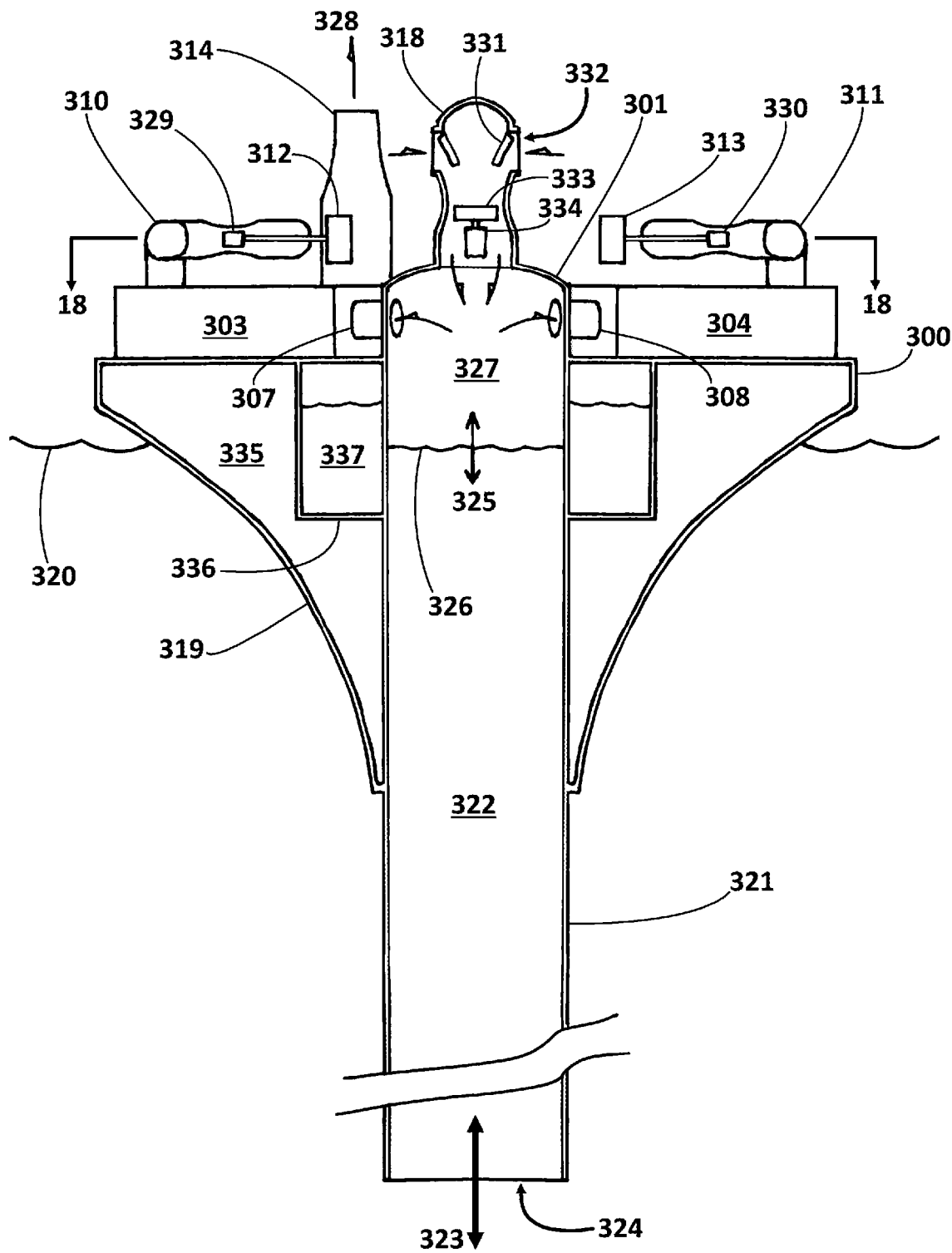
FIG. 17 is a cross sectional view of the embodiment of FIG. 16.
Figure 18:
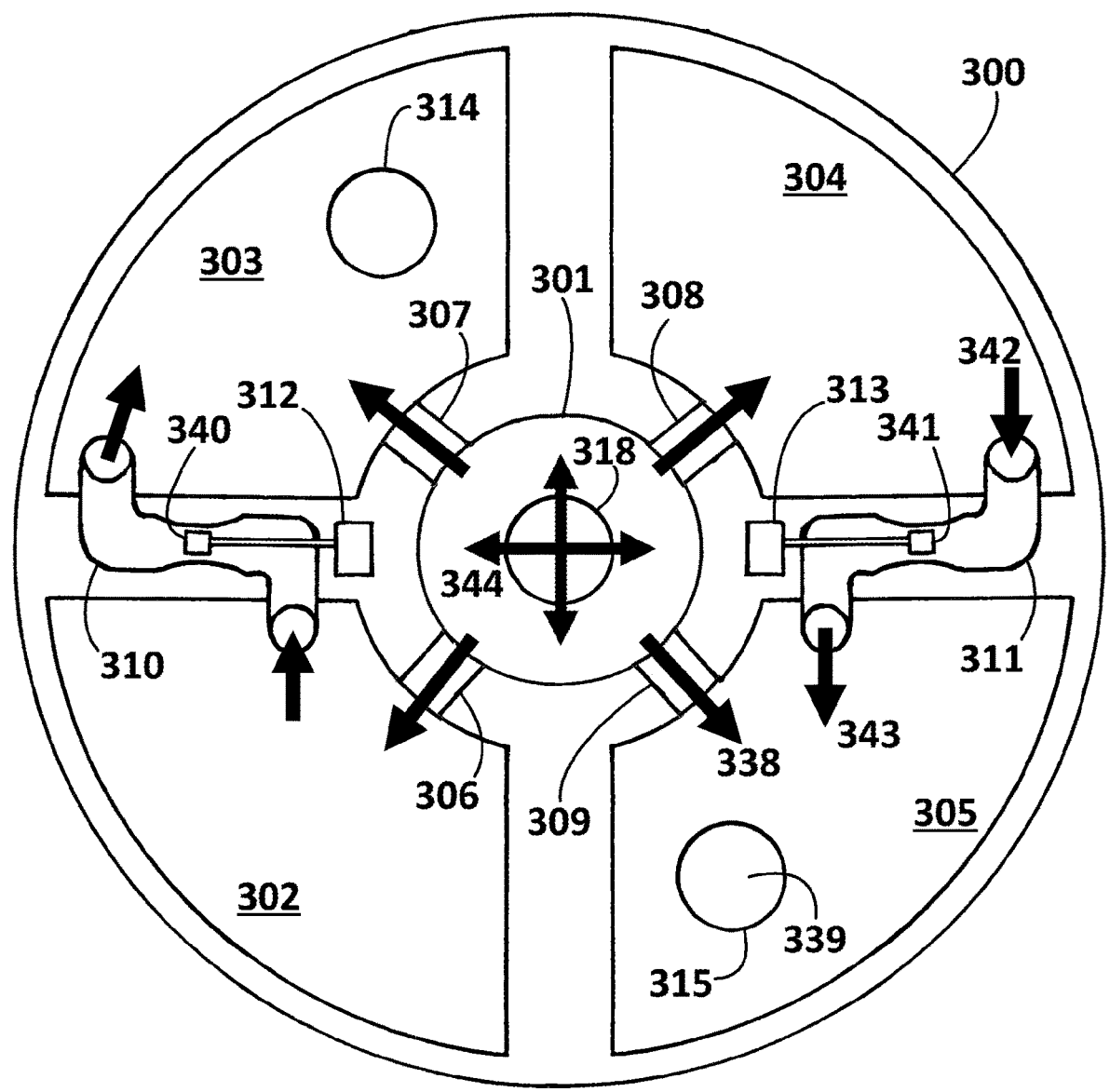
FIG. 18 is a top view of another embodiment of the present invention.

The embodiment illustrated in FIGS. 16-18 has a similar gross structure to that of the embodiments illustrated in FIGS. 1 and 4, namely, the embodiment illustrated in FIGS. 16-18 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry. While top-down and sectional views are provided of the embodiment illustrated in FIGS. 16-18, because of the similarity in the large structural features of the embodiments illustrated in FIGS. 1, 4, and 16-18, perspective and side views of the embodiment illustrated in FIGS. 16-18 are omitted.

Two pairs of high-pressure accumulators 302-303 and 304-305 are attached to an upper surface of the buoy 300. Each high-pressure accumulator is connected to a pocket of air positioned in an upper portion of the central water column 301 by a respective pipe 306-309. Each pair of high-pressure accumulators is inter-connected by a respective inter-accumulator pipe 310 and 311.

Positioned inside a constricted portion of each inter-accumulator pipe 310-311 is a turbine (not visible) that is operatively connected to a respective generator 312-313.

Pressurized air flows from one 303 and 305 of each pair of high-pressure accumulators to the atmosphere through a respective high-pressure duct 314 and 315. And, positioned within a constricted portion of each high-pressure duct 314-315 is a respective turbine 316-317 that is operatively connected to a respective generator (not shown) such that air flowing through each respective high-pressure duct causes to turn each respective turbine and causes the respective operatively connected generator to generate electrical power.

Air flows from the atmosphere into the air pocket located within an upper portion of the water column 301, when the pressure of the air within the air pocket is less than the ambient atmospheric pressure outside the embodiment, through a low-pressure duct 318 positioned at the top of the water column 301. Low-pressure duct 318 is similar to the low-pressure duct 220 of the embodiment illustrated in FIGS. 11 and 12.

A turbine (not visible) is positioned within low-pressure duct 318 and is operatively connected to a generator (not visible) such that air flowing through the low-pressure duct causes to turn the turbine therein and causes the operatively connected generator to generate electrical power.

FIG. 17 shows a vertical cross-sectional view of the same embodiment illustrated in FIG. 16, wherein the vertical section is taken along section line 17-17 as specified in FIG. 16. The embodiment incorporates a buoyant portion 300/319 including, but not limited to: a buoy, flotation module, boat, barge, or buoyant platform, that tends to float adjacent to an upper surface 320 of a body of water, and an open-bottomed water column 301/321 portion, including, but not limited to: a tube, pipe, channel, or chamber.

As the buoy 300 rises and falls in response to waves traveling across the surface 320 of the body of water on which the buoy floats, the water 322 partially enclosed within the water column 301/321 rises and falls, and water flows 323 into, and out of, the water column's mouth 324. The water 322 within the water column 301/321 rises and falls 325, at least in part, due to the changes in the pressure of the water adjacent to the bottom mouth 324 of the water column that result from changes in the depth of the bottom mouth of the water column. The depth of, and water pressure around, the bottom mouth of the water column change, at least in part, because as waves lift and let fall the buoy, the buoy's vertical movements are imperfectly synchronized with the surfaces of those waves, thereby effectively changing the depth of the water column's mouth 324. The water 322 within the water column 301/321 also rises and falls 325, at least in part, due to the inertia of that water 322 inhibiting that water's ability to accelerate up and down in unison or synchrony with the embodiment 300 and its water column 301/321.

When the distance between the top 301 of the water column and the upper surface 326 of the water 322 within the water column 321, decreases, the air 327 trapped at the top of the water column 301 is compressed. When the pressure of that compressed air exceeds the pressure of the air in any of the high-pressure accumulators 303 and 304 (and 302 and 305 in FIG. 16), and reaches or exceeds the threshold opening pressure of each high-pressure accumulator's respective one-way high-pressure-accumulator valve (e.g., not shown) inside pipes 307 and 308 (and 306 and 309 in FIG. 16), then pressurized air from air pocket 327 flows through each high-pressure-accumulator's pipe, e.g., 307 and 308, and into each respective high-pressure accumulator. e.g., 303 and 304. At the moment of maximal compression of the air pocket 327, the pressure of the air in each of the embodiment's four high-pressure accumulators 303 and 304 (and 302 and 305 in FIG. 16) should be approximately equal.

Pressurized air within one 303 and 305 (in FIG. 16) of the two high-pressure accumulators in each inter-connected pair of accumulators flows out, e.g. 328, through a respective high-pressure duct, e.g., 314, energizing, and causing to rotate, a respective turbine therein, and its respective operatively connected generator (not visible). As pressurized air flows out, e.g., 328, from one 303 and 305 of the two high-pressure accumulators in each inter-connected pair of accumulators, the pressure of the air within that accumulator is reduced. As the pressure of the air within that one high-pressure accumulator, e.g., 303, in each pair of inter-connected accumulators falls, air from the other inter-connected high-pressure accumulator 304 and (302 in FIG. 16) flows through the interconnecting pipe 310 and 311 into the corresponding partially depressurized high-pressure accumulator 303 and 305. As air flows from the more highly pressurized accumulator 302 and 304 in each pair of accumulators to its inter-connected lesser pressurized "partner" accumulator 303 and 305, respectively, it imparts rotational kinetic energy to, and causes to rotate, the interconnecting pipe-specific turbine 329 and 330, respectively, therein, which in turn energizes a respective operatively connected generator 312 and 313, respectively, resulting in the production of electrical power.

When the distance between the top 301 of the water column and the upper surface 326 of the water 322 within the water column 321, increases, the air 327 trapped at the top of the water column 301 is decompressed, and its pressure is reduced. When a requisite threshold pressure difference is reached, the greater pressure of the air outside the embodiment, pushes open four one-way valves, e.g., 331, allowing outside air to enter through the respective openings, e.g., 332, in the low-pressure duct 318. Air flowing through low-pressure duct 318 into air pocket 327 flow through, and cause to rotate, turbine 333, energizing the turbine and the operatively connected generator 334, thereby producing electrical power.

Much of the interior of buoy 300/319 is filled with a material 335 possessing a density lower than that of water. However, a chamber 336, having the shape of an annular ring positioned about, and coaxial with, water column 321, contains water 337, the volume and/or mass of which may be varied through the activation and control of a bi-directional pump (not shown). By adjusting the amount and/or mass of the water ballast within the embodiment, its waterline and/or its draft may be adjusted.

FIG. 18 shows a horizontal cross-sectional view of the same embodiment illustrated in FIGS. 16 and 17, wherein the horizontal section is taken along section line 18-18 as specified in FIG. 17. The embodiment incorporates a buoyant portion 300 that tends to float adjacent to an upper surface of a body of water, and an open-bottomed water column 301.

When the relative motions of the embodiment 300 and the water enclosed within the water column 301 cause a pocket of air located within an upper portion of the water column 301 to be compressed, then, when the pressure of that air is great enough, the pressurized air forces open four one-way valves (not shown), each one positioned in a respective pipe 306-309, each pipe connecting a respective high-pressure accumulator 302-305 to an upper portion of the central water column 301 wherein the pocket of air tends to be present, and from which pressurized air flows, e.g., 338, into the respective high-pressure accumulators 302-305. Arrows, e.g., 338, show the flow of pressurized air from water column 301 into high-pressure accumulators 302-305, through respective connecting pipes 306-309 and past the one-way valves therein.

High-pressure air within high-pressure accumulators 303 and 305 flows up and out of those high-pressure accumulators through the channels, e.g. 339, in the respective high-pressure ducts 314 and 315 and through respective turbines (not visible, and similar to the turbine 211 in FIG. 12) therein, causing respective generators (not visible, and similar to the generator 236 in FIG. 12) operatively connected to those turbines to generate electrical power.

As the high-pressure within high-pressure accumulators 303 and 305 falls, high-pressure air from respective connected high-pressure accumulators 302 and 304 flows, e.g., 342/343 through respective interconnecting pipes 310 and 311, and through respective turbines 340 and 341 therein, into the relatively lower-pressure accumulators 303 and 305, causing the respective generators 312 and 313 operatively connected to turbines 340 and 341 to generate electrical power.

When the relative motions of the embodiment 300 and the water enclosed within the water column 301 cause the pocket of air located within an upper portion of the water column 301 to be decompressed, thereby reducing its pressure, then, when the pressure of that air is low enough, that partial vacuum draws open four one-way valves (e.g., 331 in FIG. 17) positioned within respective venting apertures (e.g., 332 in FIG. 17) within low-pressure (or "intake") duct 318, and outside air at atmospheric pressure flows, e.g., 344, into the depressurized air pocket within water column 301. Arrows, e.g., 344, show the flow of air from low-pressure/intake duct 318 into water column 301. When air is drawn into the water column 301 through low-pressure/intake duct 318, that air flows through a turbine (333 in FIG. 17) positioned within a constricted portion of the duct, causing a generator (334 in FIG. 17) operatively connected to the turbine to generate electrical power.

Figure 19:
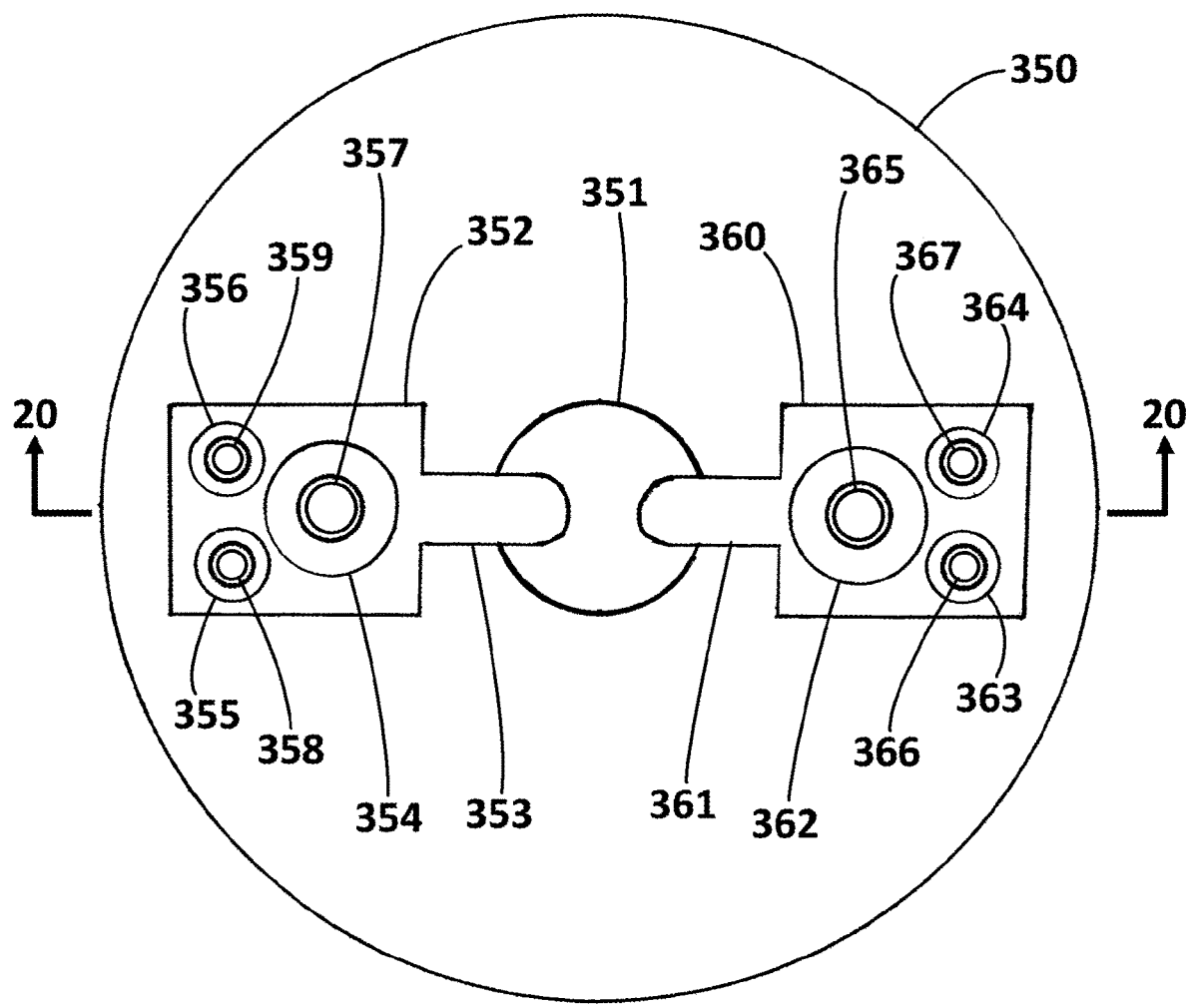
FIG. 19 is a top view of another embodiment of the present invention.

FIG. 19 shows a top-down view of an embodiment of the present invention. A buoy 350 floats adjacent to an upper surface of a body of water (not shown). An open-bottomed water column 351 is incorporated and/or positioned at the center of buoy 350.

Figure 20:
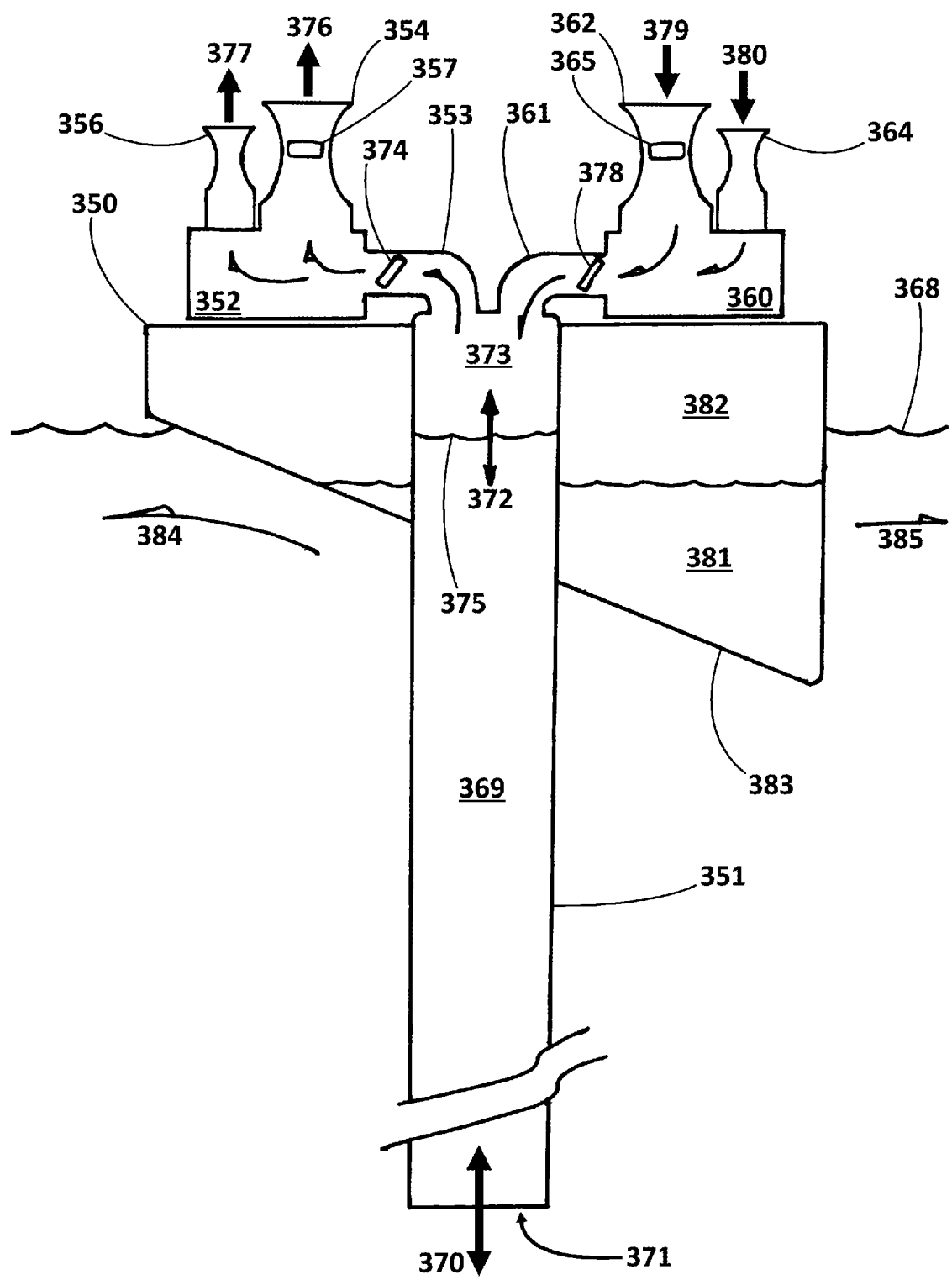
FIG. 20 is a cross sectional view of the embodiment of FIG. 19.

The embodiment illustrated in FIGS. 19 and 20 has a similar gross structure to that of the embodiments illustrated in FIGS. 1 and 4, namely, the embodiment illustrated in FIGS. 19 and 20 has an upper buoy portion comprised of an approximately cylindrical portion. Unlike the embodiments illustrated in FIGS. 1 and 4, the buoy of the embodiment illustrated in FIGS. 19 and 20 is not radially symmetrical and lacks a frustoconical bottom portion. Like the embodiments illustrated in FIGS. 1 and 4, the upper buoy portion of the embodiment illustrated in FIGS. 19 and 20 is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of approximate radial symmetry. While top-down and sectional views are provided of the embodiment illustrated in FIGS. 19 and 20, because of the similarity in the large structural features of the embodiments illustrated in FIGS. 1, 4, and 11-12, perspective and side views of the embodiment illustrated in FIGS. 19 and 20 are omitted.

A high-pressure accumulator 352 is attached to an upper surface of the buoy 350. The high-pressure accumulator 352 is connected to the central water column 351 by a pipe 353 containing a pressure-actuated one-way valve (not visible)

which opens when the air inside an upper portion of the water column 351 reaches or exceeds a threshold pressure and when the pressure of that air exceeds the pressure of the air inside the high-pressure accumulator 352.

When an air pocket inside an upper portion of the water column 351 is compressed by the water within the water column, if the pressure is sufficient, the one-way valve within pipe 353 is forced open and a portion of the pressurized air within the air pocket within an upper portion of the water column 351 flows into the high-pressure accumulator 352 through pipe 353.

Pressurized air within high-pressure accumulator 352 flows into the atmosphere outside the embodiment 350 through three exhaust ducts 354-356, each containing a respective turbine 357-359, with each turbine being operatively connected to a respective generator (not shown), such that when pressurized air flows out of the high-pressure accumulator 352, and through each respective turbine, electrical power is generated by each respective operatively connected generator.

A low-pressure accumulator 360 is also attached to an upper surface of the buoy 350. The low-pressure accumulator 360 is connected to the central water column 351 by a pipe 361 containing a pressure-actuated one-way valve (not visible) which opens when the air inside the water column 351 reaches or falls below a threshold pressure and when the pressure of that air falls below the pressure of the air inside the low-pressure accumulator 360.

When the air pocket inside an upper portion of the water column 351 is decompressed, and its pressure is reduced, by the water within the water column moving in a downward direction relative to the top of buoy 350, then if the pressure of the air within that air pocket is sufficiently low, the one-way valve within pipe 361 is forced open and a portion of the more highly pressurized air within the low-pressure accumulator 360 flows into the air pocket within the water column 351.

Depressurized air within low-pressure accumulator 360 draws in additional air from the atmosphere outside the embodiment 350 through three intake ducts 362-364, each containing a respective turbine 365-367, with each turbine being operatively connected to a respective generator (not shown), such that when air flows into the low-pressure accumulator 360 from outside the embodiment 350, and through each respective turbine, electrical power is generated by each respective operatively connected generator.

FIG. 20 shows a vertical cross-sectional view of the same embodiment illustrated in FIG. 19, wherein the vertical section is taken along section line 20-20 as specified in FIG. 19. The embodiment incorporates a buoyant portion 350 including, but not limited to: a buoy, flotation module, boat, barge, or buoyant platform, that tends to float adjacent to an upper surface 368 of a body of water, and an open-bottomed water column 351 portion, including, but not limited to: a tube, pipe, channel, or chamber.

As the buoy 350 rises and falls in response to waves traveling across the surface 368 of the body of water on which the buoy floats, the water 369 partially enclosed within the water column 351 rises and falls within that water column, as water flows 370 into, and out of, the water column's mouth 371. The water 369 within the water column 351 rises and falls 372, at least in part, due to the changes in the pressure of the water adjacent to the bottom mouth 371 of the water column that result from changes in the depth of the bottom mouth 371 of the water column 351. The depth of, and water pressure around, the bottom mouth of the water column change, at least in part, because as waves lift and let fall the buoy, the buoy's vertical movements are imperfectly synchronized with the surfaces of those waves, thereby effectively changing the depth of the water column's mouth 371. The water 369 within the water column 351 also rises and falls 372, at least in part, due to the inertia of that water 369 inhibiting that water's ability to accelerate up and down in unison or synchrony with the embodiment 350 and its water column 351 (i.e., and the structural tube of which the water column 351 is, at least in part, comprised).

When the water 369 within the water column 351 rises relative to the embodiment and/or an upper surface of the embodiment, a pocket of air 373, trapped above an upper surface 375 of the water 369 within the water column 351, is compressed, and the pressure of the air therein is increased. At a sufficient pressure, the pressure-actuated one-way valve 374 opens and a portion of the pressurized air within the air pocket 373 flows into a high-pressure accumulator 352.

When the pressure of the air within the high-pressure accumulator 352 is greater than the pressure of the air outside the embodiment (e.g., greater than atmospheric pressure), then at least a portion of that pressurized air flows out, e.g., 376-377, of the high-pressure accumulator 352 and into the air above the embodiment 350. In order to flow out of the high-pressure accumulator 352, the pressurized air must flow through one of the embodiment's three high-pressure ducts, e.g., 354 and 356 connected thereto, and through one of the three respective turbines, e.g., 357, positioned, one each, within those high-pressure ducts. As outflowing air energizes, and causes to rotate, the turbines in the high-pressure ducts, a generator (not shown) operatively connected to each respective turbine is energized and generates electrical power.

By utilizing turbines that resist the outflow of pressurized air to different degrees, or that are optimized with respect to flows of differing rates and/or pressures, the differently sized, configured, and/or designed, high-pressure ducts, turbines, and/or associated generators, can improve the efficiency through which energy is extracted from the embodiment's wave-induced pressurization of air across a broader range of wave energies.

As an example, and by no means as a limitation, such differentially optimized high-pressure ducts, turbines, and/or generators, permit an embodiment to efficiently extract energy from the relatively small volumes of relatively modestly pressurized air that tends to be produced by the air pocket 373 when the embodiment operates in sea states and/or environmental conditions characterized by relatively weak waves, and correspondingly relatively weak wave energies. For instance, if the smaller high-pressure ducts 355 and 356, turbines 358 and 359, and/or associated generators (not shown), permit air of relatively less pressurization to pass through relatively easily, while extracting energy from such flows relatively efficiently, while at the same time the larger high-pressure duct 354, turbine 357, and/or associated generator (not shown), tend to inhibit and/or obstruct the flow of such weakly pressurized air, then the embodiment can extract energy from weak waves relatively efficiently.

Likewise, such differentially optimized high-pressure ducts, turbines, and/or generators, might permit that same embodiment to efficiently extract energy from the relatively large volumes of relatively highly pressurized air that tends to be produced by the air pocket 373 when the embodiment operates in sea states and/or environmental conditions characterized by relatively vigorous waves, and correspondingly relatively large wave energies. For instance, if the smaller high-pressure ducts 355 and 356, turbines 358 and 359, and/or associated generators (not shown), permit only a limited rate of flow of air from the high-pressure accumulator, and if the larger high-pressure duct 354, turbine 357, and/or associated generator (not shown), permit a substantially greater rate of air flow when that air is highly pressurized, then smaller ducts optimized for low rates of flow and weaker pressures will not significantly diminish the efficiency with which energy is captured by the embodiment if the larger duct is optimized for high pressures and if most of the highly pressurized air flows through that larger duct.

The efficiency of the embodiment (or of a similar embodiment) may be improved when the relative resistance to flow through the three differently-sized high-pressure ducts is actively controlled and/or adjusted by an embodiment-specific control system. The efficiency of energy capture across a broad range of flow rates and pressures can also be improved through the incorporation within the high-pressure accumulator and/or within the high-pressure ducts of additional actively controlled valves to control, adjust, distribute, and/or direct, the outflow of pressurized air through the differently-sized high-pressure ducts, turbines, and generators, or through all of those ducts, turbines, and generators, especially through the control of the specific proportions, volumes, and/or rates of flow, with which pressurized air from within the high-pressure accumulator 352 is partitioned between the high-pressure ducts of varying sizes, efficiencies, and/or optimal rates and pressures of flow.

The adjustment of the relative rates at which pressurized air flows through the differently-sized high-pressure ducts can also be achieved, controlled, and/or manifested, through a related control of the relative degrees of resistive torques imparted to the turbines in each type of high-pressure duct by its respective generator, alternator, and/or other consumer of its rotational kinetic energy. The adjustment of the relative rates at which pressurized air flows through the differently-sized high-pressure ducts can also be achieved, controlled, and/or manifested, through a related control of the guide vanes associated with, and/or integral to, each of the respective turbines.

When the water 369 within the water column 351 falls relative to the embodiment and/or an upper surface thereof, the pocket of air 373, trapped above an upper surface 375 of the water 369 within the water column 351, is decompressed, and the pressure of the air therein is decreased. At a sufficiently low pressure, the pressure-actuated one-way valve 378 opens and a portion of the relatively more-greatly pressurized air within the low-pressure accumulator 360 flows into the air pocket 373.

When the pressure of the air within the low-pressure accumulator 360 is less than the pressure of the air outside the embodiment (e.g., less than atmospheric pressure), then some of that air outside the embodiment will tend to flow, e.g., 379-380, in to the low-pressure accumulator 360. In order to flow into the low-pressure accumulator 360, the outside air must flow through one of the embodiment's three low-pressure ducts, e.g., 362 and 364, connected thereto, and through one of the three respective turbines, e.g., 365, positioned, one each, within those low-pressure ducts. As inflowing air energizes the turbines in their respective low-pressure ducts, a generator operatively connected to each respective turbine is energized and generates electrical power.

By utilizing turbines that resist the inflow of outside air to different degrees, or that are optimized with respect to flows of differing rates and/or pressures, the differently sized, configured, and/or designed, low-pressure ducts, turbines, and/or associated generators, can improve the efficiency through which energy is extracted from the embodiment's wave-induced pressurization of air across a broader range of wave energies.

Water 381 entrained within a hollow chamber 382 within buoy 350 increases the mass, weight, and inertia of the buoy (i.e., therein serving as ballast) affecting the embodiment's draft, and the vertical position of its waterline. A pump and associated pipes (not shown) allow the embodiment's control system (not shown) to increase or decrease the amount, volume, mass, or level, of water 381 stored within the buoy, thereby raising or lowering, respectively, the embodiment's waterline, and increasing or decreasing the embodiment's draft. This ability of the embodiment's control system to adjust the embodiment's draft allows the control system to optimize the draft, and associated water plane area, of the embodiment with respect to the significant wave height, period, wind speed, wind direction, current speed, current direction, and/or any other relevant environmental and/or operational factor. By reducing the embodiment's draft during storms, the control system can minimize the risk of structural damage to the embodiment that might otherwise result from more energetic wave conditions of those storms.

A bottom surface 383 of the embodiment's buoy 350 is inclined with respect to a top surface of buoy 350 and/or with respect to the resting surface 368 of the body of water on which the embodiment floats. When the embodiment 350 falls, e.g., when the downward momentum of the embodiment carries it deeply into the water and/or below the surface 368 of the water such that it manifests positive buoyancy potential energy, then the sloped bottom surface 383 of the buoy tends to eject 384 water toward the shallower end of the inclined bottom 383, thereby tending to generate a thrust 385 in the opposite direction. In combination with a rudder (not shown) or other sources of propulsion it is possible for such an embodiment to steer a course in a desired direction and/or toward or to a desired geospatial location.

Figure 21:
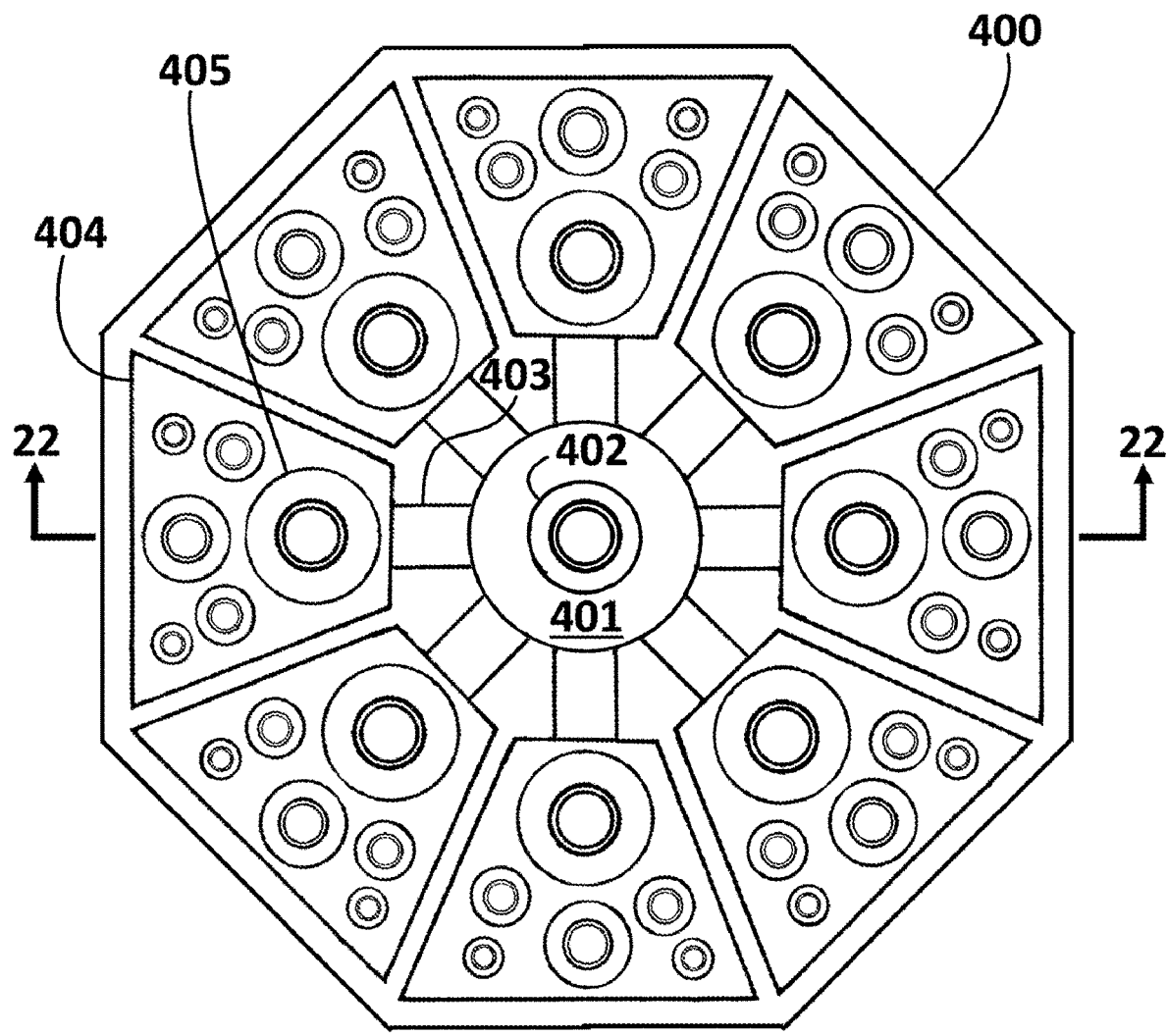
FIG. 21 is a top view of another embodiment of the present invention.

FIG. 21 shows a top-down view of an embodiment of the present invention. A buoy 400 floats adjacent to an upper surface of a body of water (not shown). An open-bottomed water column 401 is incorporated at the center of buoy 400.

Figure 22:
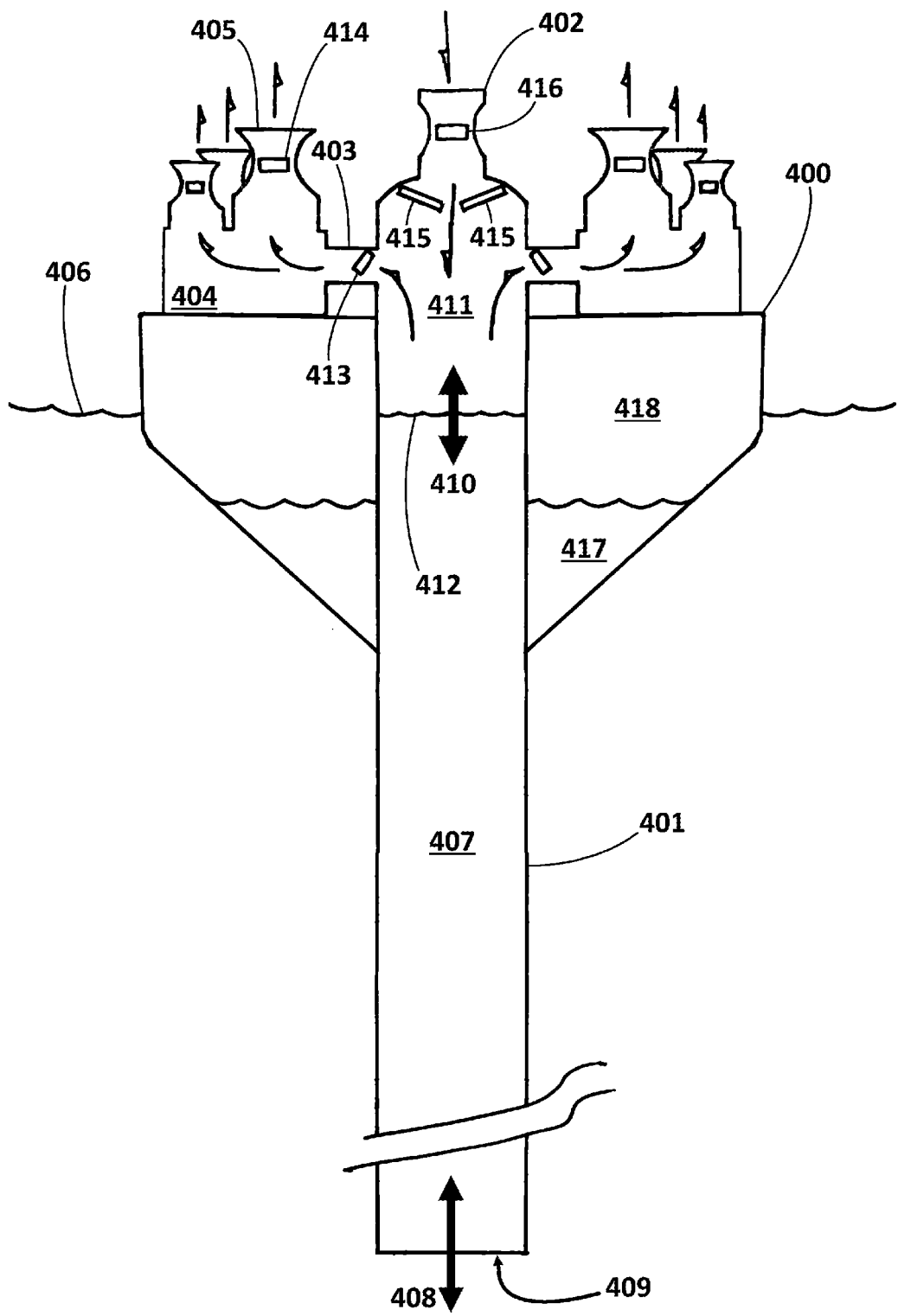
FIG. 22 is a cross sectional view of the embodiment of FIG. 21.

The embodiment illustrated in FIGS. 21 and 22 has a similar gross structure to that of the embodiments illustrated in FIGS. 1 and 4, namely, the embodiment illustrated in FIGS. 21 and 22 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry.

Unlike the embodiment illustrated in FIG. 4, the upper portion of the water column 401 of the embodiment illustrated in FIGS. 19 and 20 extends above the upper surface and/or wall of the respective buoy 400. And, unlike the embodiments illustrated in FIGS. 1 and 4, the accumulators of the embodiment illustrated in FIGS. 19 and 20 are positioned outside and above the upper surface and/or wall of the respective buoy 400.

Like the embodiments illustrated in FIGS. 1 and 4, the upper buoy portion of the embodiment illustrated in FIGS. 19 and 20 is attached and/or connected to a central hollow tubular structure having an uppermost portion positioned, at least partially, inside the buoy portion, and a lowermost portion that extends out and through the bottom of the buoy, such that the buoy and the tubular structure share a nominally vertical longitudinal axis of approximate radial symmetry. While top-down and sectional views are provided of the embodiment illustrated in FIGS. 21 and 22, because of the similarity in the large structural features of the embodiments illustrated in FIGS. 1, 4, and 21-22, perspective and side views of the embodiment illustrated in FIGS. 21 and 22 are omitted.

The embodiment 400 is similar in structure and function to the ones illustrated in FIGS. 5-6, and 16-18. In response to waves buffeting the embodiment, air is frequently drawn into an air pocket located inside an upper portion of water column 401. When the water in the water column moves downward relative to the embodiment, and the pressure of the air in the air pocket is reduced, then air is drawn in from outside the embodiment and passes through an intake duct 402 and the turbine (416 in FIG. 22) therein resulting in the generation of electrical power. When the water in the water column moves upward relative to the embodiment, and the pressure of the air in the air pocket located inside an upper portion of water column 40 is increased, then pressurized air opens one-way valves in connecting pipes, e.g., 403, and pressurized air flows into one of eight high-pressure accumulators, e.g., 404. Pressurized air within each high-pressure accumulator flows out and into the atmosphere from which it was drawn and/or taken through one or more of a variety of exhaust ducts, e.g., 405, and the respective turbine(s), e.g., 414, therein resulting in the generation of electrical power.

In the illustrated embodiment 400, each exhaust duct, turbine, and generator assembly differs in the degree to which it resists the outward flow of air, and in the rate at which air may flow out.

The smaller the duct, and respective turbine and generator, the lesser the resistance it offers to the outflow of air, and the less pressure is required to reach a rate of flow close to the maximal possible rate for that duct, and respective turbine and generator assembly, system, and/or mechanism. A relatively lesser resistance to out flow may be the result of many elements of the assembly's design and/or configuration, including, but not limited to: the specific design of the turbine, a lesser degree of constriction (if any) within the duct proximate to the turbine, and/or a lesser amount of resistive torque imparted to the turbine by the rotatably connected generator or alternator. And, the resistance to out flow through each duct, and respective turbine and generator assembly may be controlled and/or adjusted through a variety of adjustable attributes characteristic of each duct, and respective turbine and generator assembly, including, but not limited to: the amount of resistive torque imparted to the turbine by the rotatably connected generator or alternator; the angle of attack of the blades of each turbine; and the incorporation and utilization of an adjustable flow valve and/or aperture to constrict the flow of air through each duct, and respective turbine.

By contrast, the larger the duct and respective turbine, the greater the resistance it offers to the outflow of air, and the greater the air pressure required to reach a rate of flow close to the maximal possible rate characteristic of the duct and respective turbine. A relatively greater resistance to out flow may be the result of many elements of the assembly's design and/or configuration, including, but not limited to: the specific design of the turbine, a greater degree of constriction (if any) within the duct proximate to the turbine, and/or a greater amount of resistive torque imparted to the turbine by the rotatably connected generator or alternator. And, the resistance to out flow through each duct, and respective turbine and generator assembly may be controlled and/or adjusted through a variety of adjustable attributes characteristic of each duct, and respective turbine and generator assembly, including, but not limited to: the amount of resistive torque imparted to the turbine by the rotatably connected generator or alternator; the angle of attack of the blades of each turbine; and the incorporation and utilization of an adjustable flow valve and/or aperture to constrict the flow of air through each duct, and respective turbine.

Because of the variety of exhaust ducts, turbines, and associated generators, each of which may be designed and/or configured within a single assembly, system, or mechanism to offer a different and/or unique range of optimal flow rates and/or pressures, the breadth of wave energies over which the embodiment will exhibit favorable, if not optimal, energy extraction can be quite large.

An embodiment similar to the one illustrated in FIGS. 21 and 22, utilizes dynamic control of the amount of resistive torque imparted by each generator (or alternator) to its respective turbine in order to better optimize the efficiency with which energy is extracted from the pressurized air generated in response to any particular wave environment.

An embodiment similar to the one illustrated in FIGS. 21 and 22, includes additional one-way valves that open to allow the flow of air through each exhaust duct when, and only when, a requisite pressure is achieved or exceeded within the respective accumulator. For example, the one-way valves regulating the out flow of air through the smallest ducts may open most easily and/or in response to the lowest accumulator pressures, while the one-way valves regulating the out flow of air through the largest ducts may require the highest accumulator pressures in order to open. In a similar embodiment, such one-way valves open when, and only when, the accumulator pressure is within a specific range of pressures, and they close when the accumulator pressure is outside such a range of pressures.

An embodiment similar to the one illustrated in FIGS. 21 and 22, includes additional one-way valves that are actively controlled by an embodiment-specific control system (not shown) which opens a specific assortment or subset of ducts (e.g., while also adjusting the resistive torques created by each generator and imparted to each respective "active" duct's turbine) so as to direct or limit the flow of air through specific ducts and thereby optimize the extraction of energy from rates and pressures of pressurized accumulator air arising as a consequence of the embodiment's interaction with specific wave conditions.

Exhaust ducts of differing sizes (e.g., differing diameters, differing cross-sectional areas normal to the direction of flow, etc.), and their similarly differently-sized turbines (e.g., turbines of different diameters, cross-sectional areas, etc.) may differ in their nominal rates of air flow, pressures of flow, etc., due to many design, configurational, and/or operational, characteristics. Likewise, the ducts and turbines connected to, and or receiving pressurized air from, two different high-pressure accumulators on the embodiment, may differ in their nominal rates and/or pressures of flow. As a result, those respective accumulators may contain air at differing pressures when compressed air flows in to them following a compression of the air pocket in water column 401. Such differing initial pressures may offer significant improvements to energy capture efficiency. An accumulator (or a duct and turbine directly connected to the water column) can only receive air from the water column's compressed air pocket if the pressure of the air in that compressed air pocket is greater than the pressure of the air already inside the accumulator. Therefore, having one or more accumulators in which the pressure of the air already inside them is relatively low allows compressed air to flow into them when the pressure of that compressed air is not yet great. Furthermore, and by contrast, having one or more accumulators in which the pressure of the air already inside them is relatively high allows the relatively steady, constant and unbroken generation of electrical power derived from the relatively steady flow of that air out of those accumulators.

Maintaining at least a two-part energy extraction profile, and preferably a multi-part energy extraction profile, e.g. through the incorporation, utilization, and/or differential regulation, of two or more accumulators, ducts, turbines, and generators, can provide relatively quick bursts of energy capture that consume relatively large volumes of compressed air and thereby can tend to increase the total energy captured by an embodiment by processing a greater portion of the compressed air being generated by the embodiment, while also providing greater continuity of energy capture thereby reducing need for batteries and/or other types of energy storage, which is especially important for an embodiment that will use the power it generates to carry out some energy-consuming process such as executing computational work, generating chemical fuels, etc., which are best performed with a relatively steady and/or constant supply of energy.

FIG. 22 shows a vertical cross-sectional view of the same embodiment illustrated in FIG. 21, wherein the vertical section is taken along section line 22-22 as specified in FIG. 21. The embodiment incorporates a buoyant portion 400 including, but not limited to: a buoy, flotation module, boat, barge, or buoyant platform, that tends to float adjacent to an upper surface 406 of a body of water, and an open-bottomed water column 401 portion, including, but not limited to: a tube, pipe, channel, or chamber.

As the buoy 400 rises and falls in response to waves traveling across the surface 406 of the body of water on which the buoy floats, the water 407 partially enclosed within the water column 401 rises and falls, and water flows 408 into, and out of, the water column's mouth 409. The water 407 within the water column 401 rises and falls 410, at least in part, due to the changes in the pressure of the water adjacent to the bottom mouth 409 of the water column that result from changes in the depth of the bottom mouth 409 of the water column 401. The depth of, and water pressure around, the bottom mouth of the water column change, at least in part, because as waves lift and let fall the buoy, the buoy's vertical movements are imperfectly synchronized with the surfaces of those waves, thereby effectively changing the depth of the water column's mouth 409. The water 407 within the water column 401 also rises and falls 410, at least in part, due to the inertia of that water 407 inhibiting that water's ability to accelerate up and down in unison or synchrony with the embodiment 400 and its water column 401 (i.e., and the structural tube of which the water column 401 is, at least in part, comprised).

When the water 407 within the water column 401 rises relative to the embodiment and/or an upper surface thereof, a pocket of air 411, trapped above an upper surface 412 of the water 407 within the water column 401, is compressed, and the pressure of the air therein is increased. At a sufficient pressure, eight pressure-actuated one-way valves, e.g., 413, open and a portion of the pressurized air within the air pocket 411 flows into a respective eight high-pressure accumulators, e.g., 404.

When the pressure of the air within the air pocket 411 again falls, the eight one-way valves, e.g., 413, close, sealing and/or trapping high pressure air within the respective accumulators, e.g., 404.

High-pressure air within the accumulators flows out through the various exhaust ducts, e.g., 405, and the respective turbines, e.g., 414, therein. The exhaust ducts connected to the high-pressure accumulators are of multiple sizes, cross-sectional areas, relative degrees of constriction, etc., and may differ with respect to other design characteristics as well. Each turbine is operatively connected to a generator (not shown) such that the spinning of the turbine that results from a flowing of air through it causes the turbine's operatively connected generator to generate electrical power.

When the pressure of the air within the air pocket 411 falls below a threshold pressure (e.g., below atmospheric pressure or 1 atmosphere) a one-way valve 415 within an intake duct 402 opens and allows air from outside the embodiment 400 to flow into the air pocket 411 within the water column 401, thereby flowing through a turbine 416 therein, and causing a generator (not shown) operatively connected to the turbine to generate electrical power.

Water 417 entrained within a hollow chamber 418 within buoy 400 increases the mass, weight and inertia of the buoy (i.e., serving as ballast) affecting the embodiment's draft, and the vertical position of its waterline. A pump and associated pipes (not shown) allow the embodiment's control system (not shown) to increase or decrease the amount, volume, mass, or level, of water 417 stored within the buoy, thereby raising or lowering, respectively, the embodiment's waterline, and increasing or decreasing the embodiment's draft. This ability of the embodiment's control system to adjust the embodiment's draft allows the control system to optimize the draft, and associated water plane area, of the embodiment with respect to the significant wave height, period, wind speed, wind direction, current speed, current direction, and/or any other relevant environmental and/or operational factor. By reducing the embodiment's draft during storms, the control system can minimize the risk of structural damage to the embodiment that might otherwise result from more energetic wave conditions of those storms.

An embodiment similar to the one illustrated in FIG. 22 does not incorporate a turbine 416 within the intake duct 402 and instead allows air from outside the embodiment to flow freely, without restriction or obstruction, into the air pocket 411 when the intake duct's one-way valve 415 opens.

An embodiment similar to the one illustrated in FIG. 22 incorporates a pressure-actuated one-way valve within one or more exhaust ducts, e.g., 405, in order to obstruct the flow of air out of the respective high-pressure accumulator at accumulator air pressures less than the threshold pressure required to open each valve. The valves incorporated within, and governing the flow through, different exhaust ducts may have different threshold opening pressures. An embodiment similar to the one illustrated in FIG. 22 incorporates actively controlled pressure-actuated one-way valves permitting the embodiment's control system to regulate, control, and/or adjust the flow of air within, into, and/or out of, the embodiment, and/or into and/or through any of its ducts and respective turbines.

An embodiment similar to the one illustrated in FIG. 22 incorporates an actively (e.g., electronically) controlled one-way valve within one or more exhaust ducts, e.g., 405, in order to provide an embodiment-specific control system with the ability to dynamically obstruct the flow of air out of the respective high-pressure accumulator. The control system is then able to orchestrate the flow of pressurized air through various ducts and subsets of accumulator-specific ducts in order to maximize the efficiency with which energy is extracted from the pressurized air within the various accumulators, and/or in order to maximize the continuity and constancy with which energy is generated by the duct-specific turbines.

Figure 23:
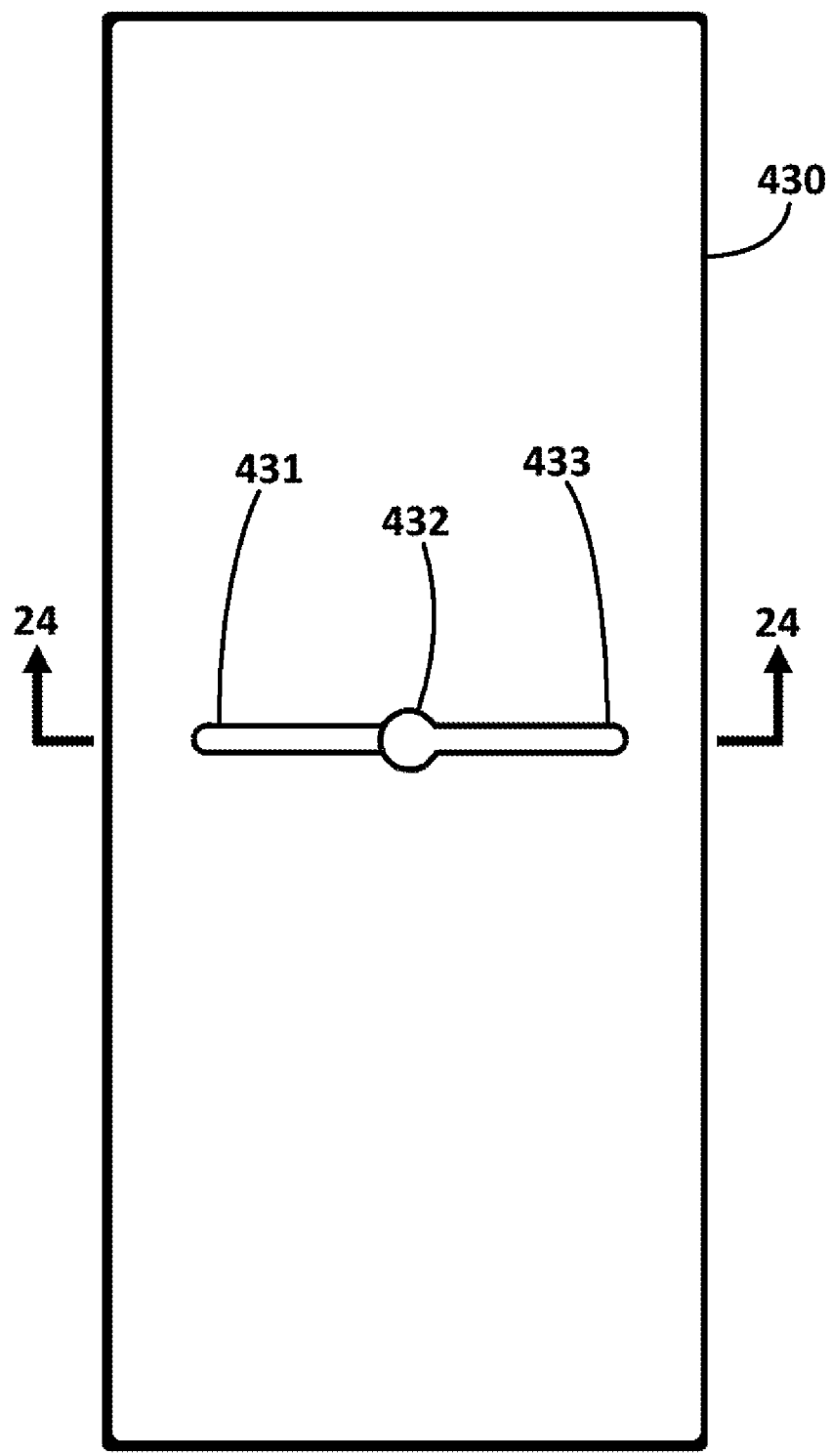
FIG. 23 is a top view of another embodiment of the present invention.

FIG. 23 shows a top-down view of an embodiment of the present invention. A buoy 430 floats adjacent to an upper surface of a body of water (not shown). An open-bottomed water column (not visible) is incorporated near the center of a buoy 400 (with respect to a horizontal plane) and is positioned so as to be approximately coaxial with a nominally vertical longitudinal axis of the embodiment.

The embodiment contains a high-pressure accumulator (not visible) and a low-pressure accumulator (not visible) within its buoy 430. A single pipe 431-433 connects the high-pressure accumulator to the low-pressure accumulator. And a turbine (not visible) within a center portion 432 of the pipe 431-433 extracts energy from air that flows through the pipe from the high-pressure accumulator to the low-pressure accumulator.

Figure 24:
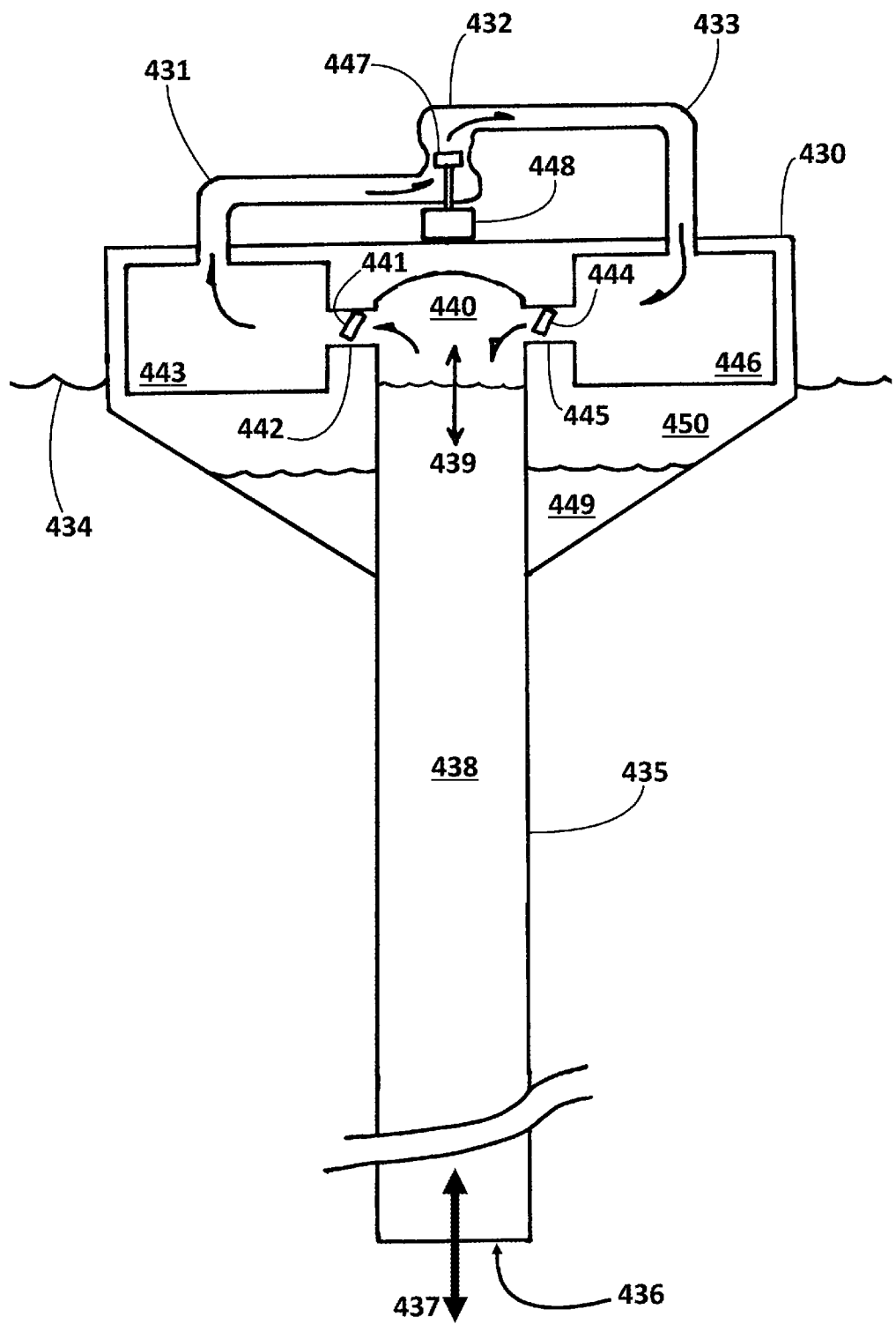
FIG. 24 is a cross sectional view of the embodiment of FIG. 23.

FIG. 24 shows a vertical cross-sectional view of the same embodiment illustrated in FIG. 23, wherein the vertical section is taken along section line 24-24 as specified in FIG. 23. The embodiment 430 floats adjacent to an upper surface 434 of a body of water. A tubular "water column" structure 435 with an open bottom 436 allows water to travel 437 in and out of the water column 435.

As the embodiment 430 rises and falls in response to passing waves, water 438 within the water column 435 rises and falls 439 although typically not in phase with the rising and falling of the embodiment. The phase-misaligned rising and falling of the water 438 within the water column 435 tends to cause a cyclical compressing and decompressing of a pocket of air 440 trapped at the top of the water column 435. When the water 438 within the water column 435 rises relative to the embodiment, and relative to the air pocket 440, the air within that air pocket is compressed and the pressure of the air therein is increased. When the water 438 within the water column 435 falls relative to the embodiment, and relative to the air pocket 440, the air within that air pocket is decompressed and the pressure of the air therein is reduced. As waves drive the embodiment up and down, the pressure of the air within the air pocket 440 tends to be cyclically raised and lowered.

When the pressure of the air within air pocket 440 is less than the pressure of the air within the high-pressure accumulator 443, a one-way valve 441 positioned within connecting pipe 442, and able to open and close, is closed, preventing any flow of air from the high-pressure accumulator 443 to and/or into the air pocket 440. However, when the air within the air pocket 440 is compressed, and when that air's pressure becomes greater than the pressure of the air within high-pressure accumulator 443, the one-way valve 441 positioned within connecting pipe 442, and able to open and close, opens allowing pressurized air from within the air pocket 440 to flow into the accumulator 443. When the pressure of the air within the air pocket 440 subsequently falls below the pressure of the air within the high-pressure accumulator 443, the one-way valve 441 closes and prevents the backflow of air through the pipe 442 from the high-pressure accumulator 443 to and/or into the air pocket 440.

When the air within the air pocket 440 is compressed, and that air's pressure is greater than the pressure of the air within the low-pressure accumulator 446, a one-way valve 444 positioned within connecting pipe 445, and able to open and close, is closed, preventing any flow of air between from the air pocket 440 into the low-pressure accumulator 446. However, when the air within the air pocket 440 is decompressed, and when that air's pressure becomes less than the pressure of the air within low-pressure accumulator 446, the one-way valve 444 positioned within connecting pipe 445, and able to open and close, opens allowing the partial vacuum within the air pocket 440 to draw into itself more highly pressurized air from the low-pressure accumulator 446. When the pressure of the air within the air pocket 440 subsequently rises above the pressure of the air within the low-pressure accumulator 446, the one-way valve 444 closes and prevents the backflow of air from the air pocket 440 into the low-pressure accumulator 446 through the pipe 445.

As the embodiment rises and falls on passing waves, pressurized air flows from the air pocket 440 into the high-pressure accumulator 443, and air is drawn from the low-pressure accumulator 446 into the air pocket 440, thereby tending to create a cyclical passage and/or flow of air through the embodiment's closed and/or sealed air circulation pathway.

During the cyclic adding of pressurized air to the high-pressure accumulator 443, and the cyclic removal of air from the low-pressure accumulator 446, high pressure air within the high-pressure accumulator 443 tends to flow into and through pipe 431 and into and through pipe 432 where it passes through, energizes, and causes to rotate, turbine 447, thereby energizing operatively connected generator 448 and generating electrical power. The flowing air then continues through pipe 433 and is drawn into the low-pressure accumulator 446. Thus, air flows in a circuit or closed loop comprising flowing from the air pocket to the high-pressure accumulator, from the high-pressure accumulator to the turbine, from the turbine to the low-pressure accumulator, and from the low-pressure accumulator to the air pocket. The conflicting and out-of-phase momenta and/or movements of the water 438 in the embodiment's water column 435 and the embodiment itself (including the embodiment's water ballast 449) tends to cause a cyclical compressing and decompressing of the air trapped in the air pocket 440. And, that cyclical variation of pressure within the embodiment's air pocket drives air through the closed loop that includes the turbine 447 and tends to result in the generation of electrical power.

Water 449 entrained within a hollow chamber 450 within buoy 430 increases the mass, weight, and inertia of the buoy (i.e., therein serving as ballast) affecting the embodiment's draft, and the vertical position of its waterline. A pump and associated pipes (not shown) allow the embodiment's control system (not shown) to increase or decrease the amount, volume, mass, or level, of water 449 stored within the buoy, thereby raising or lowering, respectively, the embodiment's waterline, and increasing or decreasing the embodiment's draft. This ability of the embodiment's control system to adjust the embodiment's draft allows the control system to optimize the draft, and associated water plane area, of the embodiment with respect to the significant wave height, period, wind speed, wind direction, current speed, current direction, and/or any other relevant environmental and/or operational factor. By reducing the embodiment's draft during storms, the control system can minimize the risk of structural damage to the embodiment that might otherwise result from more energetic wave conditions of those storms.

Figure 25:
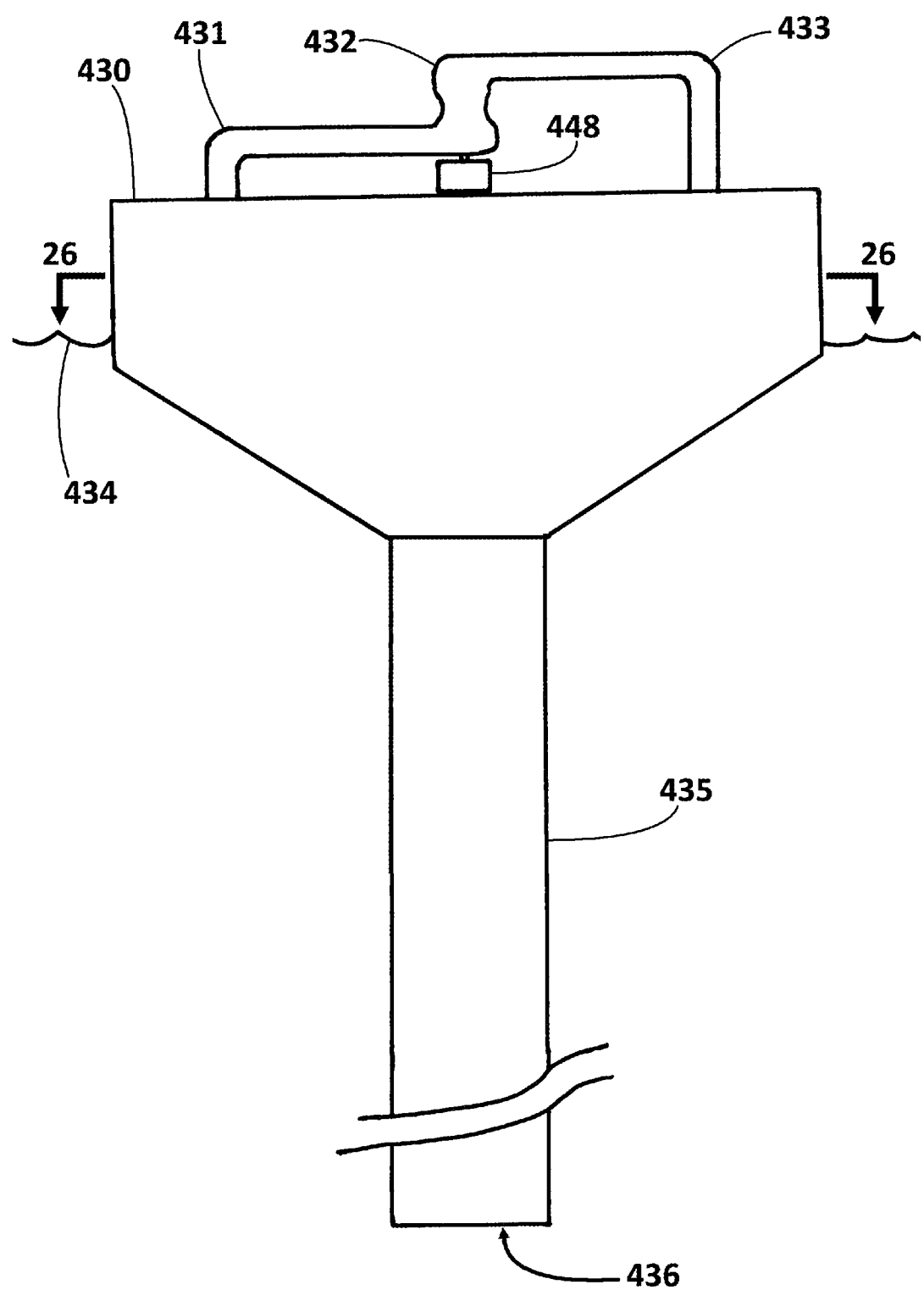
FIG. 25 is an elevated, perspective schematic view of another embodiment of the present invention.

FIG. 25 shows a side view of the same embodiment of the present invention illustrated in FIGS. 23 and 24.

Figure 26:
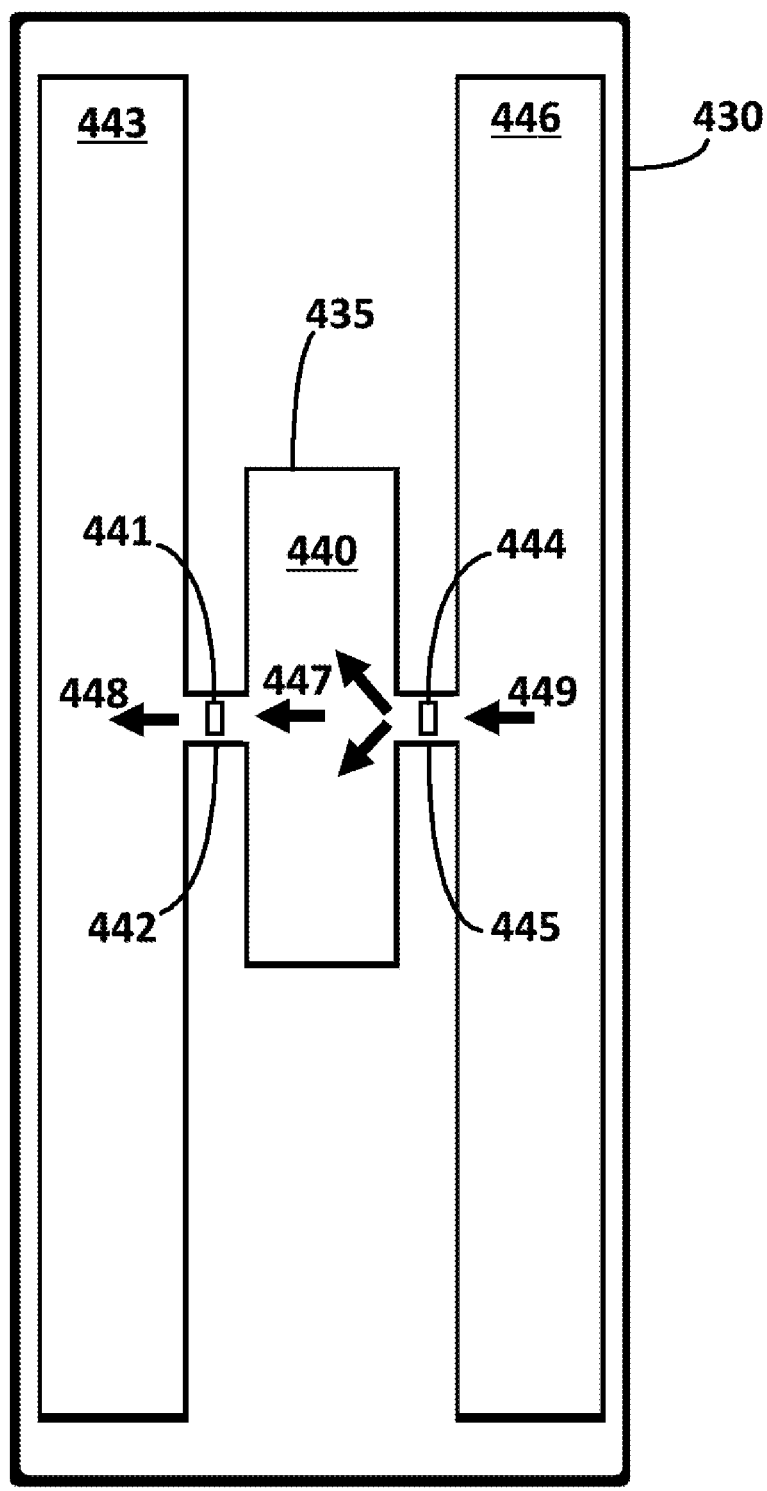
FIG. 26 is a cross sectional view of the embodiment of FIG. 25.

FIG. 26 shows a horizontal cross-sectional view of the same embodiment illustrated in FIGS. 23-25, wherein the vertical section is taken along section line 26-26 as specified in FIG. 25. The embodiment 430 floats adjacent to an upper surface of a body of water (434 in FIG. 25). A tubular "water column" structure 435, with an approximately rectangular cross-section with respect to a horizontal section plane, contains an air pocket 440 (i.e., the section plane passes through the air pocket 440 and not the water (438 in FIG. 24) within the water column 435).

When the pressure of the air within the air pocket 440 is greater than the pressure of the air within the high-pressure accumulator 443, air flows 447 and 448 from air pocket 440 past a one-way valve 441 (i.e., when the valve has opened as a result a sufficiently high pressure within the air pocket 440, and/or a sufficiently great pressure difference between the air pocket 440 and the high-pressure accumulator 443) within a connecting pipe 442 and into a high-pressure accumulator 443.

And, when the pressure of the air within the air pocket 440 is less than the pressure of the air within the low-pressure accumulator 446, air flows 449 and 447 from the low-pressure accumulator past a one-way valve 444 (i.e., when the valve has opened as a result a sufficiently low pressure within the air pocket 440, and/or a sufficiently great pressure difference between the high-pressure accumulator 443 and the air pocket 440) within a connecting pipe 445 and into the air pocket 440.

Not shown in FIG. 26, but shown in FIG. 24, compressed air from the high-pressure accumulator 443 flows through a pipe (431 in FIG. 24), through a turbine (447 in FIG. 24), through a continuation of the pipe (433 in FIG. 24), and back into the low-pressure accumulator 446.

Note that the high- and low-pressure accumulators are long rectangular chambers, and that the water column also has a rectangular cross-section.

Figure 27:
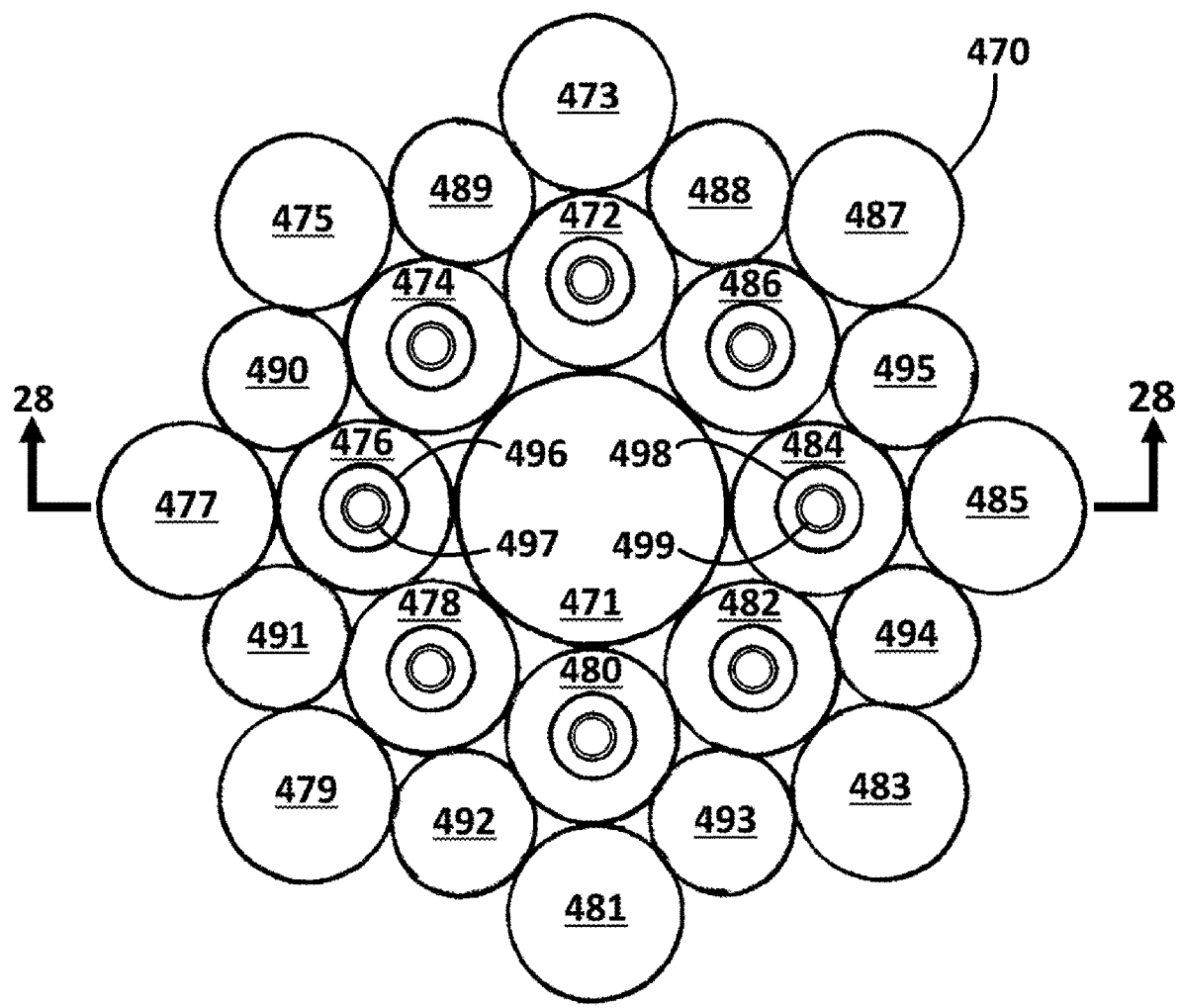
FIG. 27 is a top view of another embodiment of the present invention.

FIG. 27 shows a top-down view of an embodiment of the present invention. A buoy 470 floats adjacent to an upper surface of a body of water (not shown). An open-bottomed water column 471 is incorporated near the center of buoy 470 (with respect to a horizontal plane) and is approximately coaxial with a nominally vertical longitudinal axis of approximate radial symmetry of the embodiment.

Figure 28:
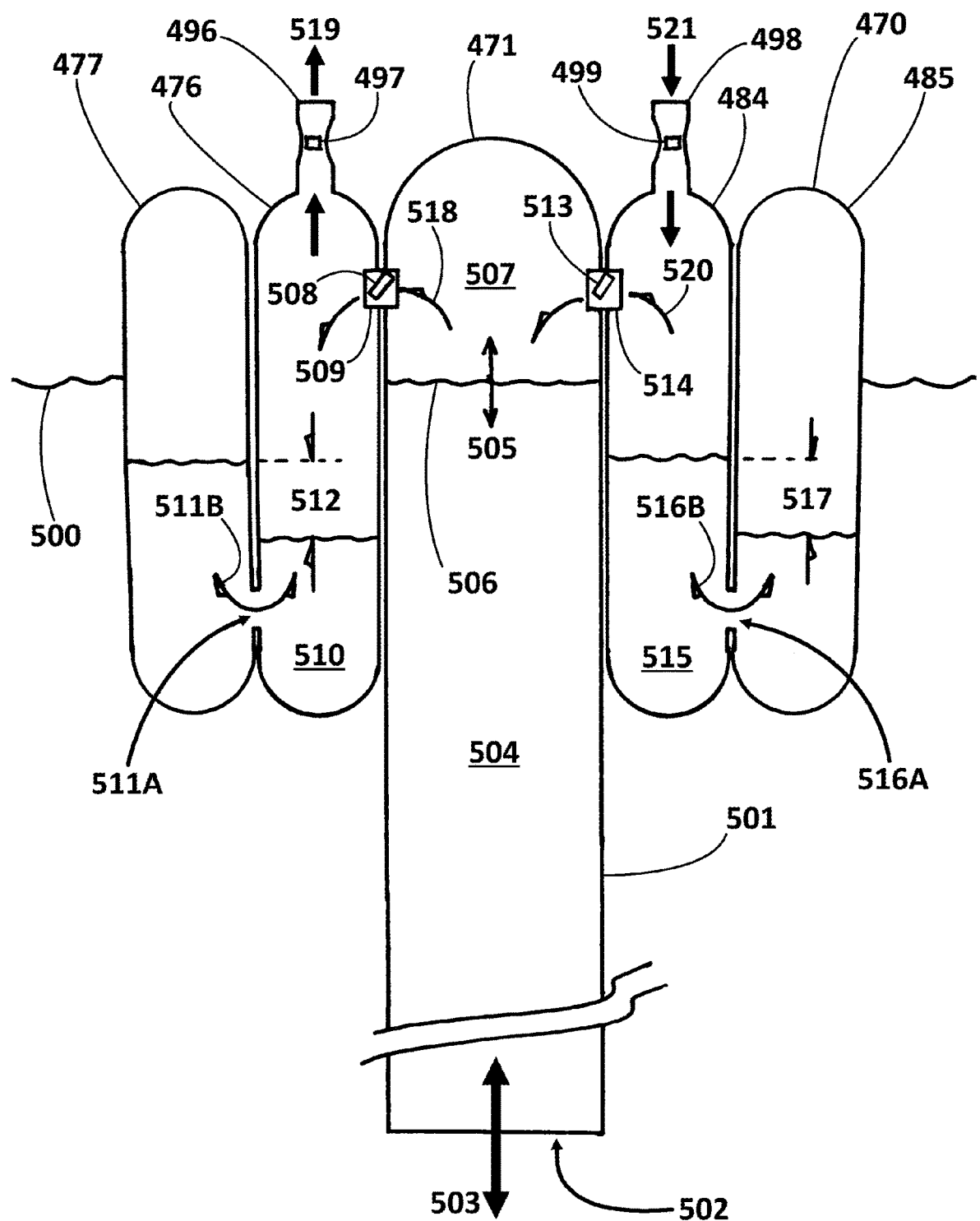
FIG. 28 is a cross sectional view of the embodiment of FIG. 27.

The embodiment illustrated in FIGS. 27 and 28 has a similar gross structure to that of the embodiments illustrated in FIGS. 1 and 4, namely, the embodiment illustrated in FIGS. 27 and 28 has an upper buoy portion that is defined by an approximately cylindrical envelope. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of approximately radial symmetry.

Unlike the embodiments illustrated in FIGS. 1 and 4, the buoy of the embodiment illustrated in FIGS. 27 and 28 is not an integral chamber, but is instead comprised of a set of adjacent and interconnected tubular chambers that are assembled so as to have an approximately cylindrical outer bound and/or envelope. The embodiment illustrated in FIGS. 27 and 28 also lacks a frustoconical bottom portion. Like the embodiments illustrated in FIGS. 1 and 4, the upper buoy portion and/or tubular assembly of the embodiment illustrated in FIGS. 27 and 28 is attached and/or connected to a central hollow tubular structure having an uppermost portion positioned inside that buoy portion, i.e., positioned within the assembly of nominally vertical tubes comprising the embodiment's buoy, and a lowermost portion that extends out and through the bottom of the buoy, such that the buoy assembly and the tubular structure share a nominally vertical longitudinal axis of approximate radial symmetry.

While top-down and sectional views are provided of the embodiment illustrated in FIGS. 27 and 28, because of the similarity in the large structural features of the embodiments illustrated in FIGS. 1, 4, and 27-28, perspective and side views of the embodiment illustrated in FIGS. 27 and 28 are omitted.

Four pairs, e.g., 472-473, 474-475, 476-477, and 478-479, of interconnected cylindrical tanks or vessels function as high-pressure accumulators, receiving from an air pocket within an upper portion of the embodiment's water column 471 cyclical and/or periodic infusion of high-pressure air and thereafter caching or buffering a portion of that high-pressure air. Four pairs, e.g., 480-481, 482-483, 484-485, and 486-487, of interconnected cylindrical tanks or vessels function as low-pressure accumulators, receiving from the atmosphere outside the embodiment air at approximately atmospheric pressure and cyclically and/or periodically releasing it to the water column 471 when the pressure therein falls below that outer atmospheric pressure.

Interspersed between the pairs of accumulator cylinders are cylindrical tanks or vessels 488-495 that provide buoyancy to the embodiment 470, and may contain water (serving as ballast) added or removed by pumps (not shown) controlled by an embodiment-specific control system (not shown).

Connected to a top portion of one cylindrical tank in each high-pressure accumulator is a duct, e.g., 496, with a respective turbine, e.g., 497, therein. Each turbine is operatively connected to a respective generator, and when air flows out of each high-pressure accumulator through its respective duct, and through its respective turbine therein, electrical power is generated by the operatively connected generator.

Likewise, connected to a top portion of one cylindrical tank in each low-pressure accumulator is a duct, e.g., 498, with a respective turbine, e.g., 499, therein. Each turbine is operatively connected to a respective generator, and when air flows into each low-pressure accumulator through its respective duct, and through its respective turbine therein, electrical power is generated by the operatively connected generator.

FIG. 28 shows a vertical cross-sectional view of the same embodiment illustrated in FIG. 27, wherein the vertical section is taken along section line 28-28 as specified in FIG. 27. The embodiment 470 floats adjacent to an upper surface 500 of a body of water. A tubular "water column" structure 471/501 with an open bottom 502 allows water to travel 503 in and out of the water column 501

As embodiment 470 rises and falls in response to passing waves, the embodiment is accelerated upward and downward (e.g., in approximate terms the waves move the embodiment in a vertically oscillatory motion in which the speed of movement varies in an approximately sinusoidal fashion). The water 504 within water column 501 has substantial inertia that inhibits its ability to rise and fall in unison with the embodiment, creating a phase difference in the up-and-down motions of the embodiment and the water enclosed within the water column 501. Moreover, because when rising toward a wave crest and falling from it afterwards the embodiment tends to "rise" and "sink" with imperfect synchronization, the effective draft of the embodiment tends to change during a wave cycle. This change in draft causes the pressure of the water outside the bottom mouth 502 of the water column to vary. When that pressure outside the bottom mouth 502 increases (reflecting an effectively greater depth of the water column mouth) water tends to enter the water column which tends to cause the surface 506 of that water 504 to rise. Conversely, when that pressure outside the bottom mouth 502 decreases (reflecting an effectively lesser depth of the water column mouth) water tends to leave the water column which tends to cause the surface 506 of that water 504 to fall.

When the effects of the water's 504 failure to accelerate up and down in synchrony with the water column 501 in which it is enclosed, is combined with the variations in the pressure at the mouth 502 of the water column 501, the result is a surface 506 of the water 504 within the water column that tends to move up and down out of phase with the up and down movements of the embodiment. This disparity in upward and downward movements of the embodiment and the water 504 within the embodiment's water column 501 tends to result in a cyclical compression and decompression of a volume of air (an "air pocket") 507 located adjacent to the top 471 of the water column 501.

When the air within the air pocket 507 is compressed, and the pressure of that air exceeds the pressure of the air within one or more high-pressure accumulators, e.g., accumulator 476-477, then a respective one-way valve, e.g., 508, positioned within a respective connecting pipe, e.g., 509, opens and pressurized air flows, e.g., 518, from the air pocket 507 into the innermost and/or centermost tank, e.g., 476, of the respective high-pressure accumulator.

The high-pressure air added to the high-pressure accumulator, e.g., 476, tends to push down on the water, e.g., 510, shared by and/or between the two high-pressure accumulator tanks, e.g., by 476 and 477, of the respective accumulator. As water 510 is displaced downward within the innermost and/or centermost tank, e.g., 476, of the respective high-pressure accumulator, water tends to flow 511B through a respective connecting orifice, e.g., 511A, into the respective connected tank, e.g., into 477. The difference 512 in the height of the water in a connected pair of high-pressure accumulator tanks, e.g., 476 and 477, creates "head pressure" that is exerted against the air trapped in the respective innermost and/or centermost tank, e.g., 476. And, in this embodiment, the air above the water in the respective outermost tank, e.g., 477, is compressed, storing pressure potential energy in that air and exerting a downward force upon the surface of the water in that respective outer tank.

Together, the displaced water and the compressed air resulting from an inflow of pressurized air into any one of the high-pressure accumulators preserves a portion of the potential energy of that compressed air. And, while compressed air tends to be added to the high-pressure accumulators impulsively, cyclically, and/or periodically, portions of that compressed air tend to flow out of each high-pressure accumulator's respective duct, e.g., 496, and through each duct's respective turbine, e.g., 497, at a relatively and/or approximately steady rate. The spinning of each high-pressure accumulator's respective turbine energizes an operatively connected generator (not shown) and generates electrical power.

When the volume of the air pocket 507 increases, and the air therein is decompressed, and the pressure of that air falls below the pressure of the air within one or more of the embodiment's low-pressure accumulators, e.g., accumulator 484-485, then a respective one-way valve, e.g., 513, positioned within a respective connecting pipe, e.g., 514, opens and relatively higher-pressure air tends to flow, e.g., 520, from the innermost and/or centermost tank, e.g., 484, of the respective low-pressure accumulator, into the air pocket 507. The removal of air from the innermost and/or centermost tank, e.g., 484, creates a partial vacuum that pulls up the water, e.g., 515, shared by and/or between the two tanks, e.g., shared by 484 and 485, of the respective low-pressure accumulator.

As water 515 is displaced upward within the innermost and/or centermost tank, e.g., 484, of the respective low-pressure accumulator, water tends to flow 516B through a respective connecting orifice, e.g., 516A, into the respective connected tank, e.g., into 484. The difference 517 in the height of the water in a connected pair of tanks, e.g., 484 and 485, creates "head pressure" that tends to pull against the air trapped in the respective innermost and/or centermost tank, e.g., 484, thereby reducing its pressure. And, in this embodiment, the air above the water in the respective outermost tank, e.g., 485, is decompressed, storing pressure potential energy (i.e., as a partial vacuum) in that air and exerting an upward force upon the surface of the water in that respective outer tank.

Together, the displaced water and the decompressed air resulting from the outflow of air from any one of the low-pressure accumulators into the air pocket 507 preserves a portion of the potential energy of that decompressed air. And, while air tends to be pulled from the low-pressure accumulators impulsively, cyclically, and/or periodically, atmospheric air tends to flow into, and/or replenish the air within, each low-pressure accumulator's respective duct, e.g., 498, and through each duct's respective turbine, e.g., 499, at a relatively and/or approximately steady rate. The spinning of each low-pressure accumulator's respective turbine energizes an operatively connected generator (not shown) and generates electrical power.

Figure 29:
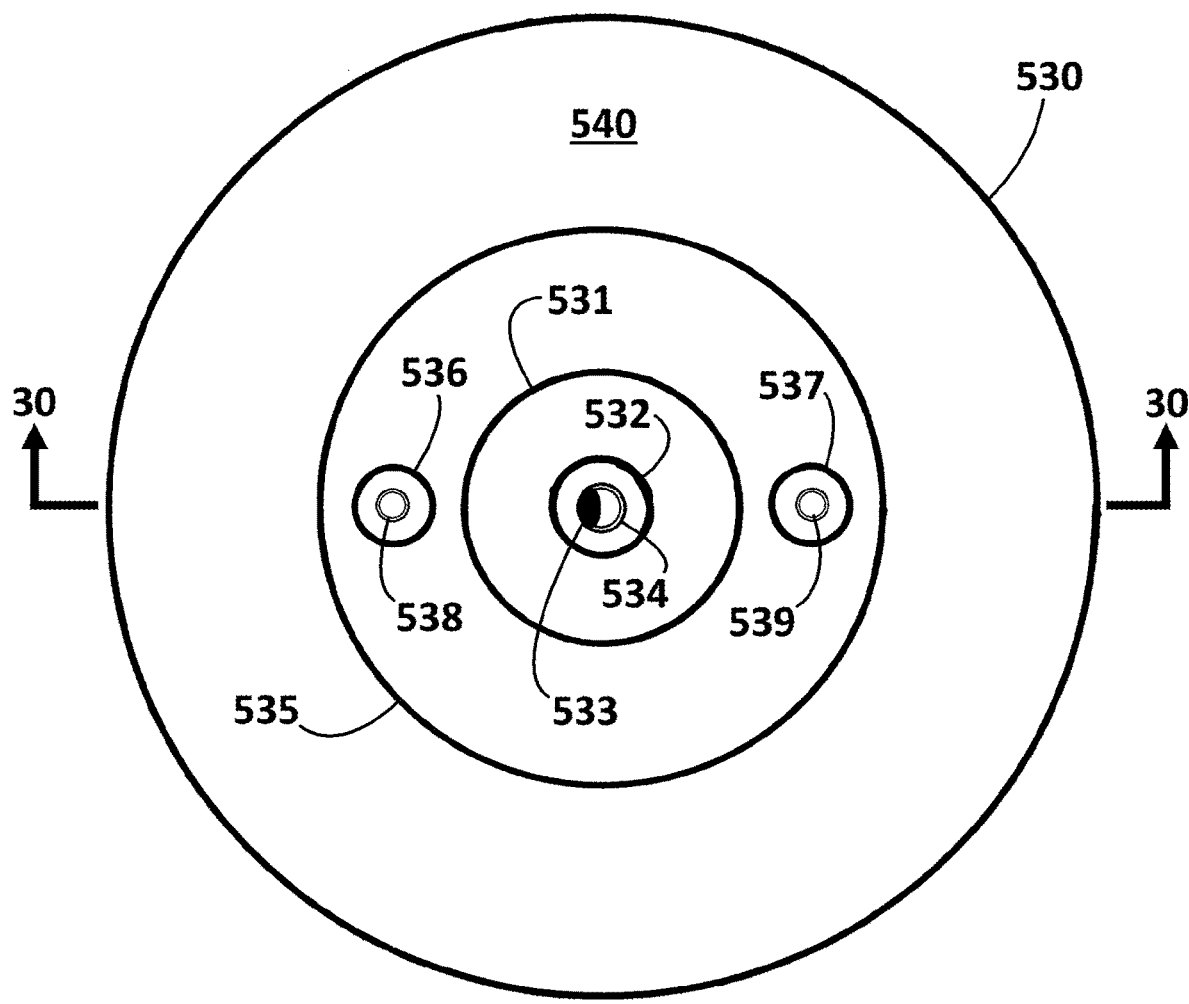
FIG. 29 is a top view of another embodiment of the present invention.

FIG. 29 shows a top-down view of an embodiment of the present invention. A buoy 530 floats adjacent to an upper surface of a body of water (not shown). An open-bottomed water column 531 is incorporated near the center of buoy 530 (with respect to a horizontal plane) and is approximately coaxial with a nominally vertical longitudinal axis of approximate radial symmetry of the embodiment.

Figure 30:
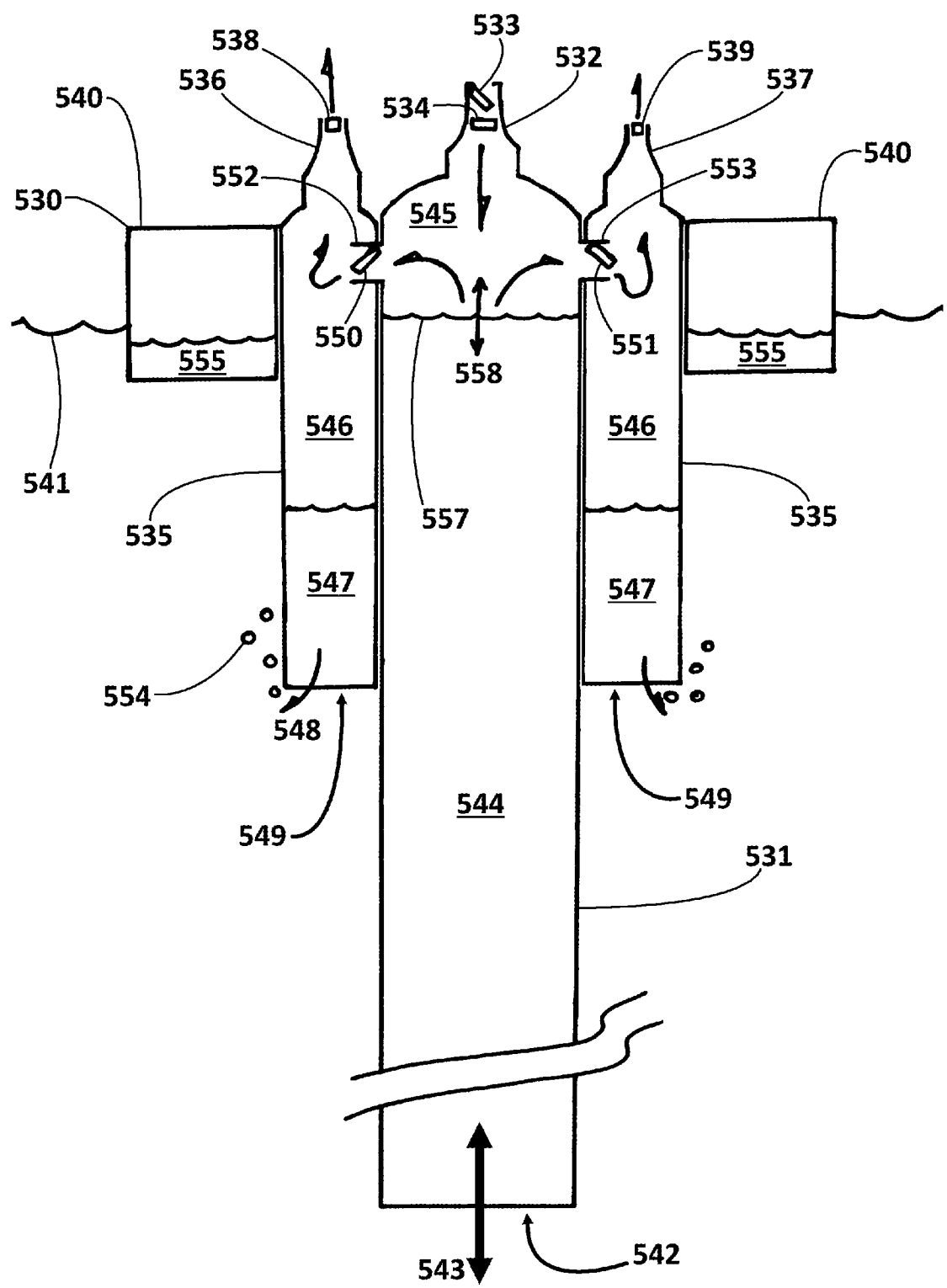
FIG. 30 is a cross sectional view of the embodiment of FIG. 29.
Figure 31:
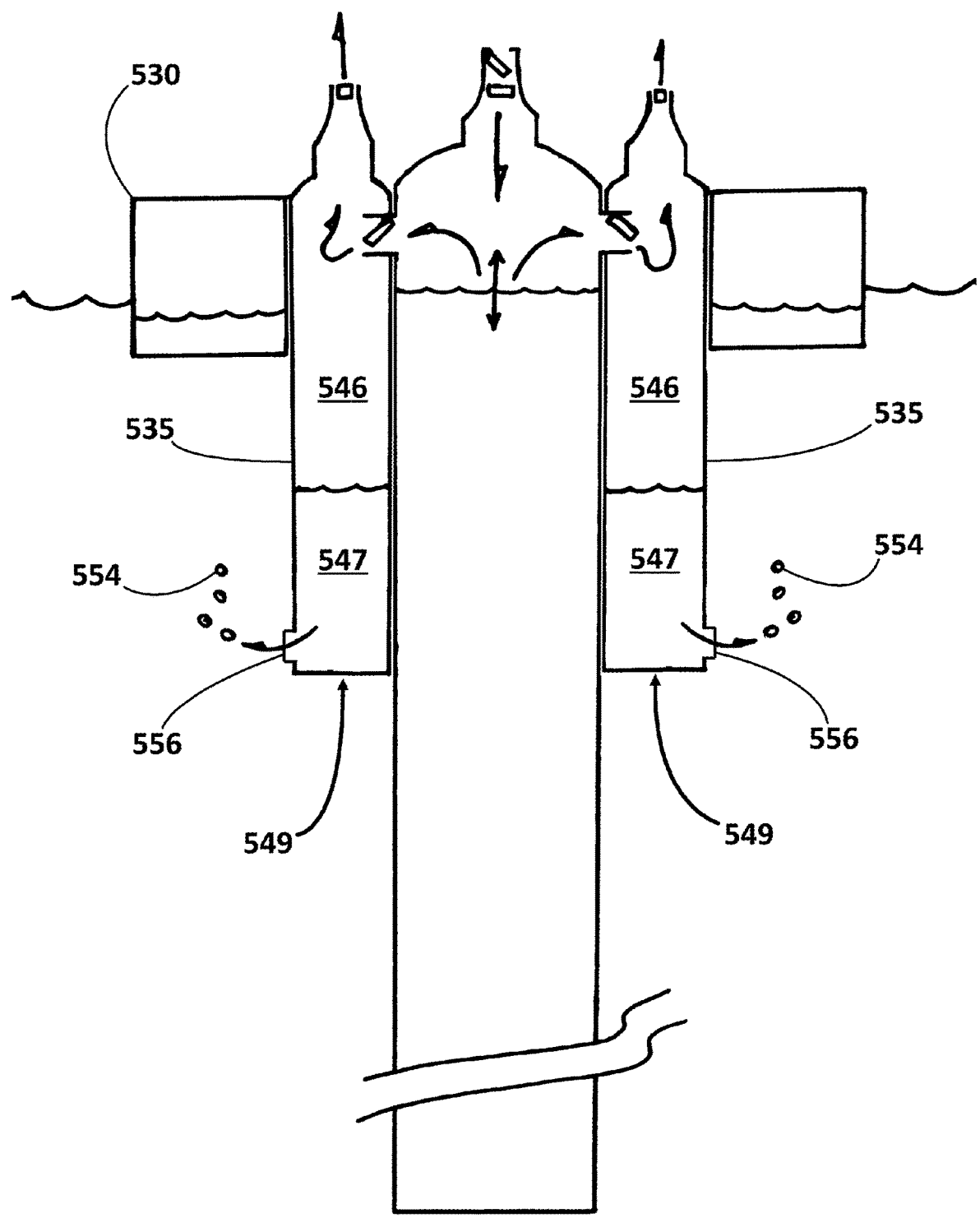
FIG. 31 is a cross sectional view of an alternate configuration of the embodiment of FIG. 29.

The embodiment illustrated in FIGS. 29-31 has a similar gross structure to that of the embodiments illustrated in FIGS. 1 and 4, namely, the embodiment illustrated in FIGS. 29-31 has an upper buoy portion, and the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of radial symmetry.

Unlike the embodiments illustrated in FIGS. 1 and 4, the buoy of the embodiment illustrated in FIGS. 29-31 is not comprised of a single hollow annular cylindrical structure, but instead is comprised of an inner hollow annular cylindrical structure, and a coaxial outer hollow annular cylindrical structure. Like the embodiments illustrated in FIGS. 1 and 4, the upper buoy portion of the embodiment illustrated in FIGS. 29-31 is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of approximate radial symmetry.

While top-down and sectional views are provided of the embodiment illustrated in FIGS. 29-31, because of the similarity in the large structural features of the embodiments illustrated in FIGS. 1, 4, and 29-31, perspective and side views of the embodiment illustrated in FIGS. 29-31 are omitted.

A duct 532 connected to an upper portion of the water column 531 contains a one-way valve 533 (partially open in the illustration) and a turbine 534 positioned within the duct 532 below that one-way valve 533 so that air flowing through the duct from the atmosphere outside the embodiment into the water column 531, to which it is connected, will tend to energize and/or to cause to rotate the turbine within the duct which, in turn, will tend to energize a generator (not shown) to which the turbine is operatively connected.

Connected to the water column 531 is an innermost annular chamber 535 that functions as both a buoyant element and as a high-pressure accumulator. The innermost annular chamber 535 is connected by pipes (not visible) to an air pocket at the top of the water column 531. Each pipe contains a one-way valve (not visible) that regulates the flow of air between an air pocket at the top of the water column 531, and an air pocket at the top of the annular high-pressure accumulator 535.

Two ducts 536 and 537 connected to an upper portion of the high-pressure accumulator 535, each contain a respective turbine 538 and 539, so that air flowing through each duct from the high-pressure accumulator to which it is connected to the atmosphere outside the embodiment will tend to energize and/or cause to rotate the duct's respective turbine and thereby to energize a generator to which each respective turbine is operatively connected.

Another larger diameter annular chamber 540, coaxial with the innermost annular chamber 535, is closed, sealed, and/or air tight, and contains water that serves as a ballast for the embodiment. Pumps (not shown) can add or remove water from the outermost annular chamber 540 in order to alter the mass, weight, and inertia of the embodiment and its draft.

FIG. 30 shows a vertical cross-sectional view of the same embodiment illustrated in FIG. 29, wherein the vertical section is taken along section line 30-30 as specified in FIG. 29. The embodiment 530 floats adjacent to an upper surface 541 of a body of water. A tubular "water column" structure 531 with an open bottom 542 allows water to travel 543 in and out of the water column 531.

When the embodiment 530 moves up and down in response to passing waves, the water 544 partially enclosed (except at the bottom 542) within the water column 531, and an upper surface 557 of that water, tends to move 558 up and down relative to the embodiment 530, alternately compressing and decompressing a pocket of air 545 trapped at the top of the water column 531.

When the water 544 moves up relative to the embodiment 530 and the water column 531 therein, the air pocket 545 is compressed. When the pressure of the air in the air pocket 545 is compressed to a point at which it is higher than the pressure of the air 546 within the high-pressure accumulator 535, then one-way valves 550 and 551, positioned inside of respective connecting pipes or orifices 552 and 553, open and pressurized air tends to flow from the air pocket 545 into the high-pressure accumulator 535, thereby pushing down the level, and/or reducing the volume, of the water 547 partially enclosed within the accumulator 535. Water 547 exits 548 the accumulator 535 through the open bottom 549 of the accumulator's annular chamber. And, when the volume or pressure of the air within the accumulator 535 decreases, water enters the accumulator through the same open bottom 549.

High pressure air 546 within the high-pressure accumulator 535 escapes to the atmosphere outside the embodiment through one of two exhaust ducts 536 and 537, passing through respective turbines 538 and 539 therein. The rotations of those turbines will cause respective operatively connected generators (not shown) to generate electrical power.

When the water 544 moves down relative to the embodiment 530 and the water column 531 therein, the air pocket 545 is expanded and decompressed, and the pressure of the air within that air pocket 545 is reduced. When the pressure of the air within air pocket 545 falls below the pressure of the air outside the embodiment (e.g., below atmospheric pressure), then one-way valve 533, inside intake duct 532, opens and air tends to flow from outside the embodiment into the depressurized air pocket 545 within the embodiment's water column 531. The inflowing air passes through a turbine 534 positioned within the intake duct 532 tending to cause that turbine to rotate. A generator (not shown) operatively connected to the turbine 534 generates electrical power in response to the turbine's rotations.

If the wave conditions are sufficiently energetic to cause pressurized air to be added to the high-pressure accumulator faster than it can be vented to the atmosphere, then the water 547 inside the accumulator will be pushed down further and further within the accumulator chamber 535. As the volume of air within the high-pressure accumulator increases, and, correspondingly, as the volume of water within the high-pressure accumulator decreases, the buoyancy of the embodiment 530 will increase, and the draft of the embodiment (e.g., the depth of the bottom mouth of its water column 531) will decrease, eventually raising the outer annular chamber 540 out of the water and significantly decreasing the embodiment's water plane area and its responsiveness to the waves, thereby tending to insulate the embodiment from a significant fraction and/or portion of the potentially excessive wave energy about it.

Conversely, if the wave conditions are sufficiently weak or poor so as to cause pressurized air to be depleted from the high-pressure accumulator faster than it can be replaced by cyclic and/or sufficiently vigorous compressions of the air pocket 545, then the air 546 inside the accumulator will tend to rise higher and higher within the accumulator chamber 535. As the volume of air within the high-pressure accumulator decreases, and, correspondingly, as the volume of water within the high-pressure accumulator increases, the buoyancy of the embodiment 530 will decrease, and the draft of the embodiment (e.g., the depth of the bottom mouth of its water column 531) will tend to increase, eventually, if the outer annular chamber 54- is not already displacing water from the body of water 541 on which the embodiment floats, lowering the outer annular chamber 540 into of the water 541 and significantly increasing the embodiment's water plane area and its responsiveness to the waves, thereby enabling the embodiment to capture a greater fraction and/or portion of the wave energy about it.

If the volume of pressurized air within the high-pressure accumulator 535 grows large enough, then at some point newly added pressurized air will push air out of the bottom of the accumulator chamber 535 and at least a portion of the newly added pressurized air will escape through the open bottom 549 of the accumulation chamber 535 as bubbles 554.

The outer annular chamber 540 contains water 555 as ballast. Pumps (not shown) can increase or decrease the volume, weight, and mass of water 555 contained or trapped within the outer annular chamber 540 in order to adjust the mass and draft of the embodiment.

FIG. 31 shows an alternate configuration of the embodiment illustrated in the vertical cross-sectional view embodiment illustrated in FIG. 30. Whereas the annular chamber of the high-pressure accumulator 535 in the embodiment of FIG. 30 has an open bottom 549 that allows water and surplus air to exit 548. The annular chamber of the high-pressure accumulator 535 of the embodiment configuration illustrated in FIG. 31 has a closed bottom 549. Water and surplus air within the accumulator 535 exits through apertures 556 in side of the annular chamber 535 proximate to its bottom 549. The use of a solid bottom on the high-pressure accumulator 535 chamber prevents wave-induced up and down motions of the embodiment from agitating the water inside the accumulator and causing unwanted oscillations in the pressure of the air 546 therein.

Figure 32:
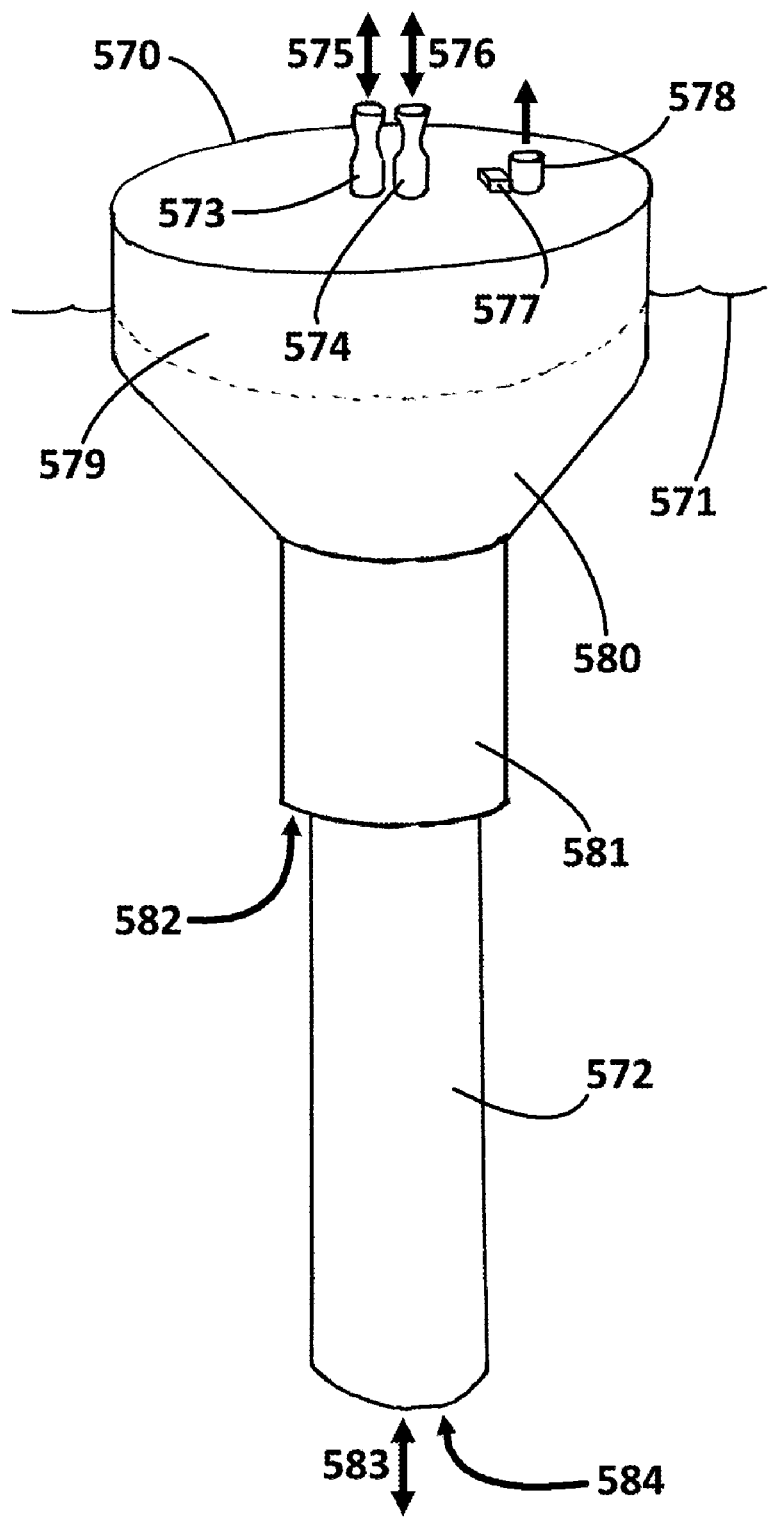
FIG. 32 is an elevated, perspective schematic view of another embodiment of the present invention.

FIG. 32 shows a side perspective view of an embodiment 570 of the present invention. A buoy 579-581 floats adjacent to an upper surface 571 of a body of water. An open-bottomed water column 572 is incorporated near the center of buoy 579-581, and is approximately coaxial with a nominally vertical longitudinal axis of approximate radial symmetry of the embodiment.

Two "bi-directional" ducts 573 and 574 (i.e., ducts through which air flows in both vertical directions, and/or both into the embodiment and out from the embodiment) are connected to an upper portion of the water column 572. Positioned inside each duct is a bi-directional turbine (not visible) so that air flowing 575 and 576 into, or out of, each respective duct 573 and 574 tends to impart rotational kinetic energy to the bi-directional turbine inside each respective duct. Respective generators (not shown) operatively connected to each turbine generate electrical power in response to rotations of their respective turbines.

A control circuit 577 attached to an upper surface of the embodiment 570 opens and closes a valve 578 that, when open, allows air to flow from a chamber inside the buoy 570 to the atmosphere outside the embodiment.

An upper portion 579 of the buoy 579-581 of the embodiment has an approximately cylindrical shape, a middle portion 580 of the buoy 579-581 has an approximately frusto-conical shape, and a lower portion 581 of the buoy 579-581 has an approximately cylindrical shape. The buoy 579-581 is approximately radially symmetrical, and coaxial with the tubular and/or cylindrical water column 572 positioned within it and extending from its lower end. An annular gap and/or channel 582 exists between the outer wall, e.g., 581, of the lower cylindrical portion of buoy 579-581, and the coaxial cylindrical water column 572, and that gap 582 allows water to move freely in and out of a hollow chamber (not visible) within the buoy.

Water is free to move 583 in and out of the open bottom 584 or mouth of the water column 572.

Figure 33:
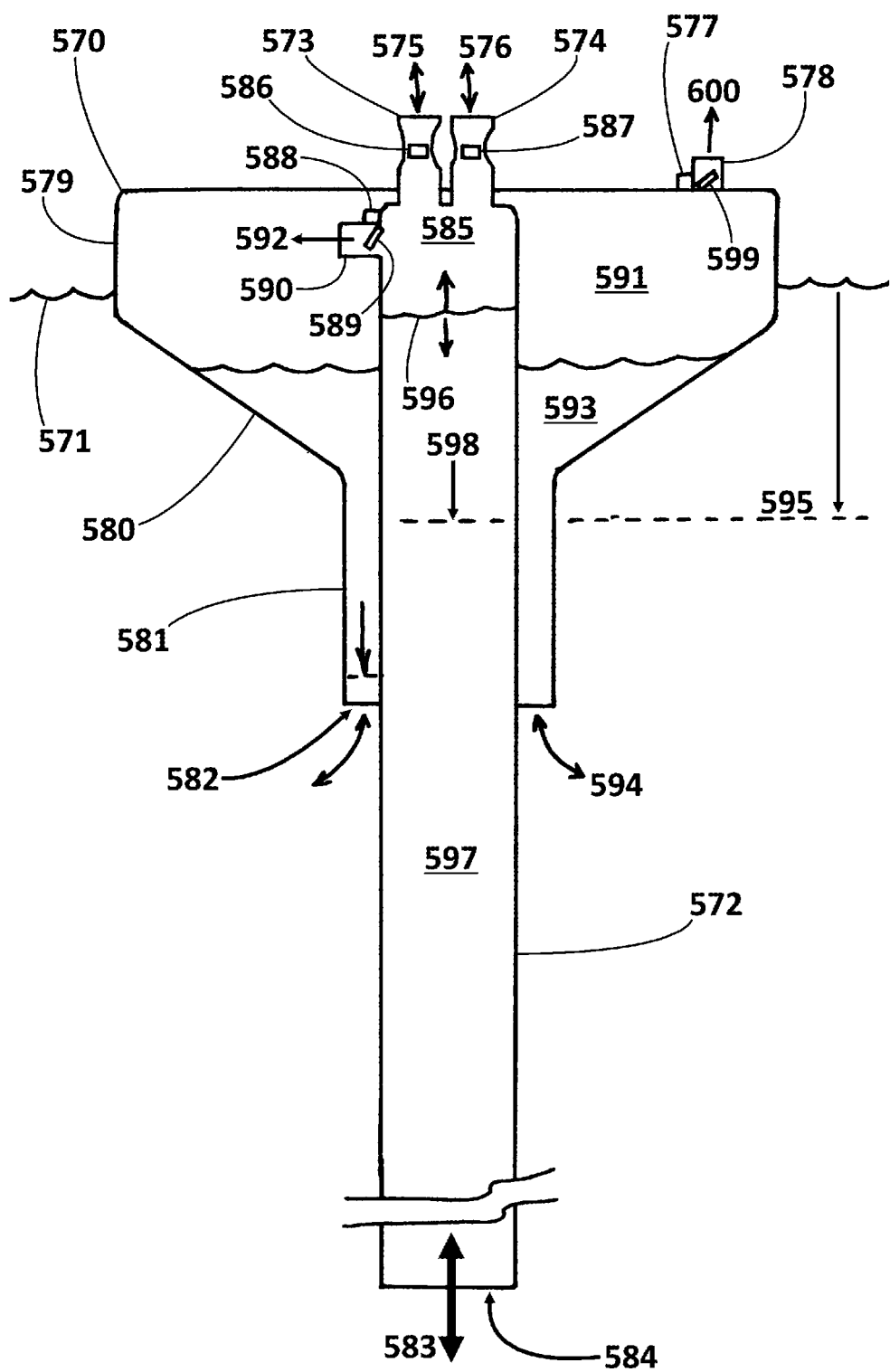
FIG. 33 is a cross sectional view of the embodiment of FIG. 32.

FIG. 33 shows a vertical cross-sectional view of the same embodiment illustrated in FIG. 32, wherein the section plane includes and/or passes through the centermost nominally vertical longitudinal axis of approximate radial symmetry of the embodiment, as well as includes and/or passes through the longitudinal axes of radial symmetry of the two bi-directional ducts 573 and 574.

The embodiment 570 floats adjacent to an upper surface 571 of a body of water. A tubular "water column" structure 572 with an open bottom 584 allows water to travel 583 in and out of the water column 572.

As the embodiment moves up and down in response to passing waves, water 597 within the water column 572 tends to move up and down as well although typically out of phase with the movements of the embodiment, causing air trapped within an air pocket 585 in an upper portion of water column 572 to be alternately compressed and expanded. When the air pocket 585 is compressed, pressurized air tends to be forced out 575 and 576 of bi-directional ducts 573 and 574, tending to cause respective turbines 586 and 587, therein to rotate, which, in turn, tends to cause respective generators (not shown) operatively connected to those turbines to be energized and to produce electrical power.

When the air pocket 585 is expanded and/or decompressed, and the pressure of the air therein is reduced to a level below that of the air outside the embodiment, e.g., below atmospheric pressure, then outside air tends to be drawn in 575 and 576 to the air pocket 585 through respective ducts 573 and 574, tending to cause respective turbines 586 and 587, therein to rotate, which, in turn, tends to cause respective generators (not shown) operatively connected to those turbines to be energized and to produce electrical power.

When a controller 588 opens a one-way valve 589 positioned within a pipe 590 or aperture connecting the air pocket 585 to a hollow chamber 591 within, and/or to the hollow interior of, the buoy 579-581, a portion of the compressed air periodically generated within the air pocket 585 is directed into the chamber 591 forcing at least a portion of a water ballast 593 out 594 of the buoy through an annular opening 582 between the buoy wall 581 and the water column wall 572. When the controller determines that a sufficient volume of compressed air has been injected into the chamber 591 it can close the one-way valve 589 and prevent the further ingress of compressed air, and the further reduction in the volume and mass of ballast water 593 within the buoy.

If a sufficient volume of compressed air is directed into the chamber 591 so as to drive out approximately all of the water ballast, and approximately fill the chamber 591 with air, then the embodiment's waterline can be moved down to a level 595, tending to place the waterline at the lower cylindrical portion 581 of the buoy. This will tend to have the consequence of moving the average height of the surface 596 of the water 597 partially enclosed within the water column 572 down to the same level 598 as the embodiment's waterline 595. Such a change will greatly increase the volume and height of the air pocket, thereby accommodating relatively large oscillations in the height 598 of the water 597, and its upper surface 596, within the water column 572 as it oscillates in response to wave-induced movements of the embodiment. In the absence of such an alteration in the height and/or vertical length of the air pocket 585, vigorous oscillations in the position of the water-column water's 597 surface 596 might send water up and out of the ducts 573 and 574, and therethrough the respective turbines 586 and 587 therein, which might damage those components.

When the embodiment's control system (not shown) determines that it is advantageous to increase the embodiment's draft and to raise its waterline 595 (e.g., back to a more nominal position such as at 571), then the control system activates a controller 577 which opens a valve 599 positioned within a pipe 578 or orifice connected to, or positioned within, an upper surface of the buoy 579 and/or the chamber 591, thereby allowing air within the chamber 591 to vent 600 to the atmosphere outside the embodiment 570. Such venting allows water 593 to enter and/or rise within the chamber 591 thereby increasing the embodiment's ballast and increasing the embodiment's draft, with the potential consequence of increasing the embodiment's waterplane area and its sensitivity to ambient wave motions.

When sufficient air has been released from the chamber 591, and the embodiment's draft has reached its target depth, then the embodiment's control system closes the valve 599 preventing the further egress of air from the chamber 591.

Figure 34:
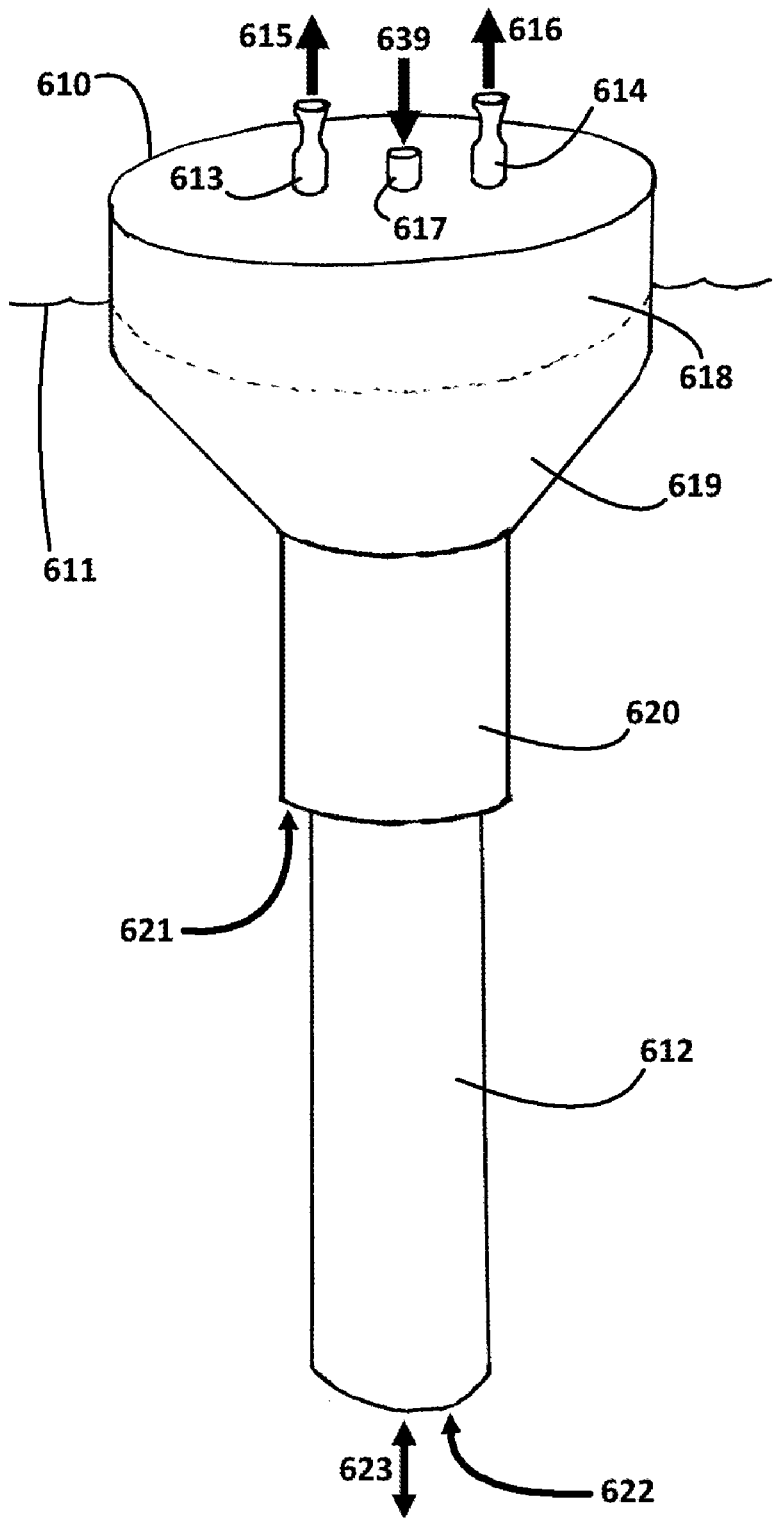
FIG. 34 is an elevated, perspective schematic view of another embodiment of the present invention.

FIG. 34 shows a side perspective view of an embodiment 610 of the present invention. A buoy 618-620 floats adjacent to an upper surface 611 of a body of water. An open-bottomed water column 612 is incorporated near the center of buoy 618-620.

Two exhaust ducts 613 and 614, i.e., ducts through which pressurized air flows 615 and 616, respectively, out of the embodiment, are connected to an upper portion of the embodiment 610. Positioned inside each duct is a turbine (not visible) so that air flowing 615 and 616 out of each respective duct 613 and 614 tends to impart rotational kinetic energy to each respective turbine inside each duct. Respective generators (not shown) operatively connected to each turbine generate electrical power in response to rotations of their respective turbines.

An intake duct 617, through which atmospheric air outside the embodiment may flow 639 into the embodiment, is connected to an upper portion of the embodiment 610. Positioned inside the duct is a turbine (not visible) so that air flowing 639 into the duct 617 tends to impart rotational kinetic energy to the turbine therein. A generator (not shown) is operatively connected to the turbine and tends to generate electrical power in response to rotations of its operatively connected turbine.

An upper portion 618 of the buoy 618-620 has an approximately cylindrical shape. A middle portion 619 of the buoy 618-620 has an approximately frusto-conical shape. Below that middle portion 619 of the buoy 618-620 has a cylindrical shape and a lateral wall that is offset from the embodiment's approximately cylindrical water column 612, providing an annular gap 621 through which water may flow into and out from a hollow chamber (not visible) inside the buoy 610. Air trapped within the hollow chamber of the buoy 618-620 may also flow out and into the water 611 on which the embodiment floats through annular gap 621.

The embodiment's water column 612 is open at the bottom 622 allowing water to freely move 623 in and out of the water column.

Figure 35:
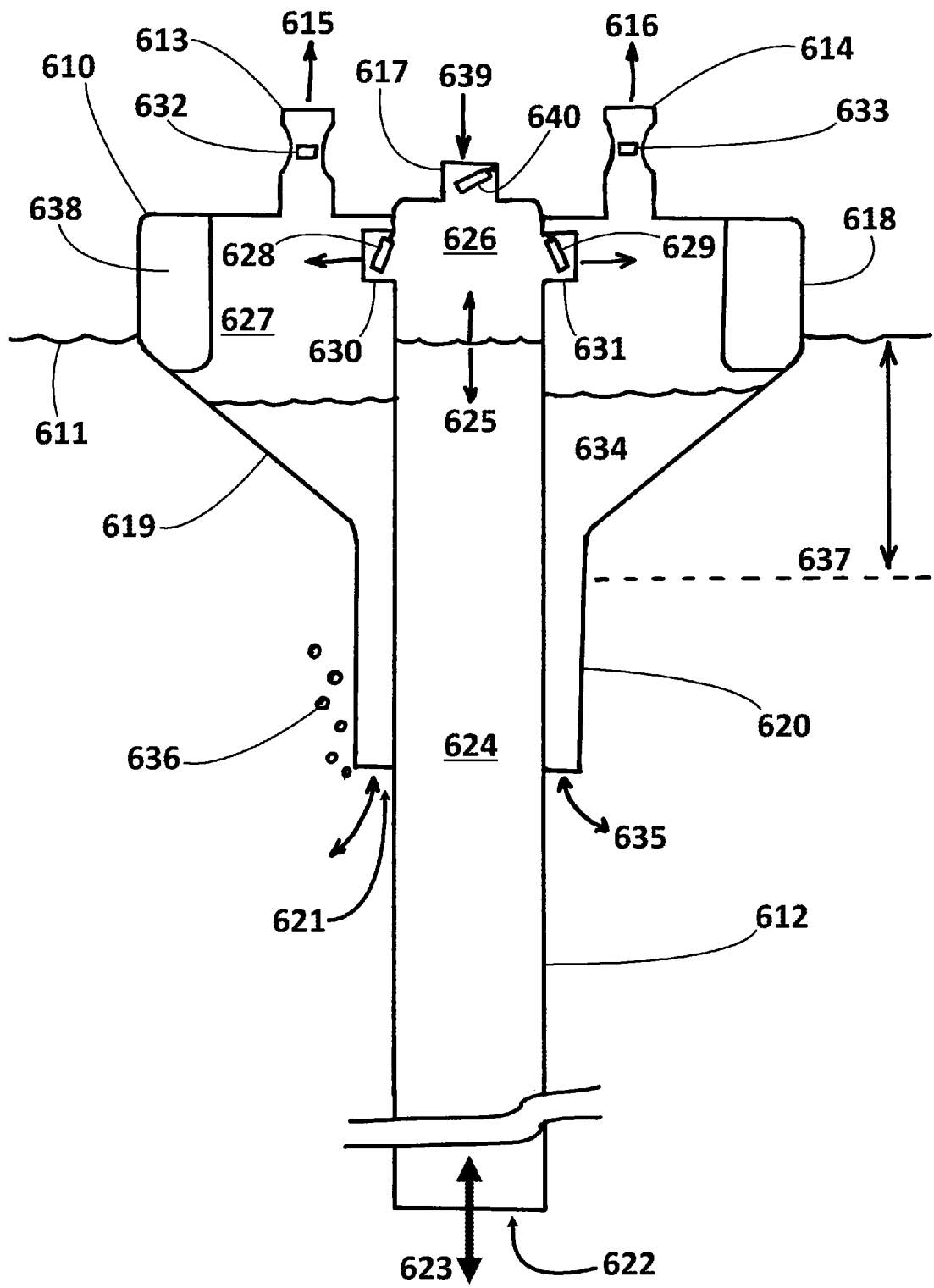
FIG. 35 is a cross sectional view of the embodiment of FIG. 34.

FIG. 35 shows a vertical cross-sectional view of the same embodiment illustrated in FIG. 34, wherein the section plane includes and/or passes through the nominally vertical longitudinal axis of approximate radial symmetry of the embodiment, and also includes and/or passes through the longitudinal axes of radial symmetry of the two ducts 613 and 614.

The embodiment 610 floats adjacent to an upper surface 611 of a body of water. A tubular "water column" structure 612 with an open bottom 622 allows water to travel 623 in and out of the water column 612. As the embodiment 610 moves up and down in response to waves traveling across the surface 611 of the water on which the embodiment floats, water 624 moves 625 up and down within the water column 612, and typically moves relative to the embodiment, tending to cause air within an air pocket 626 located in an upper portion of the water column 612 to be cyclically and/or periodically compressed and expanded, thereby tending to cause the pressure of that air to oscillate between relatively high and low pressures.

When the pressure of the air within the embodiment's air pocket 626 falls below the pressure of the air outside the embodiment, air tends to be drawn in 639 through an intake duct, vent, aperture, or orifice 617 integrated within an upper surface of the water column 612. The intake duct 617 contains a one-way valve 640 that tends to open when the pressure of the air outside the embodiment exceeds the pressure of the air within the air pocket 626, thereby allowing atmospheric air to enter the air pocket 626. The intake duct's 617 one-way valve 640 tends to close when the pressure inside the air pocket 626 is greater than or equal to the pressure of the air outside the embodiment.

When the pressure of the air within the air pocket 626 becomes greater than the pressure of the air within a hollow chamber 627 within the buoy portion 618 of the embodiment, a pair of one-way valves 628 and 629, positioned within respective ducts, vents, apertures, or orifices 630 and 631, tend to open thereby allowing pressurized air to flow from the air pocket 626 into the chamber 627. When the pressure of the air within the chamber 627 is greater than or equal to the pressure of the air within the air pocket 626, the one-way valves 628 and 629 tend to close, thereby trapping high-pressure air within the chamber 627.

High-pressure air within the chamber 627 tends to escape 615 and 616 and/or be vented to the atmosphere by flowing through two respective exhaust ducts 613 and 614, and therethrough respective turbines 632 and 633. Air flowing through turbines 632 and 633 tends to impart rotational kinetic energy to those turbines and to the rotors of respective generators (not shown) operatively connected to the turbines.

If air is added to the chamber 627 faster than it escapes 615 and 616, then pressurized air tends to accumulate within the chamber 627. When pressurized air accumulates within the chamber 627, that surplus air tends to push down on the water ballast 634 thereby forcing a portion of it out 635 of the chamber 627 and thereby reducing the mass, weight, inertia, and draft of the embodiment 610 in the process. If the volume of surplus air grows to a sufficient volume, then additional air added to the chamber 627 from and/or by the air pocket 626 will tend to cause air to escape 636 through an annular gap 621 between buoy wall 620 and water-column wall 612. If the chamber is completely filled with air, then the waterline of the embodiment will move to its lowest position 637, and the embodiment's draft will achieve its minimal value or depth, and the embodiment's waterplane area will be significantly reduced thereby significantly reducing the sensitivity of the embodiment to the energy of the ambient waves.

If air is added to the chamber 627 more slowly than it escapes 615 and 616, then the loss of air within the chamber 627 will tend to draw additional water in 635 into chamber 627, thereby increasing the mass, weight, inertia, and draft of the embodiment 610 in the process. If enough air is lost from the chamber 627, then sufficient buoyancy to prevent the embodiment from sinking will be maintained by an annular ring of buoyant material 638 (e.g., closed cell foam) to keep the embodiment afloat and to keep its waterline and draft at appropriate levels. As the volume of water within the chamber 627 increases, and the embodiment's waterline rises, the embodiment's waterplane area will tend to increase, thereby increasing the sensitivity of the embodiment to the energy of the ambient waves.

Thus, in energetic sea states when pressurized air will tend to be added to the chamber 627 faster than it can be vented 615-616 through the embodiment's turbines 632-633, the embodiment will tend to rise up out of the water and thereby reduce its waterplane area, which, in turn, will tend to reduce the amount of energy that the embodiment captures from the ambient waves, which will tend to reduce the rate at which pressurized air is added to the chamber 627. And, in weak and/or suboptimal sea states when pressurized air will tend to be added to the chamber 627 more slowly than it is vented 615-616 through the embodiment's turbines 632-633, the embodiment will tend to sink down into the water and thereby increase its waterplane area, which, in turn, will tend to increase the amount of energy that the embodiment captures from the ambient waves, which will tend to increase the rate at which pressurized air is added to the chamber 627. The embodiment 610 tends to self-regulate the amount of energy that it captures from ambient waves so as to add pressurized air to its chamber 627 at approximately the same rate at which it vents pressurized air from chamber 627 to the atmosphere through its turbines.

Figure 36:
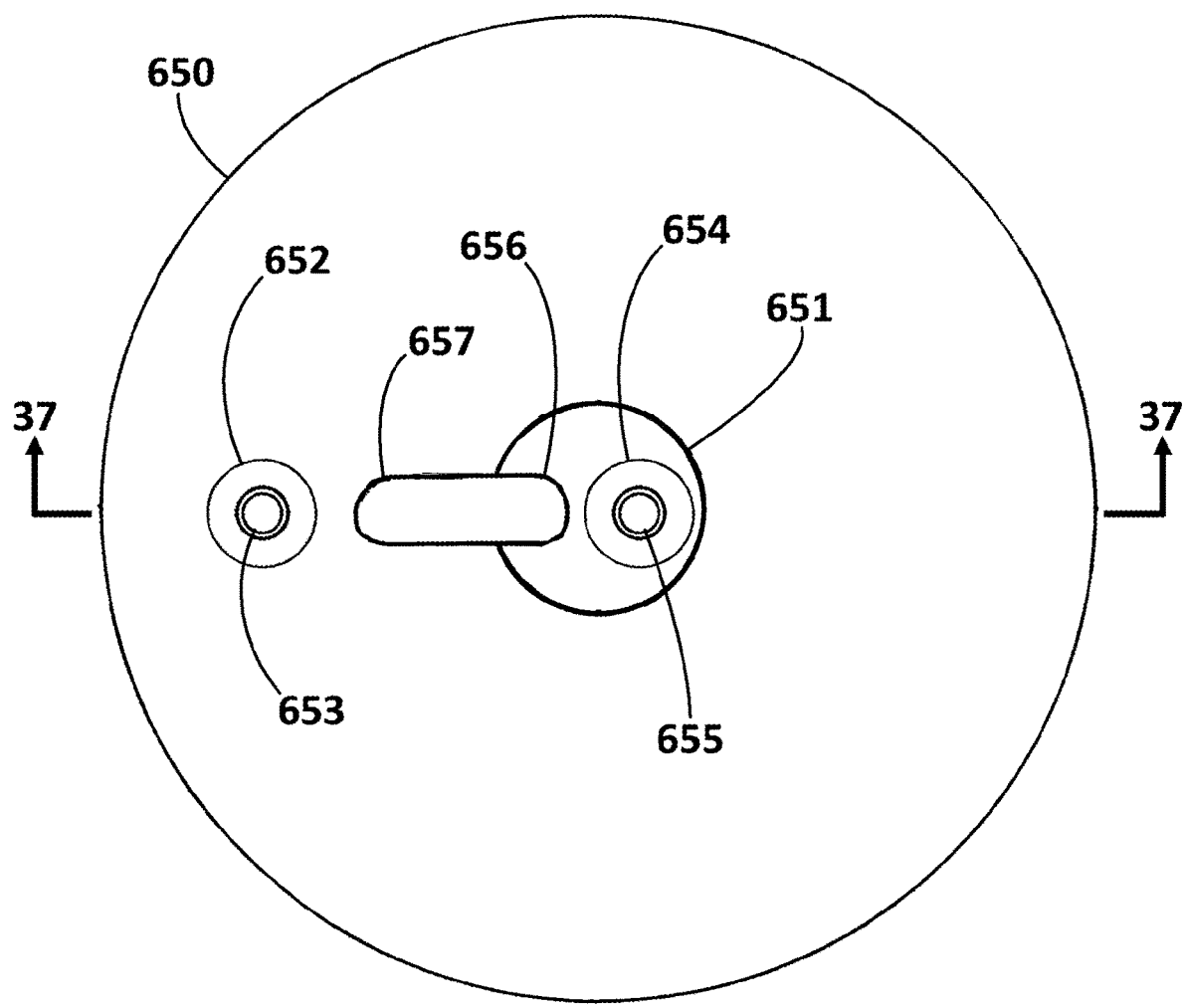
FIG. 36 is a top view of another embodiment of the present invention.

FIG. 36 shows a top-down view of an embodiment of the present invention. A buoy 650 floats adjacent to an upper surface of a body of water (not shown). An open-bottomed water column 651 is incorporated near the horizontal center of buoy 650.

The embodiment illustrated in FIGS. 34 and 35 has a similar gross structure to that of the embodiments illustrated in FIGS. 32-35, namely, the embodiment illustrated in FIGS. 34 and 35 has an upper buoy portion comprised of an uppermost cylindrical portion, a middle frustoconical portion, and a lowermost cylindrical portion. And, like the embodiments illustrated in FIGS. 32-35, the embodiment illustrated in FIGS. 34 and 35 has an annular gap between the buoy wall and the wall of the water column to which it is connected. While top-down and sectional views are provided of the embodiment illustrated in FIGS. 34 and 35, because of the similarities in the large structural features of the embodiments illustrated in FIGS. 32-35 and 34-35, perspective and side views of the embodiment illustrated in FIGS. 34 and 35 are omitted.

An exhaust duct 652 (i.e., a duct through which pressurized air flows out of the embodiment) is connected to an upper portion of the embodiment 650. Positioned inside the exhaust duct 652 is a turbine (not visible beneath an operatively connected generator 653) such that air flowing out of exhaust duct 652 tends to impart rotational kinetic energy to the turbine. A generator 653 operatively connected to the turbine tends to generate electrical power in response to rotations of the turbine.

An intake duct 654 (i.e., a duct through which atmospheric air outside the embodiment tends to flow into the water column 651) is connected to an upper portion of the water column 651. Positioned inside the intake duct 654 is a turbine (not visible beneath an operatively connected generator 655) such that air flowing in through the intake duct 654 tends to impart rotational kinetic energy to the turbine. A generator 655 operatively connected to the turbine tends to generate electrical power in response to rotations of the turbine.

One end 656 of a connecting pipe 656-657 is connected to an upper portion of the water column 651. Another end 657 of the connecting pipe 656-657 is connected to an upper portion of the buoy, and to a hollow chamber therein.

The connecting pipe 656-657 contains a one-way valve (not visible) therein that tends to open, and/or is open, and allows air to flow from the water column 651 into the hollow chamber (not visible) within the buoy 650 when the pressure of the air within an upper portion of the water column 651 is greater than the pressure of the air inside the chamber. When the pressure of the air inside the chamber is greater than the pressure of the air inside the water column 651, the one-way valve tends to close, and/or is closed.

Figure 37:
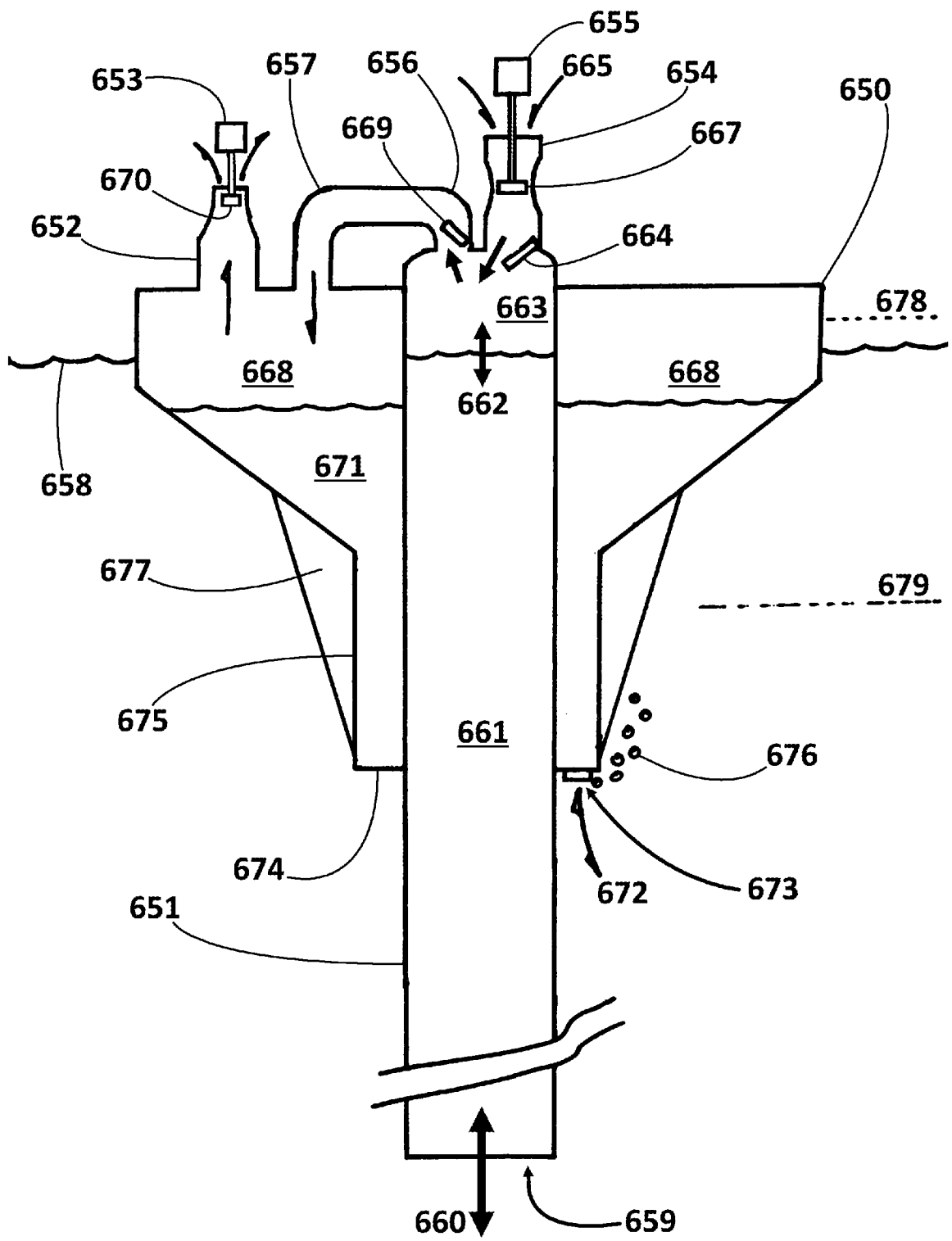
FIG. 37 is a cross sectional view of the embodiment of FIG. 36.

FIG. 37 shows a vertical cross-sectional view of the same embodiment illustrated in FIG. 36, wherein the vertical section is taken along section line 37-37 as specified in FIG. 36.

The embodiment 650 floats adjacent to an upper surface 658 of a body of water. A tubular "water column" structure 651 with an open bottom 659 allows water to travel 660 in and out of the water column 651. As the embodiment 650 moves up and down in response to waves traveling across the surface 658 of the water on which the embodiment floats, water 661 moves 662 up and down within the water column 651, and tends to move relative to the embodiment, tending to cause air within an air pocket 663 located in an upper portion of the water column 651 to be cyclically and/or periodically compressed and expanded, thereby tending to cause its pressure to oscillate between relatively high and low pressures.

When the water 661 in the water column 651 moves down relative to the embodiment, the volume of the air pocket 663 is expanded, and the pressure of the air therein is reduced. When the pressure of the air within the air pocket 663 falls below the pressure of the air outside the embodiment 650, a one-way valve 664 tends to open and air from outside the embodiment flows 665 into the intake duct 654, and through a turbine 667 therein, tending to cause the turbine 667 to rotate and energize a generator 655 operatively connected (by a shaft) thereto, resulting in the generation of electrical power.

When the pressure of the air inside the air pocket 663 once again increases and is once again greater than the pressure of the air outside the embodiment, then one-way valve 664 tends to close.

When the water 661 in the water column 651 moves up relative to the embodiment, the volume of the air pocket 663 is reduced, and the pressure of the air therein is increased. When the pressure of the air within the air pocket 663 increases to the point that it becomes greater than the pressure of the air inside a hollow chamber 668 inside the buoy 675, then a one-way valve 669 tends to open thereby allowing air to flow from the air pocket 663 into the hollow chamber 668 inside the buoy.

When the pressure of the air inside the hollow chamber 668 increases to the point that it becomes greater than the pressure of the air inside the air pocket 663, and/or the pressure of the air inside the air pocket 663 decreases to the point that it becomes less than the pressure of the air inside the hollow chamber 668, then one-way valve 669 tends to close thereby tending to trap the relatively highly pressurized air inside the hollow chamber 668.

Pressurized air inside the hollow chamber 668 tends to escape and/or vent to the atmosphere outside the embodiment through exhaust duct 652, passing through turbine 670 therein and tending to cause it to rotate, which in turn, tends to energize operatively connected (by a shaft) to generator 653, thereby resulting in the generation of electrical power.

If pressurized air flows into the chamber 668 faster than it flows out of that chamber through exhaust duct 652, then the water 671 enclosed within the chamber 668, and providing the embodiment with additional mass and ballast, will tend to flow out 672 of an opening, orifice, and/or aperture 673 positioned at the bottom of a flat annular surface 674 spanning, joining, and connecting an outer wall 675 of the buoy and a wall 651 of the water column. If the chamber 668 fills with air, and completely expels the water ballast 671, then additional air added to the chamber 668 will force air from the buoy 650, through aperture 673, thereafter tending to rise to or toward the surface 658 of the body of water on which the embodiment floats, as bubbles 676.

Supplemental buoyancy is provided by material 677 (e.g., closed cell foam) attached to the buoy 675. When filled with the maximum possible amount of water ballast, and the minimum amount of air 668, the supplemental buoyancy 677 limits the height of the waterline 678 to, and/or from exceeding, a limiting height 678. By contrast, when filled with the maximum possible amount of air (and the minimum possible amount of water ballast), the embodiment's waterline may fall as low as 679.

In vigorous waves and/or wave states that threaten to damage the embodiment, the resistive torque generated by the exhaust turbine's generator 653 can be increased such that the turbine 670 will tend to retard and/or obstruct the flow of air out of the chamber 668. Likewise, in vigorous and potentially dangerous waves and/or wave states the resistive torque generated by the intake turbine's generator 655 can be decreased such that the turbine 667 will tend to more freely permit, and/or facilitate, the flow of air into the air pocket and chamber 668. Either and/or both of these configurational changes will tend to reduce the embodiment's ballast water 671, thereby tending to lower its waterline and reduce its draft, which will tend to reduce the waterplane area of the embodiment, thereby tending to reduce the ability of the embodiment to capture energy from the ambient waves and/or tending to lift the embodiment, to a degree, above the waves and help protect it from damage.

In relatively weak waves, the resistive torque generated by the exhaust turbine's generator 653 can be decreased so as to increase and/or facilitate the flow of air out of the chamber 668, and/or the resistive torque generated by the intake turbine's generator 655 can be increased so as to decrease and/or obstruct the flow of air into the air pocket and chamber 668. Either and/or both of these configurational changes will tend to increase the embodiment's ballast water 671, thereby tending to raise its waterline and increase its draft, which will tend to increase the waterplane area of the embodiment, thereby tending to increase the ability of the embodiment to capture energy from the ambient waves and/or tending to lower the embodiment, to a degree, further into the waves and help it to capture a greater proportion and/or fraction of the relatively meager energy available in the ambient waves.

Figure 38:
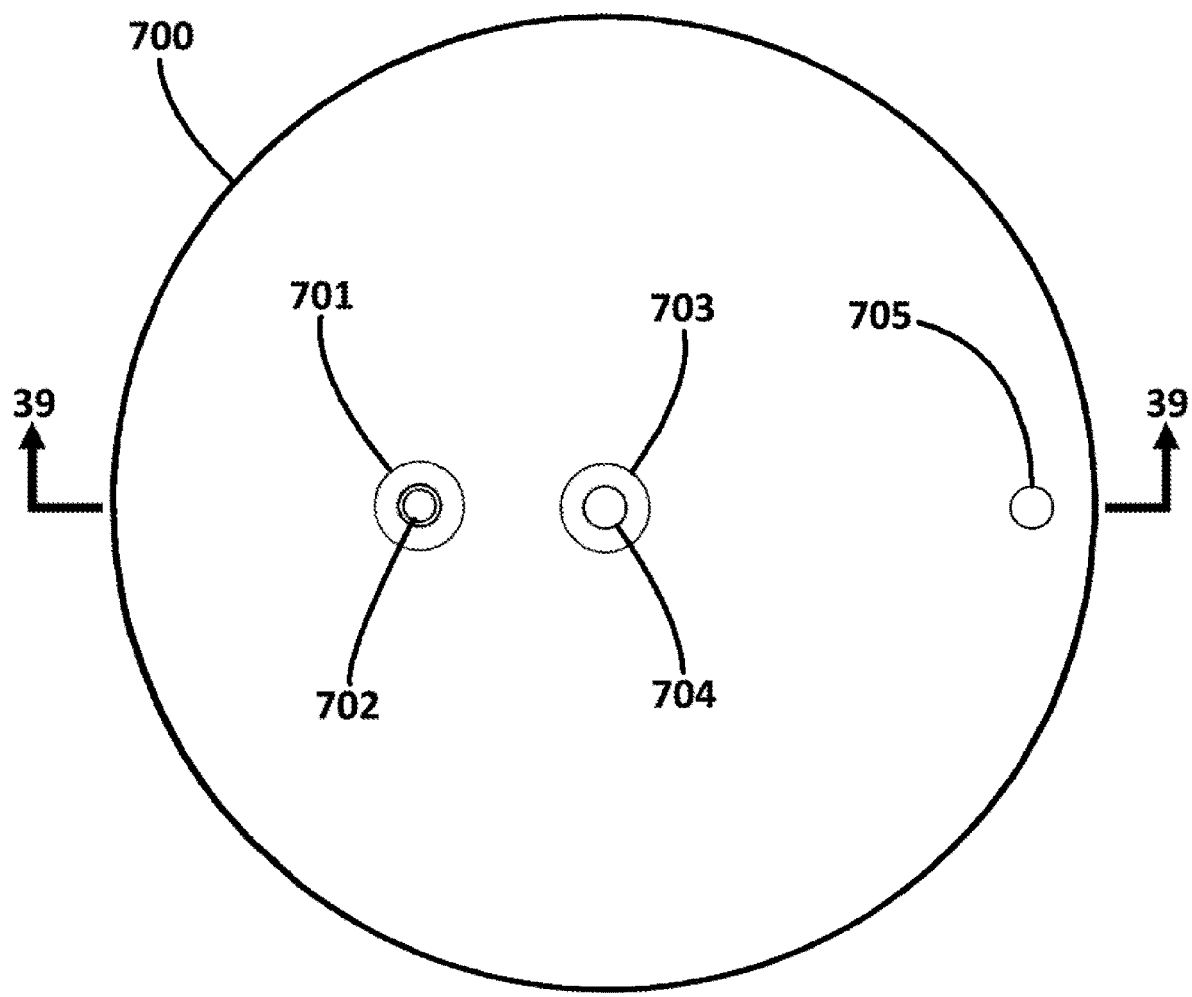
FIG. 38 is a top view of another embodiment of the present invention.

FIG. 38 shows a top-down view of an embodiment of the present invention.

Figure 39:
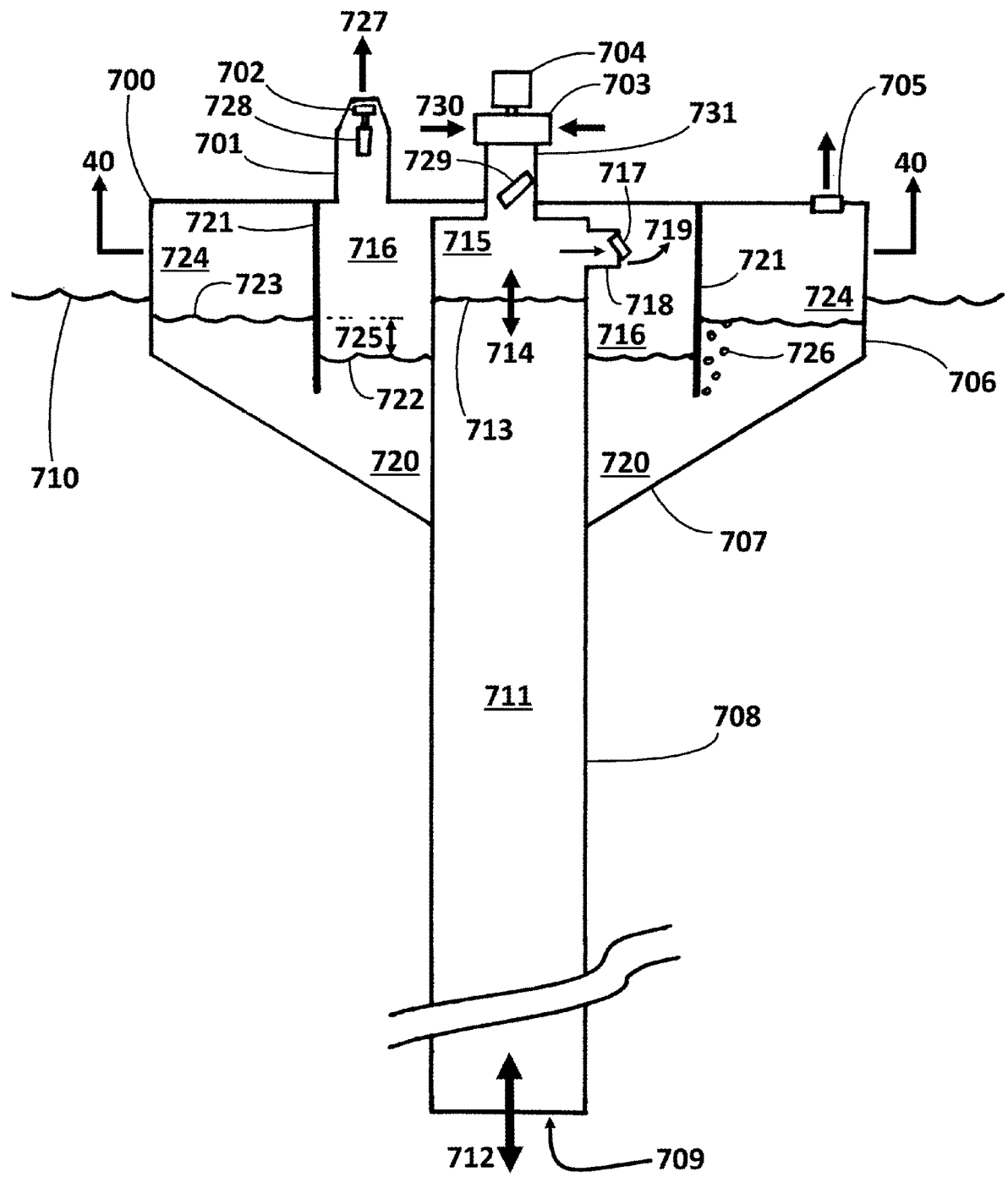
FIG. 39 is a cross sectional view of the embodiment of FIG. 38.
Figure 40:
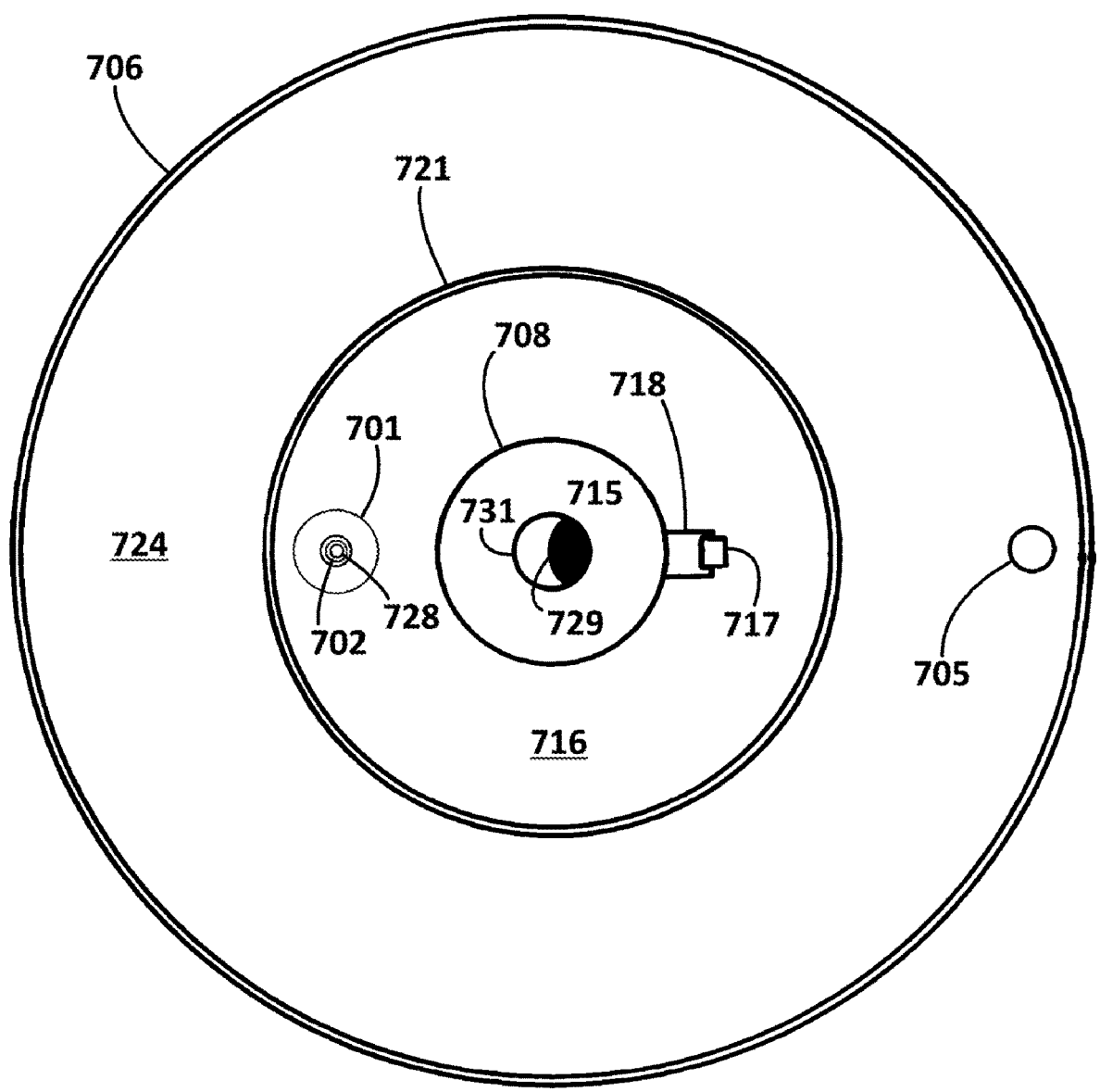
FIG. 40 is a top view of another embodiment of the present invention.

The embodiment illustrated in FIGS. 38-40 has a similar gross structure to that of the embodiment illustrated in FIG. 1, namely, the embodiment 700 illustrated in FIGS. 38-40 has an upper buoy portion comprised of an uppermost cylindrical portion and a lowermost frustoconical portion. And, the upper buoy portion is attached and/or connected to a central hollow tubular structure having an uppermost portion positioned inside the buoy portion, and a lowermost portion that extends out and through the bottom of the buoy, such that the buoy and the tubular structure share a nominally vertical longitudinal axis of approximate radial symmetry. While top-down and sectional views are provided of the embodiment illustrated in FIGS. 38-40, because of the similarity in the large structural features of the embodiments illustrated in FIGS. 1 and 38-40, perspective and side views of the embodiment illustrated in FIGS. 38-40 are omitted.

An exhaust turbine 702 positioned within an exhaust duct 701 vents pressurized air from a high-pressure accumulator (not visible within the embodiment) to the atmosphere whenever the pressure of the air within the high-pressure accumulator, to which the exhaust duct is connected, exceeds that of the air outside the embodiment, e.g., is greater than atmospheric pressure. Rotations of the exhaust turbine 702 tends to cause an operatively connected exhaust generator (not visible below the exhaust turbine) to generate electrical power.

An intake turbine 703 positioned atop, and operatively connected to, an intake duct (not visible below the intake turbine) admits atmospheric air into the embodiment whenever the pressure of the air within an air pocket at the top of the water column, to which the intake duct is connected, falls below that of the air outside the embodiment, e.g., below atmospheric pressure. Rotations of the intake turbine 703 tends to cause an operatively connected intake generator 704 to generate electrical power.

A pressure-actuated pressure relief valve 705 allows pressurized air within the embodiment's high-pressure accumulator to vent to the atmosphere if the pressure of the air within the embodiment's high-pressure accumulator exceeds a threshold pressure, and/or level. A similar embodiment has a pressure relief valve 705 that is controlled electrically by the embodiment's control system (not shown).

FIG. 39 shows a vertical cross-sectional view of the same embodiment illustrated in FIG. 38, wherein the vertical section is taken along section line 38-38 as specified in FIG. 38.

The embodiment 700 has a buoyant portion 706-707 comprised of an upper cylindrical portion 706 and a lower frustoconical portion 707. Embedded within, and/or connected to, the embodiment's buoy 706-707 is a water column 708 and/or tube that is positioned so as to be approximately coaxial with the buoy about a nominally vertical longitudinal axis of approximate radial symmetry.

At its lower end 709, the water column 708 is open to the body of water 710 upon which the embodiment floats. When waves buffet the embodiment, and cause the embodiment to rise and fall, the inertia of the water 711 within the water column prevents it from precisely and/or synchronously matching the vertical movements of the embodiment 700. This inertial latency is combined with variations in the depth pressure of the water outside the water column's bottom mouth 709 resulting from the failure of the embodiment to precisely and/or synchronously match the vertical movements of the surface 710 of the water on which the embodiment floats, results in a movement of the water within the embodiment's water column relative to the embodiment itself. The movement of the water 711 within the water column 708 causes and/or is facilitated by the freedom of water to move 712 in and out of the water column's bottom mouth 709.

As a result of the non-synchronous and/or out-of-phase variations in the vertical oscillations of the water 711 within the embodiment's water column 708 and the embodiment itself, the upper surface 713 of the water 711 within the water column 708 tends to move 714 up and down relative to the upper end of the water column 708, thereby tending to cause a pocket of air 715 adjacent to the upper end of the water column to be alternately compressed and decompressed.

The embodiment incorporates a high-pressure accumulator 716 which comprises and/or constitutes an approximately annular chamber in which air of relatively high pressure is stored, cached, and/or trapped. When the volume of the air pocket 715 is reduced as a result of an upwelling of the surface 713 of the water 711 within the water column 708, the air therein is compressed and its pressure tends to increase. When the pressure of the air within the air pocket 715 exceeds the pressure of the air with the embodiment's high-pressure accumulator 716 then one-way valve 717 within pipe and/or aperture 718 tends to open thereby allowing a portion of the relatively high-pressure air within the air pocket 715 to flow 719 into the high-pressure accumulator 716. When the pressure of the air within the air pocket 715 subsequently drops to become less than or equal to the pressure of the air within the high-pressure accumulator 716, then the one-way valve 717 tends to close and preserve the pressure of the air within the accumulator 716.

Inside the buoy 706-707 is a cylindrical accumulator wall 721 that is approximately coaxial with a nominally vertical longitudinal axis of approximate radial symmetry of the both the buoy 706-707 and the water column 708. The cylindrical accumulator wall 721 divides the water ballast 720 within the hollow interior of the buoy into inner and outer annular accumulator pools of water the upper surfaces of which 722 and 723, respectively, are separated by the accumulator wall but the lower portions of which are fluidly connected thereby allowing water to move freely between the inner and outer annular accumulator pools.

When relatively high-pressure air is added to the high-pressure accumulator 716, the air within the accumulator tends to push against the surface 722 of the inner accumulator pool. The pressure exerted on the surface 722 of the inner accumulator pool tends to push that surface downward thereby tending to raise the surface 723 of the outer accumulator pool, and compress the air trapped within that outer accumulator air pocket 724. The difference in the relative heights of the surfaces of the inner 722 and outer 723 accumulator pools represents a hydrostatic and/or head pressure.

If the volume of relatively high-pressure air added to the high-pressure accumulator 716 exceeds the volume defined and/or provided by the cylindrical accumulator wall 721 then air from the high-pressure accumulator 716 will tend to flow past the bottom edge of the accumulator wall 721 and bubble 726 into the outer accumulator air pocket 724 and tending to become trapped therein. If the volume and/or pressure of the air within the outer accumulator air pocket 724 reaches or exceeds a threshold pressure and/or level, then a pressure actuated pressure relief valve 705 will tend to open and vent air from the outer accumulator air pocket 724 into the atmosphere outside the embodiment until the pressure of the air within the outer accumulator air pocket 724 falls to a pressure or level below the threshold pressure and/or level. A similar embodiment utilizes and/or incorporates a pressure relief valve that is controlled by the embodiment's control system (now shown).

Relatively highly pressurized air within the high-pressure accumulator 716 tends to flow through exhaust duct 701 and through an exhaust turbine 702 therein so as to vent 727 to, and/or flow into, the atmosphere outside the embodiment. Air flowing through the exhaust turbine 702 tends to cause the turbine to rotate and thereby to energize a generator 728 operatively connected to the exhaust turbine 702.

When the surface 713 of the water 711 within the water column 708 moves downward and/or away from the upper end of the water column, then the volume of the air pocket 715 therein tends to expand, and the pressure of the air therein tends to be reduced. When the pressure of that air 715 falls below the pressure of the air outside the embodiment, e.g., below atmospheric pressure, then a one-way valve 729 tends to open thereby allowing air to flow into the air pocket 715 from the atmosphere outside the embodiment. When one-way valve 729 opens, outside air tends to flow 730 into and through an intake turbine 703, thereby tending to cause the intake turbine 703 to rotate and impart energy to a generator 704 operatively connected to the intake turbine. After passing through the intake turbine the inflowing air travels through intake duct 731 and into the air pocket 715.

FIG. 40 shows a horizontal bottom-up cross-sectional view of the same embodiment illustrated in FIGS. 38 and 39, wherein the horizontal section is taken along section line 40-40 as specified in FIG. 39.

Figure 41:
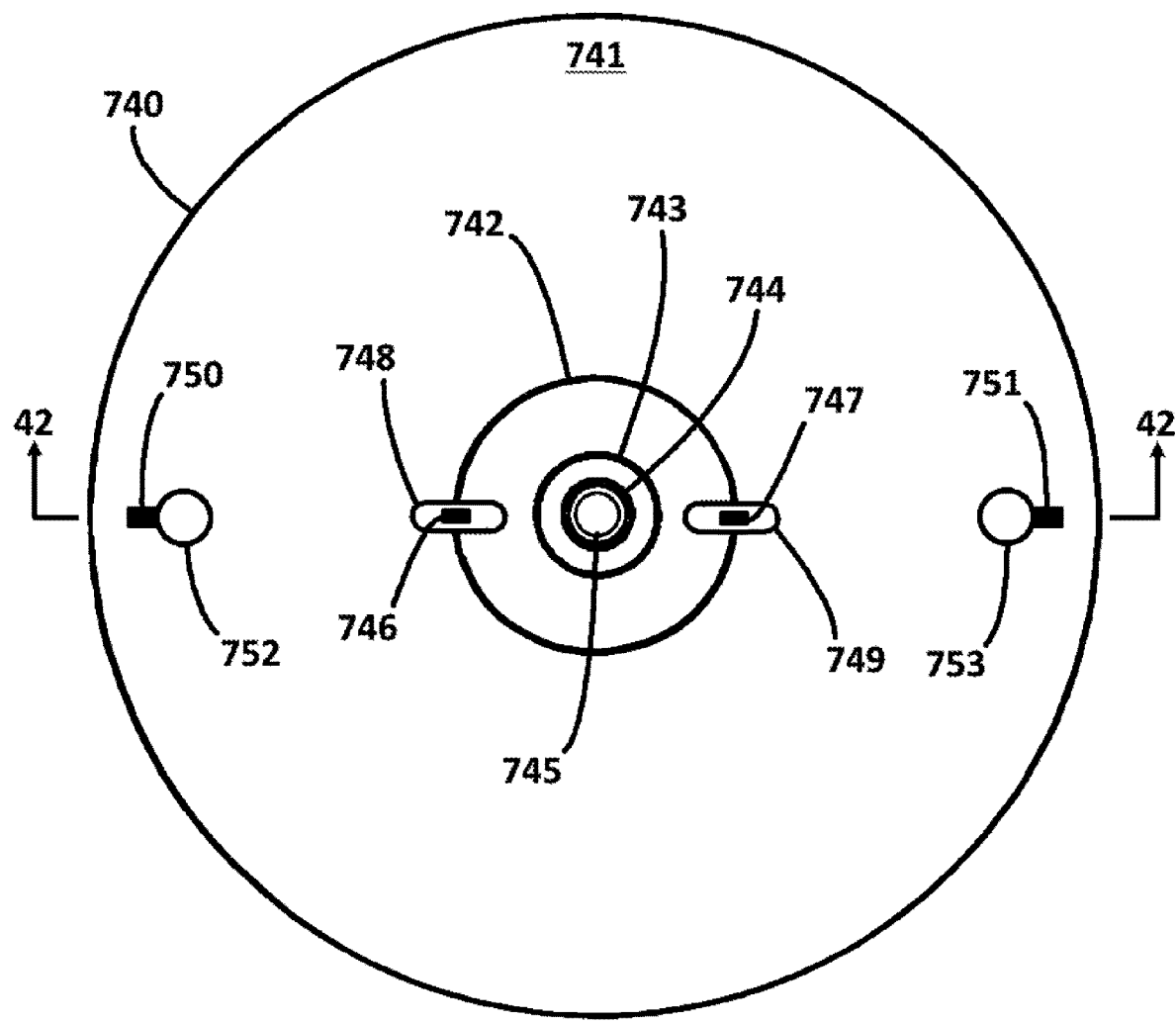
FIG. 41 is a top view of another embodiment of the present invention.

FIG. 41 shows a top-down view of an embodiment of the present invention.

The main structural features and/or elements of which embodiment 740 is comprised, e.g., a buoy and a tubular water column 742 passing therethrough, have an approximate radial symmetry about a common nominally vertical longitudinal axis passing through the center of the approximately circular upper surface 741 of the buoy.

Fluidly connected to the upper end of the water column 742 is a duct 743 through which air tends to flow back and forth between the atmosphere outside the embodiment and an air pocket inside, and adjacent to, the upper end of the water column 742. Positioned within a constricted portion 744 of the duct 743 is a bi-directional turbine 745 which tends to rotate in response to the passage of air through it, thereby tending to cause a generator operatively connected to the turbine to generate electrical power.

In response to control signals from the embodiment's control system (not shown), a pair of deballasting actuators 746 and 747 open respective deballasting valves (not visible within deballasting pipes 748 and 749). Likewise, in response to additional and/or other control signals from the embodiment's control system (not shown), the pair of deballasting actuators 746 and 747 close their respective deballasting valves.

In response to control signals from the embodiment's control system (not shown), a pair of ballasting actuators 750 and 751 open respective ballasting valves 752 and 753. Likewise, in response to additional and/or other control signals from the embodiment's control system (not shown), the pair of actuators 750 and 751 close their respective ballasting valves 752 and 753.

Figure 42:
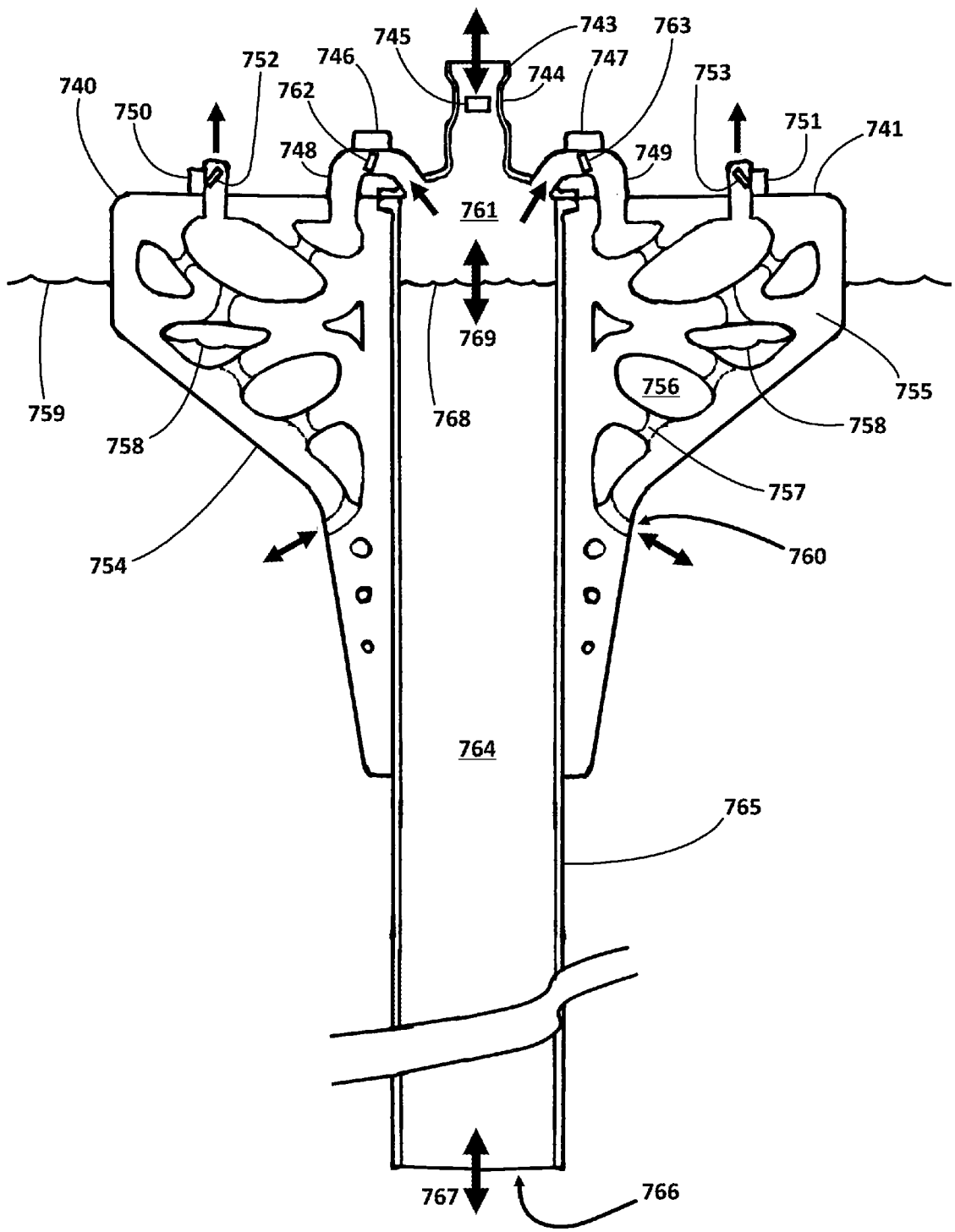
FIG. 42 is a cross sectional view of the embodiment of FIG. 41.

FIG. 42 shows a vertical cross-sectional view of the same embodiment illustrated in FIG. 41, wherein the vertical section is taken along section line 42-42 as specified in FIG. 41.

The embodiment 740 is comprised of a buoyant or buoy portion 754 that is comprised of a material 755 that is amenable to fabrication through 3D printing. Such materials include, but are not limited to: cement, cementitious materials, plastic, resin, sintered metal, etc. The buoy includes a linked and/or fluidly connected network of buoy voids, e.g., 756, and channels, e.g., 757, such that many, if not all, of the hollow spaces within the buoy are able to be filled with air and/or water.

The network of buoy voids is connected to the body of water 759 through a plurality of apertures, e.g., 760, thereby allowing water within the buoy voids to flow into the body of water 759 on which the embodiment floats, and allowing water 759 outside the embodiment to flow into those buoy voids.

The network of buoy voids is also connected to the air pocket 761 by two pipes 747 and 748, the flow of air through which is controlled, regulated, and/or altered, by means of respective one-way valves 762 and 763, which when opened by the embodiment's control system (not shown) allow compressed air to flow from the air pocket 761 into the network of buoy voids thereby tending to displace water (ballast) therein and cause water to flow out of the network of buoy voids and into the body of water 759 on which the embodiment floats.

The network of buoy voids is also connected to the atmosphere outside the embodiment by two valves 752 and 753 through which air may flow out of the network of buoy voids and into the atmosphere outside the embodiment. When opened by the embodiment's control system (not shown), valves 752 and 753 allow air to escape the network of buoy voids and thereby allow water 759 outside the embodiment to flow into the network of buoy voids.

Through the control of the complementary valve pairs 762-763 and 752-753 the volumes and/or ratio of air and water within the network of buoy voids can be adjusted and controlled, thereby controlling the buoyancy of the buoy, the embodiment's waterline, the embodiment's waterplane area, and its sensitivity to the ambient waves.

As the embodiment moves up and down in response to the passage of waves, water 764 within the embodiment's water column 765 also tends to move up and down however, due to that water's inertia and variations in the depth pressure at the water column's lower mouth 766, that water 764 tends to move up and down asynchronously with respect to the movements of the embodiment. The asynchronous oscillations of the water 764 within the water column 765 tend to cause water to move 767 in and out of the water column's bottom mouth 766, and tend to cause the upper surface 768 of the water 764 within the water column 765 to move 769 up and down, thereby alternately compressing and decompressing the pocket of air 761 above that surface 768.

When the air within the air pocket 761 is compressed, it tends to flow out of the water column through duct 743 thereby flowing through turbine 745 therein, and thereby tending to cause that turbine to rotate and causing a generator (not shown) operatively connected to the turbine 745 to generate electrical power.

When the air within the air pocket 761 is decompressed, air from the atmosphere tends to flow in to the water column through duct 743 thereby flowing through turbine 745 therein, and thereby tending to cause that turbine to rotate and causing a generator (not shown) operatively connected to the turbine 745 to generate electrical power.

Figure 43:
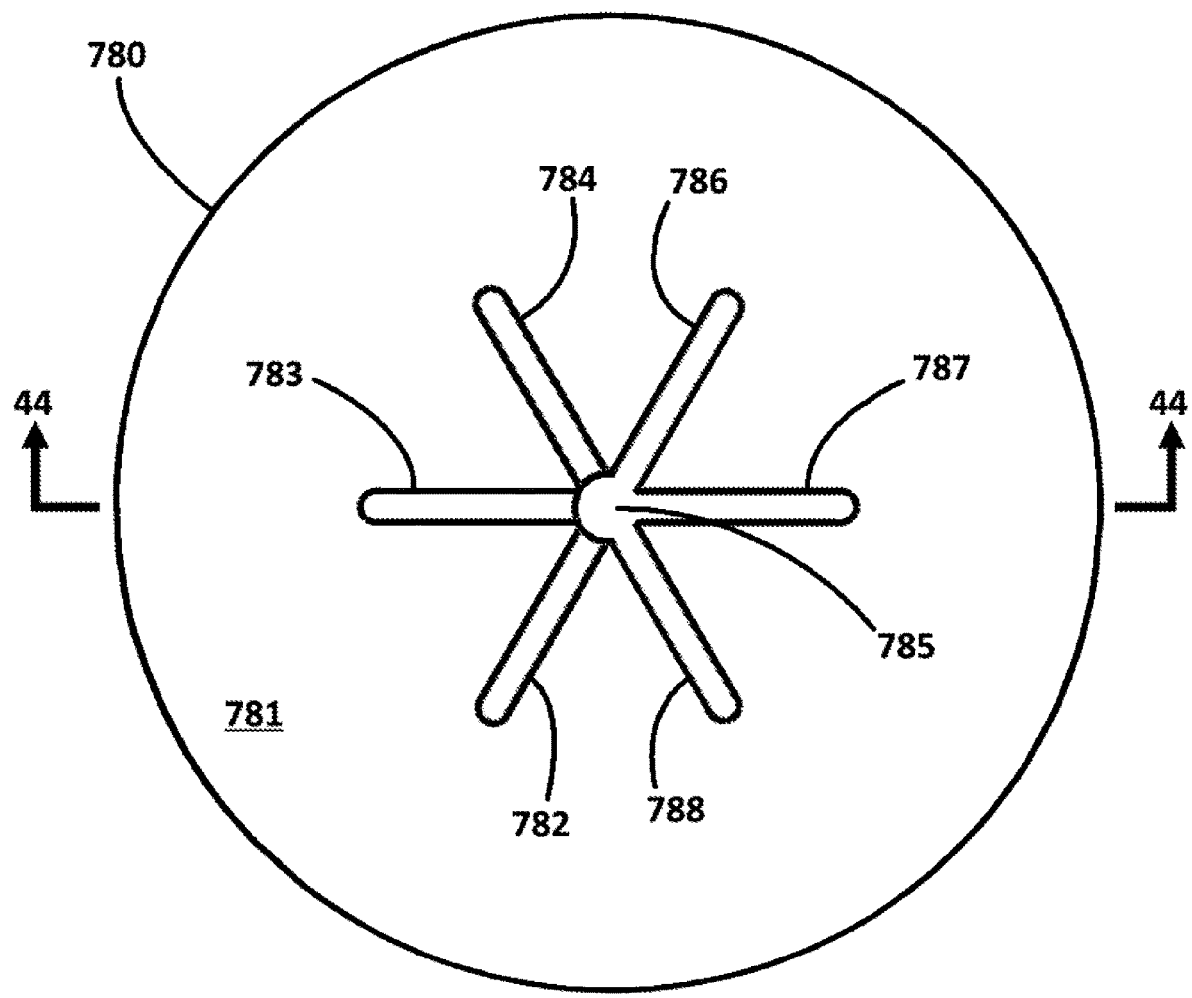
FIG. 43 is a top view of another embodiment of the present invention.

FIG. 43 shows a top-down view of an embodiment of the present invention.

The main structural features and/or elements of which embodiment 780 is comprised, e.g., a buoy and a tubular water column (not visible) depending therefrom, have an approximate radial symmetry about a common nominally vertical longitudinal axis passing through the center of the approximately circular upper surface 781 of the buoy.

Three approximately horizontal intake pipes 782-784 allow relatively high-pressure air stored, trapped, and/or cached within a high-pressure accumulator (not visible within the buoy) to flow, and/or vent, into a common, approximately vertical pipe 785 where the combined flows of air then flow through a turbine positioned therein. After flowing through the turbine in vertical pipe 785, the air flows into three approximately horizontal exhaust pipes 786-788 and thereafter into a low-pressure accumulator (not visible within the buoy).

Figure 44:
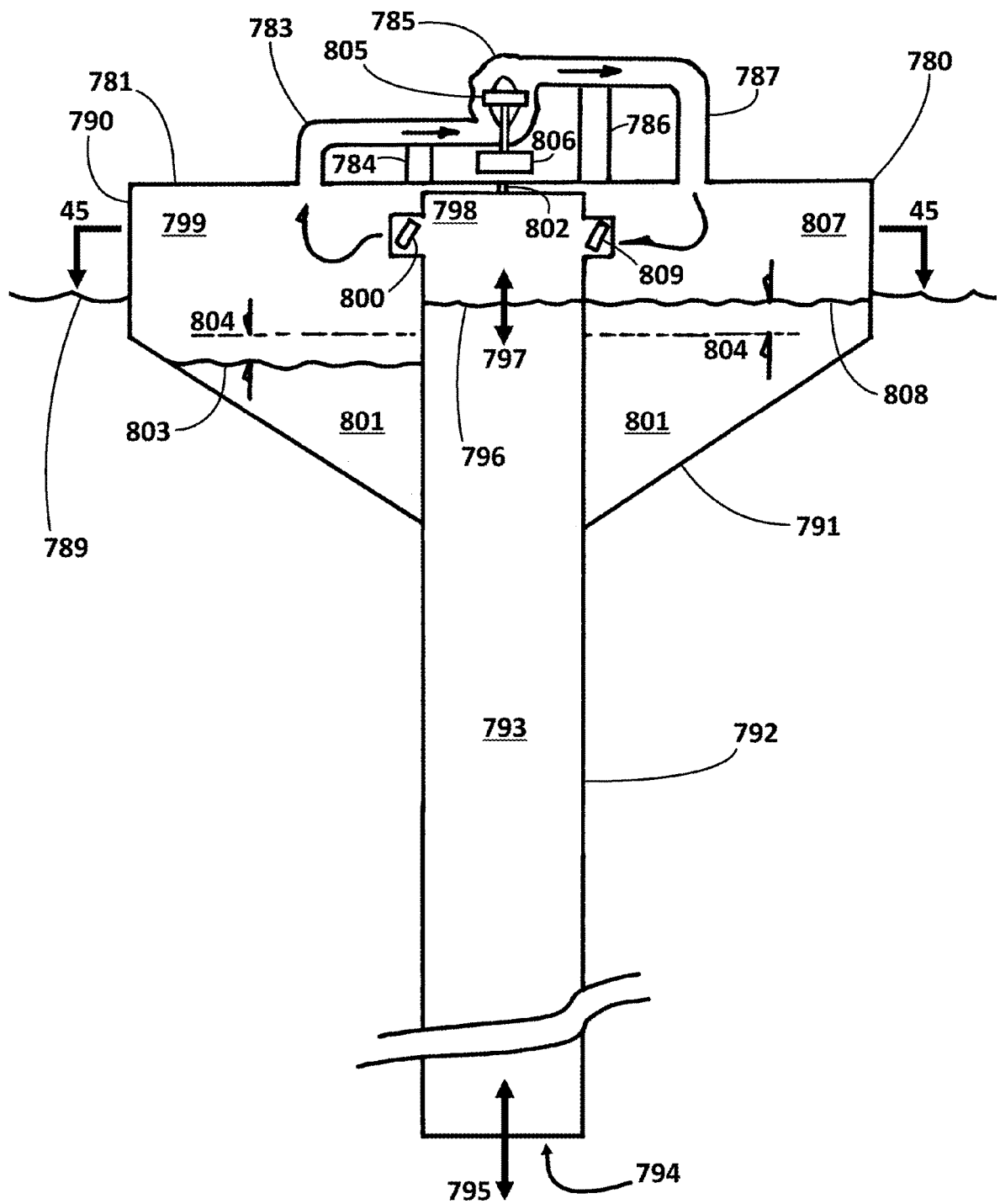
FIG. 44 is a cross sectional view of the embodiment of FIG. 43.

FIG. 44 shows a vertical cross-sectional view of the same embodiment illustrated in FIG. 43, wherein the vertical section is taken along section line 44-44 as specified in FIG. 43.

Embodiment 708 floats adjacent to an upper surface 789 of a body of water over which waves pass. A buoyant and/or buoy portion 781, 790, 791 is characterized by an approximately flat upper wall 781, an upper approximately cylindrical side wall 790, and a lower approximately frustoconical wall 791. Connected to, attached to, and partially embedded within, the buoy 790-791 is an approximately cylindrical tube 792 that partially traps, entrains, and/or encloses, a body of water 793, and which possesses a lower aperture and/or mouth 794 through which water may freely move 795 into and out from the interior of the tube. As waves, moving across the surface 789 of the body of water on which the embodiment floats, buffet the embodiment 780 the inertia of the water 793 within the tube inhibits its ability to move synchronously with the tube 792 which tends to result in a vertical movement and/or oscillation of the water 793 with respect to the tube 792. The vertical movements of the water 793 within the tube 792 tend to cause the surface 796 of that water to move 797 up and down, thereby alternately compressing and expanding a volume 798 of air trapped in an upper portion of the tube 792.

When the air within the air pocket is compressed, and when the pressure thereof exceeds the pressure of air trapped within the embodiment's high-pressure accumulator 799, then a pressure-actuated valve 800 tends to open thereby allowing a portion of that compressed air to flow from the air pocket 798 and into the high-pressure accumulator 799. When the pressure of the air within the air pocket 798 subsequently falls to equal or become less than the pressure of air trapped within the embodiment's high-pressure accumulator 799, then the pressure-actuated valve 800 tends to close, thereby trapping the highly pressurized air within the high-pressure accumulator 799 and preventing it from flowing back into the air pocket 798.

Within a lower portion of the buoy 790-791 is a body of water 801 that adds mass, weight, and inertia to the embodiment and serves as ballast. Pumps (not shown) can add or remove water to the pool 801 and/or reservoir of ballast water within the interior of the buoy 790-791 in order to alter the mass, weight, and inertia of the embodiment and the embodiment's draft, waterline, waterplane area, and its correlated sensitivity to waves and wave motion. A vertical wall within the buoy partially partitions the interior of the buoy into two halves (into left and right halves with respect to the embodiment orientation illustrated in FIG. 44). The partition wall 802 does not extend all the way to the bottom of the interior of the buoy and does not completely isolate the two halves of that interior for that reason. Because a lower portion of the interior of the buoy is unobstructed by the partition wall 802, water 801 within the interior of the buoy is able to move from one side of the partially-partitioned interior to the other side.

The relatively high pressure of the air within the high-pressure accumulator 799 (positioned on the left side of the partition wall 802) tends to push down the surface 803 of that portion of the embodiment's water ballast 801 positioned beneath it from the equilibrium level 804 that it might have in the absence of high pressure in the accumulator 799.

Pressurized air from within the high-pressure accumulator 799 tends to flow into the embodiment's three intake pipes, e.g., 783 and 784, which combine and flow together into turbine pipe 785 wherein it tends to flow through turbine 805 the resulting rotations of which tend to energize operatively connected generator 806 thereby causing the generator to generate electrical power.

Air flowing out of the turbine 805 and out of the turbine pipe 785 the turbine exhaust separates so as to flow into three exhaust pipes, e.g., 787 and 786, after which, and/or from which, it flows into low-pressure accumulator 807.

The relatively low pressure of the air within the low-pressure accumulator 807 (positioned on the right side of the partition wall 802) tends to pull up the surface 808 of that portion of the embodiment's water ballast 801 positioned beneath it from the equilibrium level 804 that it might have in the absence of low pressure in the accumulator 807.

When the volume of the air within the air pocket is expanded, thereby tending to decompress and reduce the pressure of that air, and when the pressure of that air-pocket air falls below the pressure of the air trapped within the embodiment's low-pressure accumulator 807, then a pressure-actuated valve 809 tends to open thereby allowing a portion of the air within the low-pressure accumulator (which at such a point has a greater pressure than the air within the air pocket) to flow from the low-pressure accumulator 807 and into the air pocket 798. When the pressure of the air within the air pocket 798 subsequently rises so as to equal or exceed the pressure of the air trapped within the embodiment's low-pressure accumulator 807, then the pressure-actuated valve 809 tends to close, thereby trapping the relatively low-pressure air within the low-pressure accumulator 807 and preventing any more of it from flowing into the air pocket 798.

Figure 45:
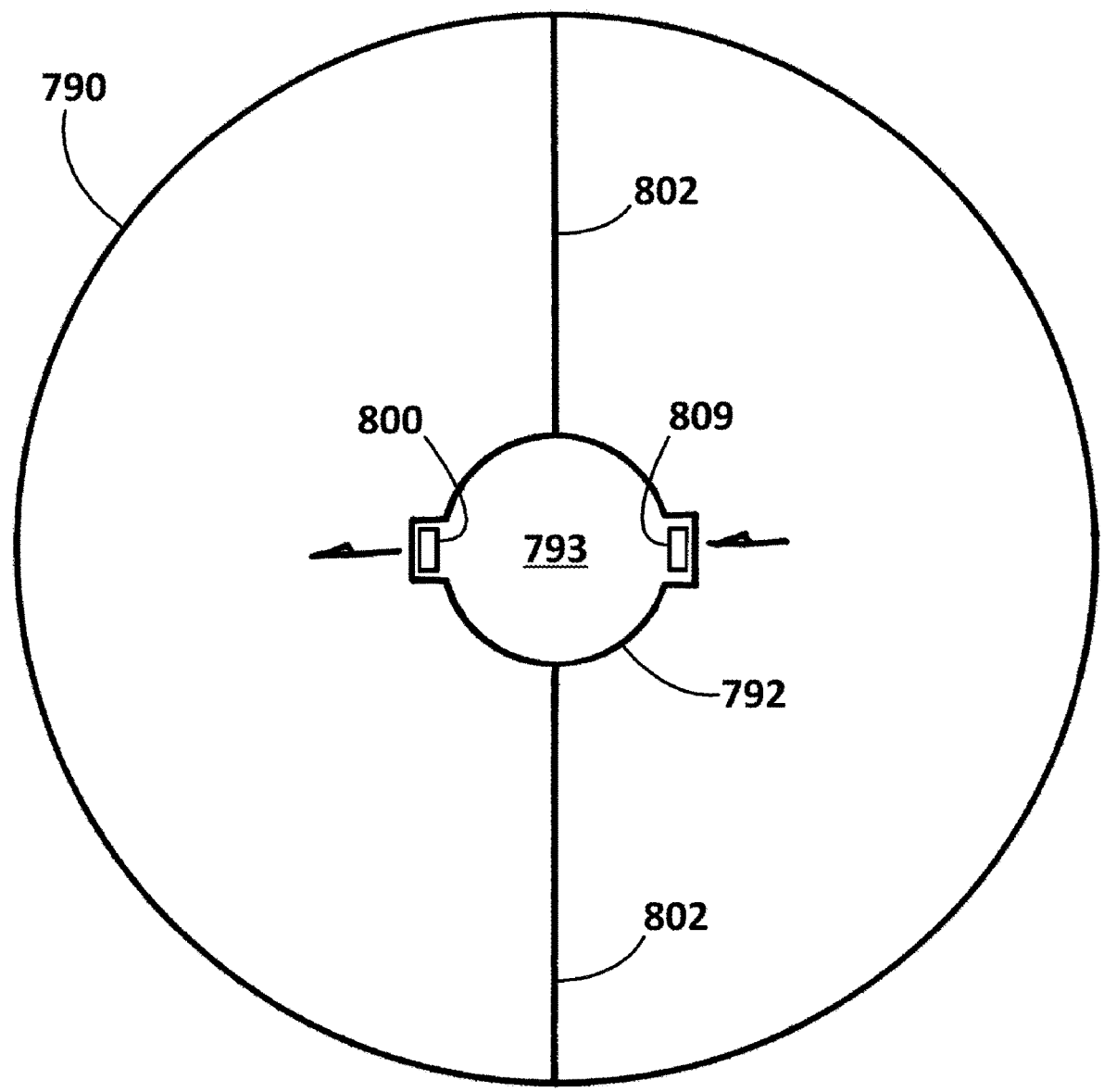
FIG. 45 is a top view of another embodiment of the present invention.

FIG. 45 shows a horizontal top-down cross-sectional view of the same embodiment illustrated in FIGS. 43 and 44, wherein the horizontal section is taken along section line 45-45 as specified in FIG. 44.

Figure 46:
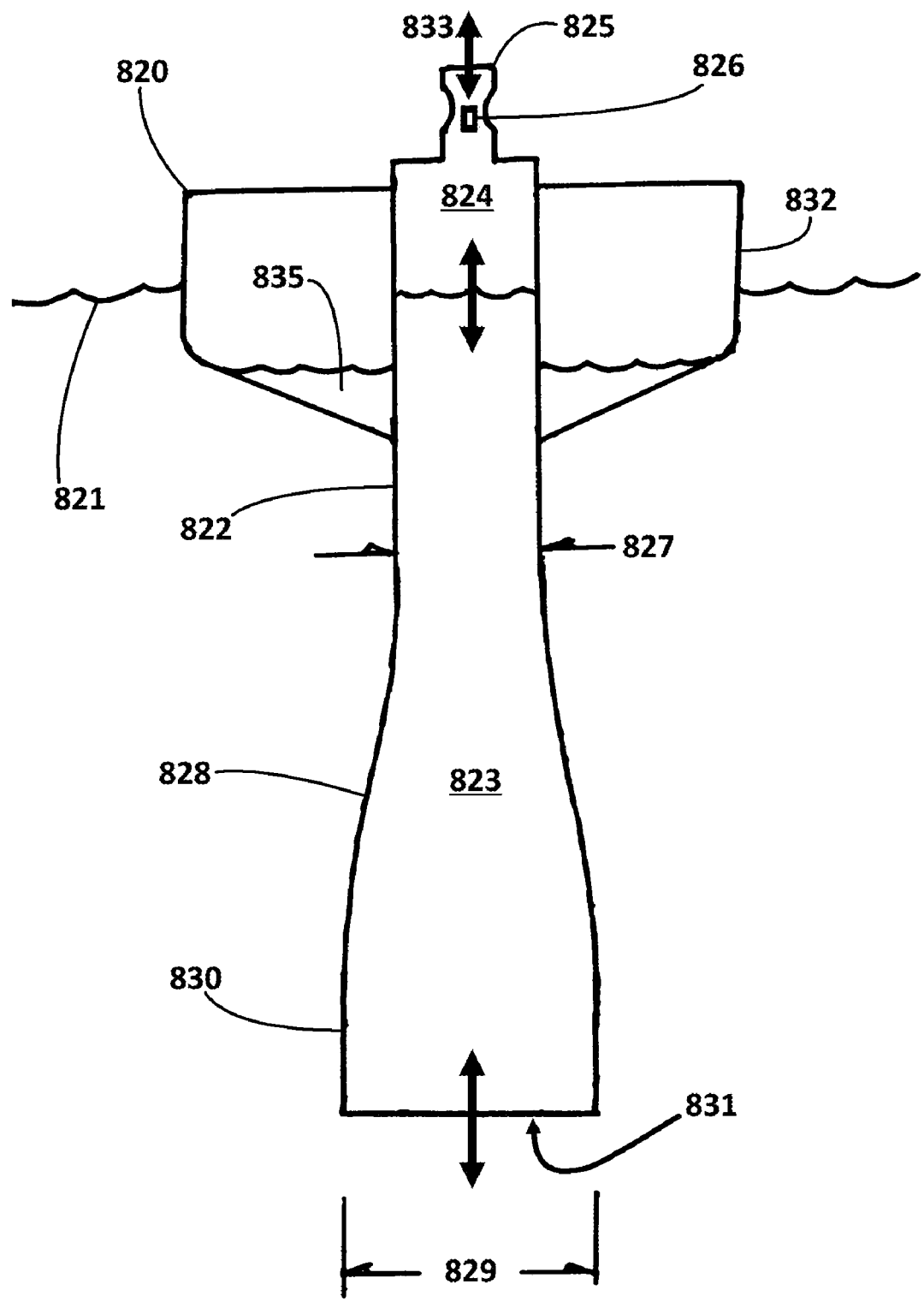
FIG. 46 is an elevated, perspective schematic view of another embodiment of the present invention.

FIG. 46 shows a vertical cross-sectional view of an embodiment of the present invention similar to the one illustrated in FIGS. 1-3, and, as with the vertical cross-sectional view illustrated in FIG. 3, the vertical cross-sectional view illustrated in FIG. 46 corresponds to a vertical section plane that includes and/or passes through the nominally vertical longitudinal axis of approximate radial symmetry of the embodiment.

The embodiment 820 floats adjacent to an upper surface 821 of a body of water on which the embodiment floats and over which waves tend to pass. The embodiment incorporates a buoyant portion 832 and a central water column 822 or tube. As the embodiment rises and falls on passing waves, water 823 within the water column 822 moves up and down relative to the embodiment 820 and its water column 822 tending to cause a cyclical compression and expansion of an air pocket 824 positioned in an upper portion of the water column 822.

When the pressure of the air within the air pocket 824 becomes greater than the pressure of the air outside the embodiment, e.g. greater than atmospheric pressure, air tends to flow 833 from the air pocket 824 through a duct 825, and through a turbine 826 therein, and then in to the atmosphere outside the embodiment 820. When the pressure of the air within the air pocket 824 becomes less than the pressure of the air outside the embodiment, air tends to flow 833 from outside the embodiment, through the duct 825, and through the turbine 826 therein, and into air pocket 824. When air flows through the turbine 826 the turbine tends to rotate. Rotations of the turbine 826 tend to energize a generator (not shown) operatively connected to the turbine 826 causing that generator to generate electrical power.

The embodiment's water column 822 has a first diameter 827 and a first cross-sectional area (with respect to a plane normal to its nominally vertical longitudinal axis of approximate radial symmetry), below which, e.g., proximate to 828, the diameter increases and/or the tube 822 flares. In the illustrated embodiment, the water column 822 has a second diameter 829, e.g., proximate to 830, which is greater than the first diameter 827, and a second cross-sectional area which is greater than the first cross-sectional area. In an embodiment similar to the one illustrated, the diameter of the water column 828 continues progressively increasing down to the bottom mouth 831 of the water column 822.

Water columns of every shape, length, diameter or profile of such diameters (e.g., of walls in a vertical cross-sectional plane), cross-sectional area or profile of such areas, wall thickness, wall material, etc., are included within the scope of the present disclosure.

Figure 47:
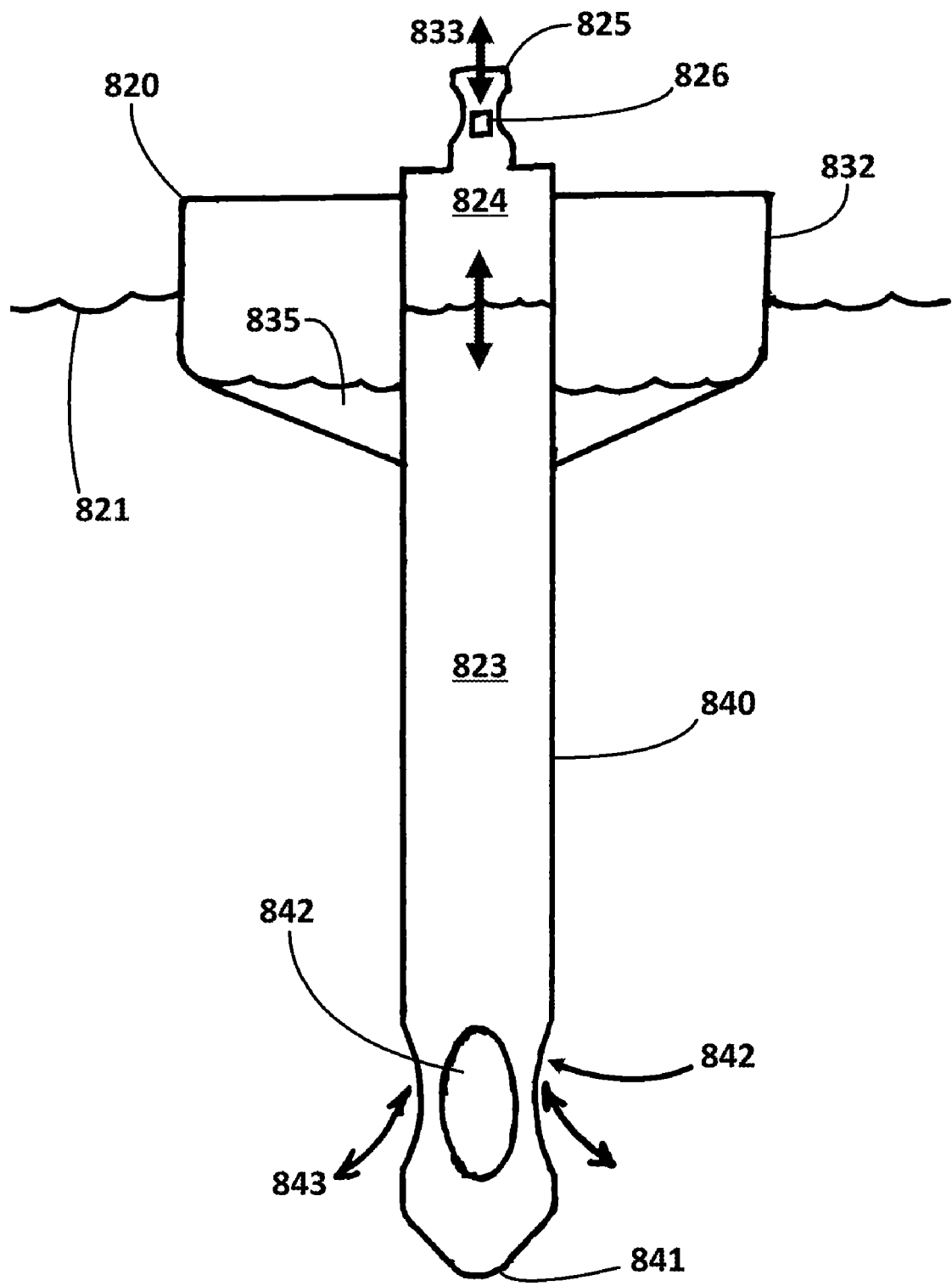
FIG. 47 is an elevated, perspective schematic view of another embodiment of the present invention.

FIG. 47 shows a vertical cross-sectional view of a different configuration of the same embodiment of the present invention that is illustrated in FIG. 46. Unlike the configuration illustrated in FIG. 46, the water column 920 of the embodiment configuration illustrated in FIG. 47 has an approximately constant diameter and an approximately constant cross-sectional area (normal to its nominally vertical longitudinal axis of approximate radial symmetry). And, the embodiment configuration illustrated in FIG. 47 has a pointed and solid, i.e. closed, bottom end 841 such that water may not flow out nor in through the bottom. Water column 840 has orifices, e.g., 842, in the lateral walls of a bottom portion of the tubular water-column wall 840 through which water 823 may flow 843 in and out of the water column.

Figure 48:
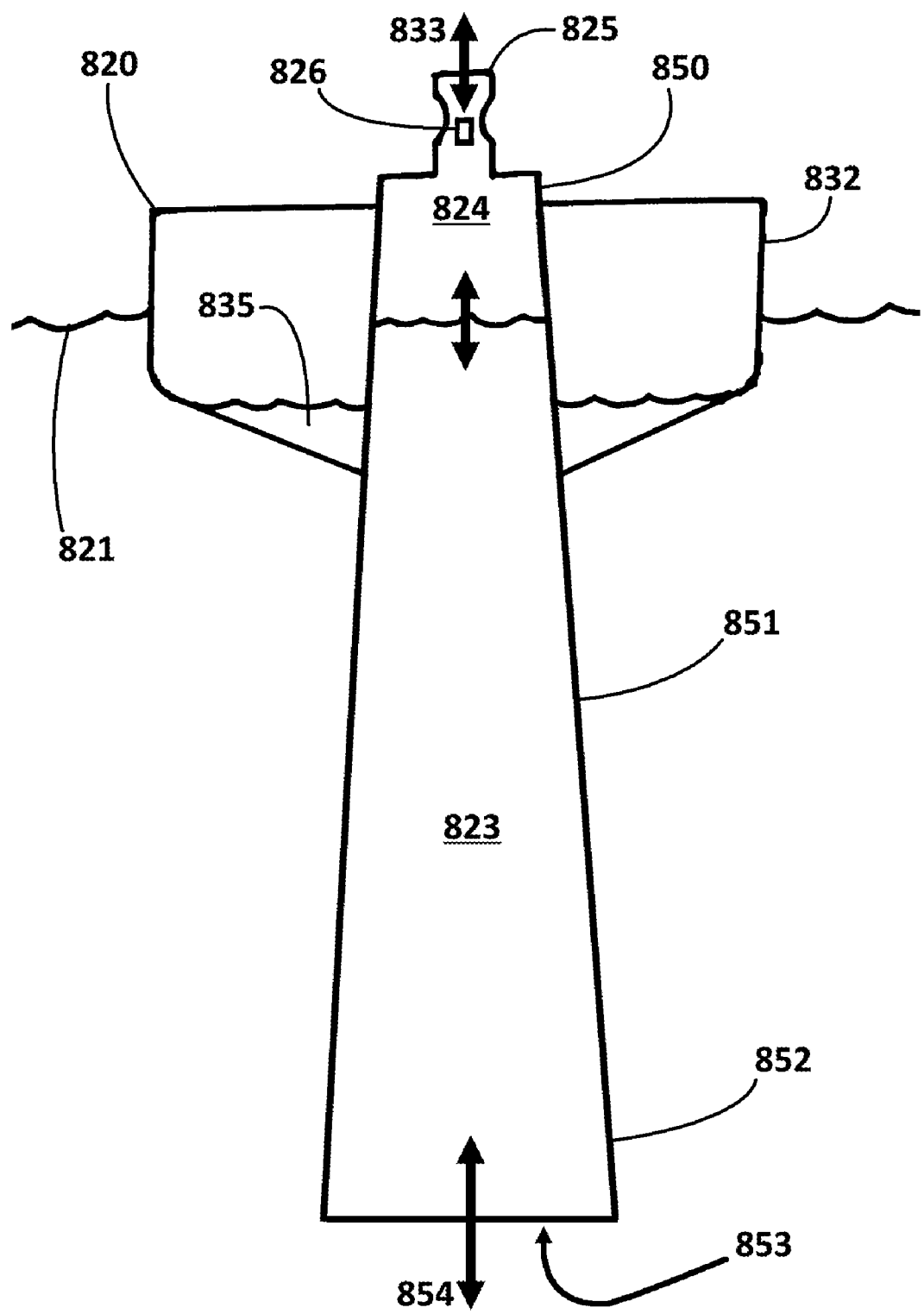
FIG. 48 is an elevated, perspective schematic view of another embodiment of the present invention.

FIG. 48 shows a vertical cross-sectional view of a different configuration of the same embodiment of the present invention that is illustrated in FIG. 46. Unlike the configuration illustrated in FIG. 46, the water column 850-852 of the embodiment configuration illustrated in FIG. 48 has an approximately constant taper. The diameter and/or cross-sectional area of the tube at a position 852 near its bottom 853 is greater than the diameter and/or cross-sectional area of the tube at a position near its top 850. With respect to the configuration illustrated in FIG. 48, water is free to flow 854 into and out of the tube 850-852 through a bottom mouth 853 that is proportionately approximately equal to the bottom mouth 831 of the configuration illustrated in FIG. 46. However, whereas the configuration illustrated in FIG. 46 has an hourglass-like transition from a relatively small upper diameter to a relatively large lower diameter, the configuration illustrated in FIG. 48 has a taper of approximately constant angularity.

Figure 49:
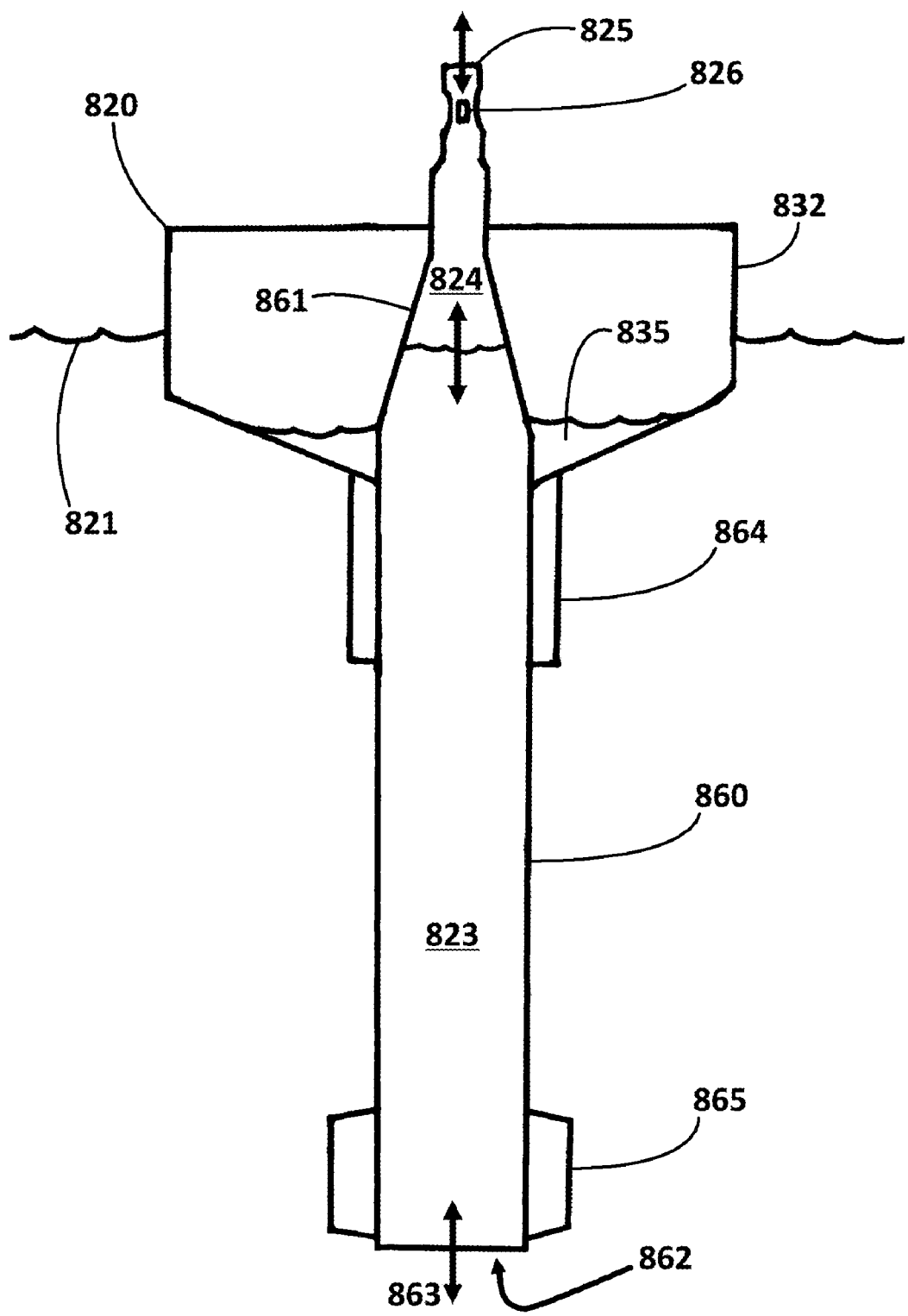
FIG. 49 is an elevated, perspective schematic view of another embodiment of the present invention.

FIG. 49 shows a vertical cross-sectional view of a different configuration of the same embodiment of the present invention that is illustrated in FIG. 46. Unlike the configuration illustrated in FIG. 46, the lower portion of water column 860 of the embodiment configuration illustrated in FIG. 49 is approximately cylindrical while the upper portion 861 includes an approximately frustoconical constriction of approximately constant angularity.

The water column 860 has an open bottom 862 through which water 823 may flow 863 in to, and out of, the water column 860.

The embodiment configuration illustrated in FIG. 49 has buoyant material, e.g., 864 (e.g., closed-cell foam) attached to the water tube 860 adjacent to an upper end of that water tube 860. The embodiment configuration illustrated in FIG. 49 also has negatively-buoyant ballast, e.g., 865, (e.g., metal) attached to the water tube 860 adjacent to a lower end of that water tube 860.

Figure 50:
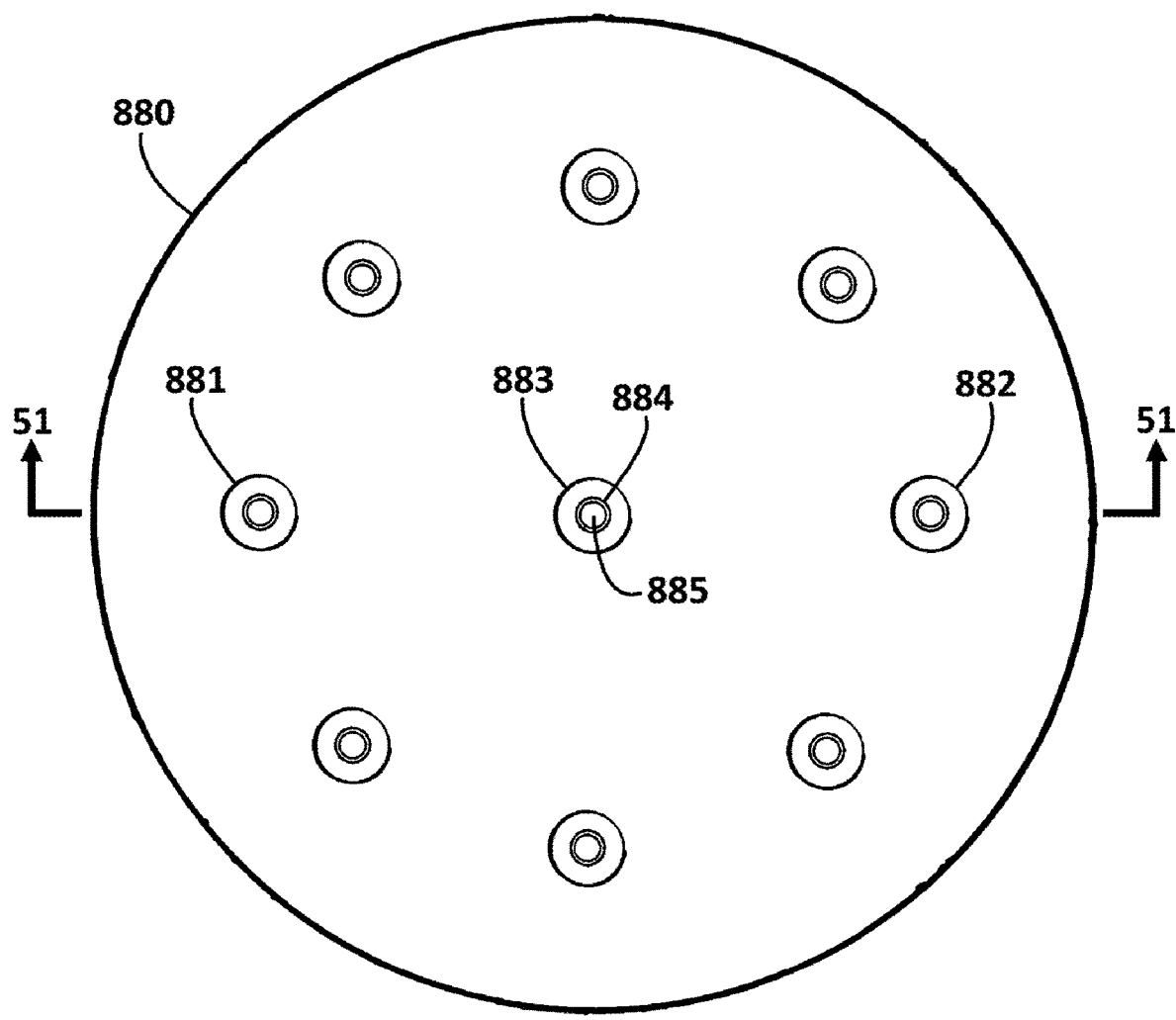
FIG. 50 is a top view of another embodiment of the present invention.

FIG. 50 shows a top-down view of an embodiment 880 of the present invention that is similar to the embodiment illustrated in FIGS. 1-3. Unlike the embodiment illustrated in FIGS. 1-3 which has a single water tube 105, the embodiment illustrated in FIGS. 50-52 has nine water tubes, eight water tubes, e.g., 881 and 882, arrayed in radial fashion about the periphery of the buoy 880, and one water tube 883 positioned at the center of the buoy 880. Also unlike the embodiment illustrated in FIGS. 1-3 in which the embodiment's water tube 105 protrudes through the top 108 of the embodiment's buoy 109-110, the upper end of each of the nine water tubes, e.g., 881, of the embodiment illustrated in FIGS. 50-52 is positioned within the embodiment's buoy and/or below the upper wall of that buoy—with only the respective tube-specific ducts protruding through the top of the buoy.

Each of the ducts, e.g., 881-883, of the embodiment 880 has a constriction, e.g., 884, and/or a narrowing within a portion of the duct, and a turbine, e.g., 885, is positioned within the constricted portion of each duct.

Figure 51:
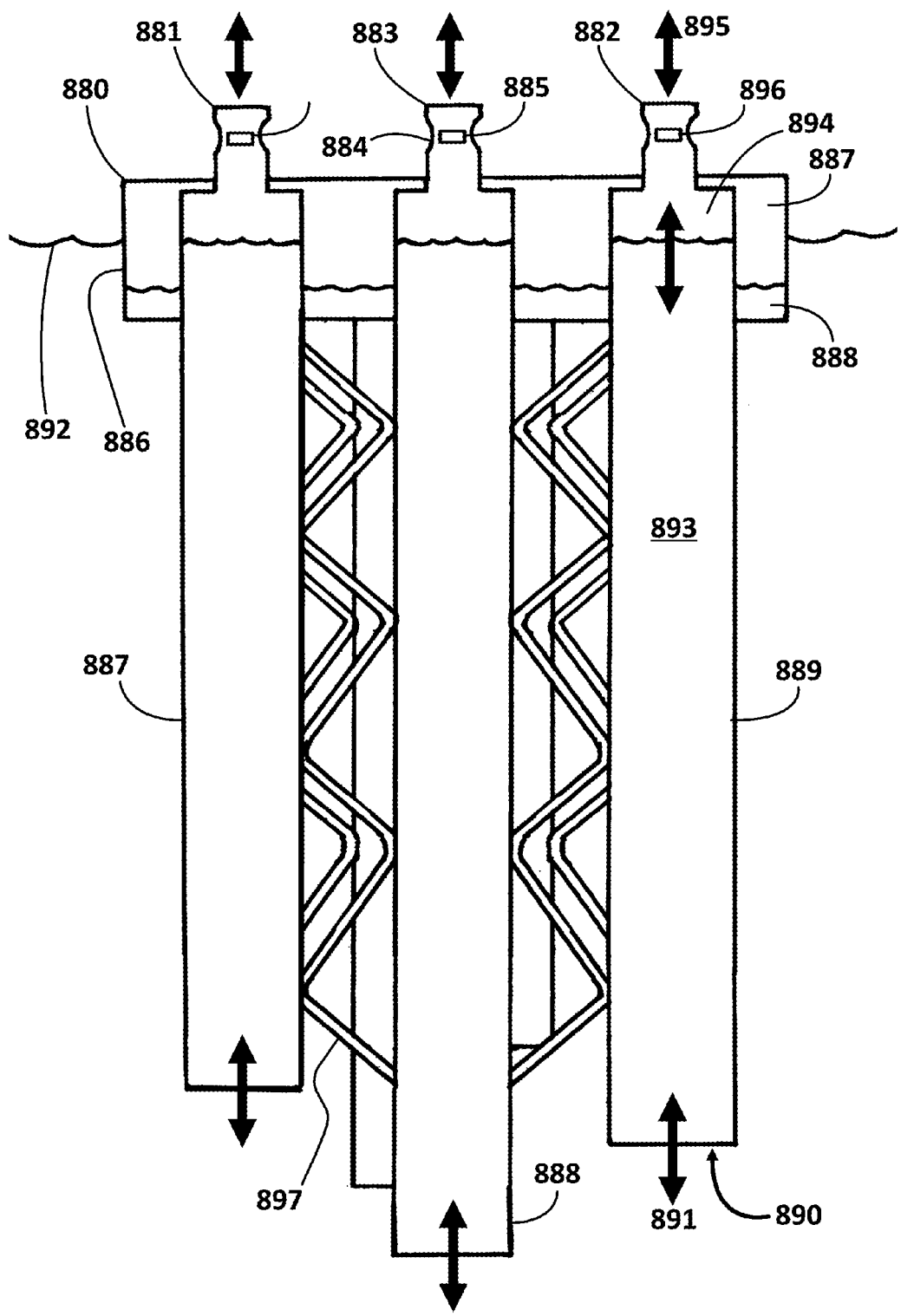
FIG. 51 is a cross sectional view of the embodiment of FIG. 50.
Figure 52:
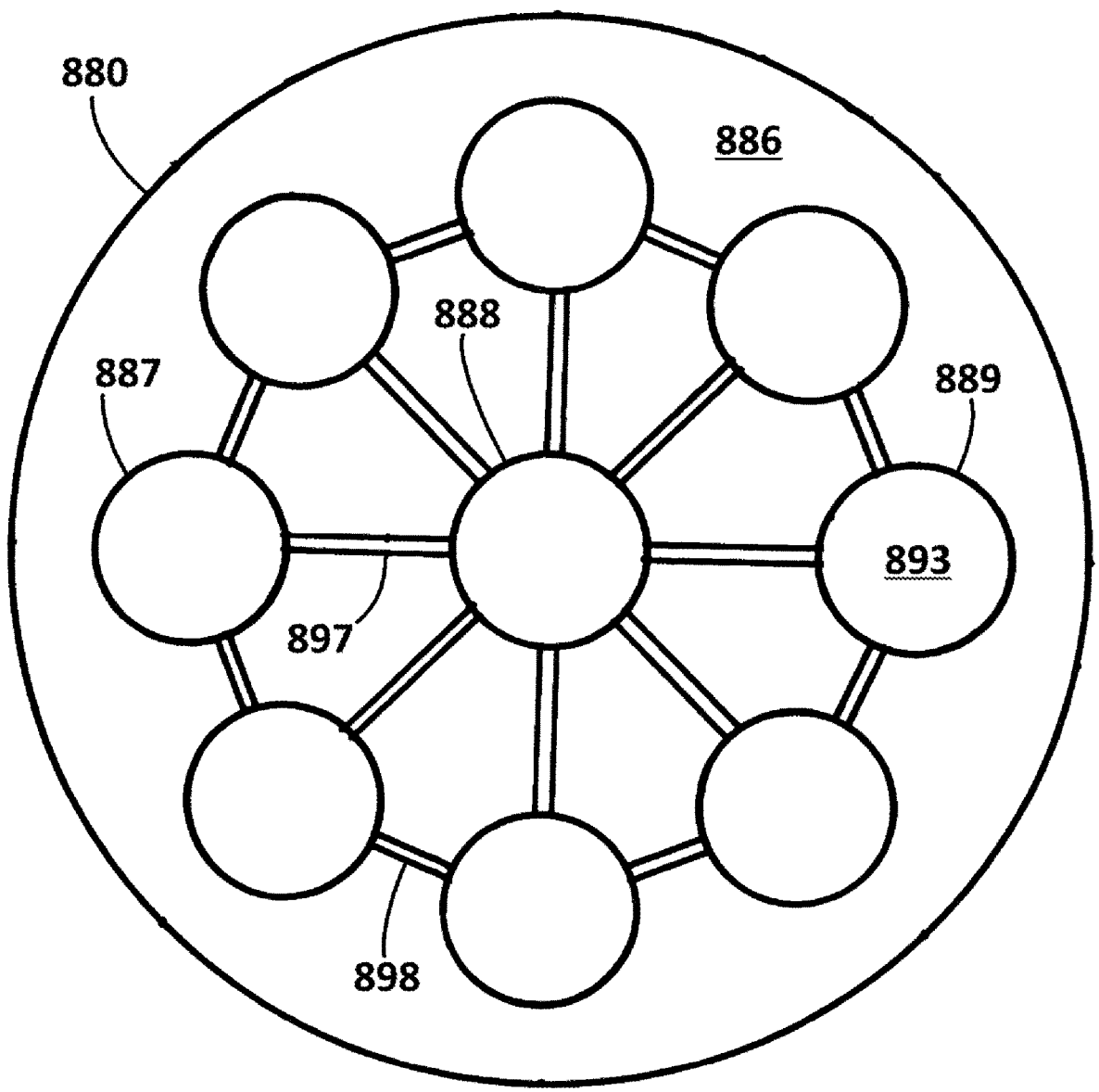
FIG. 52 is a top view of another embodiment of the present invention.

FIG. 51 shows a vertical cross-sectional view of the same embodiment illustrated in FIG. 50, wherein the vertical section is taken along section line 51-51 as specified in FIG. 50.

The embodiment 880 is comprised of a buoyant and/or buoy portion 886 that has a hollow interior containing a gas 887, e.g., air, nitrogen, and/or hydrogen, and a water ballast 888, the mass, weight, and inertia of which may be adjusted, controlled, and/or altered by the embodiment's control system (not shown). Pumps (not shown) can add or remove water from the water ballast 888 inside the buoy 886 in order to alter the mass, weight, and inertia of the embodiment and its draft.

Connected, joined, and/or attached, to the embodiment's buoy portion 886 are nine water columns and/or tubes, e.g., 887-889, each of which possesses a lower end, mouth, and/or aperture, e.g., 890, through which water may move, e.g., 891, between the interior of each respective tube, e.g., 889, and the body of water 892 on which the embodiment floats.

In response to motions and/or movements of the embodiment, and/or of the water 892 on which it floats, the water, e.g., 893, within each water tube, e.g., 889, tends to, and/or periodically, moves vertically within its respective tube, thereby tending to alternately compress and expand a pocket of air, e.g., 894, positioned at an upper end of each respective tube, e.g., 889. When a water tube's respective air pocket, e.g., 894, expands, the resulting decompression of that air pocket tends to cause air to flow, e.g., 895, from the atmosphere outside the air pocket through the water tube's respective air duct, e.g., 882, and through the respective turbine, e.g., 896, therein, thereby tending to cause the turbine to rotate and to energize an operatively connected generator (not shown) thereby causing the generator to generate electrical power. When a water tube's respective air pocket, e.g., 894, is compressed, the resulting increase in the pressure of the air within that air pocket tends to cause air to flow, e.g., 895, from the air pocket and into the atmosphere outside the embodiment through the water tube's respective air duct, e.g., 882, and through the respective turbine, e.g., 896, therein, thereby again tending to cause the turbine to rotate and to energize an operatively connected generator (not shown) thereby causing the generator to generate electrical power.

A latticework of trusses, struts, and/or braces, e.g., 897, provide structural support for the array of water tubes, e.g., 887-889. And, the water tubes can be of varying lengths, diameters, volumes, etc., so as to tend to make each tube optimally sensitive to a particular and/or specific range of wave heights, periods, and/or energies. Note that each water tube visible within the illustration of FIG. 51 is of a unique length, and therefore a unique volume. The oscillations of the water within each tube of unique length would be expected to have a unique phase in at least one wave condition, and a unique degree of air pocket compression (i.e., amplitude of water, e.g., 893, oscillation within each tube of unique length). Such variation in intra-tube water oscillation can help to smooth, and/or to remove spikes, in the rate of electrical power generation thereby helping to reduce the need for batteries and/or other energy buffering mechanisms. Such variation in optimal wave-condition sensitivity can help to provide a wider range of wave conditions over which the embodiment's electrical power generation is above a baseline and/or threshold level, again, potentially reducing the need for batteries and/or other energy buffering mechanisms.

FIG. 52 shows a bottom-up view of the same embodiment illustrated in FIGS. 50 and 51.

Figure 53:
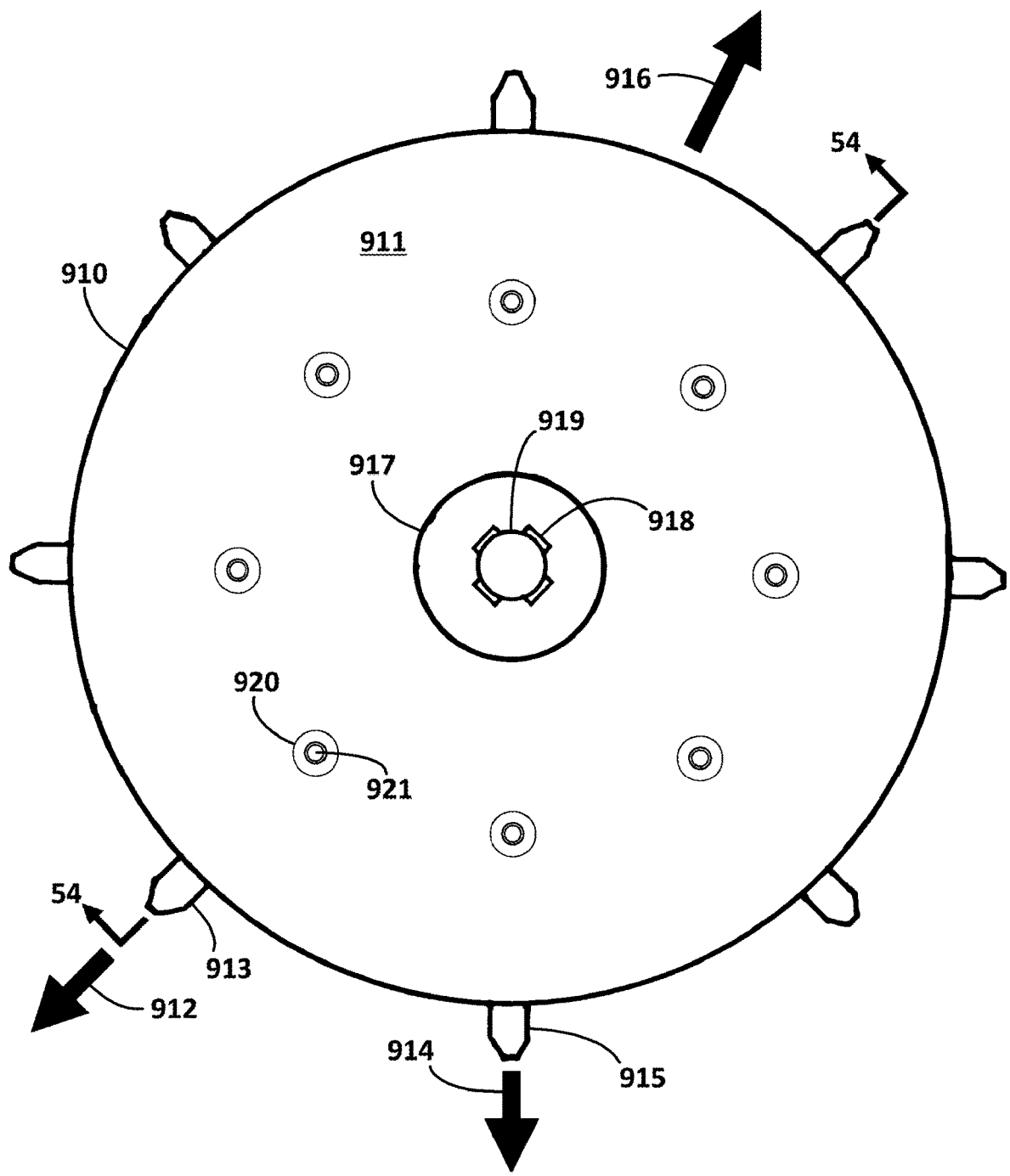
FIG. 53 is a top view of another embodiment of the present invention.

FIG. 53 shows a top-down view of an embodiment of the present invention.

The main structural features and/or elements of which the embodiment 910 are comprised, e.g., a buoy and a tubular water column (not visible) depending therefrom, have an approximate radial symmetry about a common nominally vertical longitudinal axis passing through the center of the approximately circular upper surface 911 of the buoy.

Arrayed in radial fashion about the periphery of the buoy 911 are eight nozzles and/or jets that are fluidly connected to a high-pressure accumulator (not visible) inside the buoy 911. When the embodiment's control system (not shown) opens a nozzle-specific valve, then pressurized air from within the embodiment's high-pressure accumulator is allowed to flow out, e.g., 912 of the respective nozzle, e.g., 913, thereby tending to generate thrust. By opening one or more nozzle valves, thereby causing thrust to be generated by those nozzles, and/or by the high-pressure air emitted by each, and by adjusting, regulating, controlling, and/or altering, the degree to which each nozzle-specific valve is open, and therefore adjusting, regulating, controlling, and/or altering the amount of thrust generated by and/or from each respective nozzle, the embodiment's control system can generate thrust in a variety and/or range of magnitudes, and over any lateral (i.e., parallel to the surface 911 of the embodiment's buoy, and nominally parallel to the surface of the body of water on which the embodiment floats) angle, and/or in any direction. For example, the embodiment configuration illustrated in FIG. 53 shows high-pressure air being emitted, and/or allowed to flow 912 and 914 from, respective nozzles 913 and 915, thereby generating a composite, net, additive, and/or resultant thrust 916 in a direction approximately 25 degrees to the right of vertical (with respect to the orientation of the embodiment illustrated in FIG. 53).

By adjusting, regulating, controlling, and/or altering, the magnitude of thrust (ranging from no thrust to maximal thrust) emitted by each of its eight nozzles, the embodiment 910 can steer a course in any desired direction across the surface of the body of water on which the embodiment floats. And, by adjusting, regulating, controlling, and/or altering, the magnitude of thrust (ranging from no thrust to maximal thrust) emitted by each of its eight nozzles, the embodiment 910 can travel and/or propel itself at a range of speeds.

A central water column and/or tube 917 is incorporated within, and/or connected to, the embodiment's buoy portion 911 depends from the buoy and contains a body of water that tends to oscillate within the tube in response to the influence of passing waves on the embodiment's position, and on the height of the water's surface. An open bottom allows water within the embodiment's tube 917 to move in and out of the tube as it oscillates therein.

A pocket of air trapped at the top of the water tube 917 changes pressure as a consequence of the vertical oscillations of the water within the tube 917, thereby causing the pressure of air within the air pocket to alternately decrease and increase.

When the pressure of the air within the water tube's air pocket decreases, air tends to be drawn into the air pocket from the atmosphere outside the embodiment through intake apertures, e.g., 918, each of which incorporates a one-way valve that allow air to flow into the water tube's air pocket, but prevent air from escaping from the air pocket. The intake apertures are incorporated within an intake duct 919 that connects each intake aperture to the water tube's air pocket.

When the pressure of the air within the water tube's air pocket increases, portions of the pressurized air therein tends to flow into the embodiment's high-pressure accumulator (not visible) positioned within the buoy 911. The pressurized air within the water tube's air pocket flows into the embodiment's high-pressure accumulator through one-way valves that allow air to flow from the air pocket into the high-pressure accumulator, but prevent air from escaping, and/or flowing back into the air pocket, from the high-pressure accumulator.

Pressurized air within the embodiment's high-pressure accumulator tends to flow out of one of eight exhaust ducts, e.g., 920, each of which incorporates a turbine, e.g., 921, which tends to rotate in response to the flow of air through its respective duct and to thereby energize a respective operatively connected generator, thereby generating electrical power. And, when a nozzle-valve is opened, high-pressure accumulator air also tends to flow out of the respective nozzle.

Figure 54:
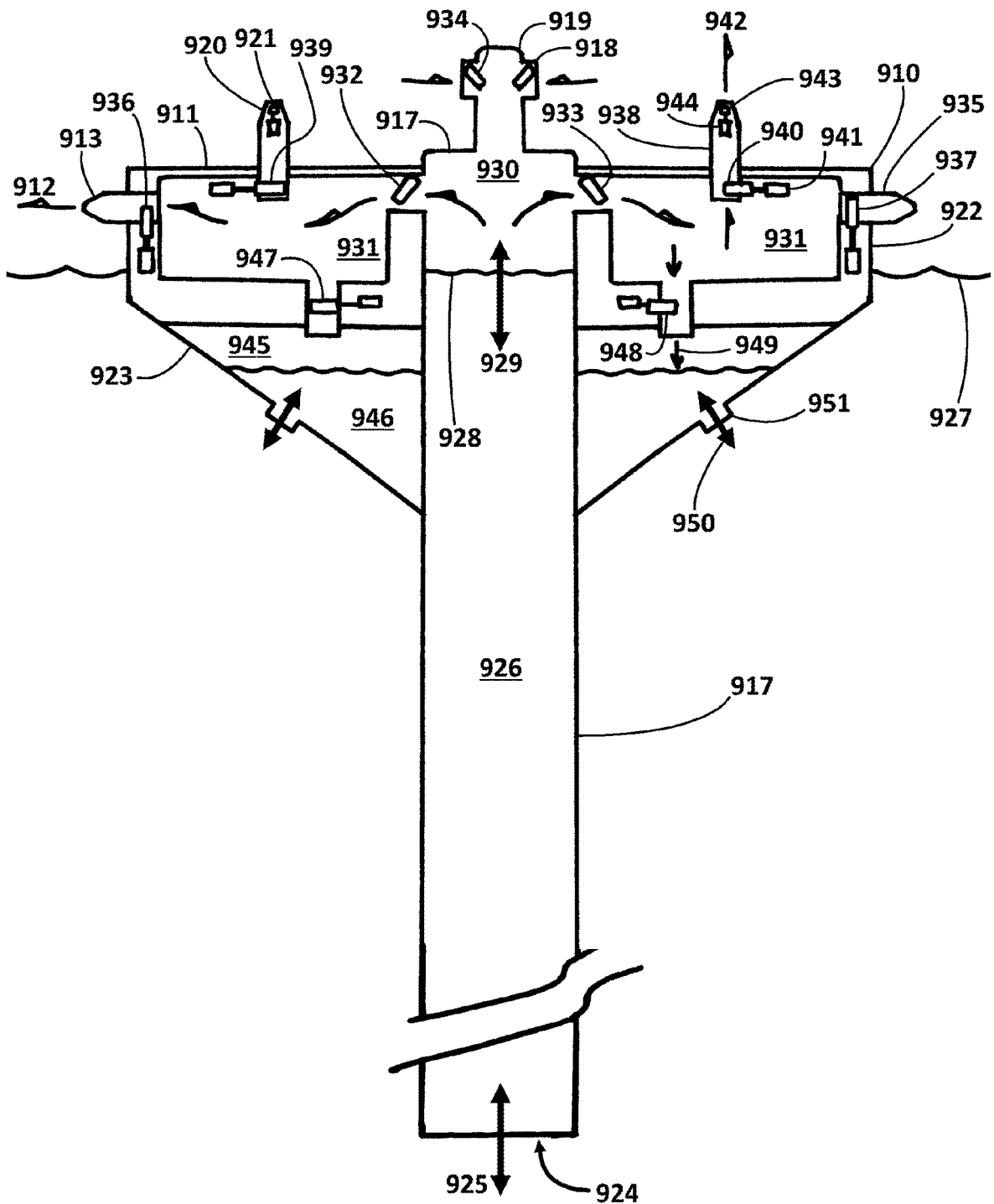
FIG. 54 is a cross sectional view of the embodiment of FIG. 53.

FIG. 54 shows a vertical cross-sectional view of the same embodiment illustrated in FIG. 53, wherein the vertical section is taken along section line 54-54 as specified in FIG. 53. Embodiment 910 floats adjacent to an upper surface 927 of a body of water.

Embodiment 910 is comprised of a buoyant and/or buoy portion 911, 922, 923, and a central approximately vertical water column or tube 917. Buoy 911, 922, 923 has an approximately flat horizontal upper wall 911, an approximately cylindrical side wall 922, and an approximately frustoconical lower wall 923. Water column 917 has an approximately cylindrical shape and an open bottom or mouth 924 through which water may enter and leave the interior of the water column 917. Water 926 partially trapped, enclosed, and/or entrained within water column 917 tends to move up and down as a consequence of wave-induced movements of the embodiment, and wave-induced changes in the depth of the water 927 on which the embodiment floats.

As water 926 within the embodiment's water column 917 moves up and down, e.g., in response to ambient wave action, an upper surface 928 of that water 926 moves 929 up and down, thereby alternately and/or cyclically increasing and reducing the pressure of the air within a pocket 930 positioned above the water 926 in the water column 917.

When the pressure of the air within the air pocket 930 rises to become greater than the pressure of the air within the embodiment's high-pressure accumulator 931, then one-way valves 932 and 933 tend to open, thereby allowing pressurized air within the air pocket 930 to flow into the high-pressure accumulator 931. When the pressure of the air within the air pocket 930 falls to become less than or equal to the pressure of the air within the embodiment's high-pressure accumulator 931, then one-way valves 932 and 933 tend to close, thereby trapping the highly pressurized air within the high-pressure accumulator 931 and preventing it from flowing back into the air pocket 930.

When the pressure of the air within the air pocket 930 falls to become less than the pressure of the air outside the embodiment, e.g., less than atmospheric pressure, then one-way intake valves, e.g., 934, positioned within apertures, e.g., 918, of an intake duct 919, tend to open, thereby allowing atmospheric air from outside the embodiment to flow into the air pocket 930. When the pressure of the air within the air pocket 930 rises to become greater than or equal to the pressure of the air outside the embodiment, e.g., greater than or equal to atmospheric pressure, then the one-way intake valves, e.g., 934, tend to close, thereby preventing air from within the air pocket 930 from flowing back into the atmosphere outside the embodiment.

The embodiment incorporates eight thrust nozzles, e.g., 913 and 935, that the embodiment's control system (not shown) can control by means of eight respective nozzle-specific valves, e.g., 936 and 937. When the embodiment's control system opens a nozzle-specific valve, e.g., 936, and/or when such a valve is open, then high-pressure air is able to flow 913 from the high-pressure accumulator 931, through the nozzle, and into the atmosphere outside the embodiment, thereby generating thrust. When the embodiment's control system closes a nozzle-specific valve, e.g., 937, and/or when such a valve is closed, then high-pressure air is prevented from flowing out of the high-pressure accumulator 931 through that nozzle, and no thrust is generated.

The embodiment incorporates eight exhaust and/or power-generation ducts, e.g., 920 and 938, each of which is controlled by means of a duct-specific valve, e.g., 939 and 940. And, each duct-specific valve, e.g., 940, is controlled by an actuator, e.g., 941. When the embodiment's control system (not shown) opens a duct-specific valve, e.g., 940, and/or when such a valve is open, then high-pressure air is able to flow 942 out from the high-pressure accumulator 931, through the duct, and through the respective duct-specific turbine, e.g., 943, therein, thereby energizing a generator, e.g., 944, operatively connected to the turbine, thereby generating electrical power. When the embodiment's control system (not shown) closes a duct-specific valve, e.g., 939, and/or when such a valve is closed, then high-pressure air is prevented from flowing out of the high-pressure accumulator 931, through the respective power-generation duct.

A hollow water ballast chamber 945 at a lower end of the buoy 923 may contain a water ballast 946 the volume, mass, weight, and inertia of which may be adjusted, controlled, regulated, and/or altered, by the embodiment's control system (not shown), thereby adjusting, controlling, regulating, and/or altering, the embodiment's draft, waterline, waterplane area, and/or sensitivity to, and/or ability to absorb. energy from ambient waves.

The embodiment has two ballast-control valves 947 and 948. When the embodiment's control system (not shown) opens a ballast-control valve, e.g., 948, and/or when a ballast-control valve, e.g., 948, is open, then high-pressure air tends to flow, e.g., 949, from the embodiment's high-pressure accumulator 931 into the embodiment's water ballast chamber 945 thereby tending to force a portion of the water ballast 946 therein to flow, e.g., 950, out of the water ballast chamber 945 through one of two ballast apertures, e.g., 951, and therethrough flow into the body of water 927 on which the embodiment floats.

When the embodiment's control system (not shown) closes a ballast-control valve, e.g., 947, and/or when a ballast-control valve, e.g., 947, is closed, then high-pressure air in the embodiment's high-pressure accumulator 931 is unable to flow into the embodiment's water ballast chamber 945, and the pressurized air within the embodiment's water ballast chamber 945 is unable to escape, thereby stabilizing the volume of air 945 and the volume of water ballast 946 in the water ballast chamber 945.

Figure 55:
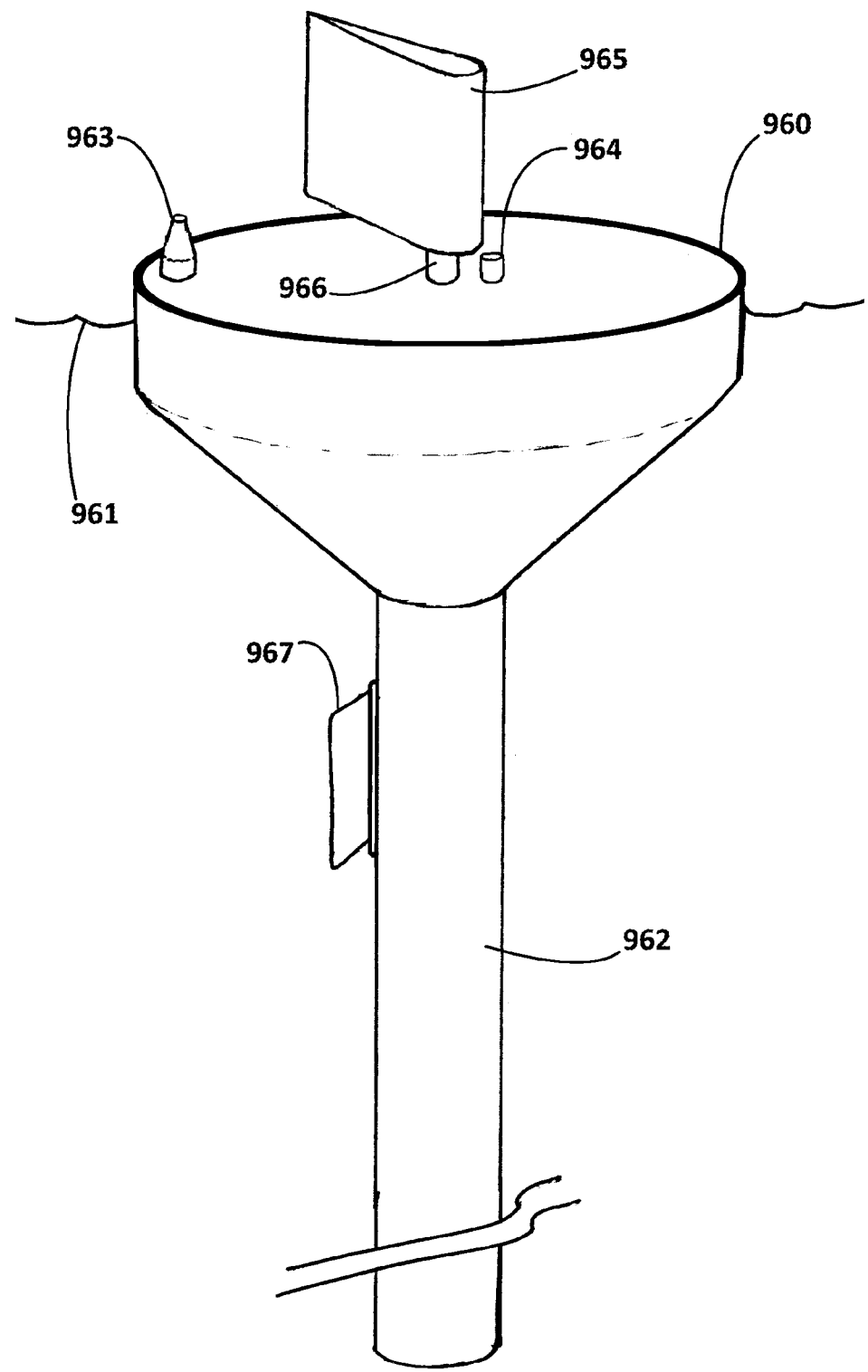
FIG. 55 is an elevated, perspective schematic view of another embodiment of the present invention.

FIG. 55 shows a side perspective view of an embodiment of the present invention.

The embodiment illustrated in FIG. 55 is similar in function and design to the embodiments illustrated in FIGS. 4-7, 34-35 and 53-54, i.e., the embodiment incorporates a buoy; an open-bottomed central water column; a high-pressure accumulator that receives pressurized air from an air pocket at the top of the water column when the air therein is pressurized, and vents pressurized air to the atmosphere through a duct and a turbine therein; and, a duct with a one-way valve that allows atmospheric air to enter the air pocket at the top of the water column when the air therein is depressurized.

The embodiment 960 floats adjacent to an upper surface 961 of a body of water. The embodiment incorporates a buoy 960 and an open-bottomed water column 962. An exhaust duct 963 allows pressurized air to escape from the embodiment's high-pressure accumulator (not visible inside the buoy 960) into the atmosphere while imparting rotational kinetic energy to a turbine (not shown) therein, that is operatively connected to a generator (not shown), that generates electrical power in response to rotations of the connected turbine. An intake duct 964 allows air from outside the embodiment to flow through a one-way valve into an air pocket within a top portion of the water column 962.

The embodiment includes a rigid sail 965 that is able to be rotated about a shaft 966 so as to assume any angular orientation about the nominally-vertical longitudinal axis of that shaft. The embodiment also includes a rudder 967 that allows the embodiment to steer a course in response to propulsion applied to the embodiment by the rigid sail when the sail obstructs a flow and/or stream of wind blowing across the surface 961 of the water on which the embodiment floats.

Figure 56:
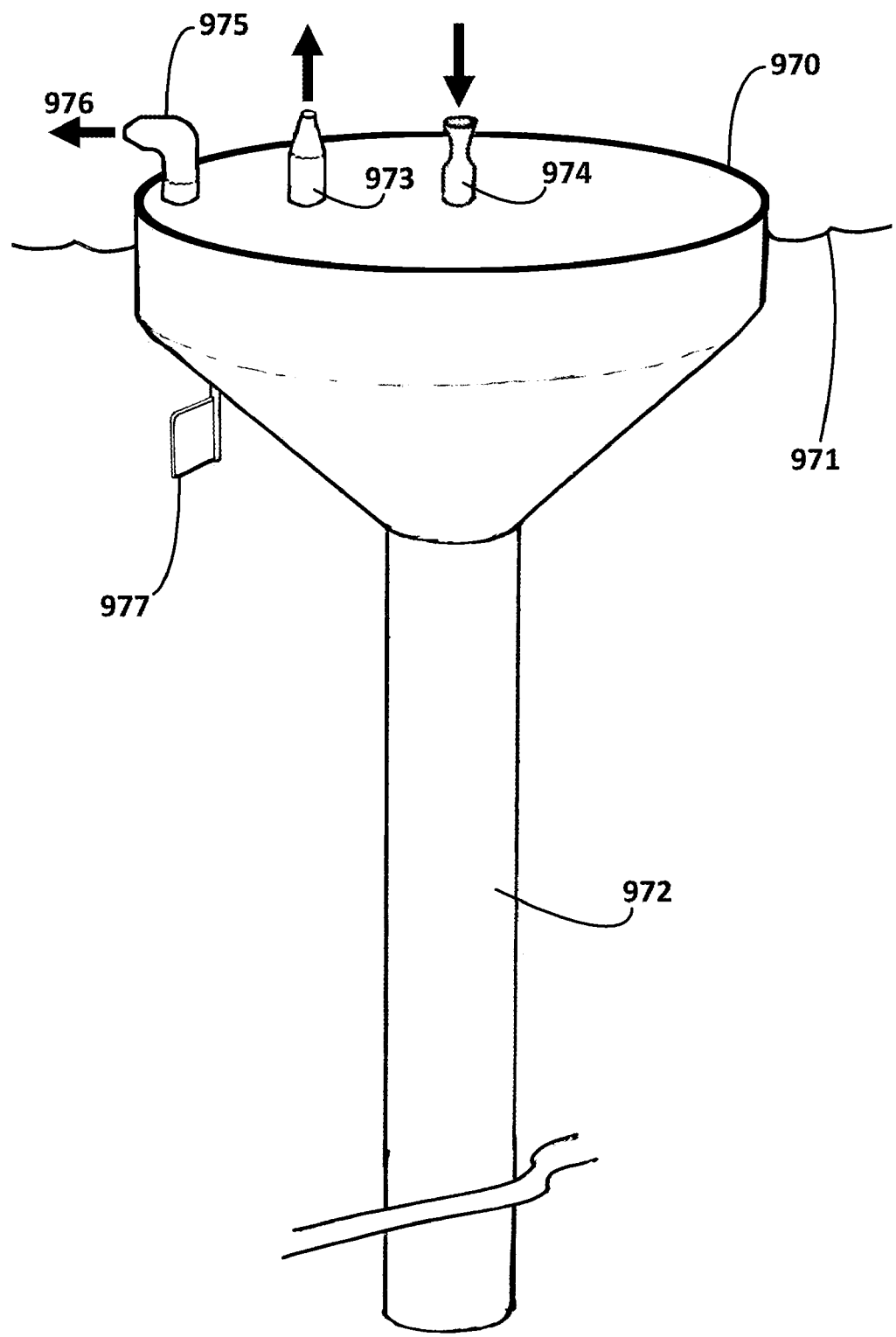
FIG. 56 is an elevated, perspective schematic view of another embodiment of the present invention.

FIG. 56 shows a side perspective view of an embodiment of the present invention.

The embodiment illustrated in FIG. 56 is similar in function and design to the embodiments illustrated in FIGS. 4-7, and 36-37, i.e., the embodiment incorporates a buoy; an open-bottomed central water column; a high-pressure accumulator that receives pressurized air from an air pocket at the top of the water column when the air therein is pressurized, and vents pressurized air to the atmosphere through a duct and a turbine therein; and, a duct with a one-way valve that allows atmospheric air to flow through the duct, and a turbine therein, and enter the air pocket at the top of the water column when the air therein is depressurized.

The embodiment 970 floats adjacent to an upper surface 971 of a body of water. The embodiment incorporates a buoy 970 and an open-bottomed water column 972. An exhaust duct 973 allows pressurized air to escape from a high-pressure accumulator (not visible within the buoy) into the atmosphere while imparting rotational kinetic energy to a turbine (not shown) therein, that is operatively connected to a generator (not shown), that generates electrical power in response to rotations of the connected turbine. An intake duct 974 allows air from outside the embodiment to flow into an air pocket within a top portion of the water column 972 while imparting rotational kinetic energy to a turbine (not shown) therein, that is operatively connected to a generator (not shown), that generates electrical power in response to rotations of the connected turbine.

When a valve is opened (e.g., by an embodiment-specific control system, not shown) a propulsion duct 975 vents 976 pressurized air to the atmosphere outside the embodiment 970, thereby generating thrust. The embodiment includes a rudder 977 that allows the embodiment to steer a course in response to propulsion applied to the embodiment by the propulsive duct 975.

Figure 57:
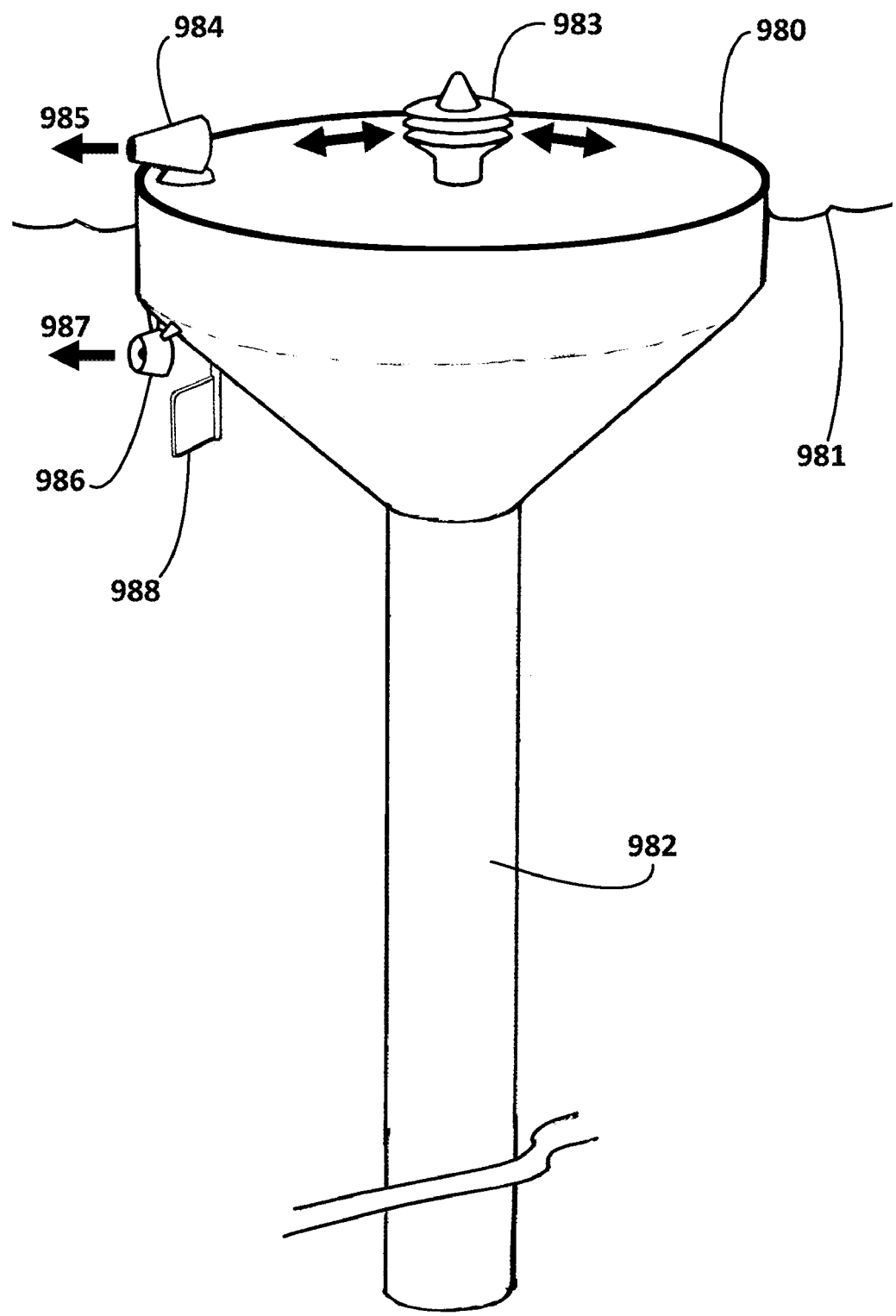
FIG. 57 is an elevated, perspective schematic view of another embodiment of the present invention.

FIG. 57 shows a side perspective view of an embodiment of the present invention.

The embodiment illustrated in FIG. 57 is similar in function and design to the embodiments illustrated in FIGS. 1-3, 32-33, 41-42, and 50-52, i.e., the embodiment incorporates a buoy; an open-bottomed central water column; a duct through which air flows between an air pocket at the top of the water column and the atmosphere outside the embodiment in response to changes in the pressure of the air within that air pocket created by vertical movements of the water within the water column; a turbine connected to the duct such that the flow of air through the duct results in rotations of the turbine, and in the generation of electrical power by an operatively connected generator.

The embodiment 980 floats adjacent to an upper surface 981 of a body of water. The embodiment incorporates a buoy 980 and an open-bottomed water column 982. A duct is connected to a bi-direction (e.g., a "bi-radial") turbine 983 and the duct allows pressurized air to escape into the atmosphere, and allows air from outside the embodiment to flow into an air pocket within a top portion of the water column 982, while imparting rotational kinetic energy to the bi-direction turbine 983 connected thereto, that is operatively connected to a generator (not shown), that generates electrical power in response to rotations of the connected turbine.

The embodiment includes a "ducted fan" 984 that, when energized by the embodiment's control system (not shown) and electrical power generated by the generator operatively connected to the embodiment's bi-direction turbine 983, pressurizes air and generates a propulsive flow of air 985 that generates thrust and propels the embodiment. The embodiment also includes a submerged "thruster" 986 (e.g., a motor-driven propeller) that, when energized by the embodiment's control system (not shown) generates a propulsive flow of water 987 that generates thrust and propels the embodiment. The embodiment also includes a rudder 988 that allows the embodiment to steer a course in response to propulsion applied to the embodiment by the ducted fan and/or the submerged thruster.

Figure 58:
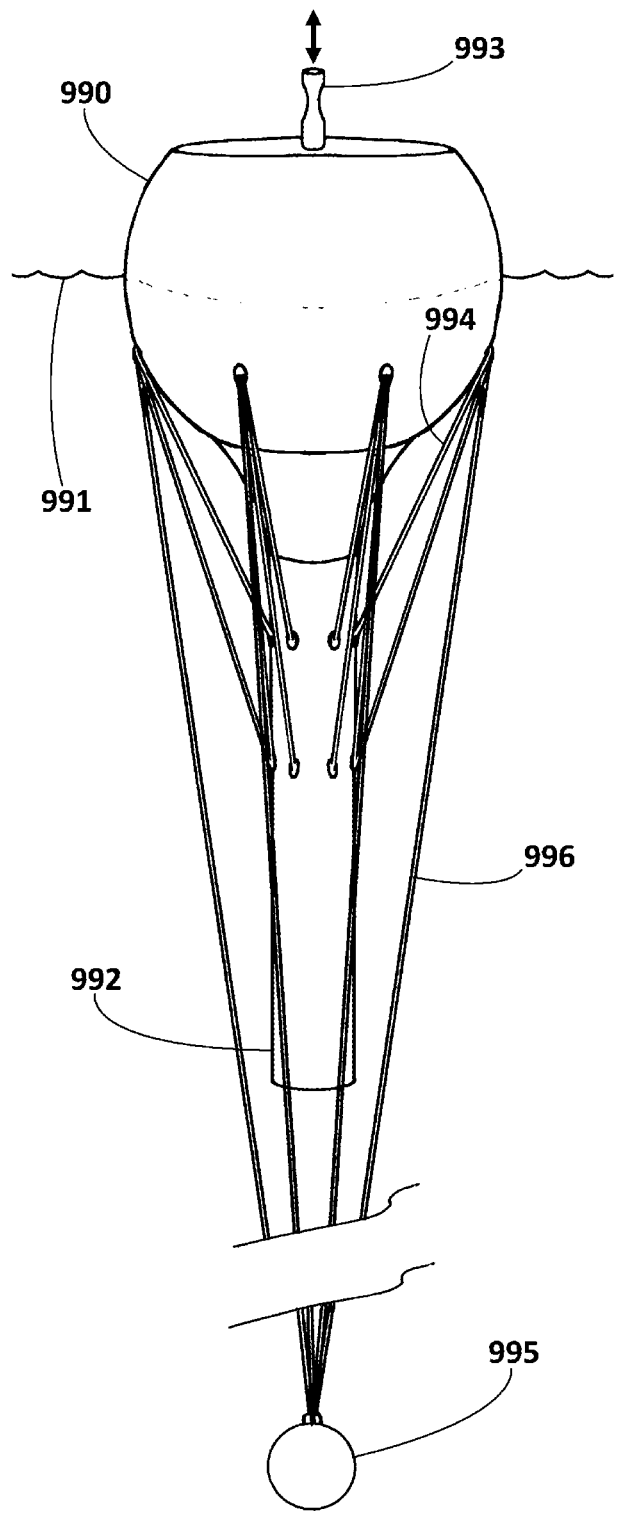
FIG. 58 is an elevated, perspective schematic view of another embodiment of the present invention.

FIG. 58 shows a side perspective view of an embodiment of the present invention.

The embodiment illustrated in FIG. 58 is similar in function and design to the embodiments illustrated in FIGS. 1-3, 32-33, 41-42, and 50-52, i.e., the embodiment incorporates a buoy; an open-bottomed central water column; a duct through which air flows between an air pocket at the top of the water column and the atmosphere outside the embodiment in response to changes in the pressure of the air within that air pocket created by vertical movements of the water within the water column; a turbine positioned within the duct such that the flow of air through the duct results in rotations of the turbine, and in the generation of electrical power by an operatively connected generator.

The embodiment 990 floats adjacent to an upper surface 991 of a body of water. The embodiment incorporates a buoy 990 that has an approximately spherical shape (which may reduce surge-induced rotations of the embodiment) and an open-bottomed water column 992. A bidirectional duct 993 allows pressurized air to escape from the air pocket within a top portion of the water column 992 into the atmosphere, and allows air from outside the embodiment to flow into the air pocket, while imparting rotational kinetic energy to a turbine (not shown) therein, that is operatively connected to a generator (not shown), that generates electrical power in response to rotations of the connected turbine.

Cables 994, struts, wires, ropes, chains, rods, tubes, bars, and/or other connecting members, connect points and/or portions of the spherical buoy 990 to points and/or portions of the water column 992, thereby providing additional structural support to the water column 992 and reducing the risk of structural fatigue and/or failure that might otherwise result from torques and/or bending in those portions of the embodiment near where the water column and the buoy connect.

A weight 995 suspended by a plurality of cables 996, struts, wires, ropes, chains, and/or other at-least-partially flexible connectors promotes the vertical stability of the embodiment.

Figure 59:
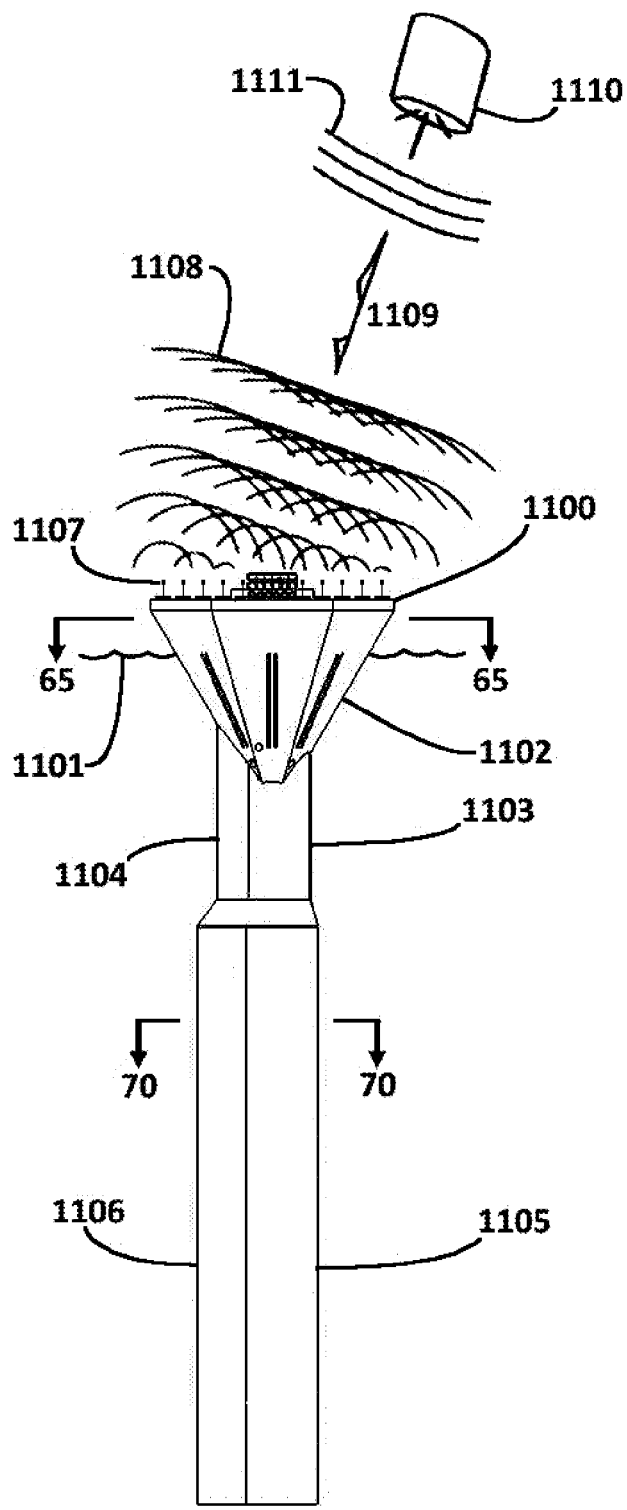
FIG. 59 is an elevated, perspective schematic view of another embodiment of the present invention.

FIG. 59 shows a side view of an embodiment of the present invention.

The buoyant embodiment 1100 floats adjacent to an upper surface 1101 of a body of water over which waves tend to pass. An upper portion 1102 of the embodiment constitutes a buoy and displaces water at the surface 1101 of the body of water (as well as below the surface). Integrated within, and depending from, the buoy 1102 is a tubular structure 1103 through and/or in which water flows up and down approximately along a nominally vertical longitudinal axis of the tube 1103. Extending from a "back" side of the tube (e.g., the left side with respect to the embodiment orientation illustrated in FIG. 59) is an angular extension 1104 and/or appendage which has the effect of imparting to the tubular structure 1103/1104 an approximately airfoil shape with respect to movements in a "forward" direction (e.g., to the right in the illustration).

At a distance below the buoy 1102, a secondary wall 1105/1106 is added to, and surrounds, the inner wall of tubular structure 1103/1104 which extends within and/or through that outer secondary wall 1105/1106. In the gap or hollow space between the inner and outer walls of tube 1105/1106 are struts and stringers which create a truss within that annular void giving added strength to the lower portion 1105/1106 of the tube. Also within the gap between the inner and outer walls of tube 1105/1106 is buoyant material having a density that is less than the density of the water in which the embodiment floats.

Attached and/or connected to an upper surface 1100 of the embodiment is a plurality of antennas, e.g., driven dipole antennas, comprising a "phased array antenna," from which phase-adjusted electromagnetic waves 1108 and/or signals may be transmitted. Through an appropriate selection of relative phases of the signals emanating from each antenna within the phased array, the direction 1109 of the beam 1108 may be controlled, changed, altered, and/or adjusted, so as to direct the beam to and/or toward a receiver, e.g., satellite 1110. Through an appropriate selection of relative phases of the signals received through each antenna within the phased array, the direction 1109 of a beam 1111 received by the phased array may be limited, confined, controlled, changed, amplified, and/or adjusted, so as to substantially eliminate or filter out all transmissions except those emanating from a targeted transmitter, e.g., satellite 1110.

Within the embodiment 1100, are computers and other computational devices and supporting devices (not visible in FIG. 59) that allow the embodiment to receive from a remote source, e.g., from a satellite 1110, computational tasks and data which it then processes with a portion of its onboard computing resources, and a portion of the results of those computations which it subsequently transmits to a remote source, e.g., to a satellite 1110. The embodiment energizes at least a portion of its computers and other computational devices and supporting devices with at least a portion of the electrical power that it generates in response to wave action.

Figure 60:
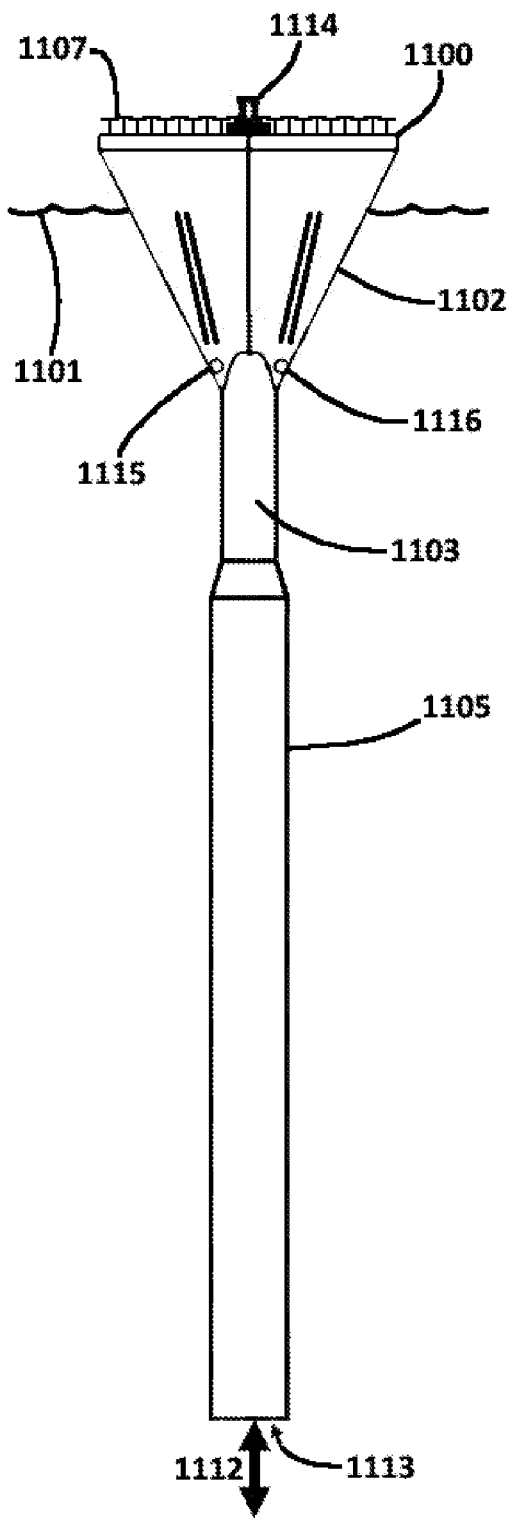
FIG. 60 is an elevated, perspective schematic view of another embodiment of the present invention.

FIG. 60 shows a front view of the same embodiment of the present invention that is illustrated in FIG. 59.

As the embodiment 1100 moves up and down in response to passing waves, water within the tube 1103/1105 is caused to rise and fall, typically out of phase with the vertical motions of the waves and the embodiment. Water moves 1112 in and out of the open bottom 1113 of the tube 1103/1105.

An array 1114 of constricted tubes, i.e., ducted exhaust channels, are present on, and embedded within, the upper wall of the buoy 1100. Through these exhaust channels, air within the tube, and pressurized as a result of the out-of-phase collision of the downward moving embodiment (especially the "ceiling" of the tube 1103/1105 near 1114), and the upward moving water within the tube 1103/1105, is vented to the atmosphere outside the embodiment through the ducted exhaust channels 1114, and through the respective turbines positioned therein, which energize operatively connected generators thereby causing those generators to generate electrical power.

Within a bottom portion of the buoy 1100 are two forward/backward horizontal thrusters 1115 and 1116 positioned within approximately and/or nominally horizontally aligned and/or oriented cylindrical cavities characterized by approximately horizontal longitudinal axes. When the thrusters spin their respective propellers in one direction they generate thrust that drives the embodiment in a forward direction. When the thrusters spin their respective propellers in the opposite direction they generate thrust that drives the embodiment in a backward direction. Through the generation of thrusts of differing magnitudes and/or directions the embodiment is able to generate a torque about its nominally vertical longitudinal axis and rotate about that nominally vertical longitudinal axis. And, through the generation of approximately equal thrusts in an appropriate direction the embodiment is able to move forward (i.e., out of the page and toward the reader).

The leading edges of the upper 1103 and lower 1105 portions of the submerged tube are approximately elliptical in horizontal cross-section and smooth, permitting the embodiment to move forward with minimal drag.

Phased array 1107 is seen from a perspective normal to the perspective of FIG. 59. Each dipole antenna, e.g., 1107, in the array extends laterally from an approximately central vertical post or strut.

A portion of the electrical power generated by the embodiment in response to wave action is used to power computers for the purposes of processing computational tasks received by satellite (or another transmission source), to energize the thrusters 1115-1116, to energize the transmitter(s) and receiver(s) through which data, processing tasks, signals, instructions, etc. are received from remote transmitters, and through which data, computational results, status updates, etc., are transmitted to remote receivers.

Figure 61:
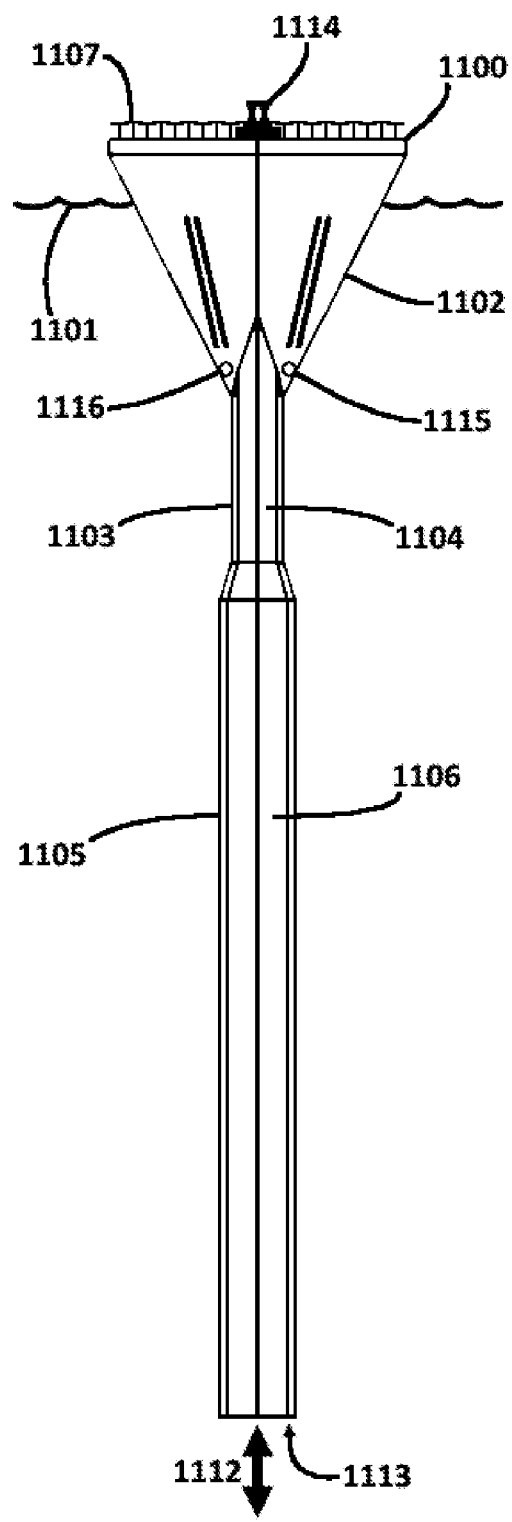
FIG. 61 is an elevated, perspective schematic view of another embodiment of the present invention.

FIG. 61 shows a back view of the same embodiment of the present invention that is illustrated in FIGS. 59 and 60.

The tapered portions 1104 and 1106 of the water tube 1103/1105 facilitate its movement through the water by imparting to the water tube an approximately airfoil shape with respect to its horizontal (i.e., normal to a nominally vertical longitudinal axis of the water tube) cross-section, thereby reducing drag with respect to forward motion (i.e., approximately parallel to the surface 1101 of the water and into the page). Forward/backward horizontal thrusters 1115 and 1116 are able to produce thrust that enables the embodiment to rotate about a nominally vertical longitudinal axis of the embodiment, and to move across the surface 1101 of the body of water on which it floats.

Figure 62:
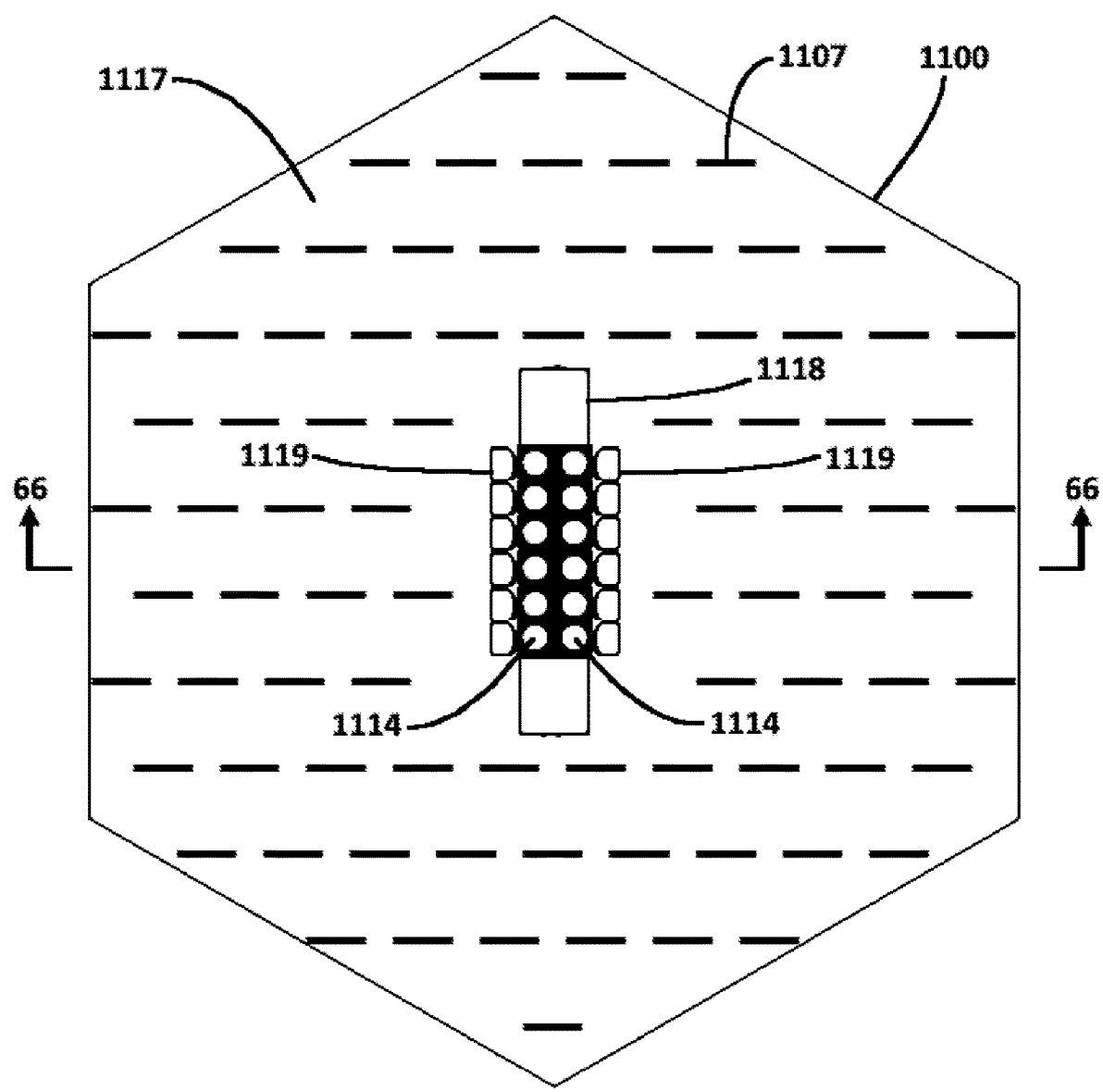
FIG. 62 is a top view of another embodiment of the present invention.

FIG. 62 shows a top-down view of the same embodiment of the present invention that is illustrated in FIGS. 59-61.

Attached to an upper deck 1117 of the buoy of the embodiment 1100 are rows of antennas, e.g., 1107, that form a phased array antenna in which signals driving each individual antenna, e.g., 1107, are adjusted by phase so as to direct the resulting beam. Similarly, the phase of the signals received by each antenna are adjusted so as to narrow or constrict the direction from which signals may be received.

A structure 1118 embedded within the upper deck 1117 supports two adjacent rows of constricted channels or exhaust ducts, e.g., 1114. Inside each exhaust duct is an air-driven turbine operatively connected to a generator such that the spinning of each turbine causes the respective operatively connected generator to generate electrical power.

Also supported by, and/or embedded within, structure 1118 are two sets of intake apertures, e.g., 1119, through which air from outside the embodiment is drawn into the water tube. The flow of air through each intake aperture is controlled by a respective one-way valve, such that air may only flow into the air pocket at the top of the water tube when the pressure of the air within that air pocket is of a lesser pressure than the air outside the embodiment (e.g., when the air in the air pocket is less than atmospheric pressure).

In an embodiment similar to the one illustrated in FIGS. 59-62, one-way valves only allow air to flow out of each respective exhaust duct and associated turbine when the pressure of the air within the water tube (i.e., the air trapped in an air pocket at the top of the water tube) is greater than the pressure of the air outside the embodiment.

Figure 63:
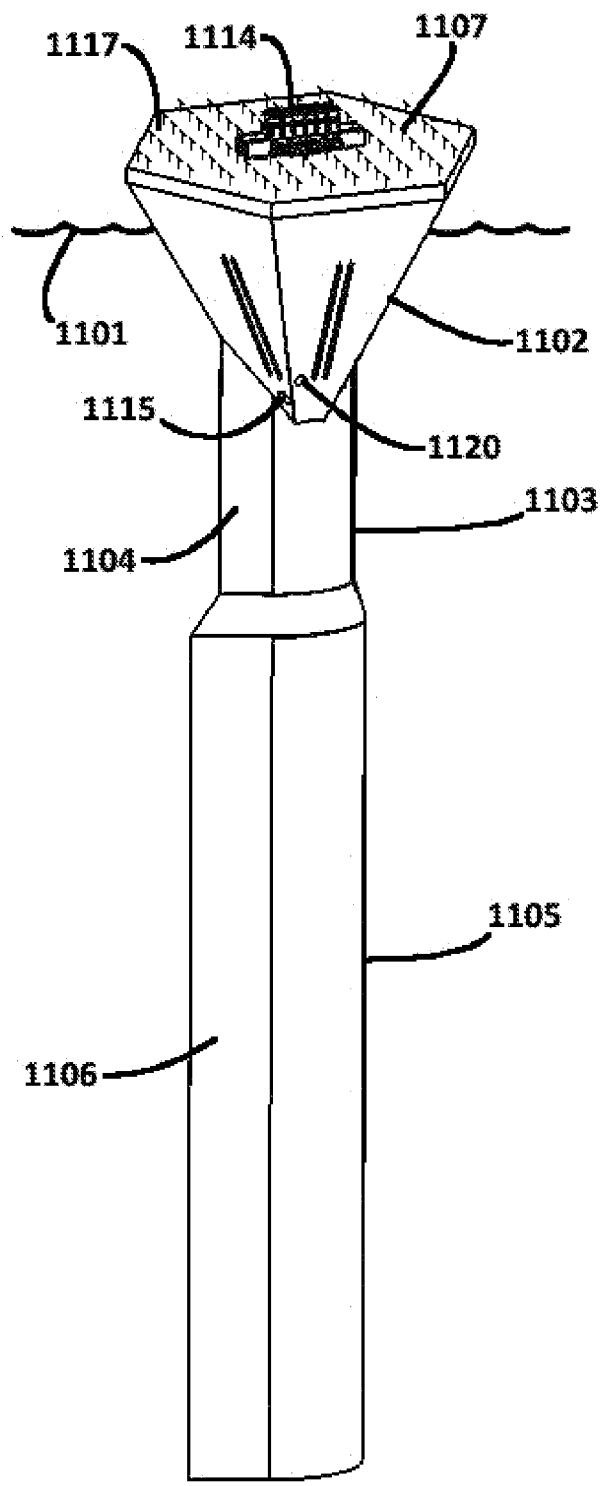
FIG. 63 is an elevated, perspective view of the embodiment of FIG. 62.

FIG. 63 shows a side perspective view of the same embodiment of the present invention that is illustrated in FIGS. 59-62.

In addition to the two forward/backward horizontal thrusters, e.g., 1115, illustrated and discussed in relation to FIGS. 60 and 61, the embodiment also has a side-to-side horizontal thruster 1120 that generates a nominally horizontal thrust along an axis approximately normal to the axes of the nominally horizontal thrust generated by thrusters 1115 and 1116 (see FIGS. 60 and 61).

Figure 64:
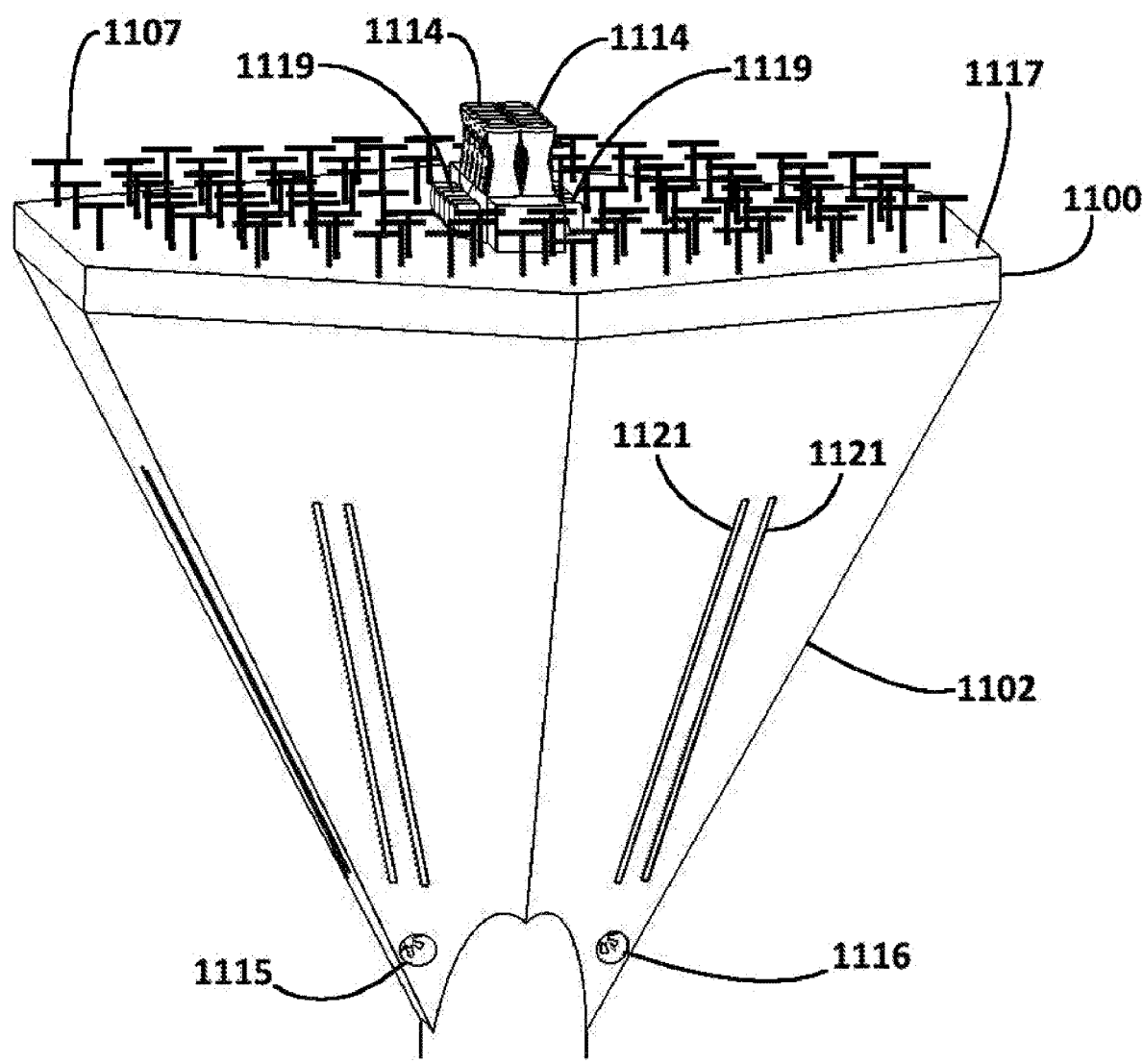
FIG. 64 is an enlarged, sectional view of the embodiment of FIG. 62.

FIG. 64 shows a front perspective view of the buoy 1100 portion of the same embodiment of the present invention that is illustrated in FIGS. 59-63.

Embedded within, and passing through, the side walls of the buoy 1102 are thermally conductive elements, e.g., 1121, that transmit thermal energy from within the buoy to the seawater outside and around the buoy. These conductive elements facilitate the passive cooling of computers and other computational circuits positioned within the buoy and powered at least in part by electricity generated by the embodiment's turbines and associated generators.

Figure 65:
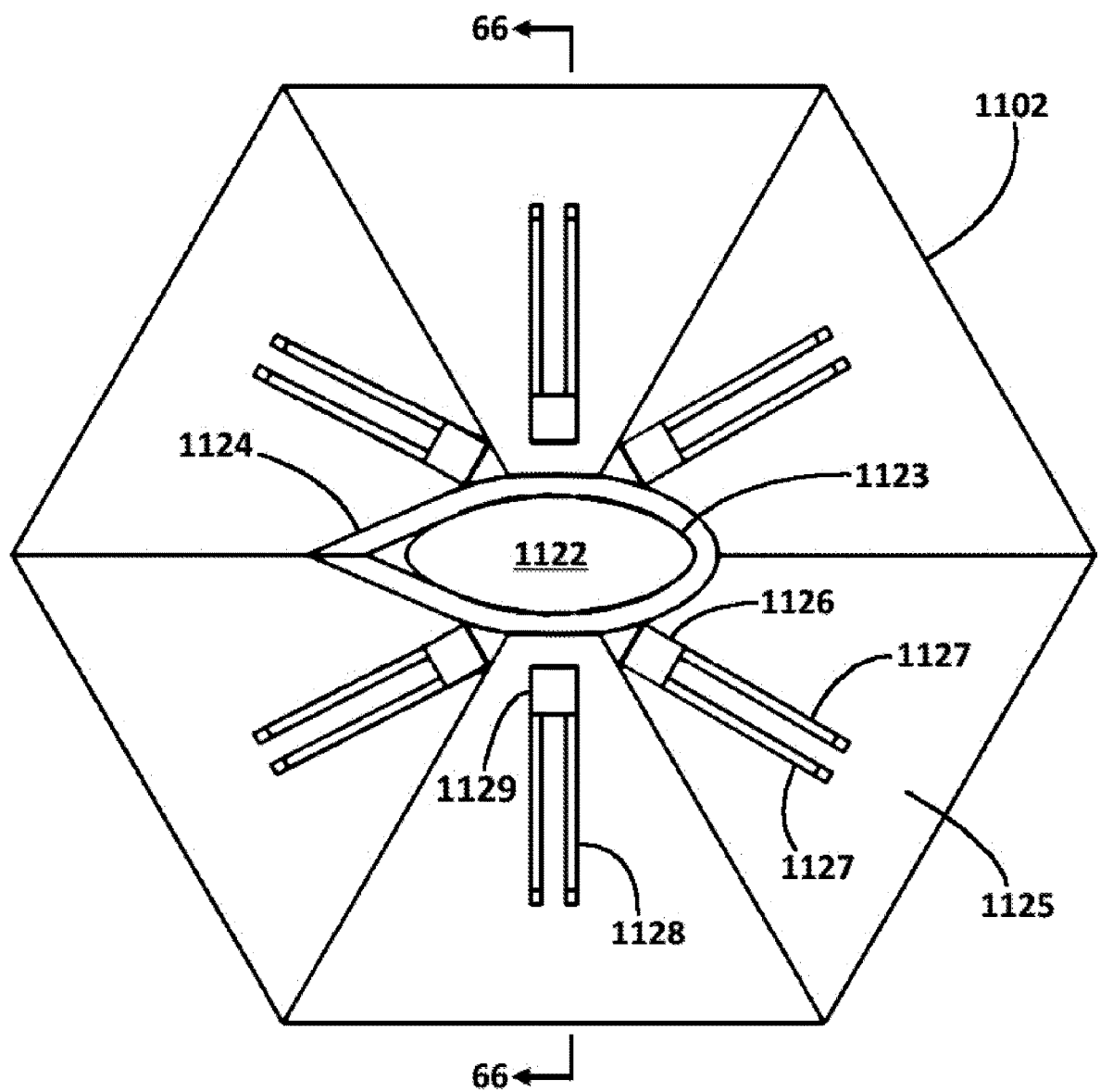
FIG. 65 is a top view of another embodiment of the present invention.

FIG. 65 shows a top-down cross-sectional view of the same embodiment of the present invention that is illustrated in FIGS. 59-64, where the line 65-65 of the section plane is specified in FIG. 59.

Within buoy 1102, adjacent to inner surfaces, e.g., 1125, of the buoy 1102, are attached, connected, and/or positioned, a plurality of computing chambers, e.g., 1126 and 1129, cases, enclosures, containers, boxes, and/or compartments. Each computing chamber, e.g., 1126, contains electronic and/or computing circuits (not visible within boxes) that are, at least in part, energized by electrical power generated by the embodiment's generators. A portion of the heat generated by the electronic and/or computing circuits positioned within the computing chambers, e.g., 1126, is absorbed by a phase change material enclosed and/or sealed within each computing chamber resulting in the conversion of a portion of that phase change material from a liquid to a gas. The gaseous phase-changing material contained within each computing chamber, e.g., 1126 and 1129, tends to rise within, and/or travel to the nominally upper distal ends of a respective pair of heat-exchanging channels, e.g., 1127 and 1128, connected to each respective computing chamber, e.g., 1126 and 1129.

Heat from the gaseous phase-changing material tends to be transferred to the walls of the heat-exchanging channels, e.g., 1127 and 1128, and a portion of that transferred heat thereafter tends to be transferred and/or conducted to the water on which the embodiment floats. When water ballast is present within the buoy 1102, then a portion of that transferred heat may also be transferred and/or conducted to the water ballast within the buoy, and thereafter may be transferred and/or conducted to the water on which the embodiment floats through the walls, e.g., 1125, of the buoy 1102.

After transferring a sufficient amount of the thermal energy responsible for boiling of the phase-changing material through the walls of the respective heat-exchanging channels, e.g., 1127 and 1128, at least a portion of the phase-changing material tends to liquefy, condense, and/or convert back to a liquid phase. The (re)condensed liquid phase-changing material then tends to flow down the interior of its respective heat-exchanging channel, e.g., tending to flow adjacent to, and/or against or along, an interior wall of its respective heat-exchanging channel, with the flow tending to be directed in a nominally downward direction toward the center of the buoy 1102 and toward and eventually back into the respective computing chamber, e.g., 1126, from which it boiled off, and from where it can repeat the cycle of vaporization and condensation, thereby transferring additional heat away from the electronic circuits within the computing chambers and into the ambient water on which the embodiment floats.

Revealed within the cross-sectional view of FIG. 65 is the tubular water channel 1122 through which water tends to rise and fall within the embodiment in response to wave action, and the airfoil-shaped walls, e.g., 1123 and 1124, which establish, define, contain, and/or entrain, the water channel 1122, and which reduce the drag forces imparted to the embodiment as it moves through, and/or relative to, the body of water on which it floats when moving in its "forward" direction (e.g., to the right with respect to the embodiment orientation illustrated in FIG. 65). When the tubular structure defined in part by walls 1123 and 1124 exits the bottom of the buoy from its bottom-most extent, it becomes elements 1103 and 1104 as specified in FIGS. 59, 61, and 63.

Within and/or between the inner 1123 and outer 1124 walls of the water tube is buoyant material that provides a substantial portion (if not all) of the embodiment's buoyancy. The net effective density of the embodiment, and the position of its nominal waterline, is influenced by the buoyant material within the water tube 1124, the water ballast (if any) within the buoy 1102, and the inherent weight of the material (e.g., steel) of which the embodiment's structures are comprised. By adjusting and/or changing the volume, weight, and mass, of water ballast within the buoy 1102, the average density of the embodiment can be adjusted and/or changed, thereby causing the embodiment's waterline to become lower or higher, which, with respect to a buoy with an inconstant horizontal cross-sectional area effectively tends to cause and/or result in a corresponding adjustment and/or change in the embodiment's waterplane area, which thereby tends to respectively increase or decrease the fraction of the ambient wave energy that will be imparted to, and/or be available for extraction by, the embodiment.

Because the water ballast (if any) within the buoy 1102 tends to offset the buoyancy of the low-density material (i.e., the material with a density less than the density of the water within which the embodiment floats) within embodiment's water tube 1124, the vertical position of the embodiment's nominal waterline can be controlled, changed, and/or adjusted, through the control, change, and/or adjustment, of the amount of water ballast within the buoy 1102.

This means that when waves are relatively small, the amount of water ballast can be maximized thereby tending to cause the embodiment's waterline to be proximate to the upper end of the embodiment (e.g., to the upper deck, i.e., 1117 in FIGS. 63 and 64, and/or wall of its buoy 1102), which, in turn, causes the size of the embodiment's waterplane area to be maximized. This maximization of the embodiment's waterplane area tends to maximize the amount of available wave energy that the embodiment will tend to capture.

Similarly, this means that when waves are relatively large, especially when the waves are produced in conjunction with a storm and potentially endanger the structural integrity of the embodiment, the amount of water ballast can be reduced and/or minimized, causing the embodiment's waterline to be moved down toward the bottom end of the embodiment (e.g., as far down and away from the upper deck, i.e., 1117 in FIGS. 63 and 64, and/or wall of its buoy 1102). This reduction in the volume, weight, and mass, of water ballast within the embodiment will tend to raise the embodiment, and/or its buoy 1102, up and out of the water, placing a substantial portion of its lateral cross-sectional area (i.e., the cross-sectional area associated with a horizontal section) out of the water.

This raising of the embodiment's buoy out and above the surface of the body of water on which the embodiment floats will also tend to substantially reduce the embodiment's waterplane area. This reduction in the embodiment's waterplane area will tend to reduce and/or minimize the amount of available wave energy that the embodiment will tend to capture. And, this reduction in the amount of available wave energy that the embodiment captures will tend to protect the embodiment from the potentially destructive structural stresses that it might otherwise experience were it to absorb more of that wave energy.

Figure 66:
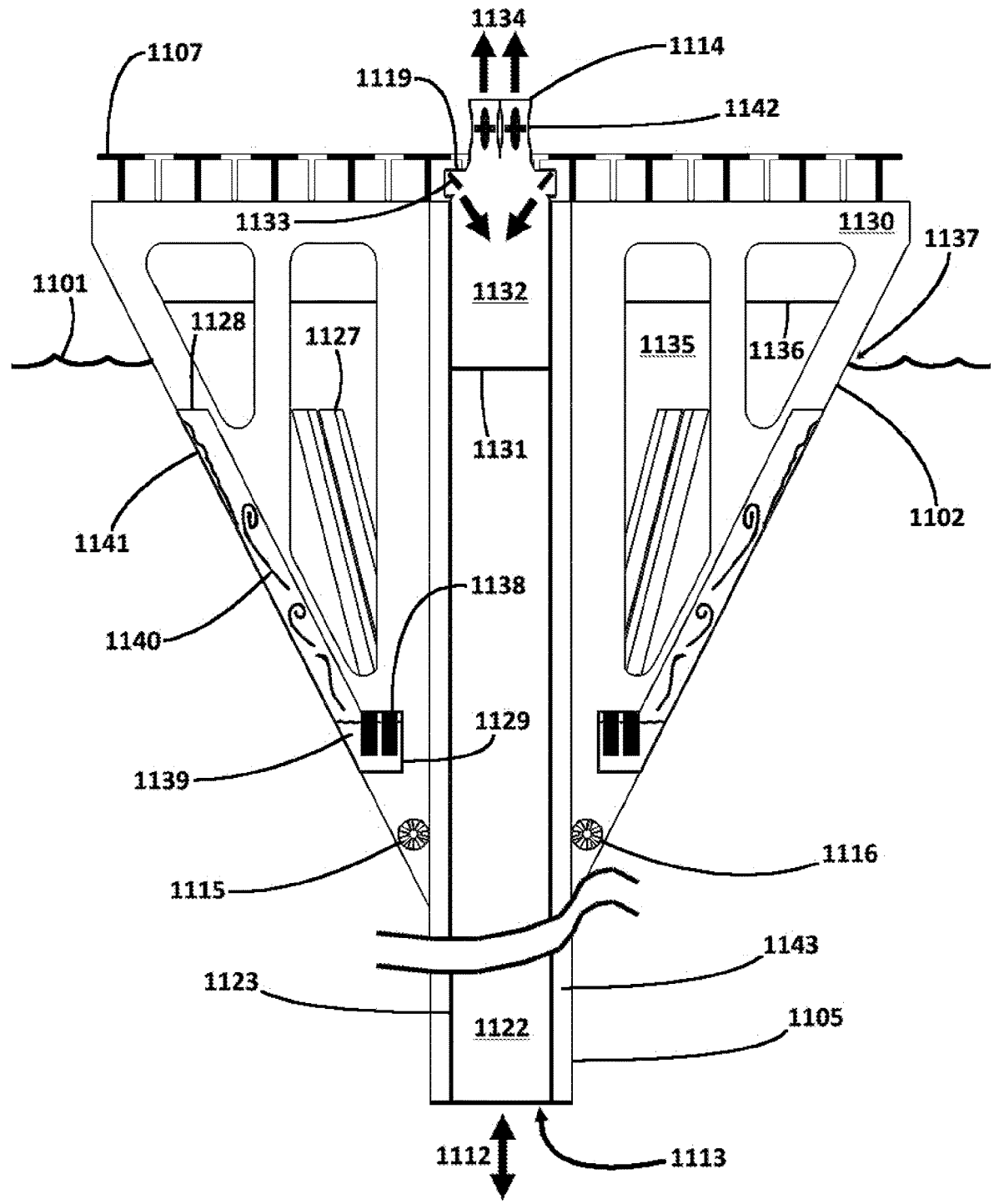
FIG. 66 is a cross sectional view of the embodiment of FIG. 65.

FIG. 66 shows a side cross-sectional view of the same embodiment of the present invention that is illustrated in FIGS. 59-65, where the line 66-66 of the section plane is specified in FIGS. 62 and 65.

The structure of the buoy 1102 is defined in part through structural plates, e.g., 1130, oriented approximately vertically and oriented in an approximately radial fashion about a nominally vertical longitudinal axis of approximate radial symmetry of the embodiment.

Within the embodiment is a tubular channel 1122 oriented approximately vertically and approximately parallel to a nominally vertical longitudinal axis of the embodiment. Water may freely enter and leave 1112 the tubular channel 1122 via a bottom mouth 1113 and/or opening. As the embodiment moves up and down in response to the passing of ocean waves, the surface 1131 of the water within the tubular channel 1122 rises and falls relative to the embodiment and the tubular channel therein.

As the surface 1131 of the water within the tubular channel 1122 falls, air tends to be drawn into the channel 1122 and/or into an air pocket 1132 which tends to be present at the top of the channel. Air enters (as suggested by downward pointing arrows within air pocket 1132) the tubular channel with little, if any, resistance through intake apertures, e.g., 1119, incorporated within an upper portion of the tube's wall(s) 1123 wherein the approximately unidirectional flow of air into the tube, and/or into the air pocket therein, is enforced, controlled, and/or regulated, by respective one-way valves, e.g., 1133, within each intake aperture, e.g., 1119. When the pressure of the air within the air pocket 1131 in an upper portion of the tubular channel 1122 is greater than the pressure of the air outside the embodiment (e.g., greater than atmospheric pressure), then the one-way valves within the intake apertures tend to remain closed, thereby preventing the escape of high-pressure air from the air pocket at the top of the tube. However, when the pressure of the air within the air pocket 1131 in an upper portion of the tubular channel 1122 is less than the pressure of the air outside the embodiment (e.g., less than atmospheric pressure), then the one-way valves, e.g., 1119, tend to open and allow the higher-pressure outside air to enter the tube.

As the surface 1131 of the water within the tubular channel 1122 rises, the pressure of any air within, and/or trapped within the air pocket 1132 at the top of the channel 1122 tends to increase. When the pressure of the air within the air pocket at the top of the tubular channel 1122 increases to where it becomes greater than the pressure of the air outside the embodiment, e.g., greater than atmospheric pressure, then the one-way valves, e.g., 1133, in the intake apertures, e.g., 1119, tend to close, preventing the escape of the high-pressure air, and forcing at least a portion of that high-pressure air to exit 1134 the tubular channel through the exhaust ducts, e.g., 1114, at the top of the air pocket 1132 and the tubular channel 1122, thereby forcing, guiding, and/or directing, at least a portion of that high-pressure air to pass through, engage, energize, spin, and/or cause to rotate, the air turbines, e.g., 1142, within the respective ducts, e.g., 1114. The high-pressure-air-induced spinning of the air turbines tends to cause respective generators, operatively connected to the air turbines, to generate electrical power.

The embodiment incorporates voids that are able to hold water as ballast allowing the embodiment to adjust its mass, weight, and inertia, within a range of values. Within buoy 1102 the relatively spacious interior void is able to, and typically does, contain a substantial volume of water 1135 (e.g., seawater) which substantially increases the weight and mass of the embodiment. When the level 1136 of water ballast within the buoy is increased, so too the weight and mass of the embodiment is increased, which tends to cause the embodiment to sit lower in the water, i.e., raising the embodiment's waterline 1137 and increasing its waterplane area (the cross-sectional area of the buoy 1102 across a section plane parallel to the surface 1101 of the water on which the embodiment floats). When the level 1136 of water within the buoy is decreased, so too the weight and mass of the embodiment is decreased, which tends to cause the embodiment to rise up out of the water, i.e., lowering the embodiment's waterline 1137 and decreasing its waterplane area.

Within the buoy 1102, and attached to its interior walls, are computing chambers, e.g., 1129, that contain electronic and/or computational circuits, e.g., 1138, that process computational tasks received via encoded electromagnetic signals from remote antennas, e.g., the antenna on a satellite, and that consume at least a portion of the electrical power generated by the embodiment. In the process of performing computational tasks, the circuits within the computing chambers, e.g., 1129, generate heat that, if not dissipated at an adequate rate, might damage the electronic and/or computational circuits positioned and/or housed within the computing chambers.

The computing chambers, e.g., 1129, containing the computational circuits, e.g., 1138, are in contact with the water that comprises the water ballast contained within the buoy 1102 when the level 1136 of that water ballast is sufficiently high. In addition, the computational circuits, e.g., 1138, within each computing chamber, e.g., 1129, are bathed in a phase-changing liquid 1139 that tends to absorb some of the heat generated by the circuits within their respective computing chambers. Upon absorbing thermal energy (i.e., heat), a portion of the phase-changing liquid 1139 tends to boil and become a gas 1140 that tends to rise within respective computing-chamber specific heat-exchanging tubes, e.g., 1128, that are fluidly connected to their respective compartments, e.g., 1129.

Because the outer sides or walls of the heat-exchanging tubes, e.g., 1128, are in contact with the water 1101 outside the buoy 1102, and are, at times, e.g., when the volume of water ballast is at or above a certain level, in contact with the water ballast 1135 within the buoy, the heated phase-changing gas tends to conductively transfer heat to the walls of the respective heat-exchanging tubes, e.g., 1128, which tends to transfer at least a portion of that heat to the air or water outside those heat-exchanging tubes, and thereafter tends to (re)condense, e.g., 1141, and change back to a liquid phase, whereupon it tends to drain down and back into the computing chamber, e.g., 1129, from whence it boiled off.

The gap 1143 between inner 1123 and outer 1105 walls of the tubular channel 1122 is, in part, filled with buoyant material(s) that offset(s) at least a portion of the embodiment's weight, thereby tending to reduce its density. In the absence of water ballast 1135 within the buoy 1102, the embodiment will tend to rise, to a degree, out of the water in which it floats, thereby reducing its waterplane area, and rendering it less sensitive to the energy of the waves that buffet it. As water is added as additional ballast, the weight and mass of the embodiment increases, and its average density increases, causing it to sink, to a degree, into the water 1101 on which it floats, thereby raising the nominal waterline, and tending to increase its sensitivity to the energy of the waves that buffet it. During storms tends to be advantageous to be able to raise the embodiment out of, and above, the surface 1101 of the water to a degree. Conversely, during periods of weak waves, it tends to be advantageous to be able to lower the embodiment further into the water thereby increasing the area of the surface 1101 of the water that it displaces, and thereby exposing it to a greater amount of the modest wave energy that is available to it.

Figure 67:
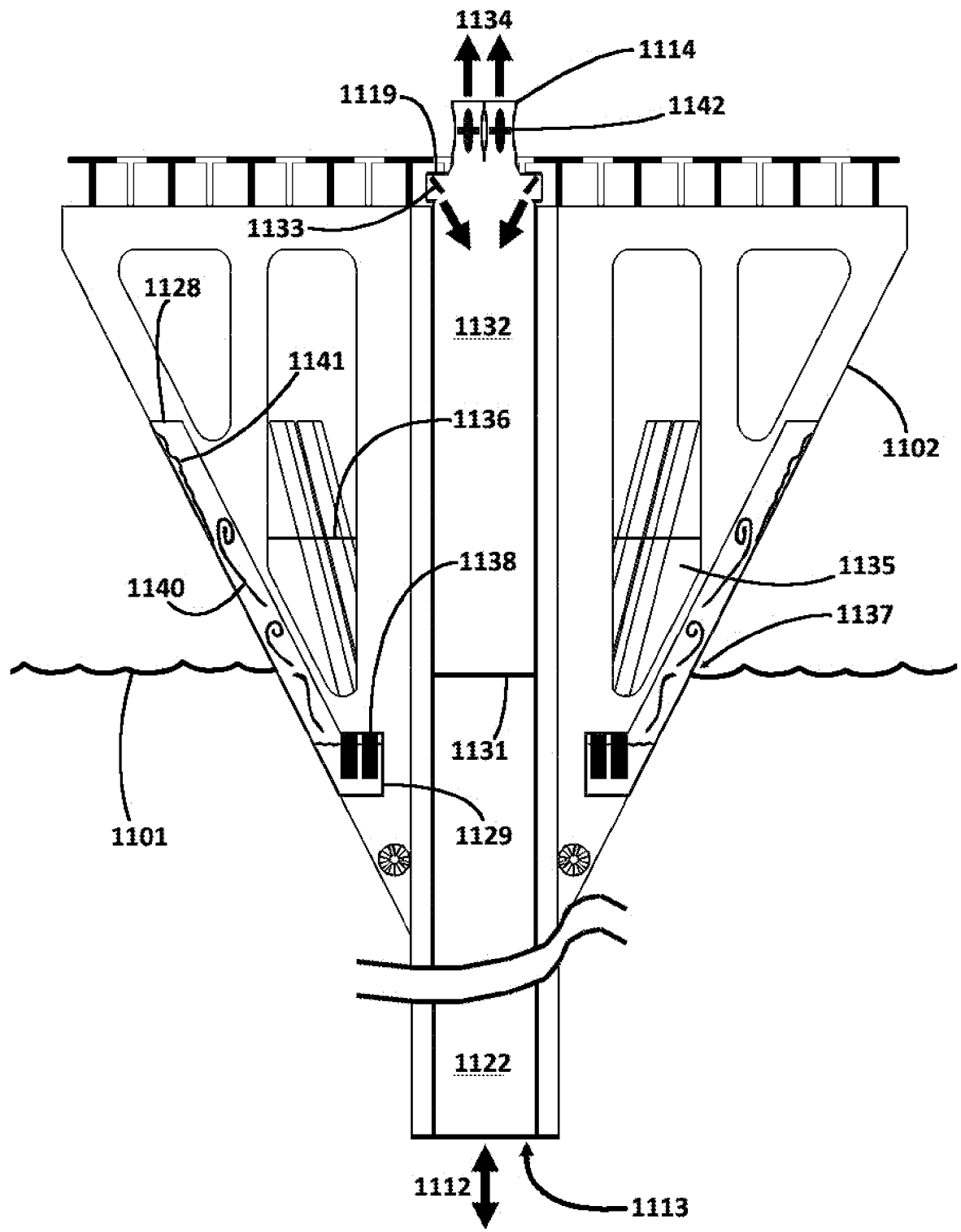
FIG. 67 is another cross sectional view of the embodiment of FIG. 65.

FIG. 67 shows the same side cross-sectional view of the embodiment of the present invention that is illustrated in FIG. 66, and, as with the cross-sectional view illustrated in FIG. 66, the line 66-66 specified in FIGS. 62 and 65 defines the section plane to which the view in FIG. 67 corresponds.

In the illustration provided in FIG. 67, the volume of water ballast 1135 within the embodiment's buoy 1102 is decreased compared to the configuration illustrated in FIG. 66. As a consequence of the lowered level 1136, and reduced volume and mass, of the water ballast 1135 within the buoy 1102, the mass, weight, and average density, of the embodiment has decreased substantially. Because of the decreased volume and mass of water ballast 1135 within the embodiment, the embodiment has risen, to a degree, out of, and above, the surface 1101 of the body of water on which the embodiment floats, thereby lowering its nominal or average waterline 1137, thereby decreasing its waterplane area, and thereby decreasing the amount of energy that it is able to extract from the waves that pass it by.

Because the volume of water ballast 1135 within the buoy 1102 has decreased, the level 1136 of that water has fallen. Because of this, a distal and/or upper portion of the heat-exchanging tubes, e.g., 1128, that are connected to, and extend out from, the computing chambers, e.g., 1129, containing computational circuits, e.g., 1138, are no longer fully bathed in the water of the ballast 1135, and are instead, in part, in contact with the air above the surface 1136 of the water ballast. Also as a consequence of the embodiment's fallen waterline 1137, the portions of the heat-exchanging tubes, e.g., 1128, that extend through the outer walls of the buoy 1102 and are nominally in contact with the water on which the embodiment floats, are no longer fully bathed in the water 1101 outside the embodiment. The reduction in the surface area within each heat-exchanging tube 1128 that is bathed in water, inside and outside the buoy 1102, means that the rate at which the heat-exchanging tubes can conductively transfer heat away from the boiled-off heat-absorbing phase-changing gas 1140 is reduced. Thus the rate at which that gas 1140 condenses on the walls of the heat-exchanging tubes, e.g., 1128, may be reduced, and it may be advantageous to reduce the rate at which computations are performed, and the corresponding and/or associated rate at which energy is consumed, and heat is generated, by the computational circuits, e.g., 1138, within the computing chambers, e.g., 1129.

It may be useful for an embodiment to reduce the volume, weight, and mass of its water ballast 1135 when waves become so vigorous that there is a danger of the embodiment being driven too forcefully in response to them. By reducing the volume of its water ballast, an embodiment can raise itself, to a degree, above the waves, thereby lowering its waterline 1137, and thereby reducing its waterplane area. And, as a consequence of lowering its waterline 1137, and reducing its waterplane area, the average level 1131 of the water inside its tubular water channel 1122 will also tend to be lowered, which thereby tends to increase the volume of the air pocket 1132 above that level 1131. Thus, the distance between the surface 1131 of the water in the water channel 1122 will tend to be further away from the intake apertures 1119, and the ducted turbines 1114/1142, adjacent to the top of the tube, permitting the vertical oscillations of the water within the tube to have a greater amplitude before they reach the intake apertures and ducted turbines, and exceed the limits of the space available to them within the tube. The increase nominal volume of the air pocket 1132 also means that, in general, the raising of the surface 1131 of the water within the embodiment's tubular channel 1122 by a given distance will tend to result in a lesser increase in the pressure of the air within the air pocket, which will cause the embodiment to absorb less energy per unit distance of oscillation in the water column 1122 than it would absorb with a more heavily ballasted configuration.

Figure 68:
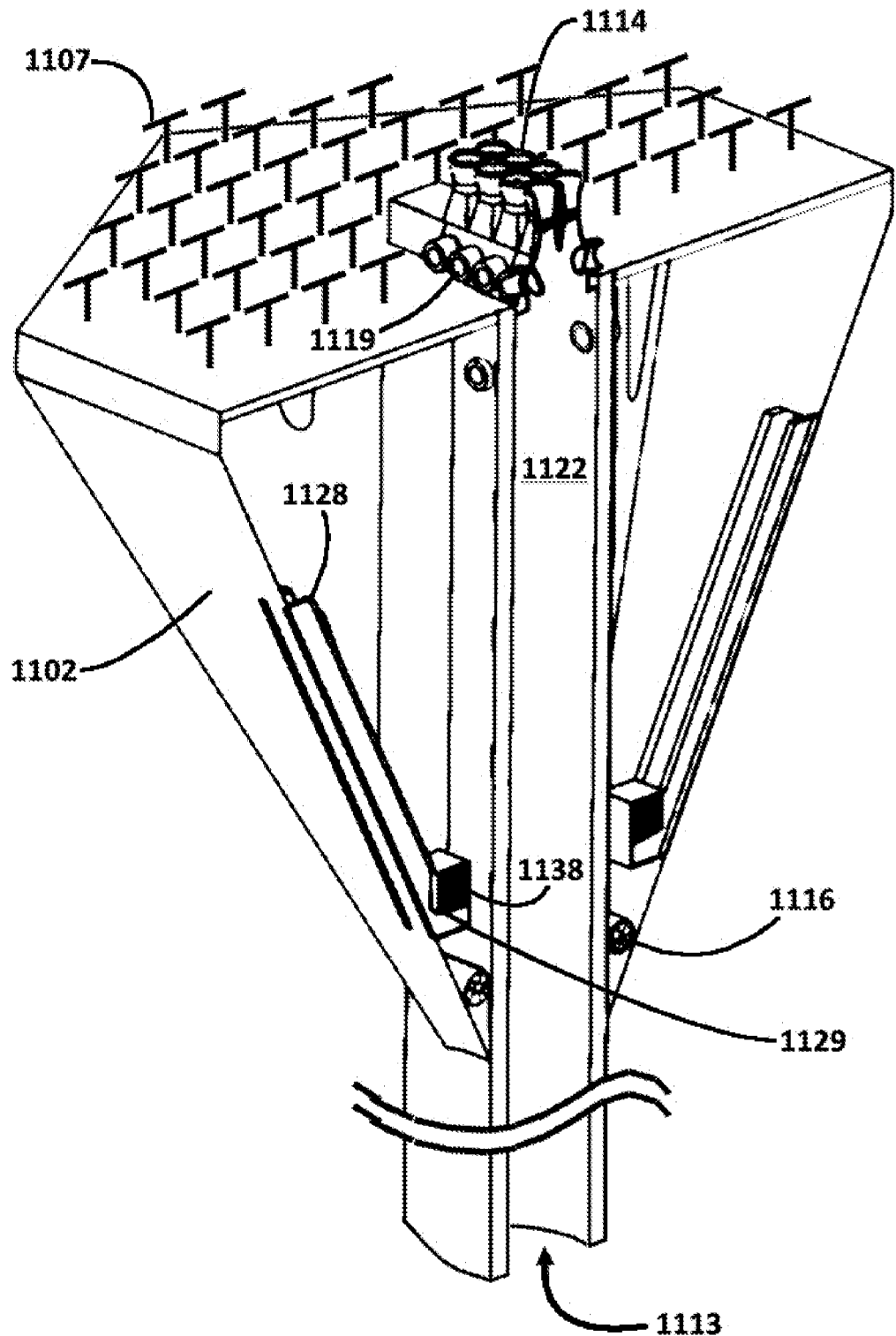
FIG. 68 is another cross sectional view of the embodiment of FIG. 65.

FIG. 68 shows the same vertical cross-section of the embodiment as is illustrated in FIGS. 66 and 67. However, FIG. 68 affords a perspective view of the cross-section, and omits the water ballast within buoy and the water within the tubular water channel 1122.

Figure 69:
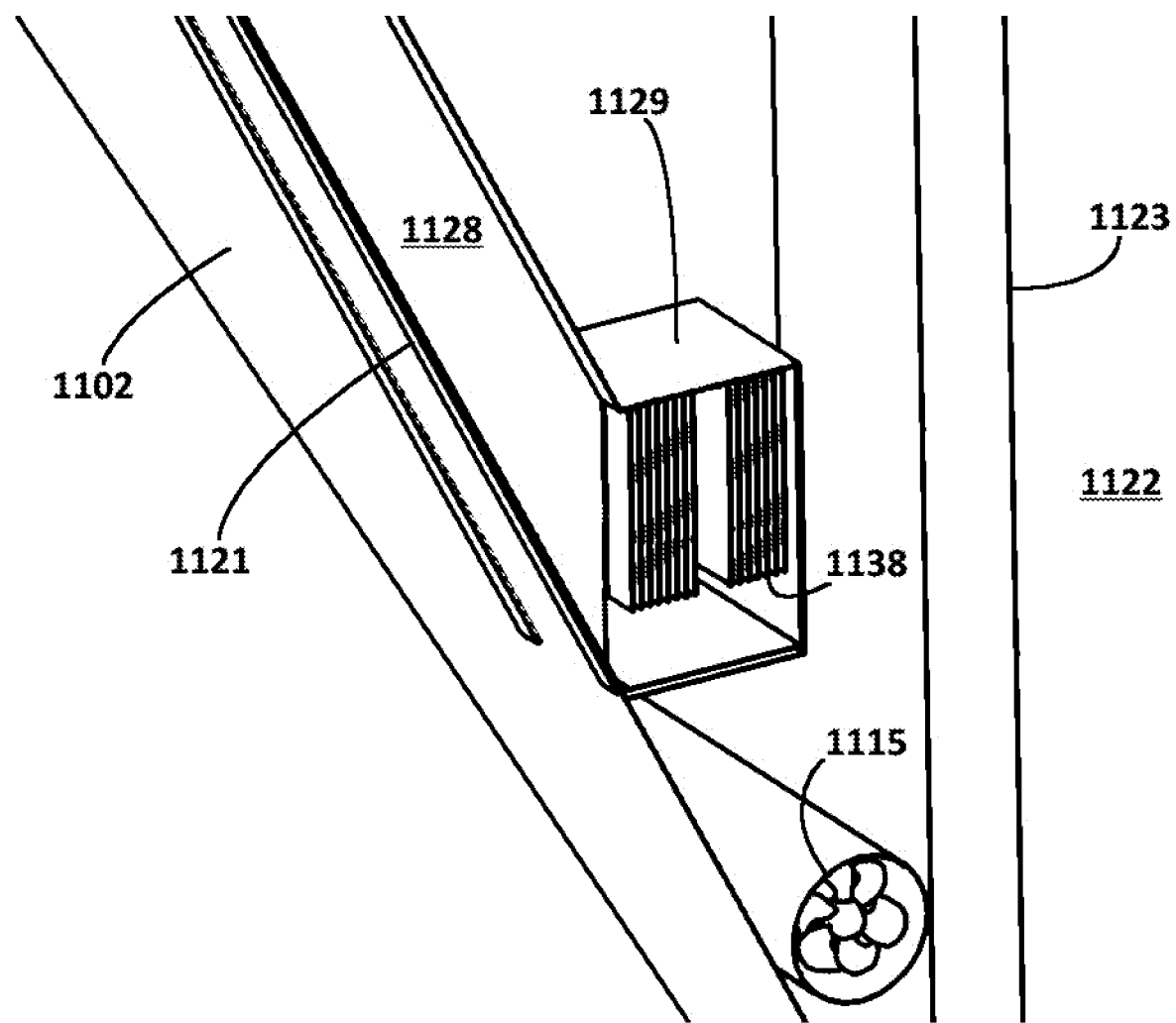
FIG. 69 is an enlarged, sectional view of the embodiment of FIG. 65.

FIG. 69 shows a close-up view of the lower-left quadrant of the perspective cross-sectional view illustrated in FIG. 68. Note the wall 1121 of the heat-exchanging channel 1128 that extends through the outer wall 1102 of the embodiment's buoy thereby facilitating the dissipation of heat from the heat-exchanging channel 1128 into the water or air outside the buoy 1102.

Figure 70:
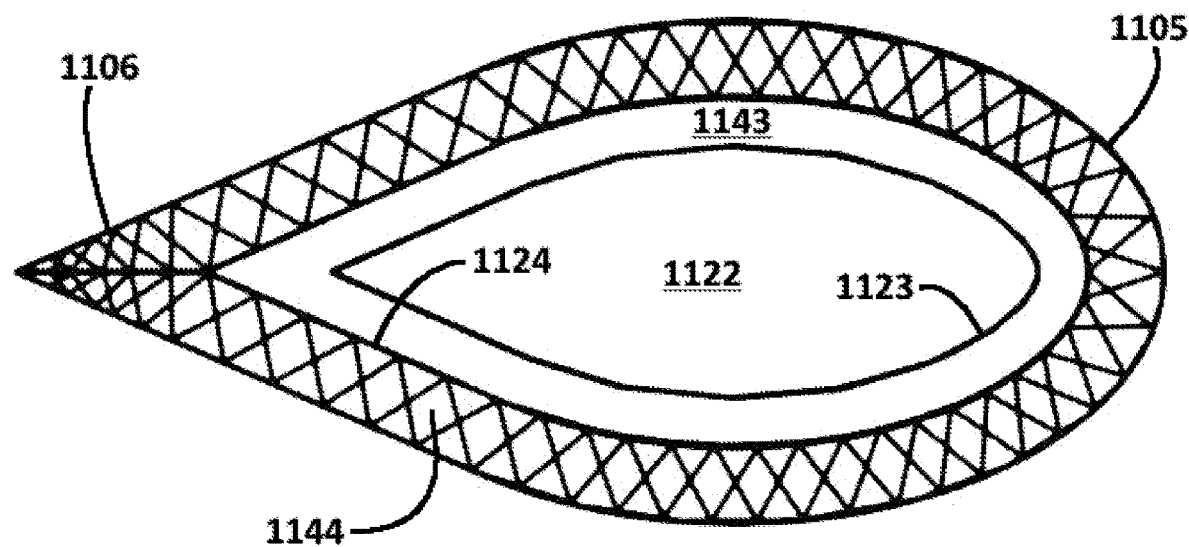
FIG. 70 is a top down cross sectional view of the embodiment of FIG. 59.

FIG. 70 shows a top-down cross-sectional view of the same embodiment of the present invention that is illustrated in FIGS. 59-69, where the line 70-70 of the section plane is specified in FIG. 59.

The lower part of the embodiment's water tube 1105/1106 is comprised of a structural design similar to the one illustrated in FIG. 70. A right-most and/or front-most portion and/or extent of the outer wall 1105 of the embodiment's water tube is smooth and approximately elliptical in horizontal cross-sectional shape so as to minimize the drag caused as the embodiment moves forward, i.e., to the right with respect to the embodiment orientation illustrated in FIG. 70. By contrast, a left-most and/or back-most portion and/or extent of the outer wall 1106 is sharp, tapered, and/or angled, so as to give the tube a horizontal cross-sectional shape that is approximately that of the trailing end of an airfoil and/or wing, again minimizing the drag, and thereby facilitating the movement, of the tube and the embodiment through the water on which the embodiment floats.

Between the outer wall 1105/1106 and an intermediate wall 1124 is a gap, void, and/or space, 1144 that contains a truss-like structure of struts, stringers, and/or voids, that give structural strength to the tube, thereby reducing the likelihood of the tube's deformation and/or structural failure, when or if the tube is subjected to stress, especially to stress that would tend to impart to the tube a torque that might tend to bend and/or break the tube.

Between the intermediate wall 1124 and the inner wall 1123 is an approximately annular space 1143 that contains buoyant material that reduces the average density of the embodiment, thereby facilitating its ability to float adjacent to the surface of the body of water on which the embodiment captures wave energy. In an embodiment, the buoyant material positioned between the intermediate wall 1124 and the inner wall 1123 is rigid (e.g., such as high-density structural polyurethane foam) which tends to increase the strength of the tube's walls, and of the tube in whole. In an embodiment, buoyant material is also positioned between the outer wall 1105/1106 and the intermediate wall 1124, i.e., between and/or within the truss structure therein. And, in another embodiment, buoyant material is positioned between the inner wall 1123 and the outer wall 1105/1106.

Within the tube, and/or within the channel 1122 within tubular wall 1123, water tends to flow vertically in an oscillating manner, especially in response to wave motion buffeting the embodiment.

Figure 71:
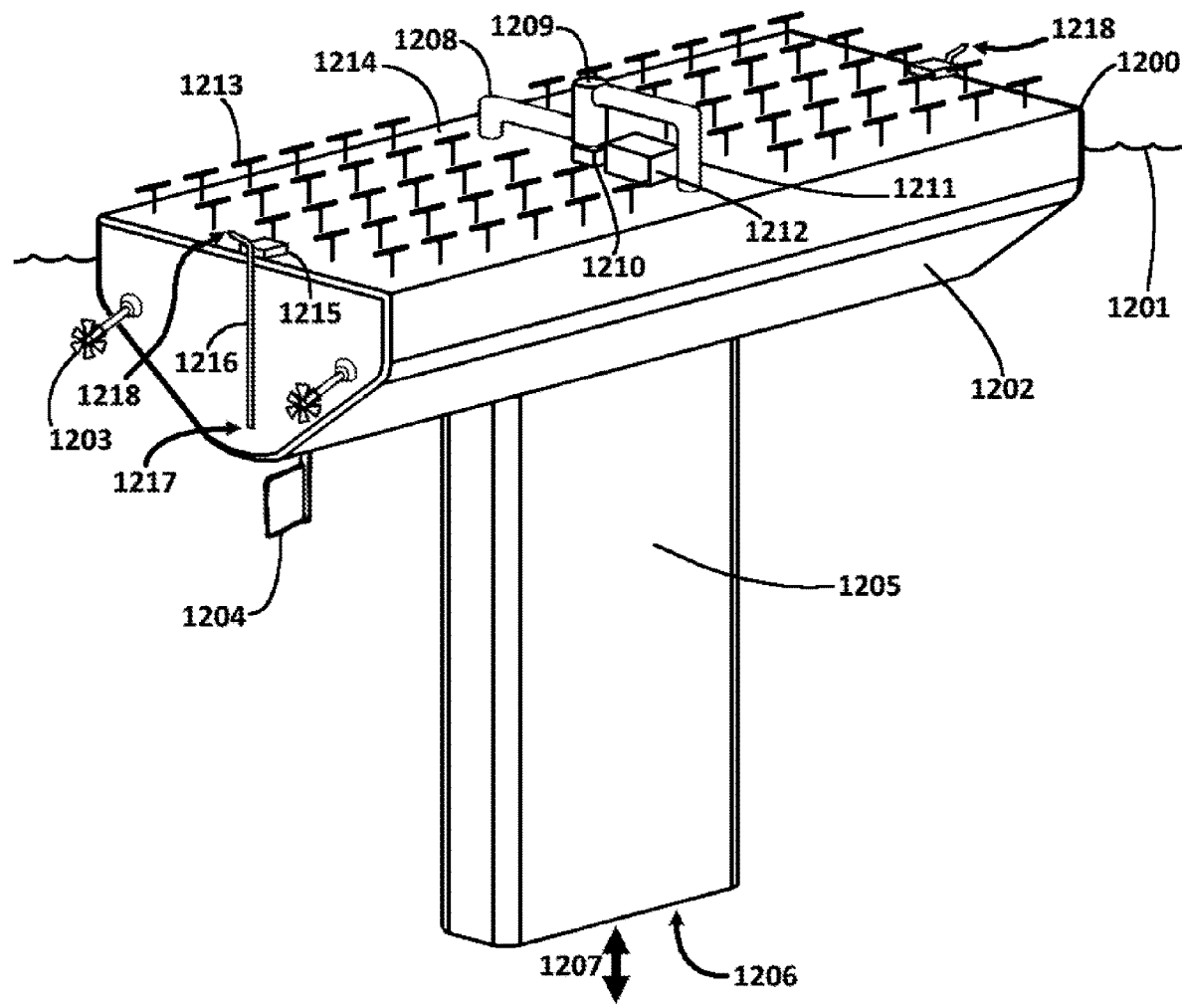
FIG. 71 is an elevated, perspective schematic view of another embodiment of the present invention.

FIG. 71 shows a side perspective view of an embodiment of the present invention.

A buoyant structure 1200, buoy, float, barge, boat, ship, vessel, and/or buoyant platform, floats adjacent to an upper surface 1201 of a body of water. The buoy 1200 has a "v-shaped" hull, a pair of propellers, e.g., 1203, and a rudder 1204, facilitating the self-propelled movement of the embodiment through the water 1201 (e.g., in and/or toward directions approximately opposite the propellers, and/or approximately to the right with respect to the embodiment orientation illustrated in FIG. 71).

An open-bottomed water tube 1205 is incorporated within the embodiment 1200 near the lateral center of buoy 1200 (with respect to a horizontal plane) and has a nominally vertical longitudinal axis that is approximately coaxial with a nominally vertical longitudinal axis of the embodiment. Because the bottom 1206 of the water tube 1205 is open to the water below, water is free and/or able to move 1207 into, and out of, the water tube. As water oscillates vertically and/or longitudinally within the water tube 1205, especially in response to the effect of wave motion on the embodiment and on the water on which the embodiment floats, a pocket of air (not visible) trapped near the top, and/or at an upper end, of the water tube tends to be cyclically compressed and decompressed.

When the air within the air pocket, at an upper end of the water tube, is compressed, a one-way valve (not visible) allows a portion of the compressed air to flow into a high-pressure accumulator (not visible) within the buoy 1200 after which it flows through a tube 1208 into a tubular channel 1209 wherein a turbine (not visible within the tubular channel) extracts energy from the flowing air and causes a generator 1210 to generate electrical power. After passing through the turbine within the tubular channel 1209, the air flows through a tube 1211 into a low-pressure accumulator (not visible) within the buoy 1200.

When the air within the air pocket, at an upper end of the water tube, is decompressed, a one-way valve (not visible) allows a portion of the depressurized air within the low-pressure accumulator to flow into the air pocket. After which the air pocket will again be compressed and pressurized, and air will again be forced into the high-pressure accumulator. And the cyclic flow of air through the embodiment and its turbine will repeat, with the air within the embodiment tending to cyclically move from the air pocket, through the turbine, and back to the air pocket again and again.

A portion of the electrical power generated by the embodiment, e.g., in response to wave action, is used to power, and/or is consumed by, one or more computers, computational circuits, and/or electronic circuits, housed within a computing chamber 1212, compartment, enclosure, housing, box, module, and/or case. Heat generated as a result of the consumption, utilization, and/or expenditure, of electrical energy and/or power by the one or more circuits within computing chamber 1212 is passively and/or conductively dissipated to the air outside the embodiment through a wall of the computing chamber 1212.

Computational tasks and data are received by the embodiment from a remote antenna and/or broadcast (e.g., via satellite transmission). The incident electromagnetic transmissions are received by means of a phased array of antennas, e.g., 1213, positioned on, attached to, and/or connected to, an upper deck 1214, and/or surface, of the embodiment 1200. A portion of the results of completed and/or processed computational tasks and/or data are transmitted by the embodiment 1200 to a remote antenna (e.g., to a satellite) by means of the same phased array of antennas, e.g., 1213.

A portion of the electrical power generated by the embodiment in response to wave action is used to power, and/or is consumed by, a pair of pumps, e.g., 1215, that pump water through a pair of respective tubes, e.g., 1216. The pumps, e.g., 1215, draw water into each of their respective tubes, e.g., 1216, through an opening, e.g., 1217, at a lower end of each tube, from the body of water 1201 on which the embodiment floats. The water within each tube, e.g., 1216, is then sprayed out of a nozzle 1218 at an upper end of each tube, e.g., 1216. The resulting aerosolized water and salt may rise into the atmosphere and promote cloud formation, thereby tending to reflect incident sunlight back into space, and potentially reducing the temperature of the Earth in the process.

Figure 72:
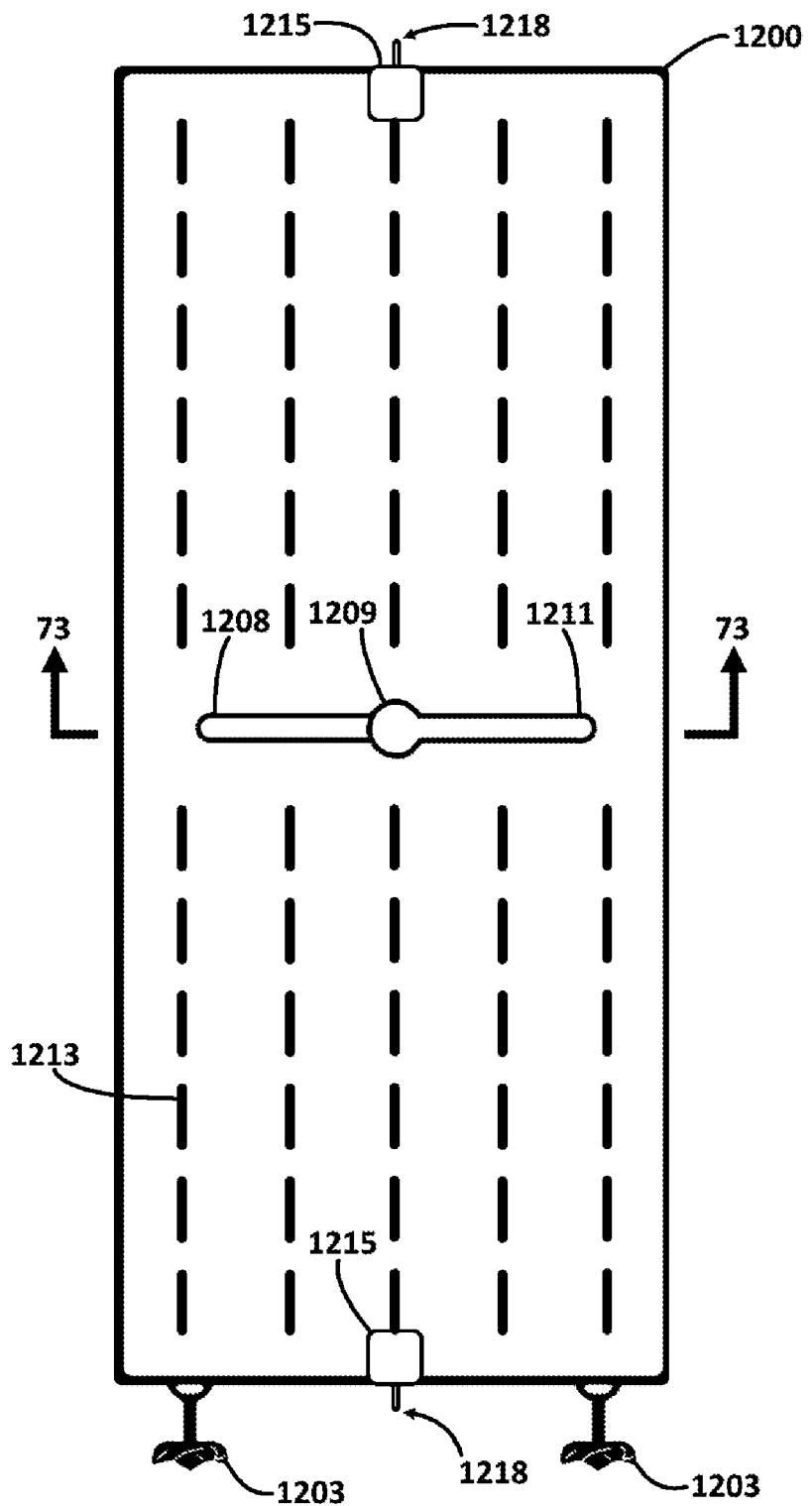
FIG. 72 is a top view of the embodiment of FIG. 71.

FIG. 72 shows a top-down view of the same embodiment of the present invention that is illustrated in FIG. 71. Note that the antennas, e.g., 1213, comprising the phased array antenna are positioned across a substantial portion of the upper surface of the embodiment 1200.

Figure 73:
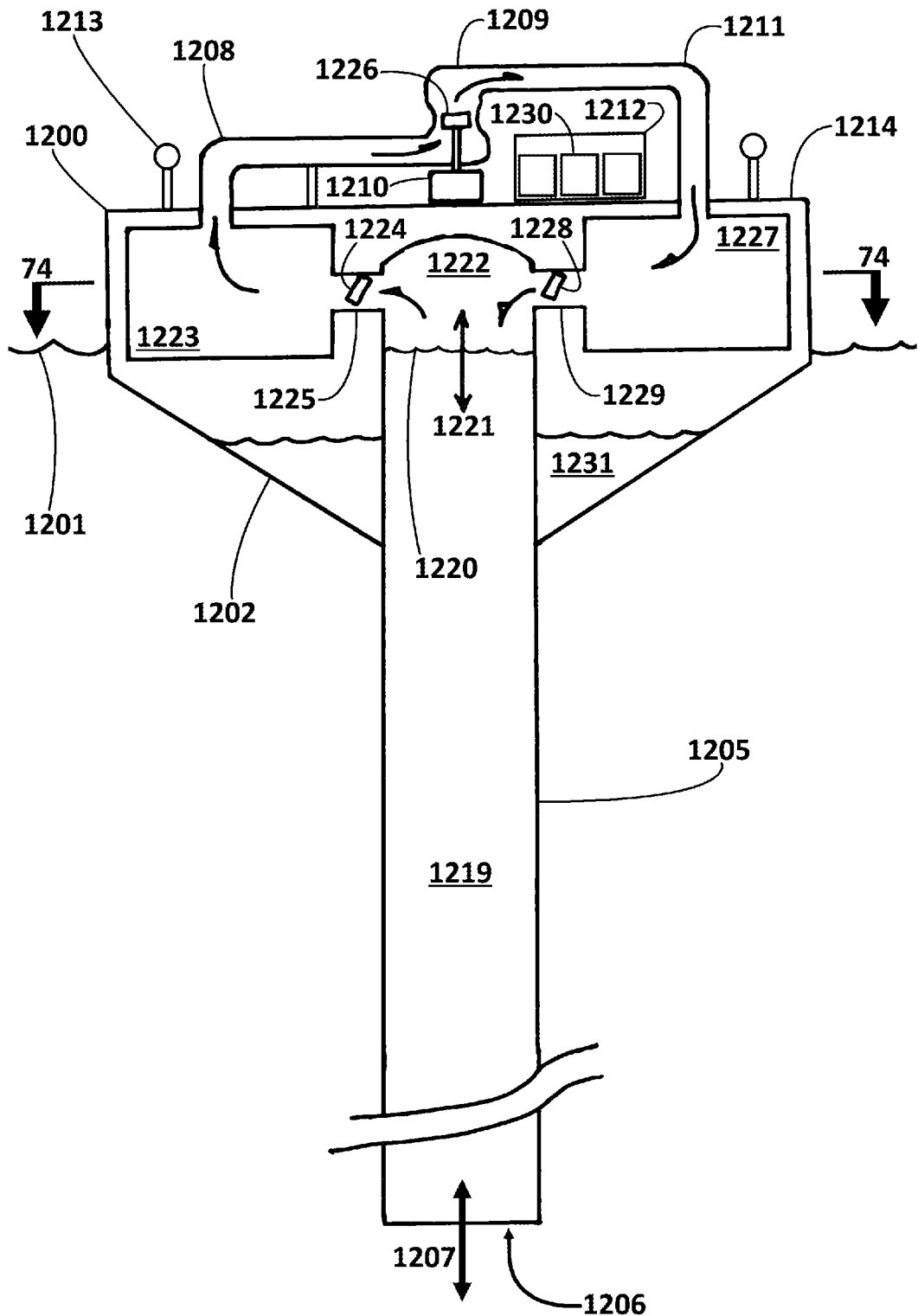
FIG. 73 is a cross sectional view of the embodiment of FIG. 71.

FIG. 73 shows a side cross-sectional view of the same embodiment of the present invention that is illustrated in FIGS. 71-72, where the line 73-73 of the section plane is specified in FIG. 72.

In response to, and/or as a consequence of, wave action upon the embodiment 1200 as it floats adjacent to a surface 1201 of a body of water, water 1219 inside water tube 1205 tends to move 1221/1207 up and down within the water tube (e.g., moving out of phase with the embodiment's vertical movements). And water tends to move 1207 in and out of the open mouth 1206 positioned at the bottom of the tube 1205.

As water 1219 within tube 1205 moves up and down, so too does the surface 1220 of the water 1219 within the tube 1205 tend to move 1221 up and down, thereby cyclically, periodically, and/or repeatedly, compressing and decompressing air that tends to be trapped within an air pocket 1222, space, volume, void, and/or space at the top of the water tube 1205.

When the pocket of air 1222 is compressed by the rising of the surface 1220 of the water within the water tube 1205, then, when the pressure of that air exceeds the pressure of the air within high-pressure accumulator 1223, one-way valve 1224 tends to open and the more highly pressurized air within the air pocket 1222 tends to flow through a channel 1225, pipe, and/or tube, from the air pocket 1222 into the high-pressure accumulator 1223. When the pressure of the air within the air pocket 1222 falls below the pressure of the air within the high-pressure accumulator 1223 then the one-way valve 1224 tends to close, blocking the reverse flow of air from the high-pressure accumulator 1223 back into the air pocket 1222 and/or water tube 1205.

Pressurized air with the high-pressure accumulator 1223 flows into pipe 1208 and into pipe 1209, therein passing through, engaging, and/or causing to rotate, turbine 1226. The rotation of turbine 1226 rotates the rotor of generator 1210 to which it is operatively connected, thereby generating electrical power.

After flowing through turbine 1226 the flowing air flows into and through pipe 1211, and thereafter flows into low-pressure accumulator 1227.

When the surface 1220 of the water 1219 within the water tube 1205 falls, the pressure of the air within the air pocket 1222 at the top of the water tube 1205, tends to be reduced. When the pressure of the air within the air pocket 1222 falls below the pressure of the air within the low-pressure accumulator 1227, one-way valve 1228 tends to open and air from the low-pressure accumulator 1227 tends to be drawn into the air pocket 1222.

When the surface 1220 of the water 1219 within the water tube 1205 again rises, pressurized air will again be pushed into high-pressure accumulator 1223, will thereafter flow through and energize turbine 1226, thereby generating more electrical power, will thereafter return to the low-pressure accumulator, and will finally be drawn again into the air pocket 1222. Thus, air within the embodiment's power take-off tends to move in, and/or along, a repeating and/or cyclical path, generating electrical power in the process.

The embodiment's control system (not shown) is able to, and does, pump air from outside the embodiment into the embodiment's power take-off, e.g., into the embodiment's air pocket 1222, using a pump (not shown), when the surface of the water 1220 within the embodiment's water tube 1205 is too close to the apertures 1225 and 1229. The embodiment's control system (not shown) is able to, and does, release air from the embodiment's power take-off, e.g., from the embodiment's air pocket 1222, using a control-system actuated valve (not shown), to the atmosphere outside the embodiment, when the surface of the water 1220 within the embodiment's water tube 1205 is too far from the apertures 1225 and 1229.

A portion of the electrical power generated by the embodiment's generator is used to power one or more electronic and/or computational circuits 1230 positioned within a computing chamber 1212 attached to an upper surface 1214 of the embodiment 1200. A portion of the heat generated by the electronic computational circuits within computing chamber 1212 is conducted through some of the walls of the chamber 1212 and into the air surrounding the embodiment, thereby facilitating the passive cooling of those computational circuits. An embodiment similar to the one illustrated in FIG. 73 includes a phase-changing material within the computing chamber 1212 to facilitate the removal of heat from the computing circuits 1230 therein, and to facilitate the conduction of a portion of that heat to the air outside the embodiment.

Within a portion of the embodiment's buoy 1202 is water ballast 1231 the volume, weight, and mass of which may be altered by pumps (not shown) controlled by a control system (not shown) of the embodiment 1200. When the volume of water ballast 1231 within the buoy 1202 is increased, the embodiment will sit lower in the water 1201, thereby raising its waterline, and tending to increase its waterplane area, thereby potentially exposing it to, and enabling it to absorb and process, a greater fraction of the ambient wave energy. When the volume of water ballast 1231 within the buoy 1202 is decreased, the embodiment will sit higher in the water 1201, thereby lowering its waterline, and tending to reduce its waterplane area, thereby potentially reducing the fraction of the ambient wave energy to which it is exposed, and which it will absorb—this is particularly useful during storm conditions which might otherwise damage the embodiment if it were to absorb too great a fraction of the ambient wave energy.

Figure 74:
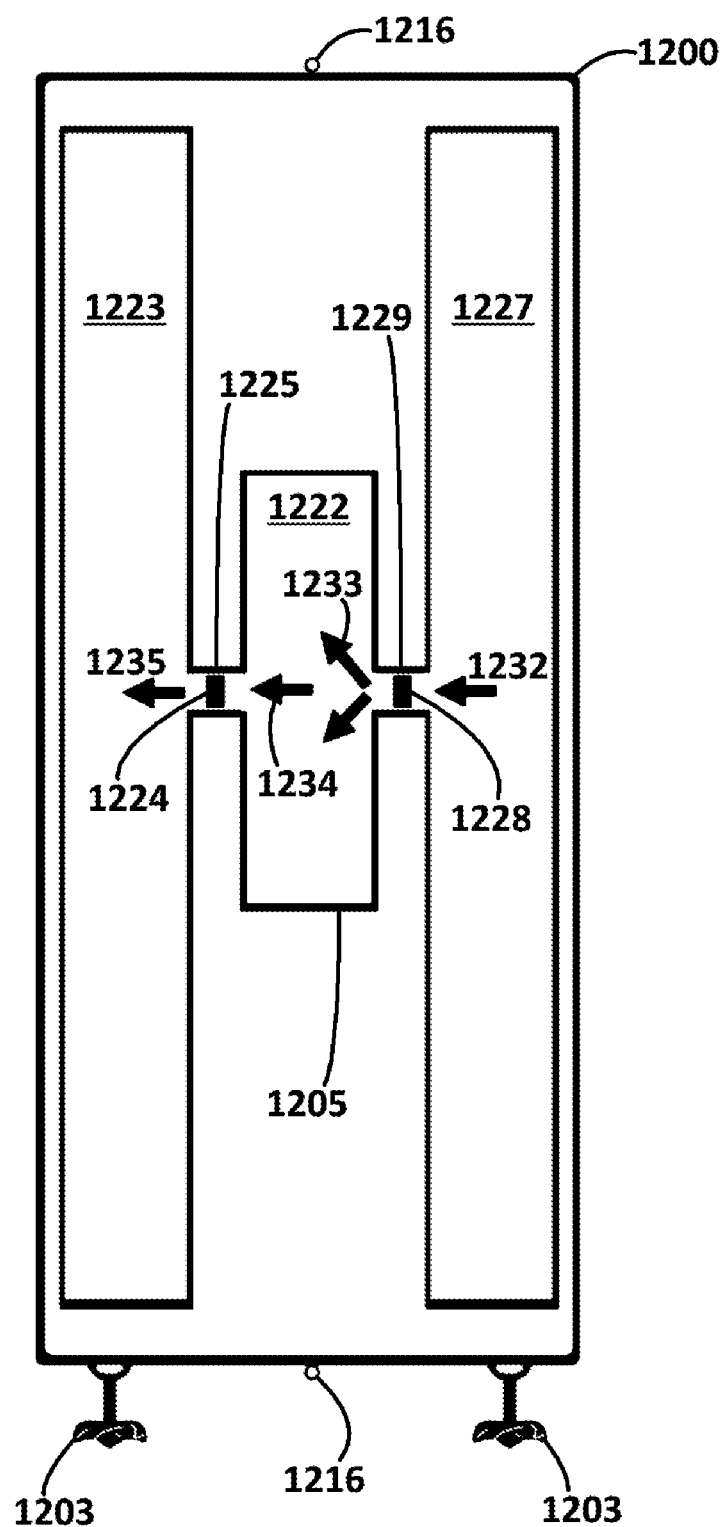
FIG. 74 is another cross sectional view of the embodiment of FIG. 71

FIG. 74 shows a top-down cross-sectional view of the same embodiment of the present invention that is illustrated in FIGS. 71-73, where the line 74-74 of the section plane is specified in FIG. 73

Air pocket 1222 is sectioned by the section plane passing through an upper position within the water tube 1205.

When the pressure of the air within the air pocket 1222 surpasses the pressure of the air within the high-pressure accumulator 1223, then the one-way valve 1224 tends to open, and/or to be open, thereby allowing the pressurized air-pocket air to flow therethrough and into the high-pressure accumulator. When the pressure of the within the air pocket 1222 is not greater than the pressure of the air within the high-pressure accumulator 1223, then the one-way valve 1224 tends to close, and/or to be closed, thereby preventing air from escaping the high-pressure accumulator so as to flow back into the air pocket 1222.

When the pressure of the air within the air pocket 1222 falls below the pressure of the air within the low-pressure accumulator 1227, then the one-way valve 1228 tends to open, and/or to be open, thereby allowing the relatively higher-pressure air within the low-pressure accumulator to flow therethrough and into the low-pressure accumulator. When the pressure of the air within the air pocket 1222 surpasses the pressure of the air within the low-pressure accumulator 1227, then the one-way valve 1228 tends to close, and/or to be closed, thereby preventing air from escaping the air pocket so as to flow back into the low-pressure accumulator.

When the air pocket 1222, and the air therein, are compressed by a rising and/or raising of the water (1219 in FIG. 73) within the tube 1205, pressurized air is forced 1234 through one-way valve 1224 within and through conduit 1225, channel, pipe, and/or tube, and flows 1235 into high-pressure accumulator 1223. From there the air moves through the tubular channel (1208, 1209, 1211 in FIG. 73), and the turbine (1226 in FIG. 73) therein, and enters 1232 low-pressure accumulator 1227.

When the air within the air pocket 1222 at the top of water tube 1205 is decompressed (i.e., has its pressure reduced) due to a drop and/or lowering in the surface (1220 in FIG. 73) of the water 1219 within the tube 1205, then one-way valve 1228 opens and air is drawn 1232 from low-pressure accumulator 1227 an flows 1233 into the air pocket 1222 at the top of the water tube 1205.

Note that the high- and low-pressure accumulators have relatively long and approximately rectangular horizontal cross-sectional shapes, and that the water column also has an approximately rectangular cross-section with respect to horizontal section planes, though of course neither of these attributes is essential, and all shapes, sizes, volumes, cross-sectional shapes, orientations, positions, and relative positions, are included within the scope of the present disclosure.

Figure 75:
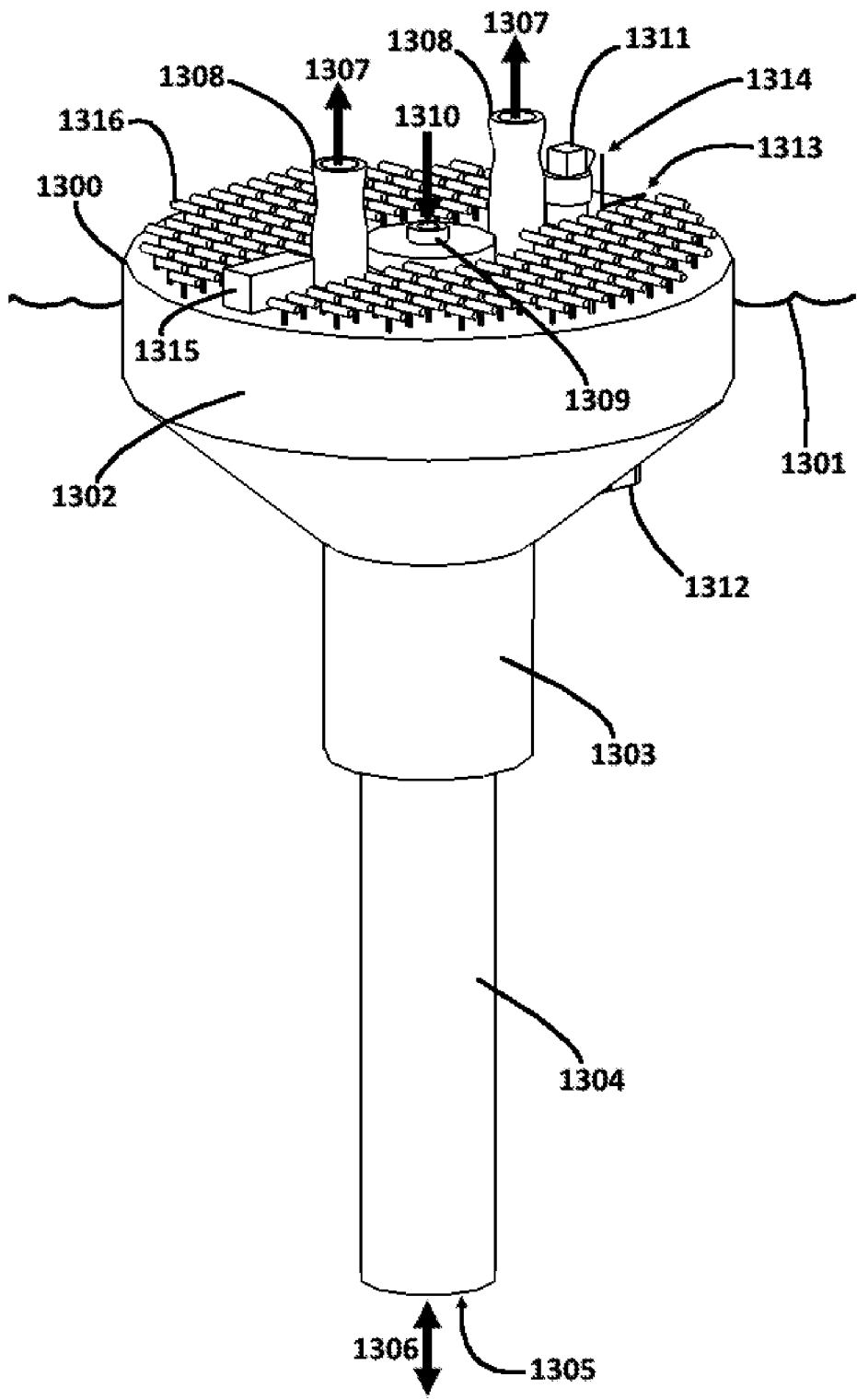
FIG. 75 is an elevated, perspective schematic view of another embodiment of the present invention.

FIG. 75 shows a side perspective view of an embodiment of the present invention.

The buoyant embodiment 1300 floats adjacent to a surface 1301 of a body of water. An upper buoy 1302 provides a substantial portion of the embodiment's buoyancy by means of buoyant material incorporated within the buoy; material that has a density that is less than the density of the water 1301 on which the embodiment floats. A bottom extension 1303 of the buoy is approximately coaxial with a water tube 1304 that depends from the buoy, with respect to a nominally vertical longitudinal axis of approximate radial symmetry, and an annular gap or space separates the buoy wall 1303 of the downward tubular extension of the buoy 1302 from the upper wall of the embodiment's tube 1304.

An open mouth 1305 at a bottom end of the water tube 1304 allows water to move 1306 into, and out of, the water tube 1304, especially in response to wave action at the buoy 1302. A pocket of air is typically found at and/or in a top portion of the water tube 1304. The air within the air pocket tends to be compressed when water within the tube 1304 rises, and tends to be decompressed when water within the tube 1304 falls. The cyclic, periodic, and/or alternating, compression and decompression of air within the air pocket at the top of the tube affords an opportunity to extract energy from the passing waves.

When air within the air pocket trapped adjacent to the top of the water tube 1304 is compressed, one-way valves (not visible) within the wall of the water tube, and separating the air pocket from a high-pressure accumulator, open and allow a portion of the pressurized air-pocket air to leave the air pocket and flow into the high-pressure accumulator. The high-pressure accumulator (not visible within the buoy 1302) is comprised of a void, space, chamber, and/or enclosure, within the buoy 1302. Pressurized air within the high-pressure accumulator flows 1307, relatively steadily, out of the high-pressure accumulator through two constricted channels 1308, within which air turbines (not visible) are caused to rotate in response to the flow of air, causing operatively connected generators to generate electrical power.

When air within the air pocket within the water tube 1304 is decompressed, a one-way valve (not visible) inside an aperture 1309 within an upper wall of the water tube opens, thereby allowing air to flow 1310 into the water tube 1304, and flow into, and/or create, an air pocket therein.

Thus, when water within water tube 1304 rises, e.g., when the embodiment is descending following the passage of a wave crest, air within an air pocket at the top of the water tube is compressed, opening one-way valves into a high-pressure accumulator within buoy 1302, and closing the one-way valve within an aperture 1309 at the top of the water tube. The compression of the air within the air pocket forces air through the respective opened one-way valves and into the high-pressure accumulator, whereafter portions of the pressurized air therein flows out, and into the atmosphere outside the embodiment 1300, in a somewhat steady, constant, and/or regular, fashion, and/or rate, through exhaust ducts 1308 causing air turbines therein to rotate and energize operatively connected generators, thereby causing the generators to generate electricity.

And, likewise, when water within water tube 1304 falls, e.g., when the embodiment is rising in response to an approaching wave crest, air within an air pocket at the top of the water tube is decompressed (i.e., its pressure is reduced) opening a one-way valve within aperture 1309 and thereby allowing air outside the embodiment 1300 to enter, and/or to create, the air pocket within the water tube, and closing the one-way valves connecting the air pocket to the high-pressure accumulator.

The cyclic compression and decompression of the air pocket at the top of the water tube 1304 creates a flow of air into and out of the air pocket, engaging turbines, and their respective operatively connected generators, thereby generating electrical power, in the process.

A controller (not shown) within the embodiment is able to open and close a one-way valve, that, when open, allows pressurized air within the high-pressure accumulator to exit through a nozzle 1311, and the relatively narrow opening therein, thereby creating a jet of pressurized air. The jet creates, and imparts to the embodiment 1300, thrust that tends to propel the embodiment in a forward direction (i.e., a direction parallel to, and opposite that of, the direction of the jet). A rudder 1312 allows the embodiment to maneuver as it is propelled forward, and thereby to steer a course in a desired direction and/or toward a desired location.

A pipe 1313 allows water 1301 to be drawn up, as the jet blows over and/or past an open upper end 1314 of the pipe 1313, and to be carried away from the upper end of the pipe as an aerosol spray drawn into the jet of air emitted by the nozzle 1311. Such a water aerosol may promote cloud formation and reflect back to space a portion of the sunlight incident on those clouds.

A portion of the electrical power generated by the embodiment 1300 is consumed by one or more computational circuits housed within a computing chamber 1315 attached to an upper surface of the embodiment 1300. A portion of the heat generated by those computational circuits is transferred to the air outside the embodiment conductively through a wall of the chamber 1315.

A phased array of antennas, e.g., 1316, arrayed across an upper surface of the embodiment 1300, allows the embodiment to receive computational tasks, data, signals, instructions, and other information, from, through, and/or via, electromagnetic signals, e.g., such as those that might be broadcast by a satellite. The phased array antenna also allows the embodiment to transmit computational results, data, updates, and other information, through, and/or via, electromagnetic signals, e.g., such as those that might be received by a satellite.

Figure 76:
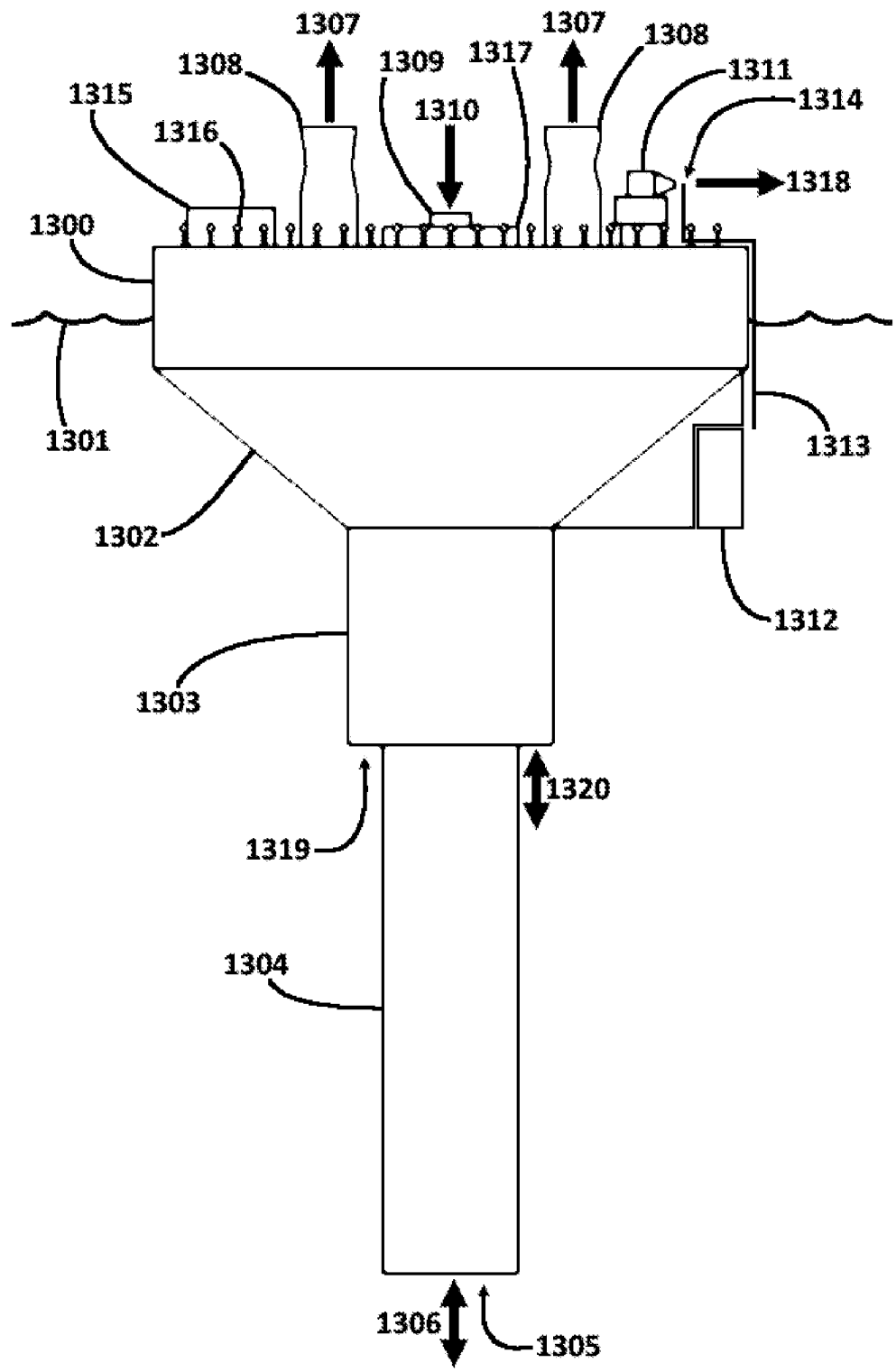
FIG. 76 is a front view of the embodiment of FIG. 75.

FIG. 76 shows a side view of the same embodiment of the present invention that is illustrated in FIG. 75.

The intake aperture 1309 is incorporated within an upper wall 1317 of the water tube 1304.

The thrust 1318 produced when high-pressure air is released from the embodiment's high-pressure accumulator through nozzle 1311 pushes the embodiment in a direction approximately opposite the rudder's radial orientation from the embodiment's vertical longitudinal axis, i.e., toward the left with respect to the embodiment orientation illustrated in FIG. 76. Thus, thrust generated by the release of high-pressure air through the nozzle 1311, in conjunction with adjustments to, and/or a turning of, the rudder 1312, allows the embodiment to be driven, steered, self-propelled, and/or moved, across the surface 1301 of the body of water on which the embodiment floats in a direction, and/or toward or to a destination, selected and controlled by the embodiment's control system (not shown).

The lower portion 1303 of buoy 1302 is approximately tubular, and is approximately coaxial with water tube 1304 with respect to their longitudinal axes of radial symmetry. A gap between tubular walls 1303 and 1304 allows water to flow 1320 into and out of an interior void within buoy 1302.

Figure 77:
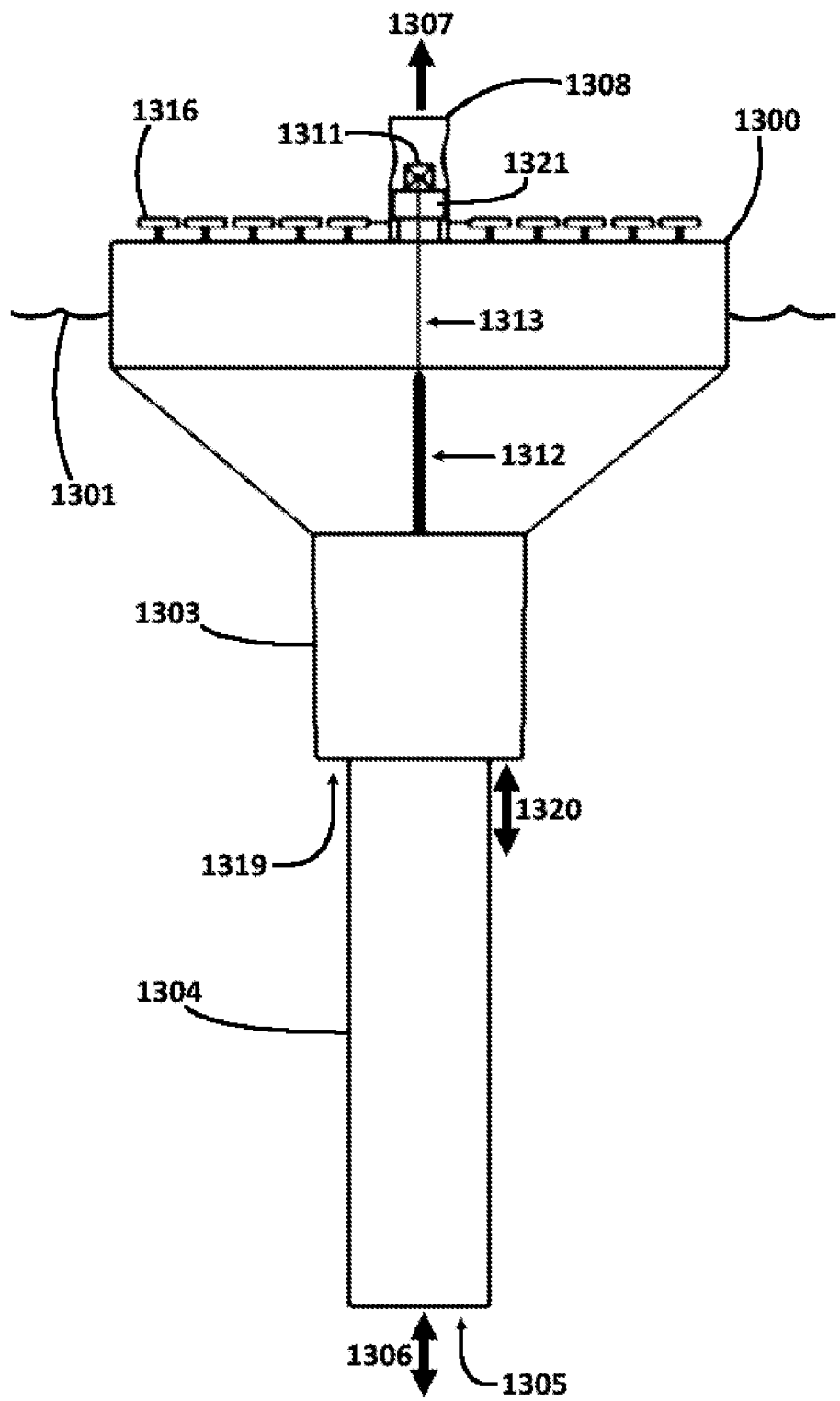
FIG. 77 is a side view of the embodiment of FIG. 75.

FIG. 77 shows a back view of the same embodiment of the present invention that is illustrated in FIGS. 75 and 76.

Nozzle 1311 is mounted on, and/or connected to, a rotatable junction, connector, platform, stage, and/or fixture 1321 that permits the embodiment's control system (not shown) to adjust, control, and/or change, the angle at which high-pressure air is directed, released, and/or emitted, as well as the related angle of the thrust thereby produced. In conjunction with the rudder 1312, the swivel-mounted nozzle allows the embodiment to control its direction of travel when the control system opens the one-way valve that releases high-pressure air through the nozzle and thereby generates thrust.

Figure 78:
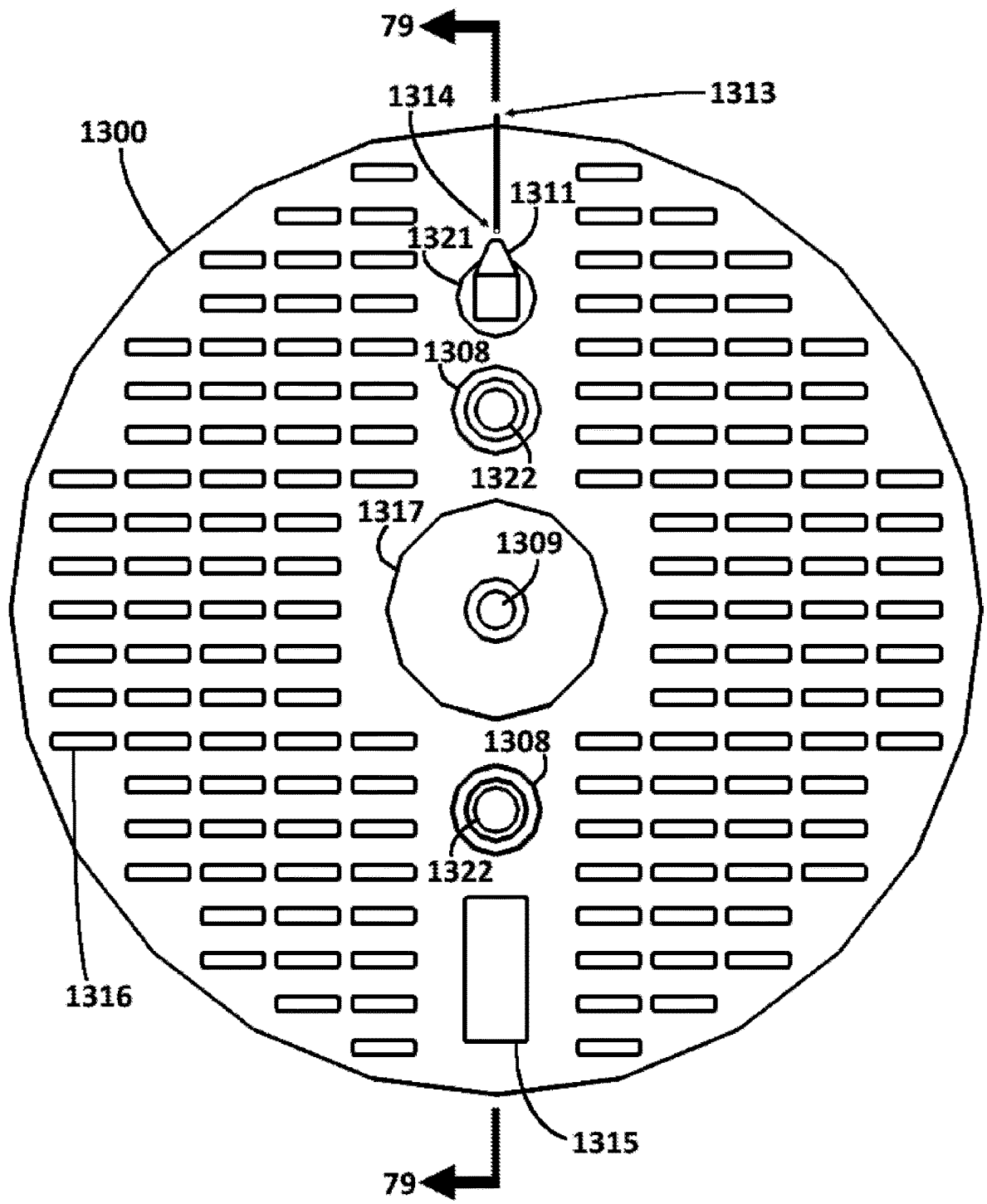
FIG. 78 is a top view of the embodiment of FIG. 75.

FIG. 78 shows a top-down view of the same embodiment of the present invention that is illustrated in FIGS. 75-77.

Inside the exhaust constricted tubes and/or ducts 1308 are air turbines 1322. Inside the intake duct and/or aperture 1309 is a one-way valve that admits atmospheric air into the air pocket when, and only when, the pressure of the air within the air pocket is lower than that of the atmospheric air (e.g., below atmospheric pressure).

Figure 79:
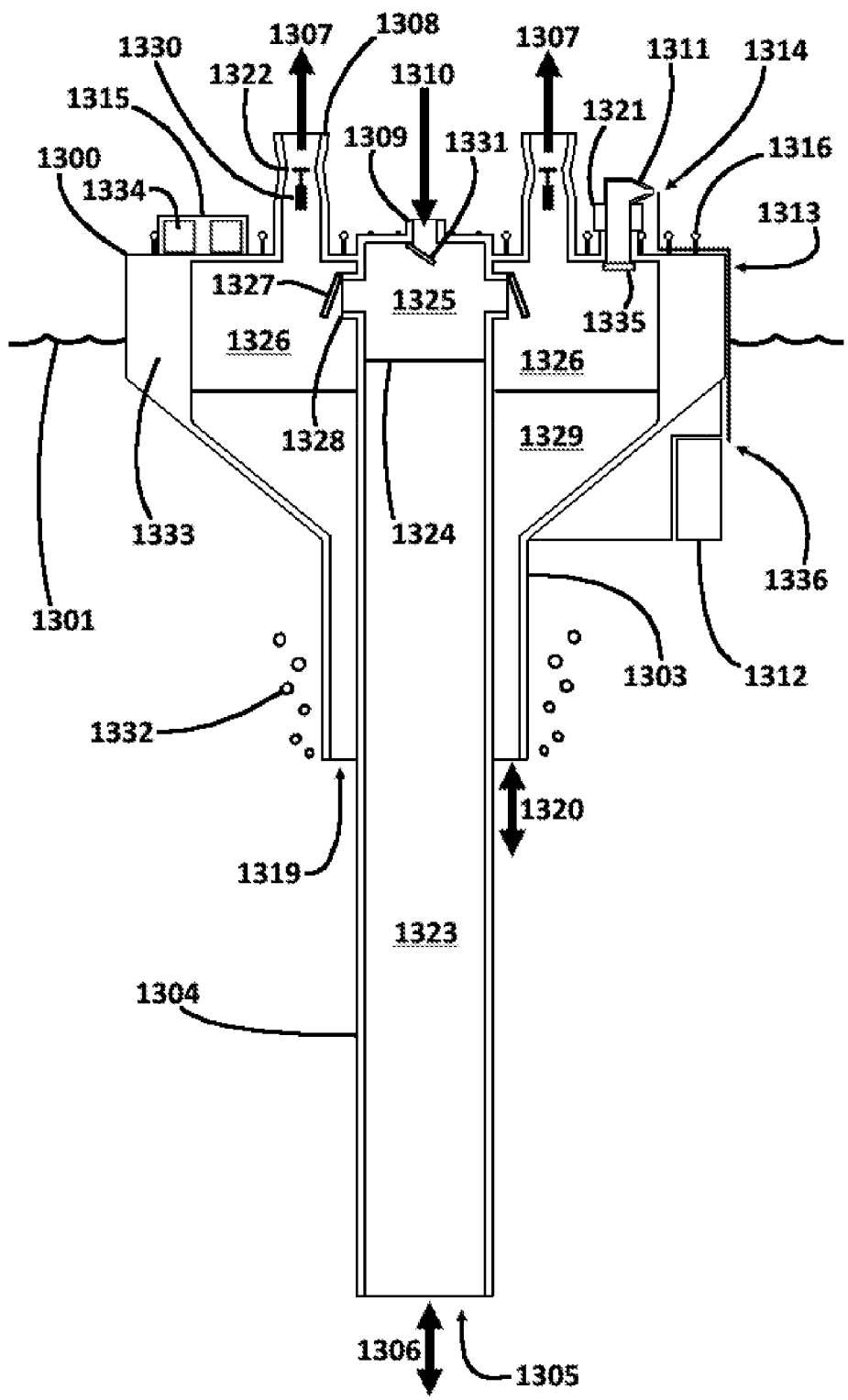
FIG. 79 is a cross sectional view of the embodiment of FIG. 75.

FIG. 79 shows a side cross-sectional view of the same embodiment of the present invention that is illustrated in FIGS. 75-78, where the line 79-79 of the section plane is specified in FIG. 78.

As waves moving over the surface 1301 of the body of water on which the embodiment 1300 floats impact and/or interact with the embodiment, water 1323 within the embodiment's water tube 1304 tends to move up and down. As the water 1323 within the tube 1304 moves up and down, the surface 1324 of that water 1323 moves up and down, tending to cyclically, periodically, and/or in alternating fashion, compress and decompress air trapped within an air pocket 1325 that tends to form at, and/or adjacent to, the top of water tube 1304.

When the surface 1324 of the water 1323 within the water tube 1304 rises, and thereby compresses the air 1325 trapped in the pocket of air at the top of the water tube 1304, the pressure of that air may exceed the pressure of the air within the upper portion 1326 of the interior of the buoy, which portion is outside and separate from the interior of the water tube 1304 thereby causing one-way valves, e.g., 1327, operatively connected to corresponding apertures, e.g., 1328, positioned within upper portions of the walls of the water tube 1304, to open, and/or to be open. When the one-way valves, e.g., 1327, open, and/or are open, in response to a sufficient increase in the pressure of the air within the air pocket 1325, then a portion of the pressurized air within the air pocket 1325 will tend to flow into the upper portion 1326 of the interior of the buoy, whereby that portion of the interior of the buoy that lies outside the water tube 1304 functions as a high-pressure accumulator.

As pressurized air flows through the separating apertures, e.g., 1328, flowing from the air pocket 1325 into the embodiment's high-pressure accumulator 1326, water 1329 also within the upper portion 1326 of the interior of the buoy is pushed down and out 1320 of the buoy 1302/1303 through the gap 1319 that lies between the walls 1303 and 1304.

Pressurized air within the high-pressure accumulator 1326 flows out of the embodiment 1300 through constricted tubes 1308 and through the respective air turbines 1322 therein. As the turbines are rotated in response to the flow of air through their respective blades, operatively connected generators 1330 generate electrical power. And, as pressurized air within the high-pressure accumulator 1326 flows out of the embodiment, the surface of the water 1329 within the interior of the buoy tends to rise, thereby tending to draw in 1320 water 1301 from outside the embodiment through gap 1319.

When the surface 1324 of the water 1323 within the water tube 1304 falls, and reduces the pressure of the air 1325 trapped at the top of the water tube 1304, one-way valve 1331 opens, and/or is open, thereby allowing air outside the embodiment to be drawn 1310 into the air pocket 1325 at the top of the water tube 1304.

When the average power of the waves impacting, and/or passing by, the embodiment, becomes excessive (with respect to design and operational criteria and limits such as the maximum output of the generators), then air will tend to gather within the high-pressure accumulator 1326 faster than it will and/or can flow out through tubes 1308. and turbines 1322 therein, incrementally pushing the water 1329 within the buoy further and further down. In the most extreme case, the air in the high-pressure accumulator 1326 may fill the interior of the buoy and some air may be forced out through the gap 1319 between walls 1303 and 1304, potentially exiting 1332 the embodiment therethrough, e.g., as bubbles.

Thus, the buoyancy of the embodiment 1300 has an upper limit. The buoyancy of the embodiment 1300 cannot exceed a maximal value that is reached, and/or established as that configuration, when the interior of the buoy 1302/1303, i.e., when its high-pressure accumulator 1326, is maximally filled with air and water 1329 has been excluded from the interior of the buoy.

This disclosed device design also inherently prevents the air within the high-pressure accumulator 1326 from exceeding a maximal amount of pressure (i.e., before the pressure of the air within the high-pressure accumulator can exceed a certain device-specific maximal pressure, air will bubble out the gap 1319 and escape the device). The maximum possible pressure of the air within the high-pressure accumulator is equal to the pressure of the water at the depth at which the lowest and/or bottommost end, and/or extent, of the gap 1319 is positioned with respect to that time, moment, configuration, and/or operational circumstance, when the high-pressure accumulator achieves its maximal volume, and/or when the water ballast 1329 achieves it minimal volume, and/or when the embodiment's waterline reaches and/or is at its lowest point, and/or when the embodiment's draft is maximal, and/or when the embodiment achieves its greatest degree of buoyancy.

When the average power of the waves impacting, and/or passing by, the embodiment, falls below an optimal and/or nominal value, then the embodiment's control system (not shown) may increase the resistive torque applied by the generators 1330 to their respective air turbines 1322 thus tending to slow the exit of high-pressure air through and/or from the constricted tubes 1308 thereby tending to maintain a desirable volume of high-pressure air within the high-pressure accumulator 1326. However, whether or not the resistive torques of the generators are increased, an inadequate and/or suboptimal average wave power will tend to result in the volume of high-pressure air within the high-pressure accumulator decreasing, and, correspondingly, in the volume of water within the interior of the buoy increasing. When this happens, the buoyancy provided by low-density and/or buoyant materials 1333 positioned and/or incorporated within the buoy (e.g., attached to the interior side walls 1303 of the buoy) tends to provide sufficient buoyancy to prevent the volume of water within the buoy from exceeding a maximum value (and thereby preventing the embodiment from sinking).

Even though water is able to enter and leave 1320 the interior void within the buoy 1302/1303 through the annular gap 1319, the volume of water 1329 within the buoy is effectively a consequence of, and controlled by, the pressure and volume of the air within the embodiment's high-pressure accumulator 1326. Therefore, even though the water 1329 within the buoy is connected to the water outside the embodiment by gap 1319, the water is effectively trapped and tends to constitute ballast, and/or to affect and/or influence the embodiment's behavior as would ballast.

By altering the rate at which air flows out of the high-pressure accumulator (e.g., by altering the magnitude of the resistive torque applied to the air turbines by their respective generators), the embodiment's control system can alter and/or control the volume of both air and water within the buoy (within a range of values determined in part by the average power of the waves buffeting the embodiment) and thereby control the embodiment's average waterline, average waterplane area, and/or average draft. By decreasing the volume of water within the high-pressure accumulator 1326, the embodiment can raise itself out of the water (to a degree) and thereby potentially reduce its waterplane area, and thereby reduce the relative amount, and/or fraction, of the ambient wave power that will impact and/or affect the embodiment.

Even without active control of the volume of air within the high-pressure accumulator 1326, the embodiment is, to a degree, self-stabilizing with respect to the wave power that it draws from the waves.

When the average wave power is undesirably great, air will tend to accumulate within the high-pressure accumulator at a greater rate than it lost through the exhaust ducts 1308, and the volume of water ballast within the buoy 1303 will therefore tend to decrease, which will therefore tend to raise the embodiment out of the water to a degree, which will tend to lower the embodiment's waterline and thereby increase its waterplane area, which will tend to reduce the fraction of the incident wave power that is absorbed by the embodiment which will tend to slow the accumulation of high pressure air within the high-pressure accumulator 1326, which will tend to draw water into the buoy and thereby increase the amount of water ballast 1329 within the buoy, which will tend to lower the embodiment, which will tend to raise the embodiment's waterline and thereby increase its waterplane area, which will tend to increase the fraction of the incident wave power that is absorbed by the embodiment . . . and so on, such that an equilibrium will tend to manifest, thereby naturally and/or spontaneously tending to adjust the amount of energy that the embodiment absorbs from the ambient waves so as to equal, at least approximately, the amount of energy that is processed by the embodiment (e.g., through the passage of pressurized air through its turbines).

Thus, the draft, waterline, and waterplane area, of the device will tend to find and oscillate about an optimal value that is defined with respect to the ambient wave conditions so that the amount of high-pressure air within the embodiment's high-pressure accumulator will tend to stabilize while providing an optimal rate of air flow through the turbines 1322, and the generation of an optimal amount of electrical power by their respective generators 1330, regardless of the average wave power (with respect to a range of average wave powers).

A portion of the electrical power generated by the embodiment is used to energize one or more electronic and/or computational circuits, e.g., 1334, contained within an enclosure 1315. A portion of the electrical power generated by the embodiment may be stored within energy storage devices, including, but not limited to: batteries, capacitors, fuel-cell/electrolyzer-generated fuels, etc. Correspondingly, a portion of the electrical power consumed by the one or more electronic and/or computational circuits, e.g., 1334, contained within enclosure 1315, may be drawn from energy storage devices, including, but not limited to: batteries, capacitors, fuel cells, etc., that are charged, and/or recharged, by a portion of the electrical power generated by the embodiment.

A valve 1335 controlled by the embodiment's control system (not shown) allows the control system to initiate and terminate the generation of thrust by releasing high-pressure air from the embodiment's high-pressure accumulator 1326 through nozzle 1311 at a rate determined by the control system. The swiveled connector 1321 allows the control system to alter or adjust the angle (to a degree and/or within a range of such angles) at which a jet of air is released, and at which the resulting thrust is generated.

When high-pressure air is released through nozzle 1311, the resulting jet of air draws water up through and/or out from the open upper end 1314 of tube 1313, with the water within the tube 1313 being drawn into the tube through the tube's open lower end 1336.

An embodiment similar to the one illustrated in FIGS. 75-79 lacks a valve at 1335, and instead constantly allows a portion of the high-pressure air within its high-pressure accumulator 1326 to be released through nozzle 1311 and thereby generate thrust. Such an embodiment might enjoy a more reliable source of propulsion at the expense of a relatively minor amount of potential (air pressure) energy.

Similarly, an embodiment similar to the one illustrated in FIGS. 75-79 lacks both the valve at 1335 and the swiveled connector 1321.

Figure 80:
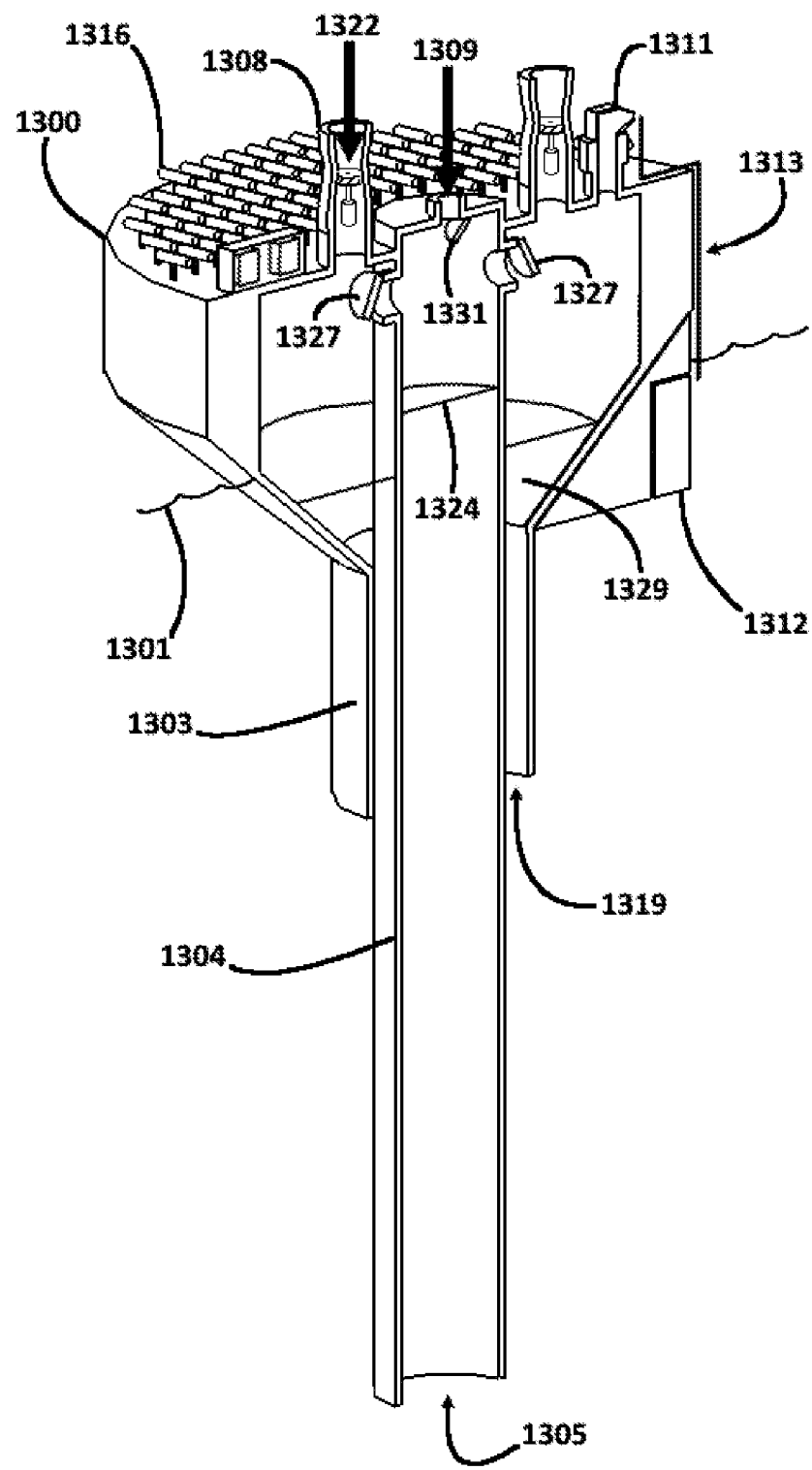
FIG. 80 is an elevated, perspective cross sectional view of the embodiment of FIG. 75.

FIG. 80 shows a perspective cross-sectional view of the same embodiment of the present invention that is illustrated in FIGS. 75-79, and, as with the side cross-sectional view illustrated in FIG. 79, the line 79-79 specified in FIG. 78 defines the section plane to which the view in FIG. 80 corresponds.

We claim:

1. A wave energy to electrical energy converter, comprising:
    a buoy adapted to be disposed on a surface of a body of water;
    an elongate tubular water-and-air column extending downwardly from the buoy, the elongate tubular water-and-air column including an opening at a lowermost end for ingress and egress of water;
    a high pressure accumulator within the buoy and partially filled with water to increase a draft of the converter, the high pressure accumulator formed with an opening adjacent a lowermost end, said opening configured to allow water and air to ingress and egress the high pressure accumulator;
    a valve connecting the high pressure accumulator with an upper portion of the elongate tubular water-and-air column;
    a duct connecting the high pressure accumulator with a gaseous atmosphere external to the buoy;
    a turbine disposed within the duct and driven by air flowing through the duct;
    wherein a level of water within the elongate tubular water-and-air column oscillates as waves pass under the buoy, and air in the elongate tubular water-and-air column is driven through the valve into the high pressure accumulator to maintain air flow to the turbine.

2. The wave energy to electrical energy converter of claim 1, further comprising a nozzle coupled to the high pressure accumulator configured to provide horizontal thrust for navigation.

3. The wave energy to electrical energy converter of claim 2, further comprising a rudder cooperating with the nozzle for navigation.

4. The wave energy to electrical energy converter of claim 1, wherein a portion of the buoy is configured to increase a waterplane area of the buoy as a waterline of the buoy is reduced.

5. The wave energy to electrical energy converter of claim 4, wherein the portion of the buoy is frustoconical having a vertical axis.

6. The wave energy to electrical energy converter of claim 1, wherein a portion of the high-pressure accumulator surrounds and forms an annular gap with the elongate tubular water-and-air column.

7. The wave energy to electrical energy converter of claim 1, further comprising computational circuits powered by energy derived from the turbine.

8. The wave energy to electrical energy converter of claim 1, further comprising a phased array of antennae on an upper surface of the buoy.

9. The wave energy to electrical energy converter of claim 1, wherein a depth of the opening of the high pressure accumulator establishes a maximum air pressure in the high pressure accumulator.

10. The wave energy to electrical energy converter of claim 1, wherein the turbine has a resistance that is managed by a control system to establish an amount of air confined by the high pressure accumulator.

* * * * *